US008417471B2

(12) United States Patent
Swarztrauber et al.

(10) Patent No.: US 8,417,471 B2

(45) Date of Patent: Apr. 9, 2013

(54) SYSTEMS AND METHODS FOR ELECTRICITY METERING

(75) Inventors: Sayre Swarztrauber, New York, NY (US); Siddharth Malik, New York, NY (US)

(73) Assignee: Quadlogic Controls Corporation, Long Island City, NY (US)

(*) Notice: Subject to any disclaimer, the term of this patent is extended or adjusted under 35 U.S.C. 154(b) by 0 days.

(21) Appl. No.: 13/217,388

(22) Filed: Aug. 25, 2011

(65) Prior Publication Data

US 2012/0019297 A1 Jan. 26, 2012

Related U.S. Application Data

(63) Continuation of application No. 12/713,030, filed on Feb. 25, 2010, now Pat. No. 8,026,628, which is a continuation of application No. 11/604,043, filed on Nov. 22, 2006, now abandoned.

(60) Provisional application No. 60/813,901, filed on Jun. 15, 2006, provisional application No. 60/739,375, filed on Nov. 23, 2005.

(51) Int. Cl.
*G06F 19/00* (2011.01)

(52) U.S. Cl.
USPC .......... 702/61

(58) Field of Classification Search .......... 307/1, 2, 307/3, 4; 702/61
See application file for complete search history.

(56) References Cited

U.S. PATENT DOCUMENTS

| | | | |
|---|---|---|---|
| 4,218,655 | A | 8/1980 | Johnston et al. |
| 4,668,934 | A | 5/1987 | Shuey |
| 4,700,188 | A | 10/1987 | James |
| 5,874,903 | A | 2/1999 | Shuey et al. |
| 5,994,892 | A | 11/1999 | Turino et al. |

(Continued)

FOREIGN PATENT DOCUMENTS

| | | |
|---|---|---|
| CA | 2 279 802 | 2/2003 |

OTHER PUBLICATIONS

International Search Report in PCT/US2006/044762 Mar. 11, 2008.

(Continued)

*Primary Examiner* — Daniel Cavallari

(74) *Attorney, Agent, or Firm* — Cowan, Liebowitz & Latman, P.C.; Steven D. Underwood

(57) ABSTRACT

In one aspect, the invention comprises a system comprising: a master data clock source; one or more transponders; and a plurality of remote power line transceivers; wherein all of said plurality of transceivers are connected to a common alternating current power distribution grid; and wherein each of said plurality of transceivers has a location is operable to monitor a voltage waveform of a power line prevailing at said location. In another aspect, the invention comprises a system comprising: transponders and remote power line transceivers each connected to a common alternating current power distribution grid each operable to monitor the voltage waveform of the power line prevailing at its own location, and generate selectable frequencies from said local power line waveform of a frequency of p/q times the frequency of said power line where p and q are positive integers greater than or equal to 1.

3 Claims, 227 Drawing Sheets

U.S. PATENT DOCUMENTS

| | | | | |
|---|---|---|---|---|
| 2003/0001754 | A1 | 1/2003 | Johnson et al. | |
| 2003/0158677 | A1 | 8/2003 | Swarztrauber et al. | |
| 2004/0257005 | A1 | 12/2004 | Poehlman et al. | |
| 2005/0137813 | A1 | 6/2005 | Swarztrauber et al. | |
| 2006/0033650 | A1 * | 2/2006 | Leung et al. | 341/143 |
| 2006/0192672 | A1 | 8/2006 | Gidge et al. | |

OTHER PUBLICATIONS

Dr. Kirby C. Holte, Technology Requirements for a Competitive Electric Utility Market in The $21^{st}$ Century, Jul. 1989, IEEE Power Engineering Review, pp. 18-22.

* cited by examiner

0kHz–25kHz BAND

| | |
|---|---|
| Number of Taps | 65 |
| Stop Band Attenuation | 71.23dB |
| Pass Band Upper Frequency | 25kHz |
| Stop Band Lower Frequency | 35kHz |
| Sampled in | 60*4096 |
| Sampled Out | 30*2048 |

25kHz–50kHz Band
| | |
|---|---|
| Number of Traps | 36 |
| Stop Band Attenuation | 81.15dB |
| Pass Band Upper Frequency | 50kHz |
| Stop Band Lower Frequency | 70kHz |
| Sampled in | 60*4096 |
| Sampled Out | 60*2048 |
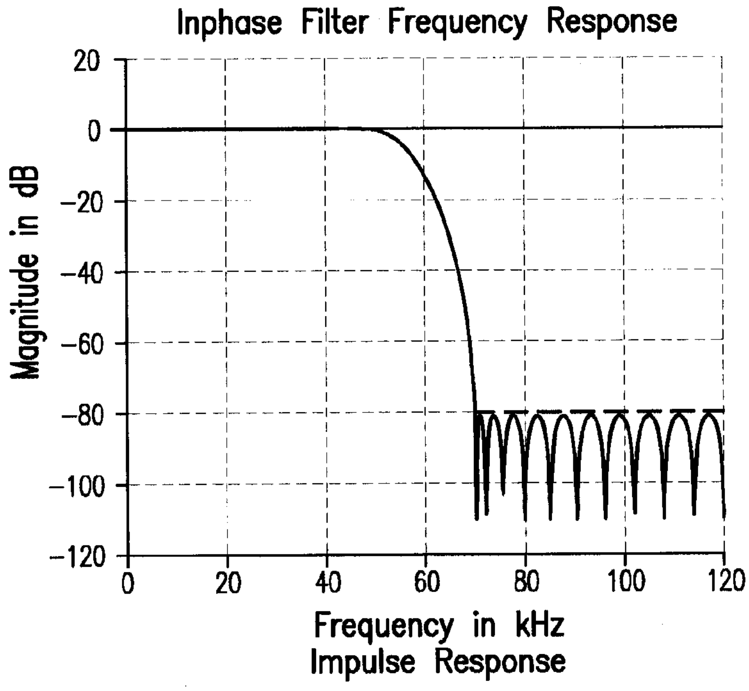
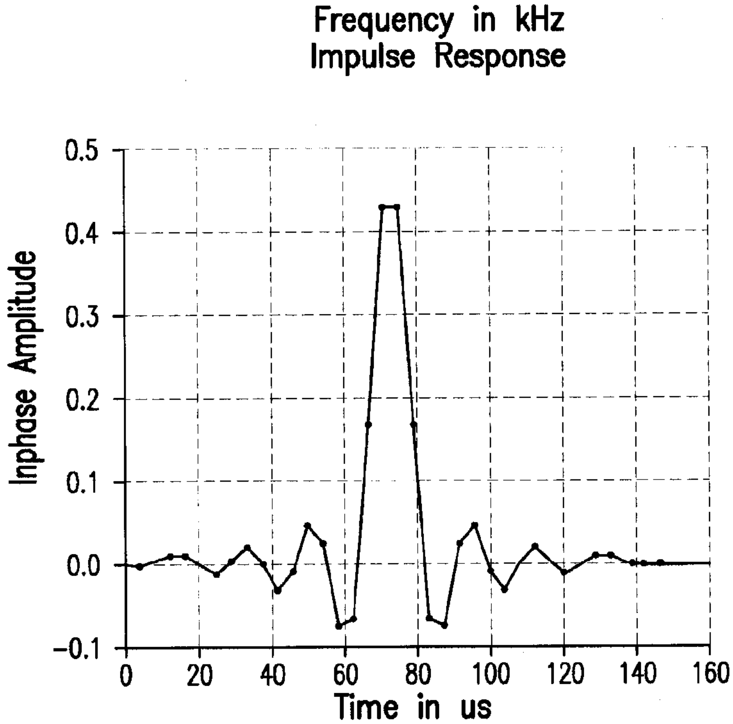
FIG.5

| | |
|---|---|
| Number of Taps | 79 |
| Stop Band Attenuation | 81.15dB |
| Pass Band Lower Freq | 25kHz |
| Pass Band Upper Freq | 45kHz |

| | |
|---|---|
| Number of Taps | 29 |
| Stop Band Attenuation | 80.453dB |
| Pass band Upper Freq | 3kHz |
| Stop band Lower Freq | 12kHz |

ID HARDWARE BLOCK DIAGRAM

1M X 16

IMPORTANT NOTE: THE /RSTOUT SIGNAL MUST BE USED TO DRIVE THE OUTPUT ENABLE PINS OF U19 TO ALLOW THE D16, D17, D18, D19, D21, D24, D25, & D26 SIGNALS TO BE LATCHED CORRECTLY BY THE MCF5270/1 FOR CONFIGURATION AT RESET

I/O PC BOARD PCB230-1

GP10 PCB230

RTC/TAMPER TEMP/RESET PCB202-3

PLC RCV PCB202-3

| | | |
|---|---|---|
| FIG.23J-1 | FIG.23J-2 | FIG.23J-3 |
| FIG.23J-4 | FIG.23J-5 | FIG.23J-6 |

FIG.23J

BDM/JTAG

Cont. on Fig.24A-2

FLASH MEMORY

Cont. from Fig.24G-3

METER I PCB202−3

METER V SCH202-3

PLC RCV PCB202-3

PLC XMIT

PLC SCH202-3

LEDS/SWITCHES PCB202–3

SYSTEMS AND METHODS FOR ELECTRICITY METERING

CROSS-REFERENCE TO RELATED APPLICATIONS

This application is a continuation of U.S. patent application Ser. No. 12/713,030, filed Feb. 25, 2010 now U.S. Pat. No. 8,026,628, which is a continuation of U.S. patent application Ser. No. 11/604,043, filed Nov. 22, 2006 now abandoned, which claims the benefit of U.S. Provisional App. No. 60/813,901, filed Jun. 15, 2006, and U.S. Provisional Pat. App. No. 60/739,375, filed Nov. 23, 2005. The entire contents of each of those applications are incorporated herein by reference.

COMPUTER PROGRAM LISTING APPENDIX SUBMITTED ON A COMPACT DISC

Submitted herewith are two identical compact discs. The material on these compact discs is incorporated herein by reference. Each of these identical compact discs contains the following file: Appendix Computer Code.txt, created Jul. 14, 2011, size: 28 kilobytes.

BACKGROUND

There are existing automated meter reading (AMR) power line carrier (PLC) systems that provide for PLC communication between a data concentrator at a substation and a meter installed down the power line in the low voltage service territory. However, most current systems have shortcomings, including single point access, limited capacity, low data rates, additional equipment to bypass the distribution transformer and, above all, lack of scalability. Very low data rates are required in order to provide overall communication reliability, which translates directly into a scalability limitation. For example, prior art systems have utilized transmit and receive frequencies as low as in the audio range in order to pass through distribution transformers. Some of these frequencies are integral multiples of the line frequency ($n\times f_{line}$, where n does not exceed 100), and others are simple fractions of the line frequency ($f_{line}/(2n)$, where n>1). The prior art employing the latter technique allows an energy consumption signal to be superimposed on the power signal at a frequency lower than that of the power signal itself. This places a limitation on the data rates that the system can deliver. The limitation on scalability is primarily caused by the limited number of meters that can be communicated with at one time and the manual programming required when changes are made to the service territory. Overall, the shortcomings of current systems include lack of reliability, flexibility, and scalability.

PLC systems make it possible to analyze network disturbances using electrical connectivity. Using PLC systems, the supply of electricity can be much more directly verified, as compared to systems that depend on wireless coverage. Various prior art PLC have used polling mechanisms to detect outages, while others have kept the meter and data collector continuously in communication. Also, there are prior art systems that report an outage event by a battery-backed up system that senses loss of power and activates a modem that relays the power loss information. One disadvantage of such systems is that when many meters simultaneously lose power, the concurrent "last gasp" messages can create considerable collisions and noise.

SCADA-like systems use transceivers at substations and various infrastructure points (e.g., distribution transformers and substation feeders) to check the status of the power transmission network. These transceivers constantly monitor the operation of such instruments and relay information when a fault is encountered.

What are needed are AMR systems that require minimal manual intervention and are scalable as the number of installed meters increases, either due to mandatory procedures in place or due to high energy costs and the need to eliminate unmetered services. As utilities strive to reduce operating costs, a system that is economically scalable and overcomes some or all of the above-mentioned problems is highly desirable. The scalability issue also implies that an automated system that the utility can install across the entire service territory (including multiple generating stations) or a subsection thereof (including multiple substations), which provides a single-point control which provides data and status of installed meters, is needed. In addition, any technological progress that lowers the cost per metering point for a large system (e.g., more than 500 meters) by eliminating any additional equipment required at each transformer for PLC signaling is always welcomed by utilities.

It is a goal of this invention to present a two-way PLC AMR system that avoids the above-mentioned shortcomings of the prior art systems.

The current invention, in at least one embodiment, comprises a two-way communication system for reading interval metering data over medium tension distribution lines (4-33 kV), traversing distribution transformers to the metering devices on low tension lines (120-600 volts), without requiring any special equipment at the distribution transformers, while maintaining a reliable and cost effective AMR solution.

The use of power lines for signaling, meter reading, load control, and other communication purposes has been well documented (see, for example, U.S. Pat. No. 6,947,854, to Swarztrauber, incorporated herein by reference). In a network installation with a population of more than one meter, and a transponder accessing this population, the technology described by Swarztrauber presented a PLC communication system that included programming the meter to a specific channel (one of 16 in each of two bands that cover 15-35 kHz). The transponder could remotely program the channel of each meter by utilizing a "base channel" that all meters could recognize, to direct each meter to its proper "resting" channel, isolated from the other channels by a sufficient frequency difference to allow simultaneous communications of each transponder to each meter.

However, as the system size grows, following the above procedure, each transponder requires at least two unique frequencies to avoid interference from other installed devices using RF communication over power lines. In addition, the system maintains a cross reference list at the transponder, listing the meters for which the transponder is responsible. In an environment with multiple transponders and multiple polyphase devices, cross coupling of PLC signals can result in degradation of the overall throughput.

SUMMARY

It is accordingly a general object of this invention to provide an improved method to manage the above-referenced scalability issues and to provide a considerable improvement over the existing PLC methodology.

It is also an object of this invention to provide an improvement over the existing methods for performing PLC in a high line noise environment that results in a high signal to noise ratio (SNR) and to eliminate the need for two unique frequencies to avoid interference from devices using PLC communication or random noise.

It is another object of this invention to provide a device for receiving messages via powerline carrier using a microprocessor to decode either Frequency Shift Keying (FSK) or Phase Shift Keying (PSK) signals using a Fast Fourier Transform (FFT) algorithm.

It is another object of this invention to provide a method for obtaining reliable data and event information received from PLC communication with meters, making logical deductions, performing statistical analysis about the service territory and providing an added service to the utility. This may include, but is not limited to, a comprehensive meter-territory map that the system dynamically and automatically updates as changes occur in the meter territory. The dynamic solution is uniquely determined by the ability of meters to decode PLC signals from multiple scan transponders (STs) simultaneously.

Thus, in at least one embodiment, the invention provides an improvement over the prior-art technology to use FFT as the basis for simultaneous decoding of a plurality of transponder communications. For background purposes, the following are incorporated herein by reference in their entirety: U.S. patent application Ser. No. 11/198,795, filed Aug. 4, 2005, to Swarztrauber et al., and U.S. Pat. No. 6,947,854, discussed above.

The above objects and features will be best understood from the detailed description below of certain embodiments, selected for purposes of illustration, along with the drawings.

Those skilled in the art will realize that several implementations variations are possible without deviating from the scope of this invention.

A typical installation includes more than one ST located at each of remotely located substations feeding a section of utility service territory via medium tension lines terminating at distribution transformers from which low voltage lines emanate. Whereas meters are generally installed at customer premises, utilities may install a meter at the output of every distribution transformer, hence increasing the meter population in the service territory. More than one meter typically is located in the low voltage service territory and communicates with its ST. All the STs in a system preferably are connected to a remote server that has a high speed data link in a LAN or WAN configuration and constantly communicates with all the STs. The remote server may itself operate on a clock that is derived from the utility line frequency. This can be implemented by using RTC circuits that use the 60 Hz line frequency as a reference (such as Intersil CDP68HC68T1, a multifunctional CMOS real time clock). With a setup as above, all the STs are synchronously connected and operate using a network protocol (such as Network Time Protocol) so that they all share the same master clock dictated by the server thereby maintaining synchronicity by locking every ST to a common time source.

In one aspect, the current invention enables individual meters to receive, demodulate, and interpret simultaneous communications from all of the Transponders on all bands, communicating on different frequencies at once, eliminating the need for a "base channel" and for programming of a "resting channel." Each meter can listen to all of the STs and respond to the one that requests data from it. Moreover, each meter can communicate information regarding the signal strength of each Transponder that it can hear to the one transponder that is requesting data. This enables moving meters to the "best" transponder for each meter.

The present invention, in at least one aspect, utilizes the installed PLC AMR infrastructure to provide an Event Management System (EMS) that provides a more extensive, practical, and efficient means for reporting events and tracking faults. The invention, in this aspect, thus helps utilities and metering entities to: (1) reduce the number of dispatches made in error based on verification algorithms; (2) automate the integration of an AMR infrastructure to provide a dynamically updated network map; (3) integrate power quality information; (4) use algorithms and back-end processing to proactively verify status of several parts of network; (5) include load profile information for energy forecasting; (6) perform preventive maintenance; (7) indicate status change of network switches, feeder changers, and reclosers; and (8) report such changes to a utility's central control center. For example, collecting network information about power quality may provide information on parts of a network territory with transients. One embodiment provides a Dynamic Mapping Mode of PLC AMR system operation that selects meters (either randomly or based on strategically predetermined criteria) and initiates probing.

In one aspect, the invention comprises a system comprising: a master data clock source; one or more transponders; and a plurality of remote power line transceivers; wherein all of said plurality of transceivers are connected to a common alternating current power distribution grid; and wherein each of said plurality of transceivers has a location is operable to monitor a voltage waveform of a power line prevailing at said location.

In various embodiments: (1) the system is operable to generate a local data clock from said local power line waveform of a frequency of p/q times the frequency of said power line where p and q are positive integers greater than or equal to 1; (2) the master data clock source operable to transmit information regarding the phase and frequency its own local clock to said transponders; the local data clock of the master data clock source being called the master data clock; (3) said transponders and said remote transceivers each operable to inject and receive signals on the power line; (4) said transponder is operable to (a) reconstruct the master data clock from the phase and frequency information received from the master data clock source and its own local data clock; and (b) utilize the reconstructed master data clock to align data bits injected onto the power line; (5) said remote power line transceiver is operable to: (a) receive signals from at least one, but not necessarily all, of the transponders; and/or (b) measure the difference in phase of the local data clock and the master clock by monitoring the signals transmitted from any one or more the transponders; (6) said master data clock source is also a transponder; (7) said remote power line transceiver is capable of storing said phase difference between its local clock and the master data clock so as to be able to create a copy of the master data clock from its own local clock without having to continually reconstruct the data clock by monitoring the received signals; (8) said remote transceivers are also electricity meters; (9) said remote transceivers can receive and interpret signals from more than one transponder simultaneously; (10) each of said transponders is operable to request and receive data to the said meter(s) via power line communications and transmit said data to a remotely located computer; (11) said remote power line transceiver is operable to: (a) measure the phase of the one or more voltage waveforms present at its location; and/or (b) report the phase information of said waveforms to the transponder; and (12) the waveform phase information is correlated with the metering information to allow the voltages, currents and power quantities to be added using vector additions to aggregate such quantities at key points in the power distribution grid.

In another aspect, the invention comprises a system comprising: one or more transponders and a plurality of remote power line transceivers each connected to a common alternating current power distribution grid each operable to monitor the voltage waveform of the power line prevailing at its own location, and generate selectable frequencies from said local power line waveform of a frequency of p/q times the frequency of said power line where p and q are positive integers greater than or equal to 1.

In various embodiments: (1) said transponders and said remote transceivers are each operable to inject and receive signals on the power line; (2) said signals each have a frequency of p/q times the line frequency where p and q are selectable from the set of whole integers; (3) said transponders and said remote transceivers alternate among different frequencies by changing the factor p or invert the phase of a fixed frequency so as to effect FSK or PSK modulation; (4) the frames of the data bits are uniform across the population of transponders and remote transceivers and correspond to the period and phase of the master data clock; (5) binary FSK modulation is used by selecting two values of p, p1 and p2 for the frequencies of the ones and zeros; (6) the receiver of either a transponder or a remote transceiver: (a) utilizes FFT or DFT algorithms calculated successively over the sequential data bit frames; and/or (b) demodulates the data bit at during each data frame by comparing the amplitudes of the signals corresponding to p1 and p2 over the course of each data bit frame.

In another aspect, the invention comprises an apparatus to implement a PLL comprising a input signal source, a VCO, a microprocessor, a DAC, an ADC wherein the VCO is used to drive the clock of the microprocessor; the microprocessor controls the sampling time of the ADC at times determined by its system clock; the ADC monitors the input signal source; the microprocessor reads the ADC; the microprocessor performs some filtering calculations on the signal from the ADC; the microprocessor controls the output of the DAC based upon the said calculations; and the DAC controls the input of the VCO so as to close a PLL around all of the aforementioned elements.

In various embodiments: (1) the input signal is a conditioned copy of the waveform of the A/C power line; and (2) the DAC is a pulse width modulator followed by a low pass filter.

In another aspect, a remotely located computer is operable to identify changes in operation or connectivity of electricity distribution network components. In various embodiments: (1) said components comprise one or more of: meters, transformers, transponders, switches, and feeders; (2) said remotely located computer is operable to distinguish meter changes from transformer changes; (3) said changes comprise outages; (4) said remotely located computer is operable to calculate current output at each of a plurality of transformers; and (5) said remotely located computer is operable to calculate current output at each of said plurality of transformers based on a vector sum of signals on each phase.

DETAILED DISCUSSION OF CERTAIN EMBODIMENTS

One preferred method enabling simultaneous multiple meter-ST communication is discussed with respect to an SCH161 implementation of the device. See FIG. 20.

TABLE 1

Figure 20A:
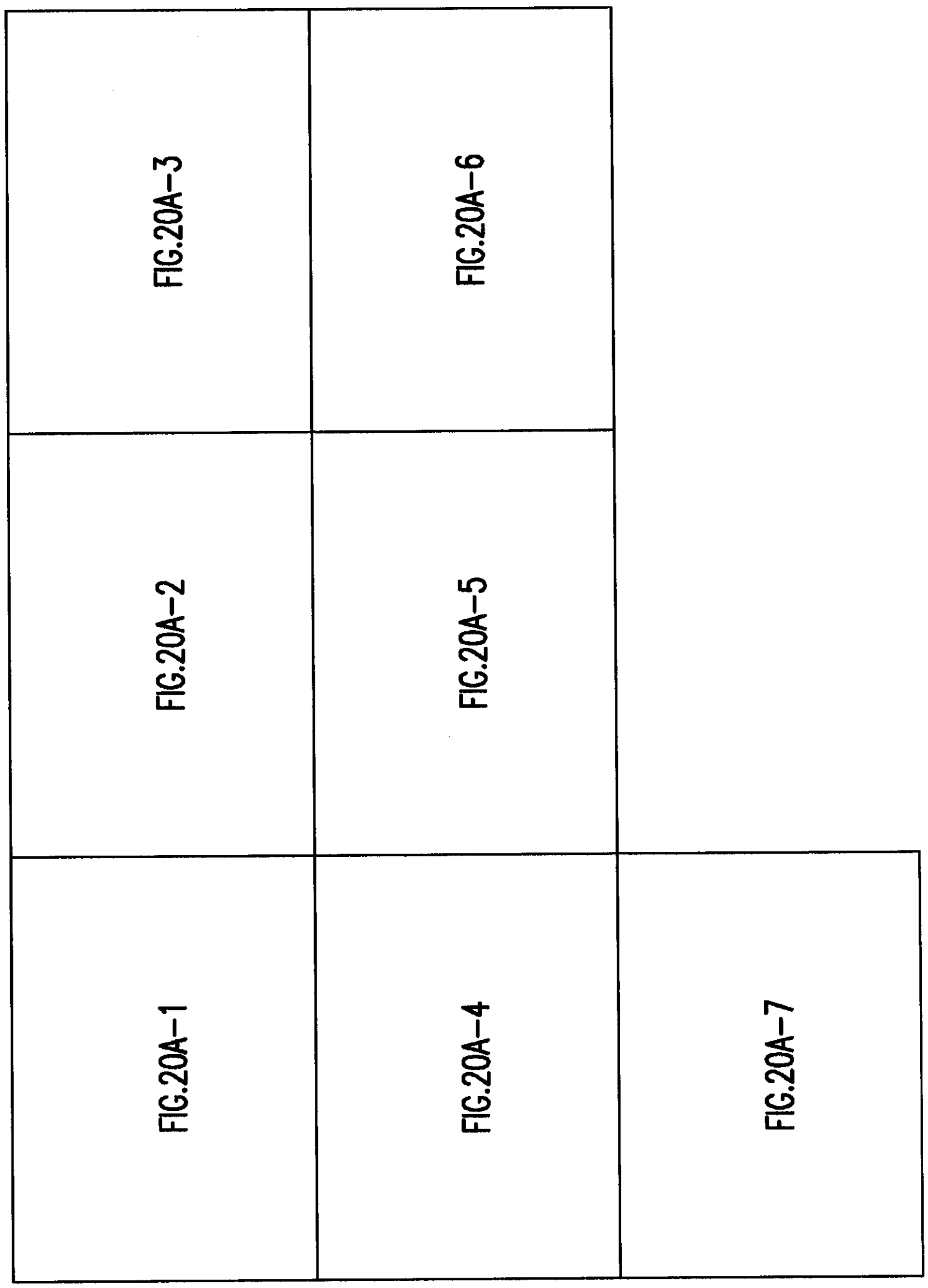
FIGS. 20A-L depict schematics for a preferred board for implementing the FFT embodiments.
Figures 1, 20A:
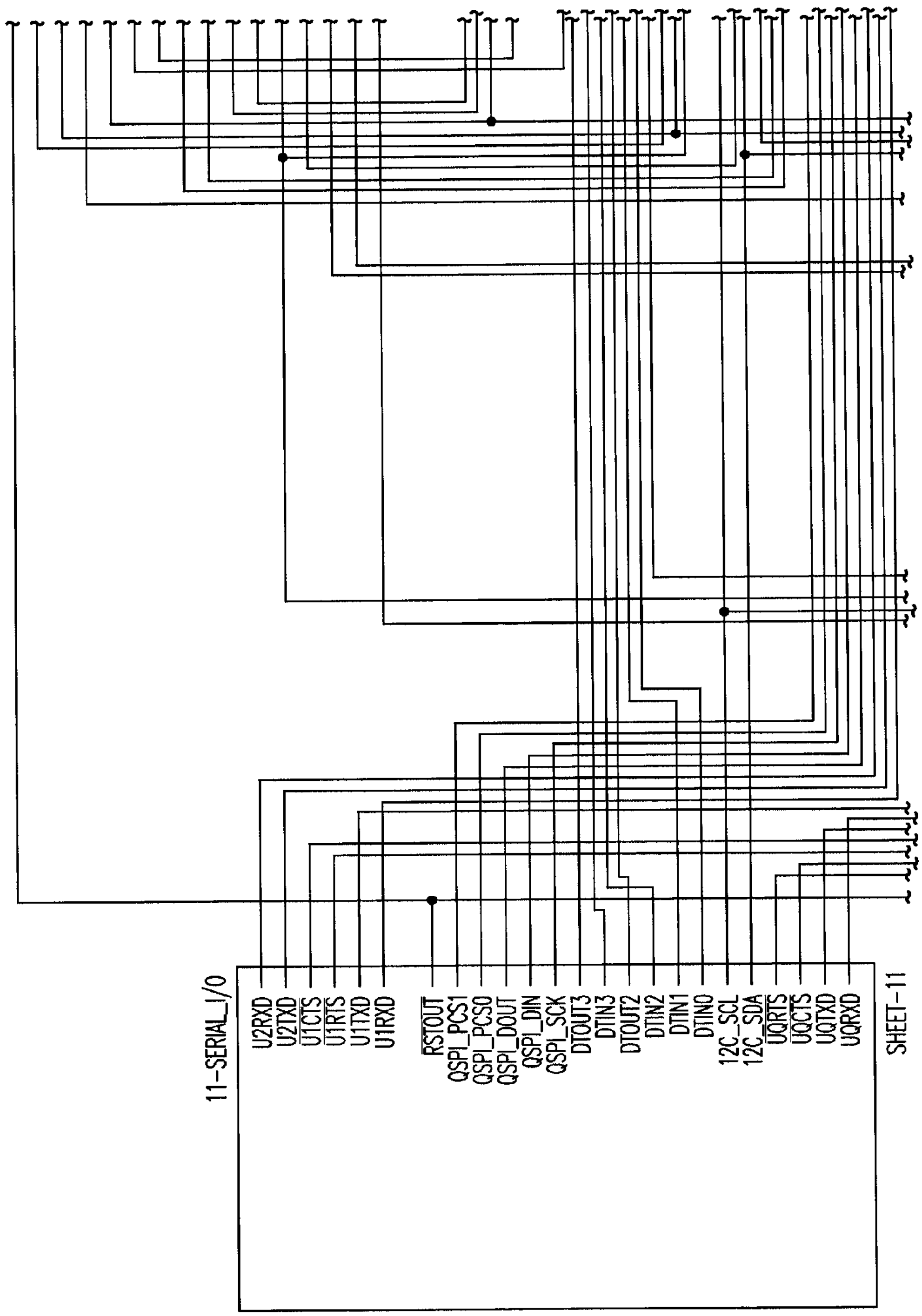
Figures 2, 20A:
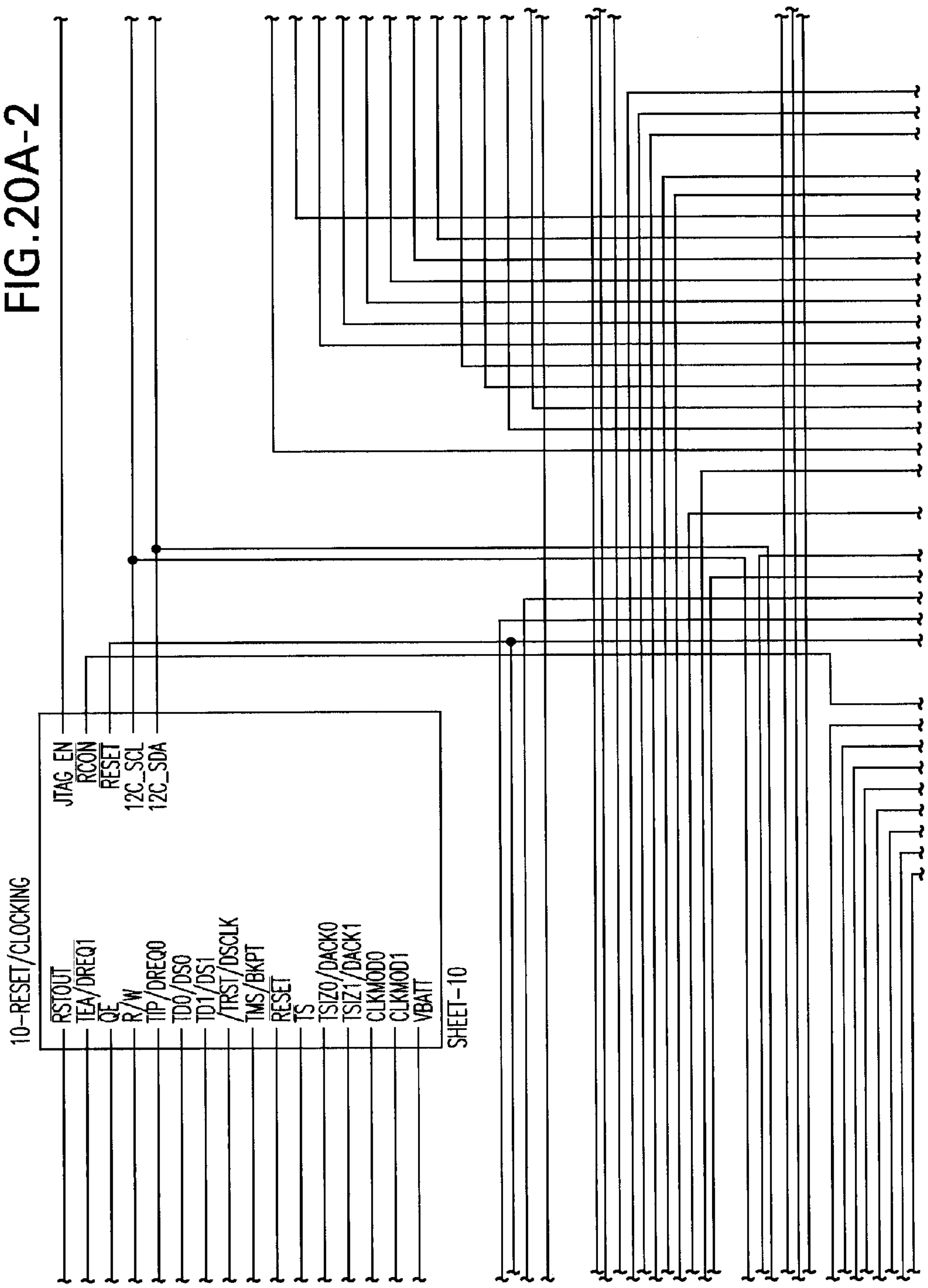
Figures 3, 20A:
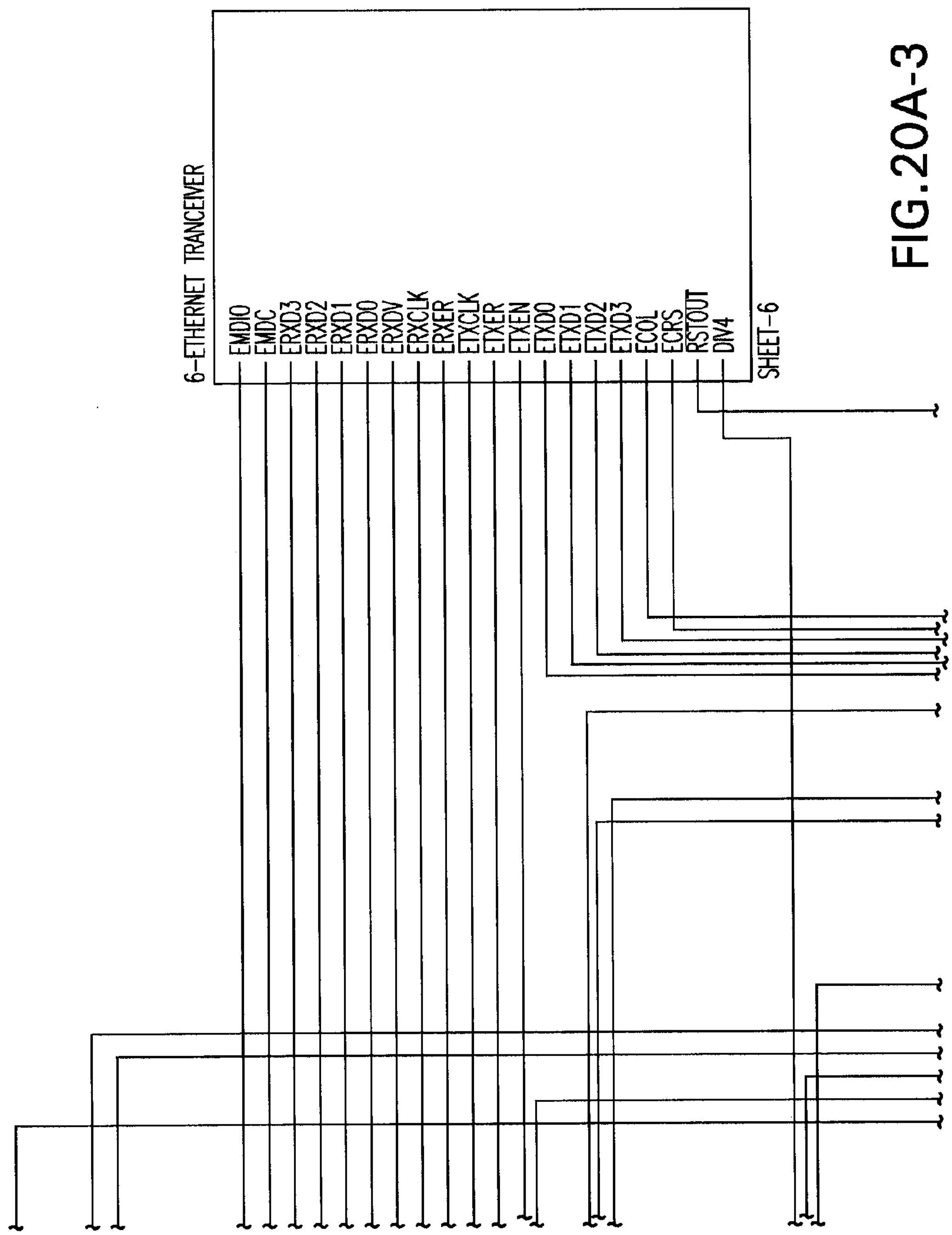
Figures 4, 20A:
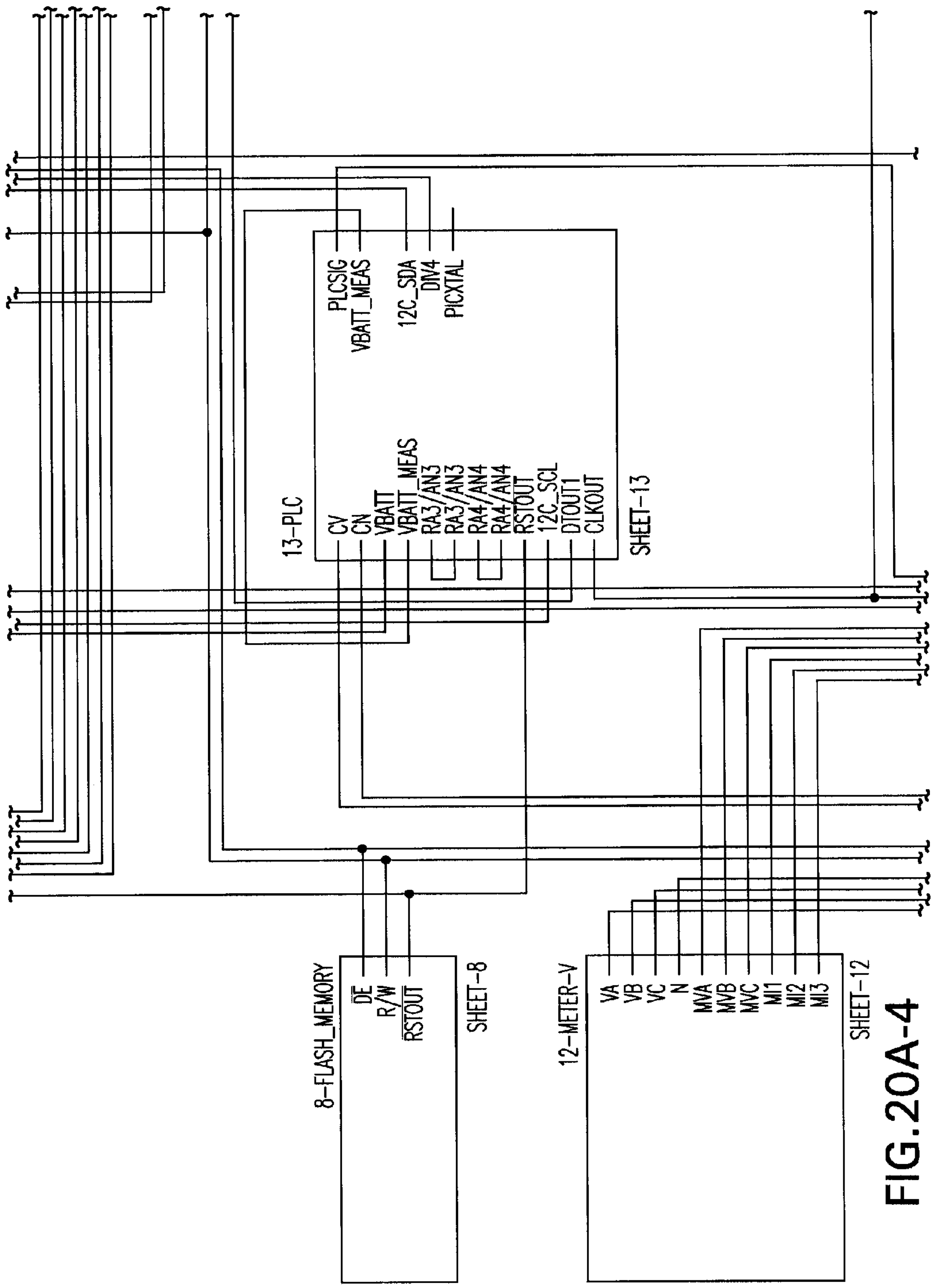
Figures 5, 20A:
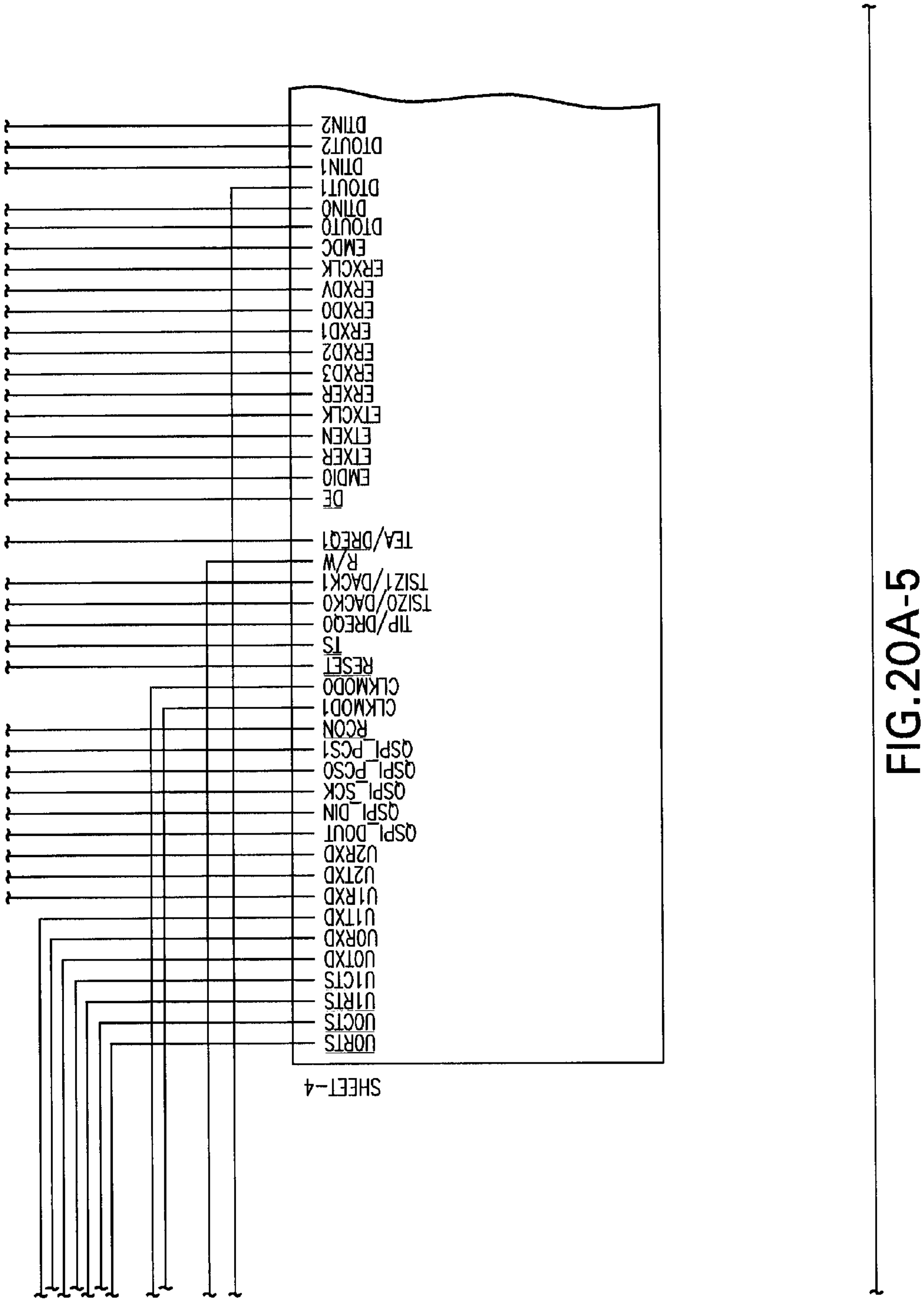
FIG. 5 depicts preferred FIR specifications for 25-50 kHz.
Figures 6, 20A:
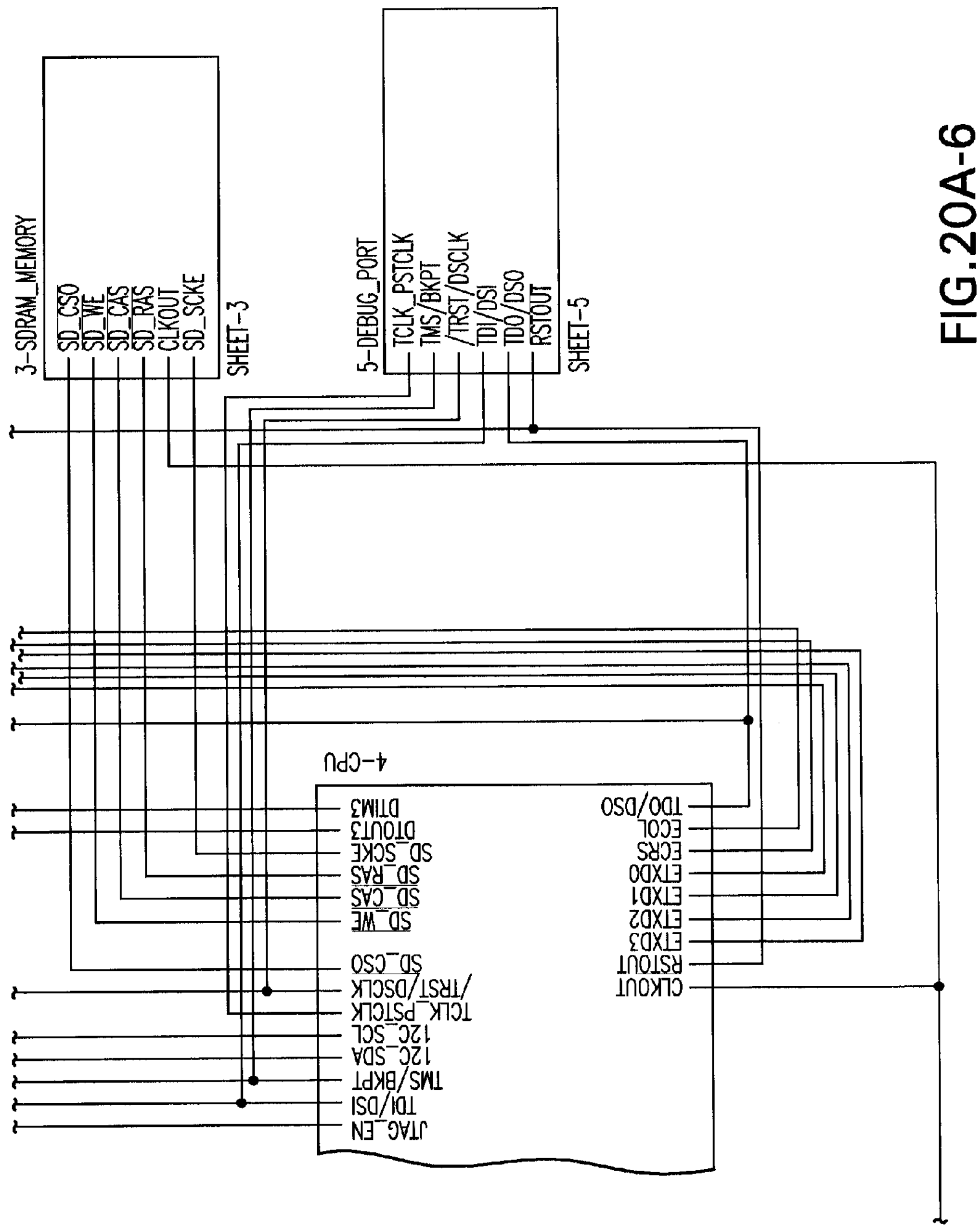
Figures 7, 20A:
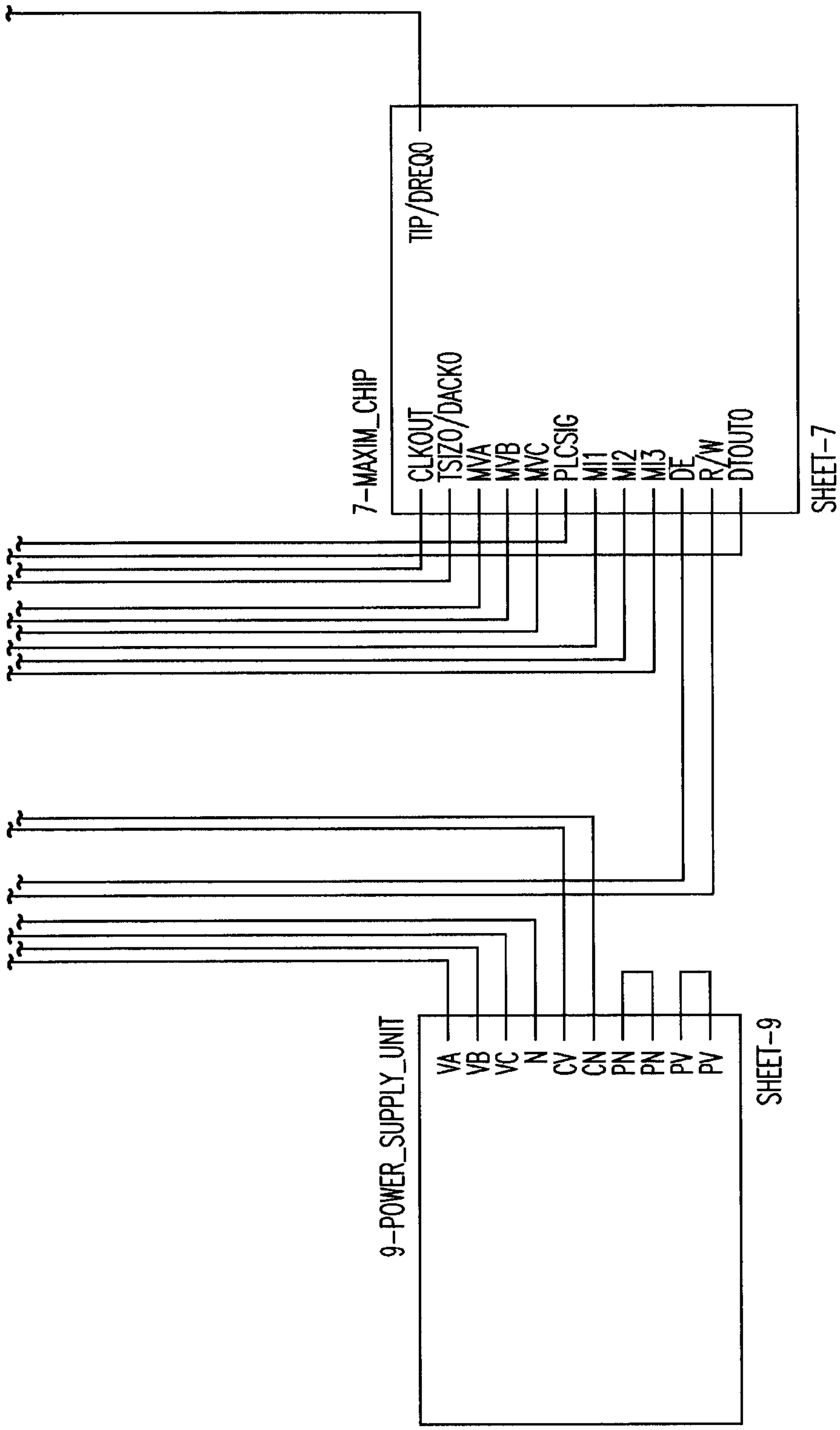
Figure 20B:
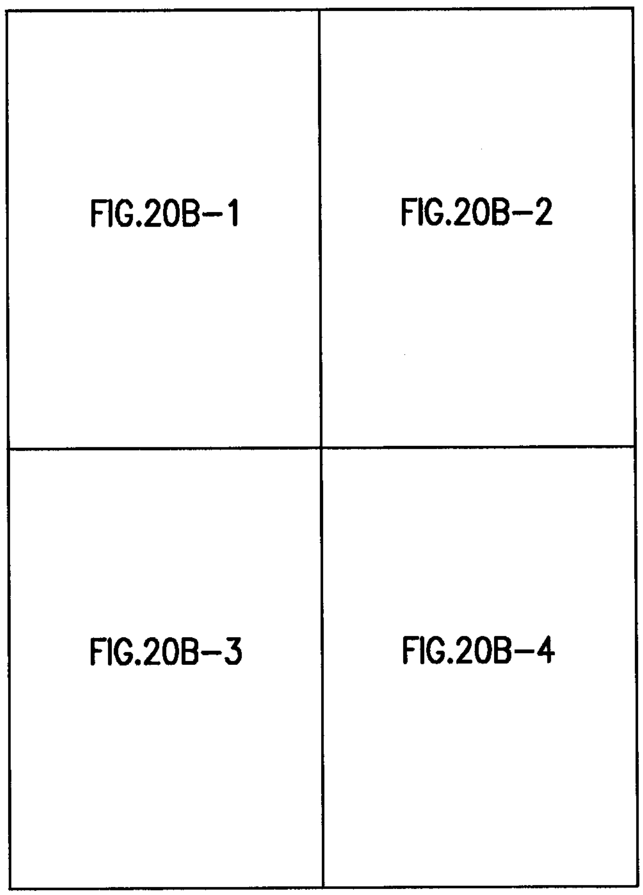
Figures 1, 20B:
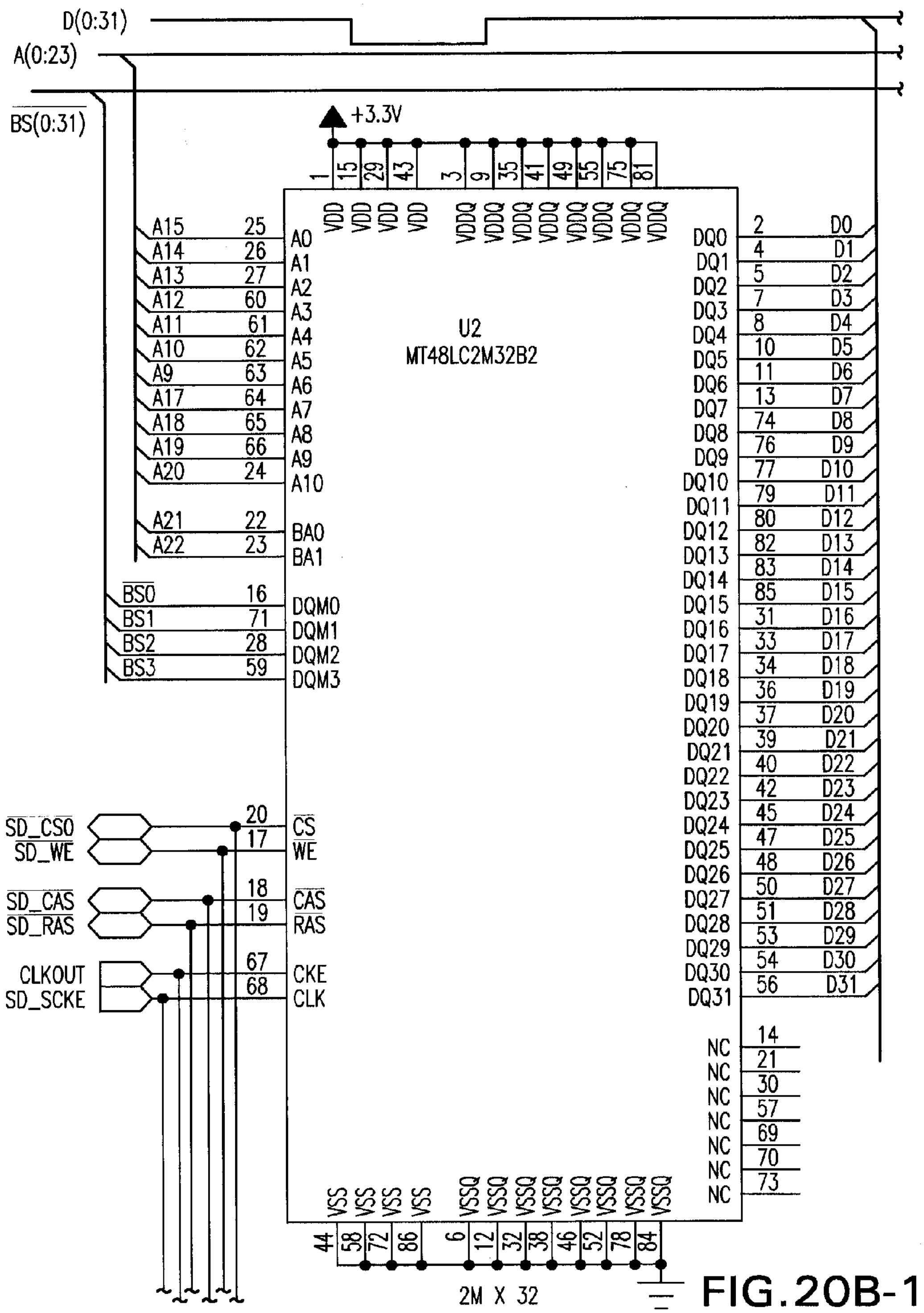
Figures 2, 20B:
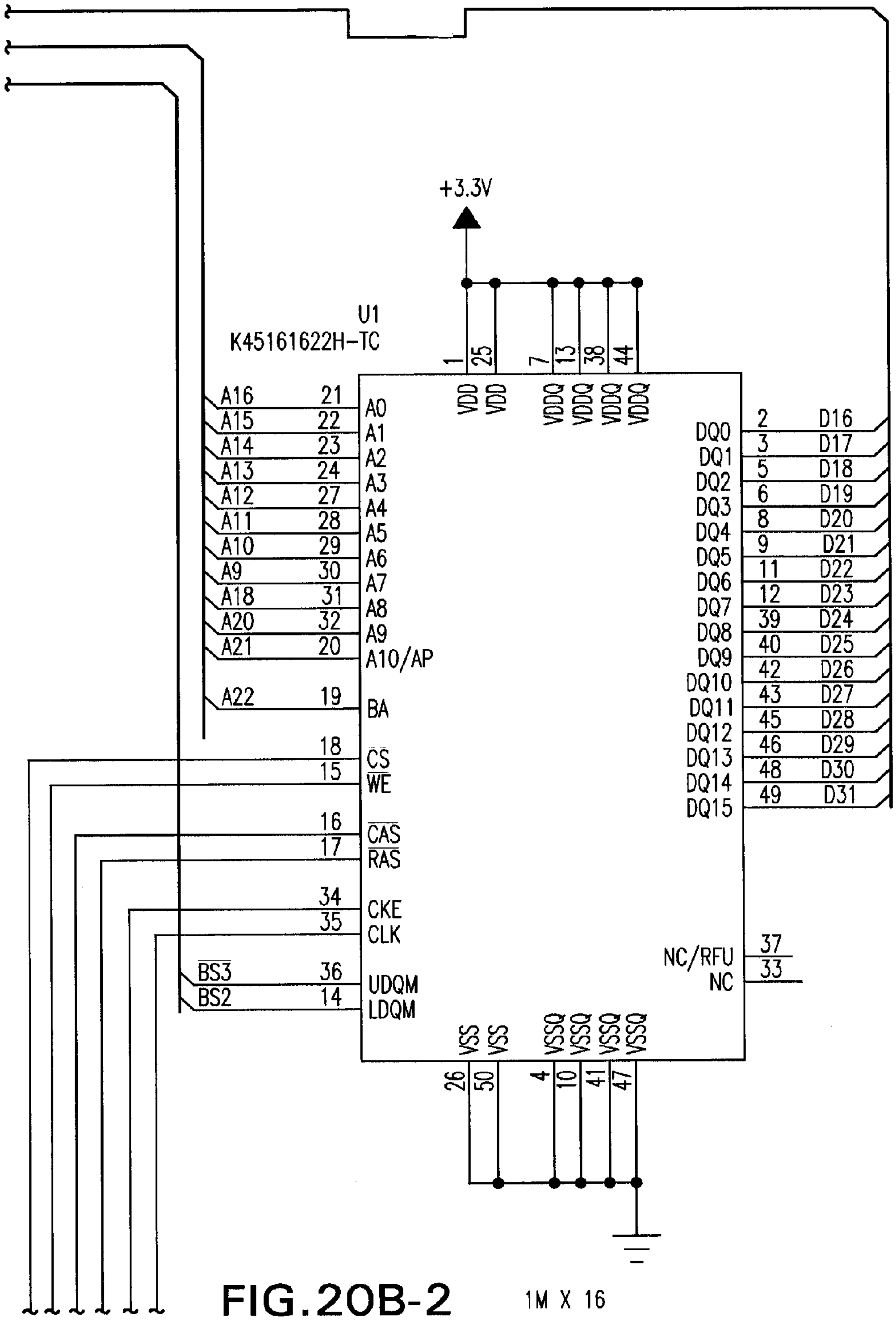
Figures 3, 20B:
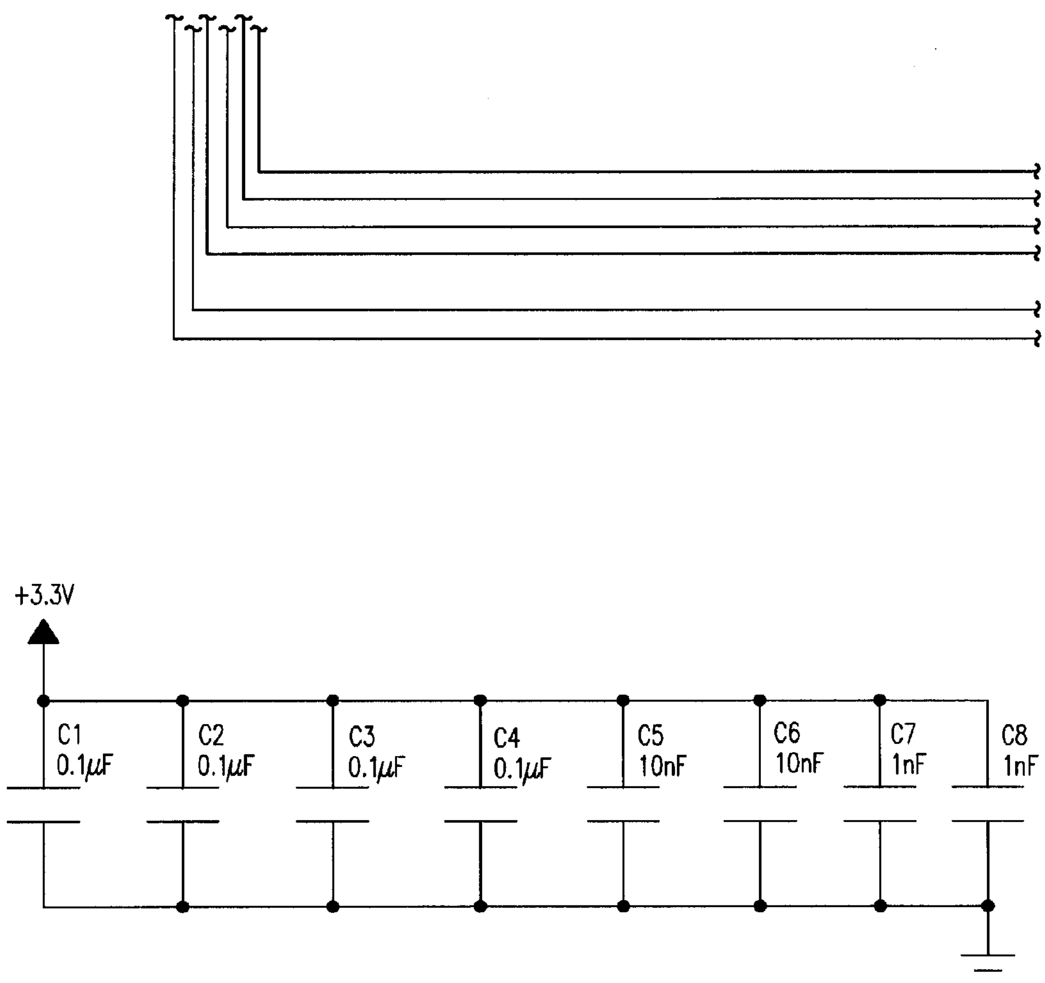
Figures 4, 20B:
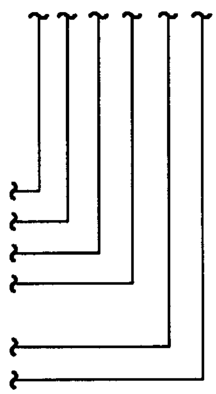
Figure 20C:
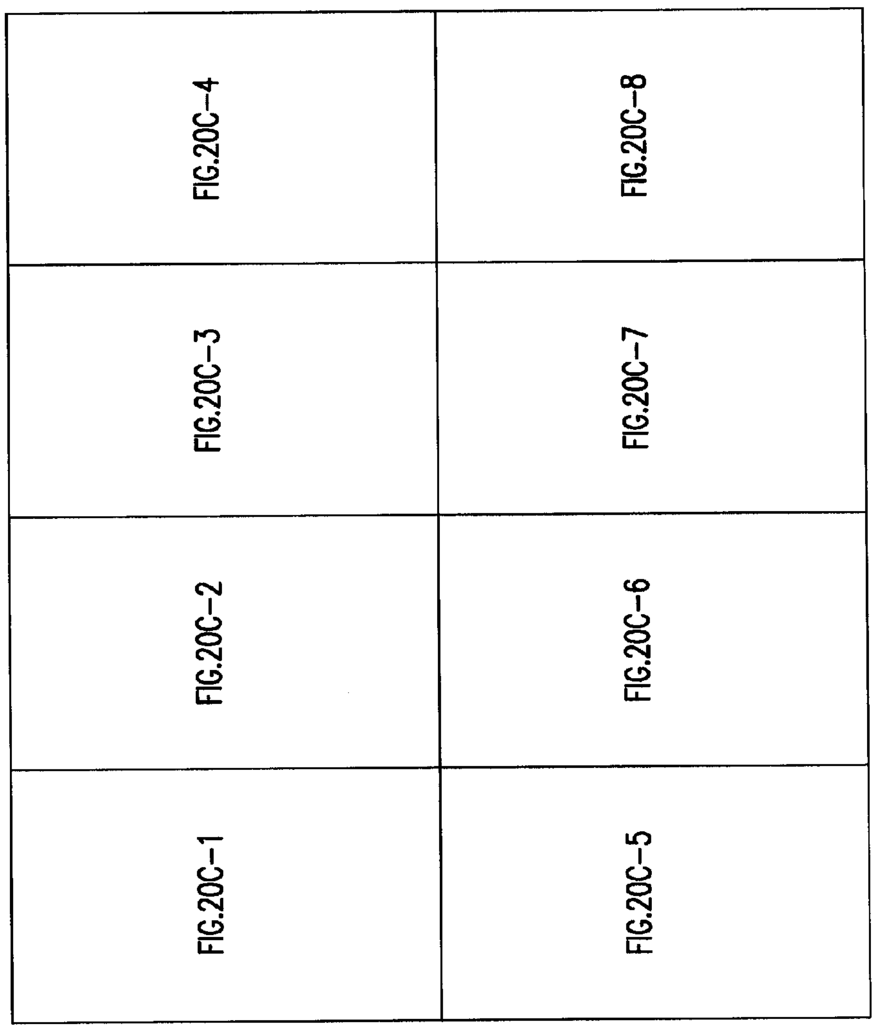
Figures 1, 20C:
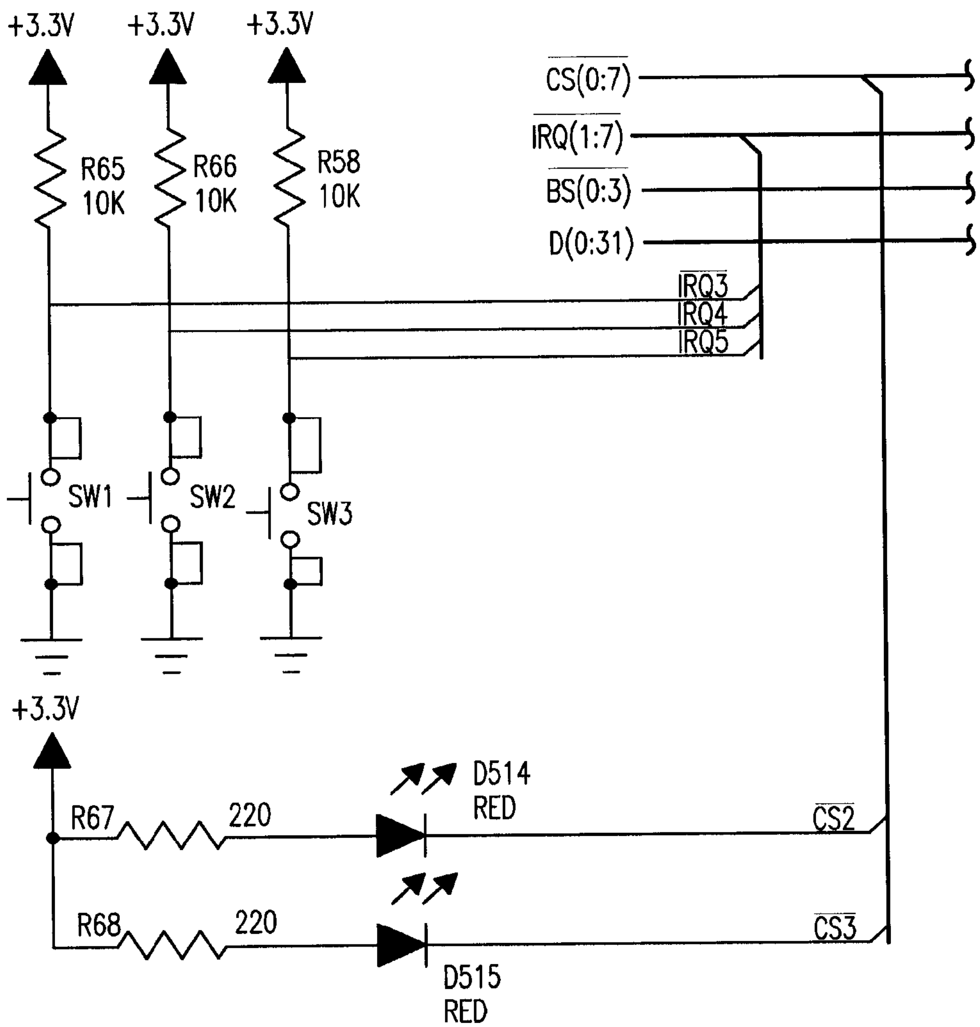
Figures 2, 20C:
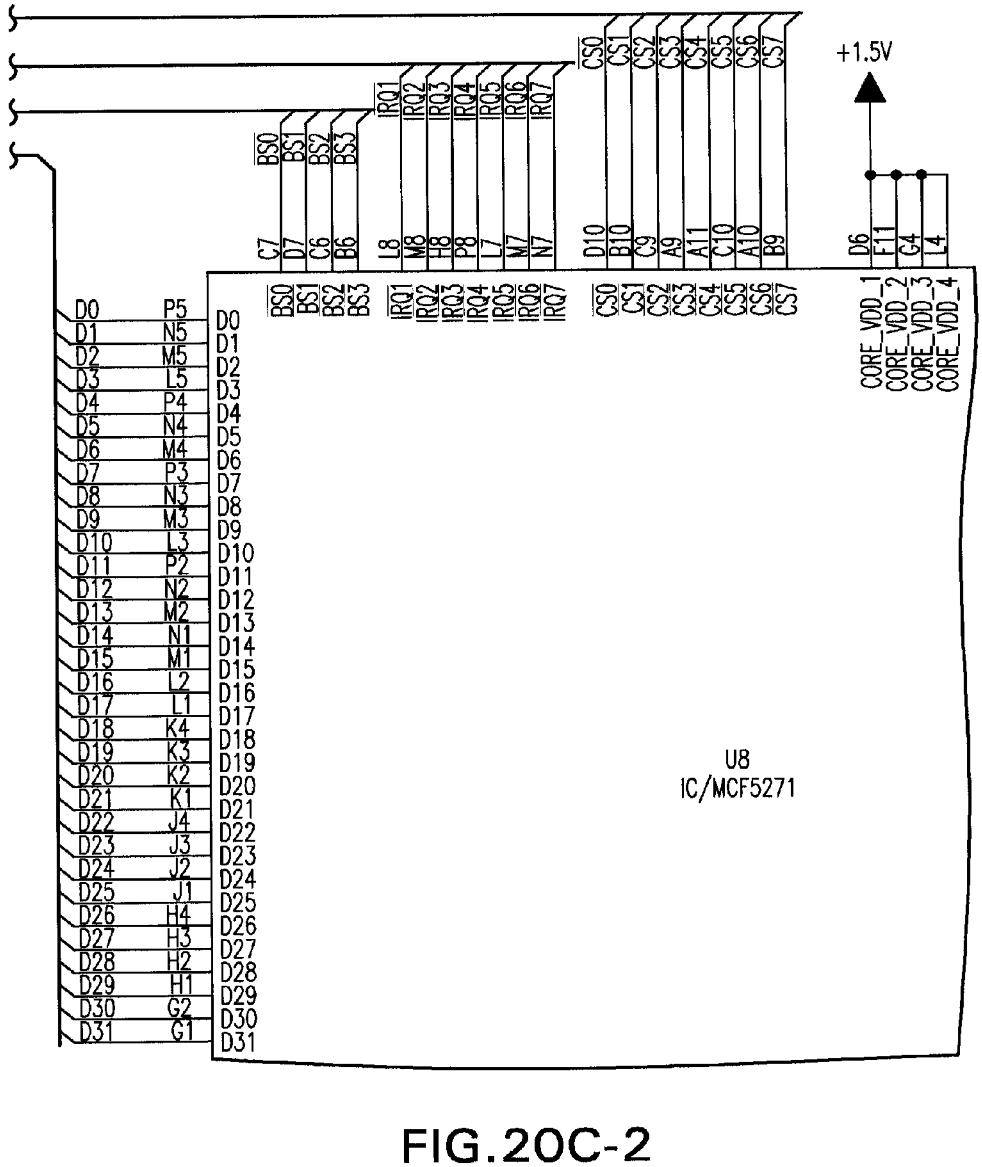
Figures 3, 20C:
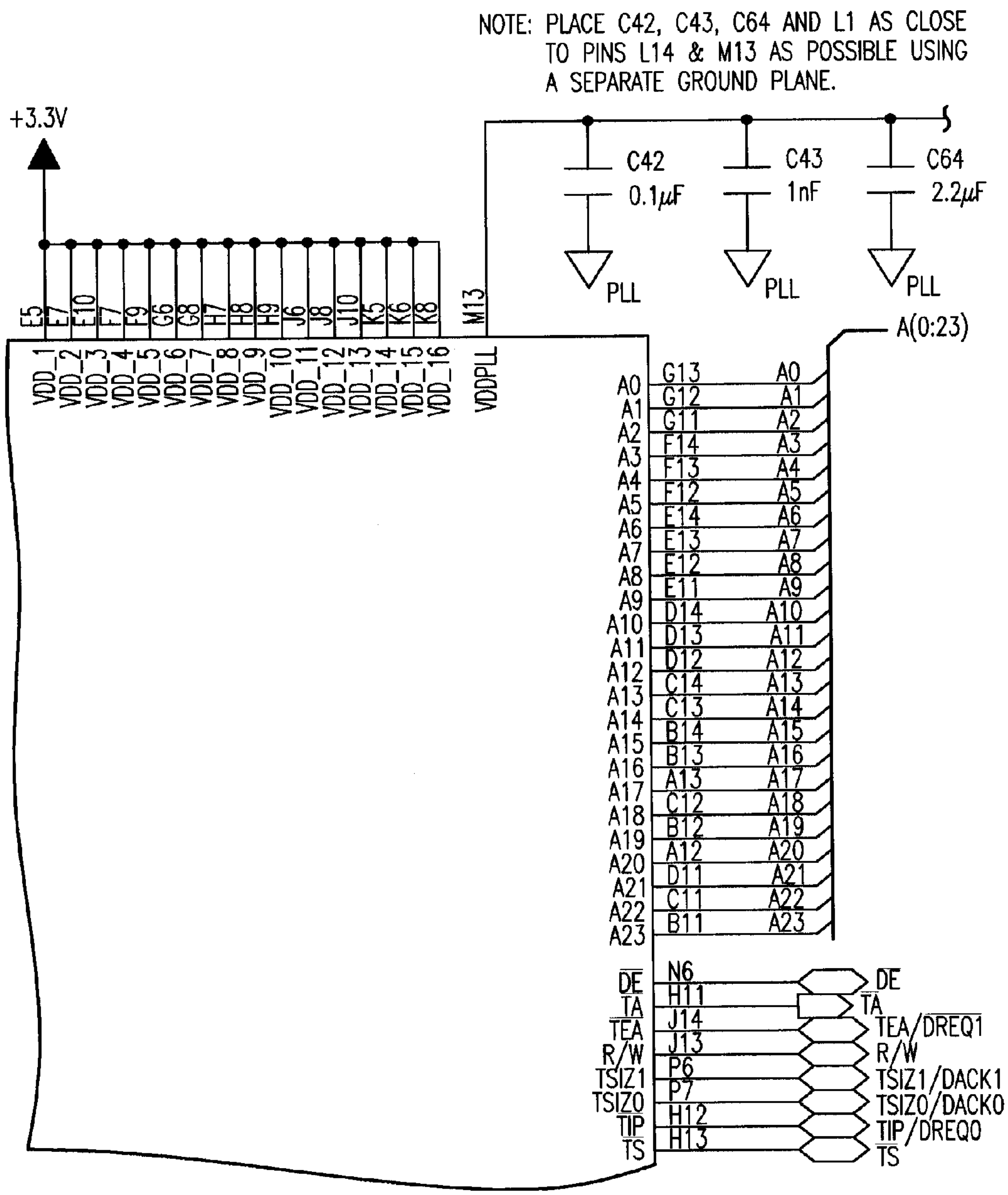
Figures 4, 20C:
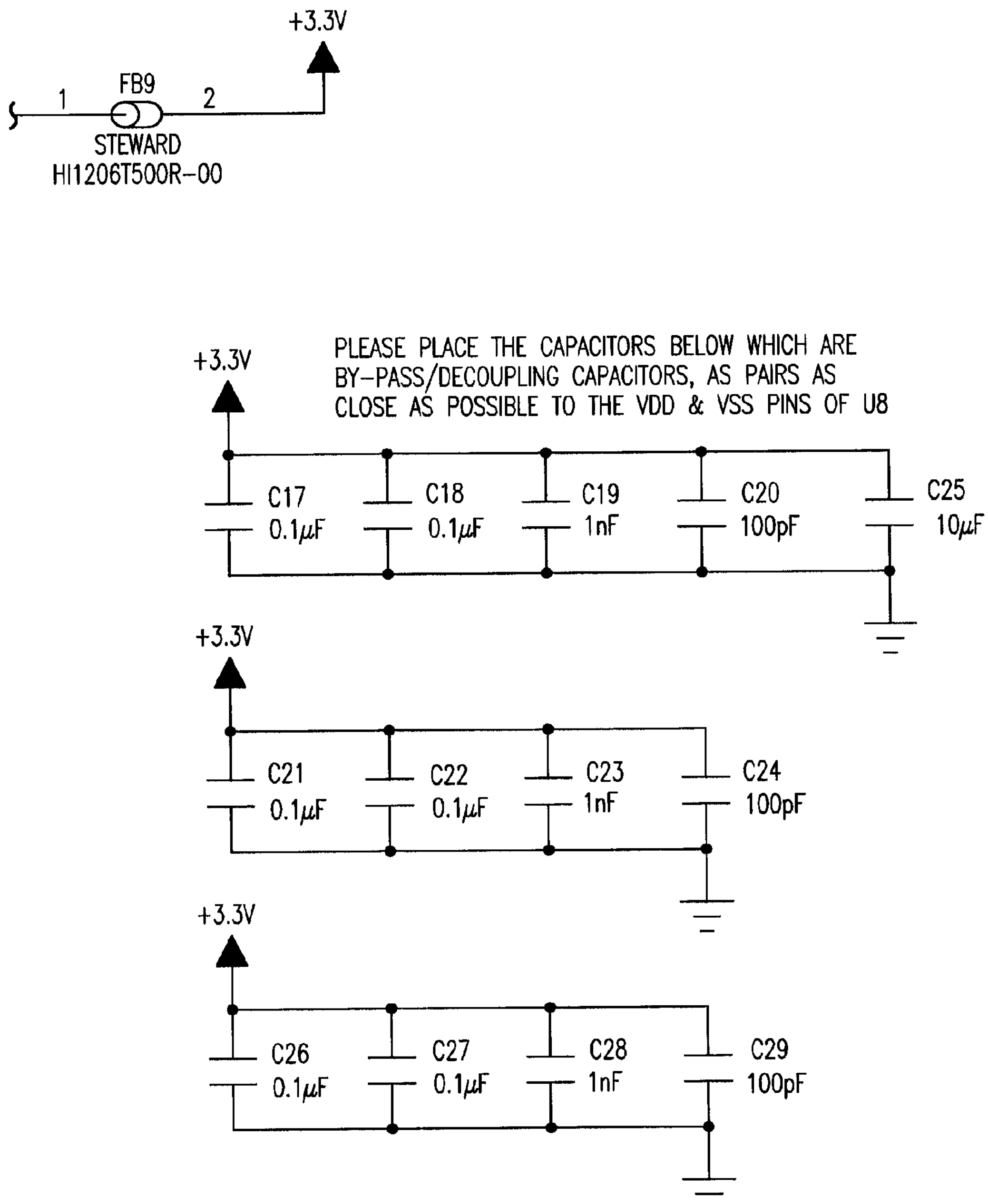
Figures 5, 20C:
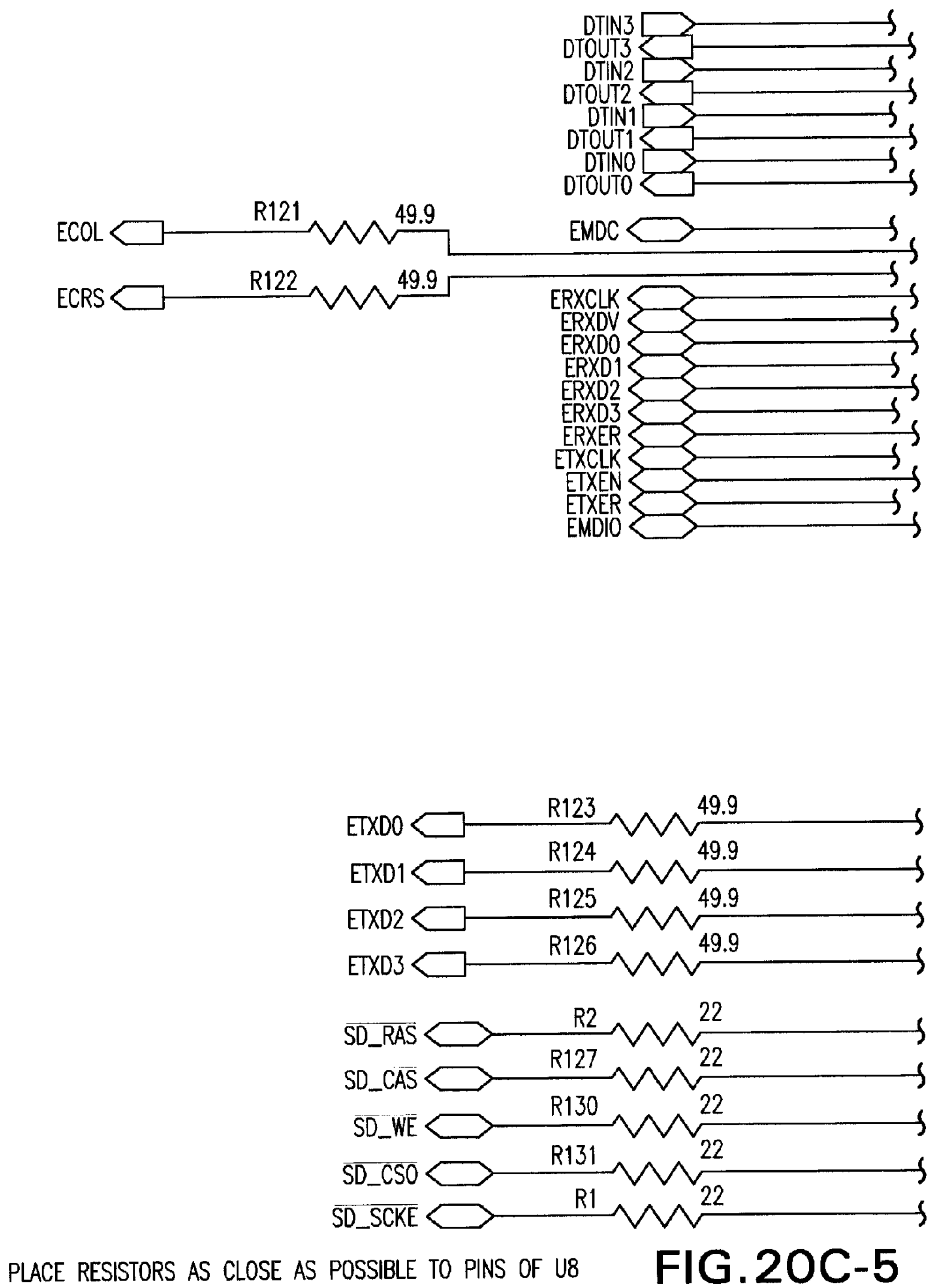
Figures 6, 20C:
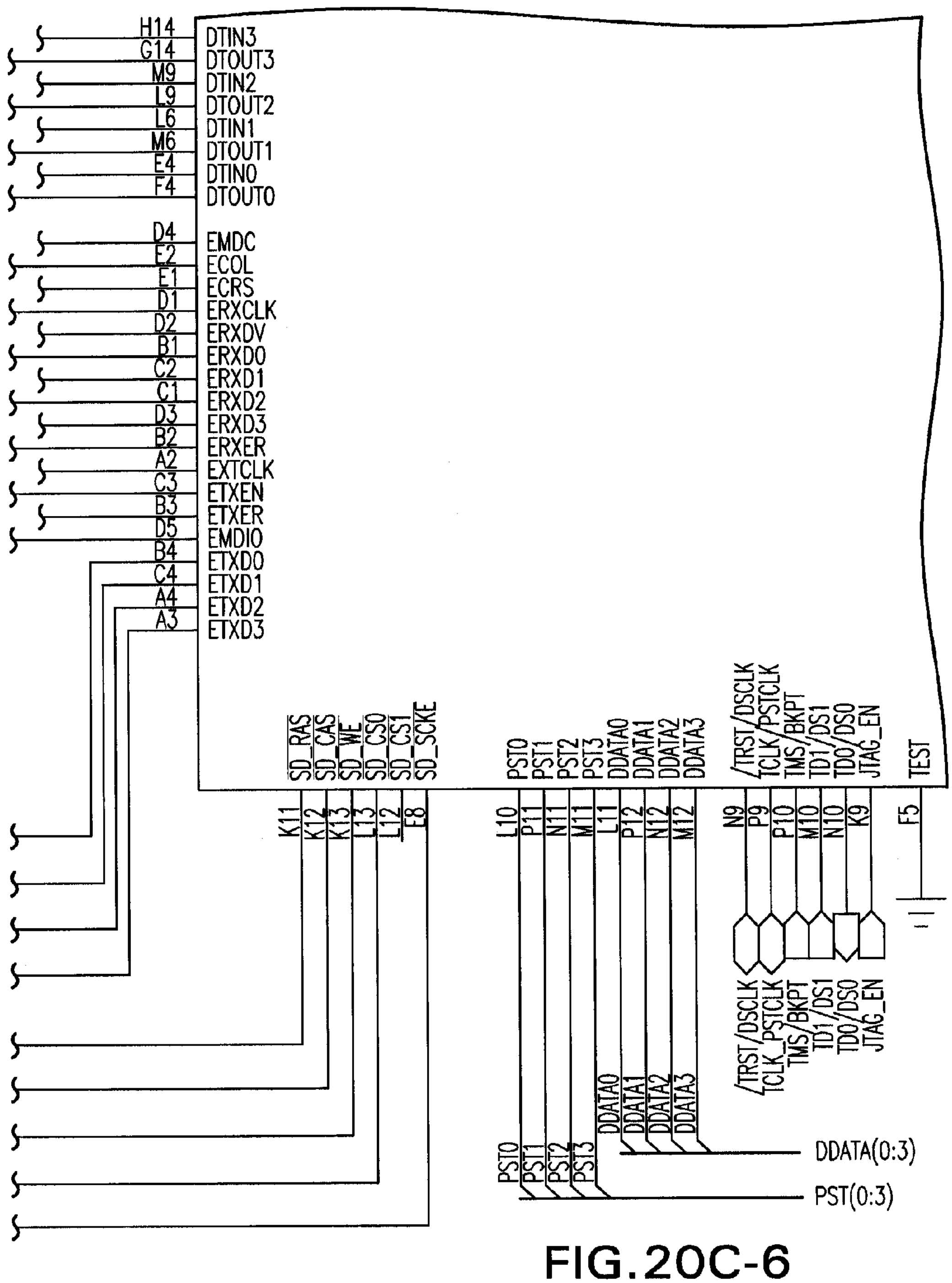
Figures 7, 20C:
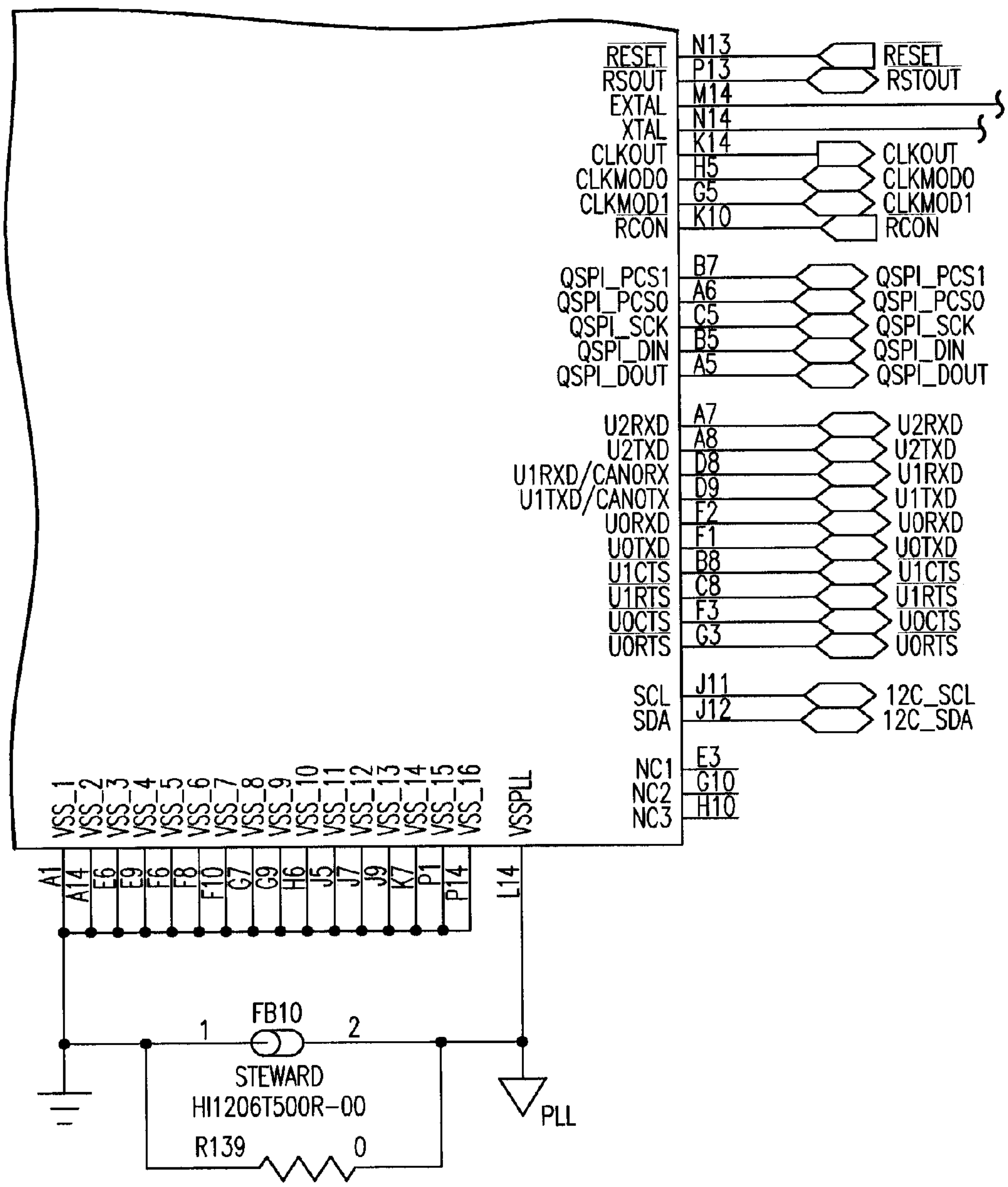
Figures 8, 20C:
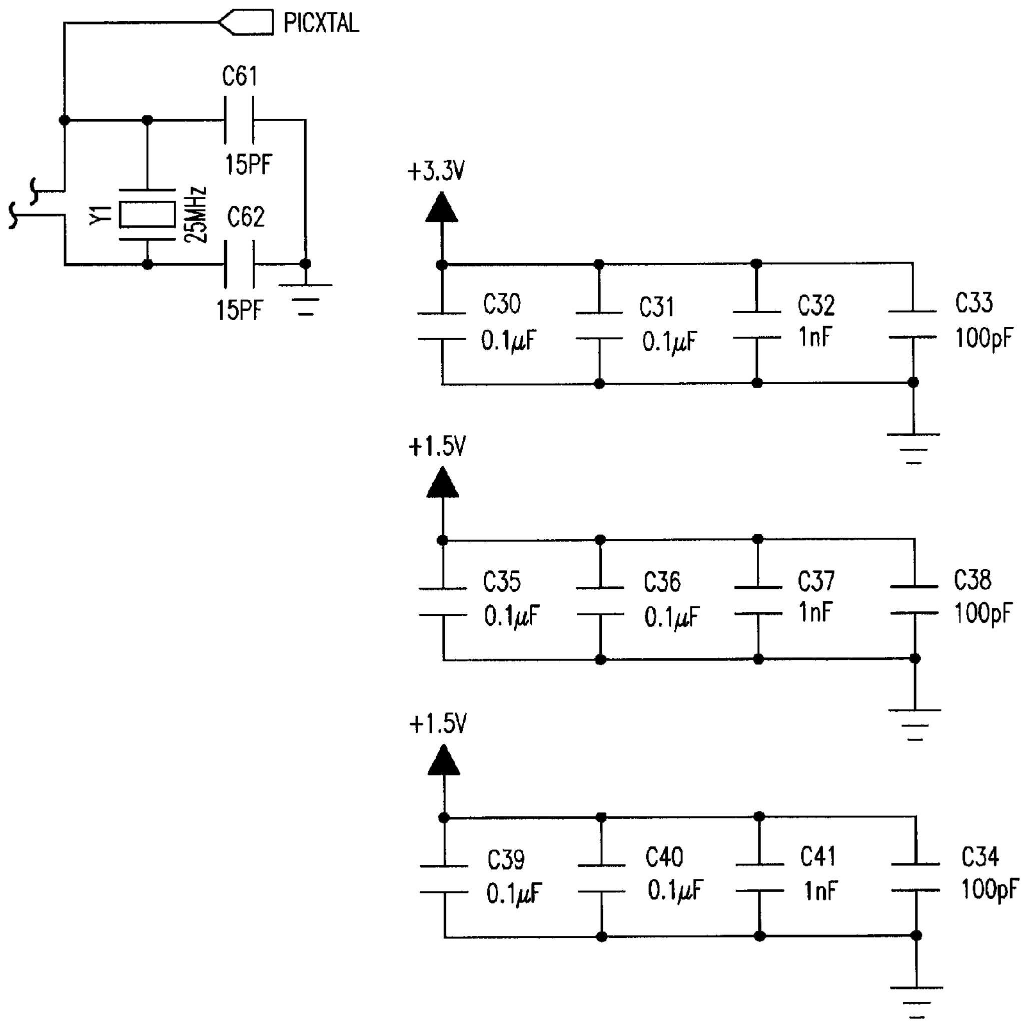
Figure 20D:
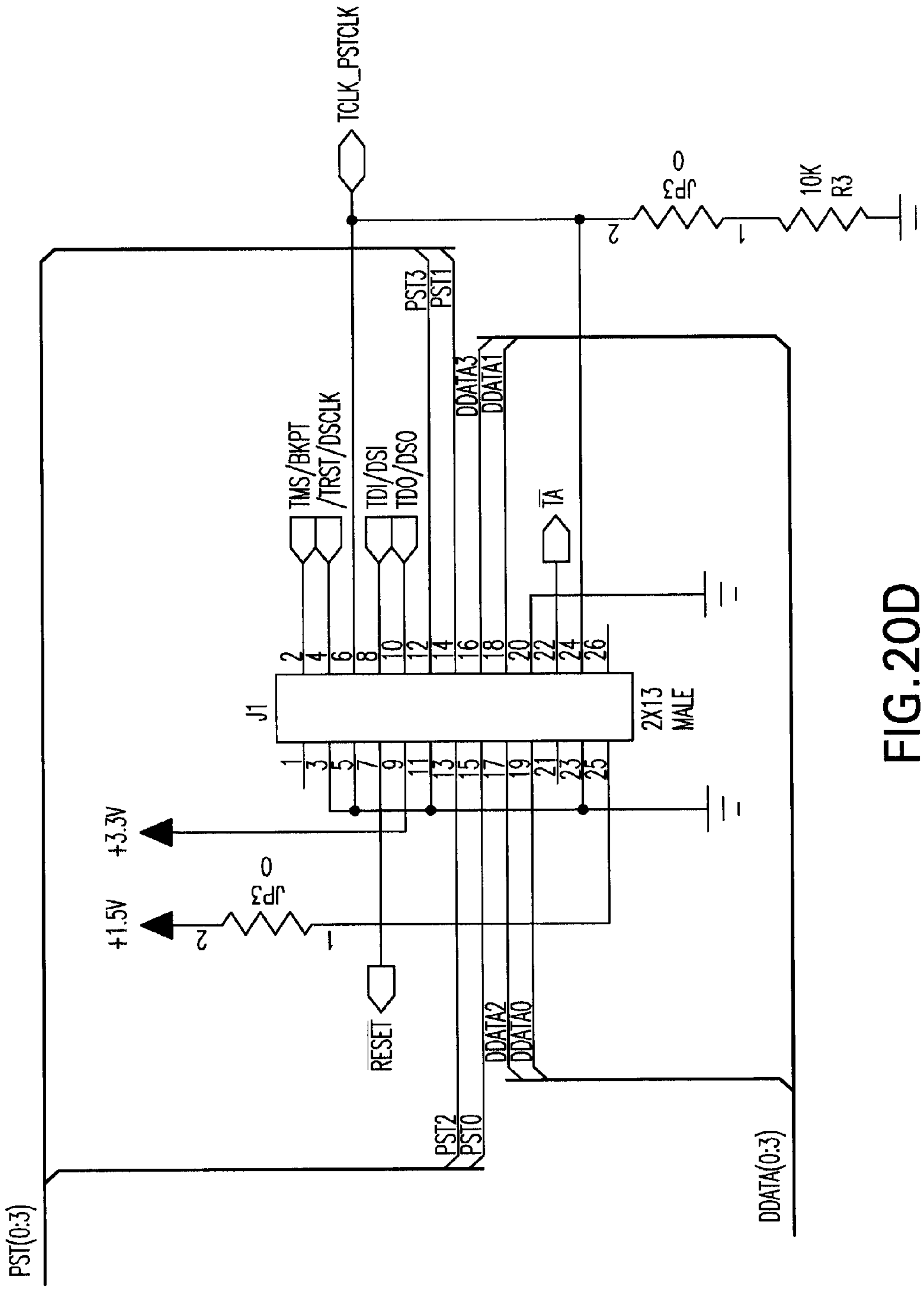
Figure 20E:
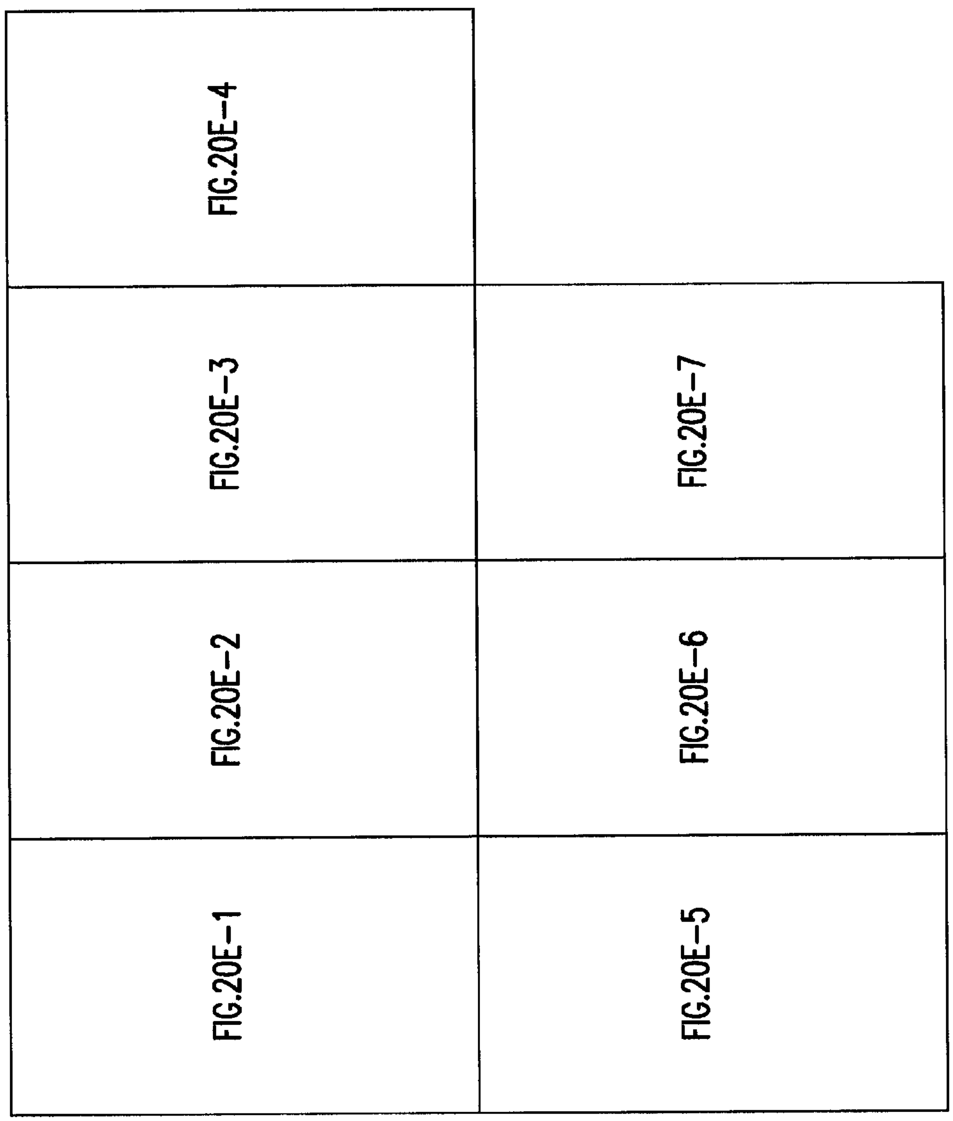
Figures 1, 20E:
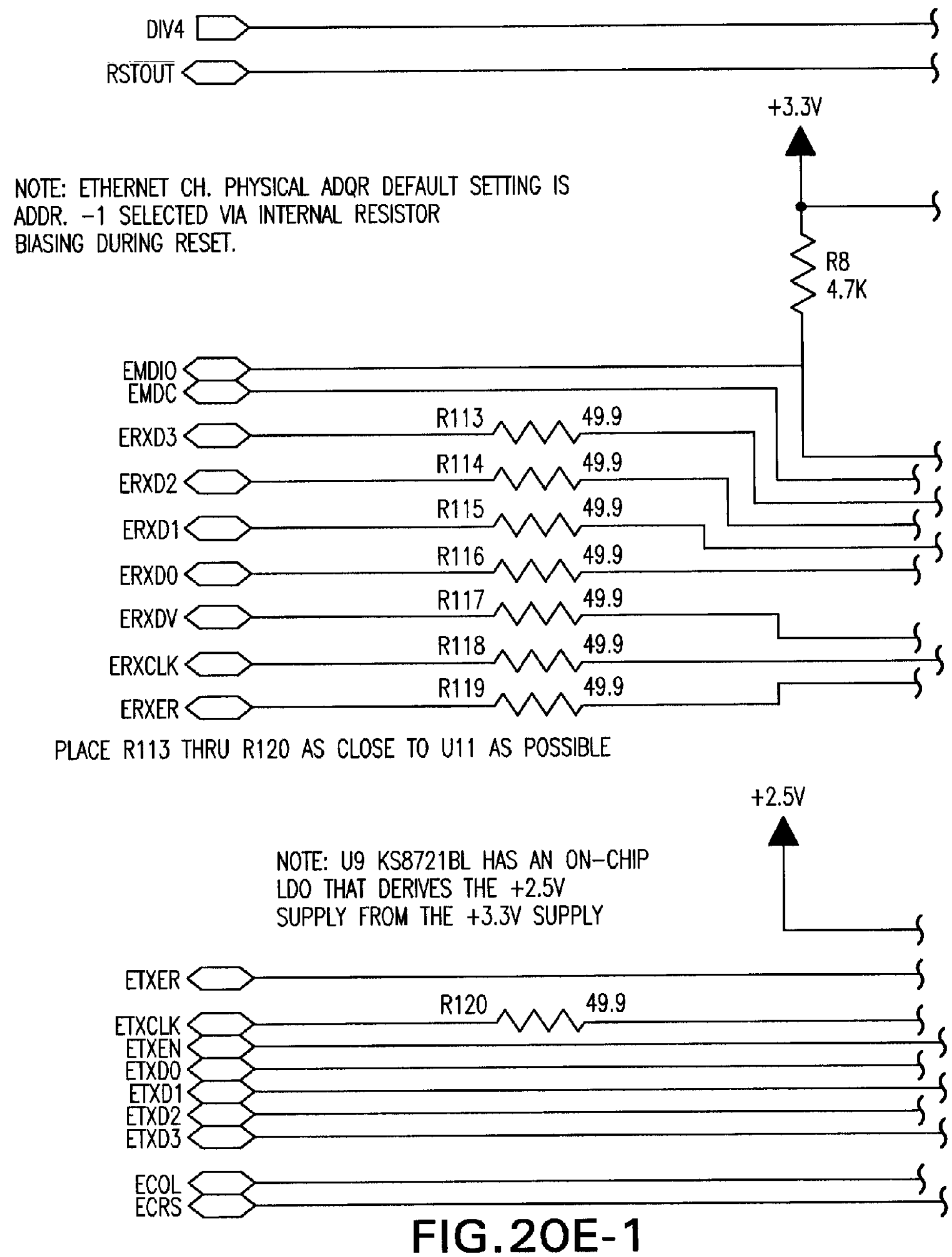
Figures 2, 20E:
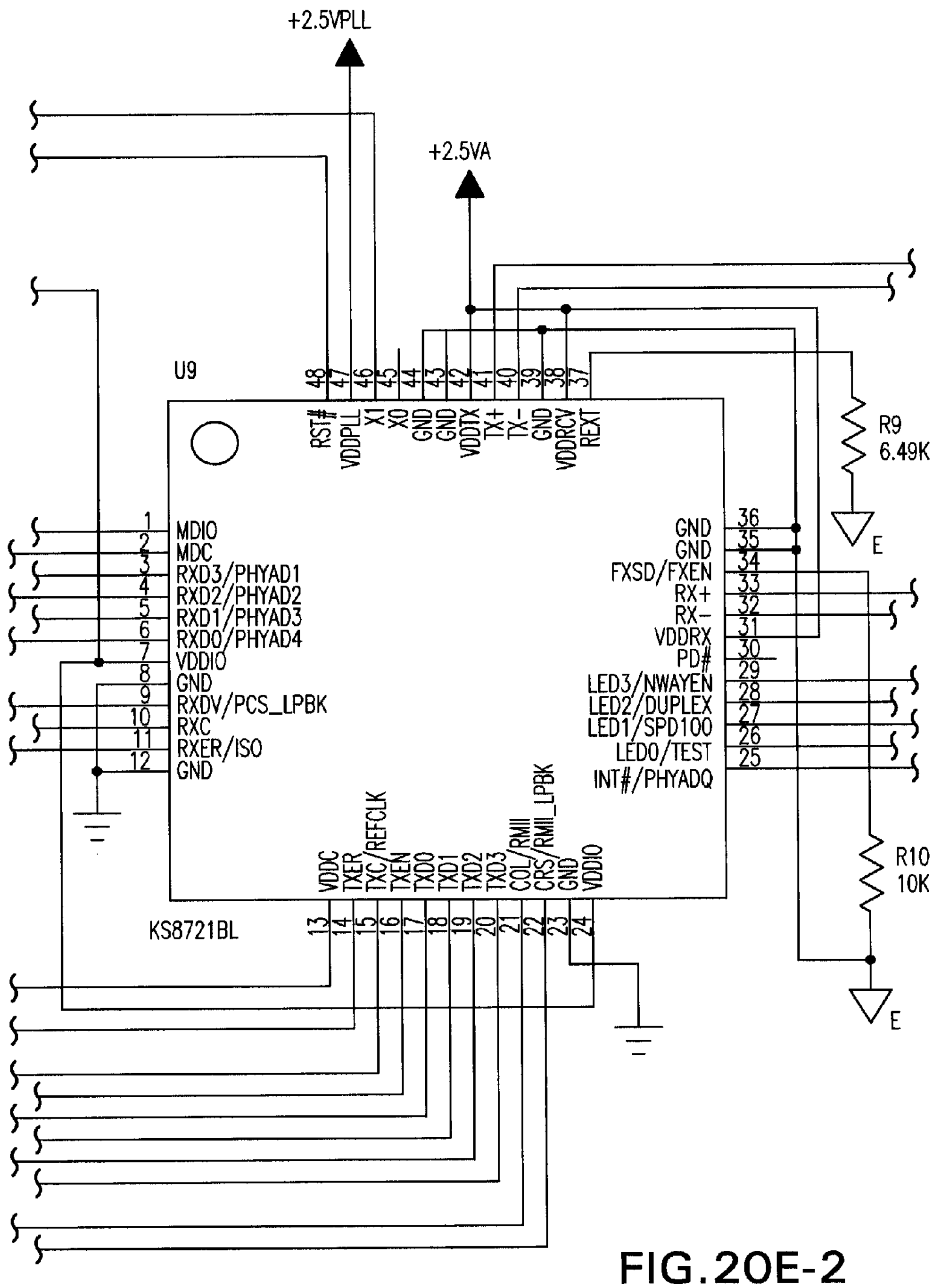
Figures 3, 20E:
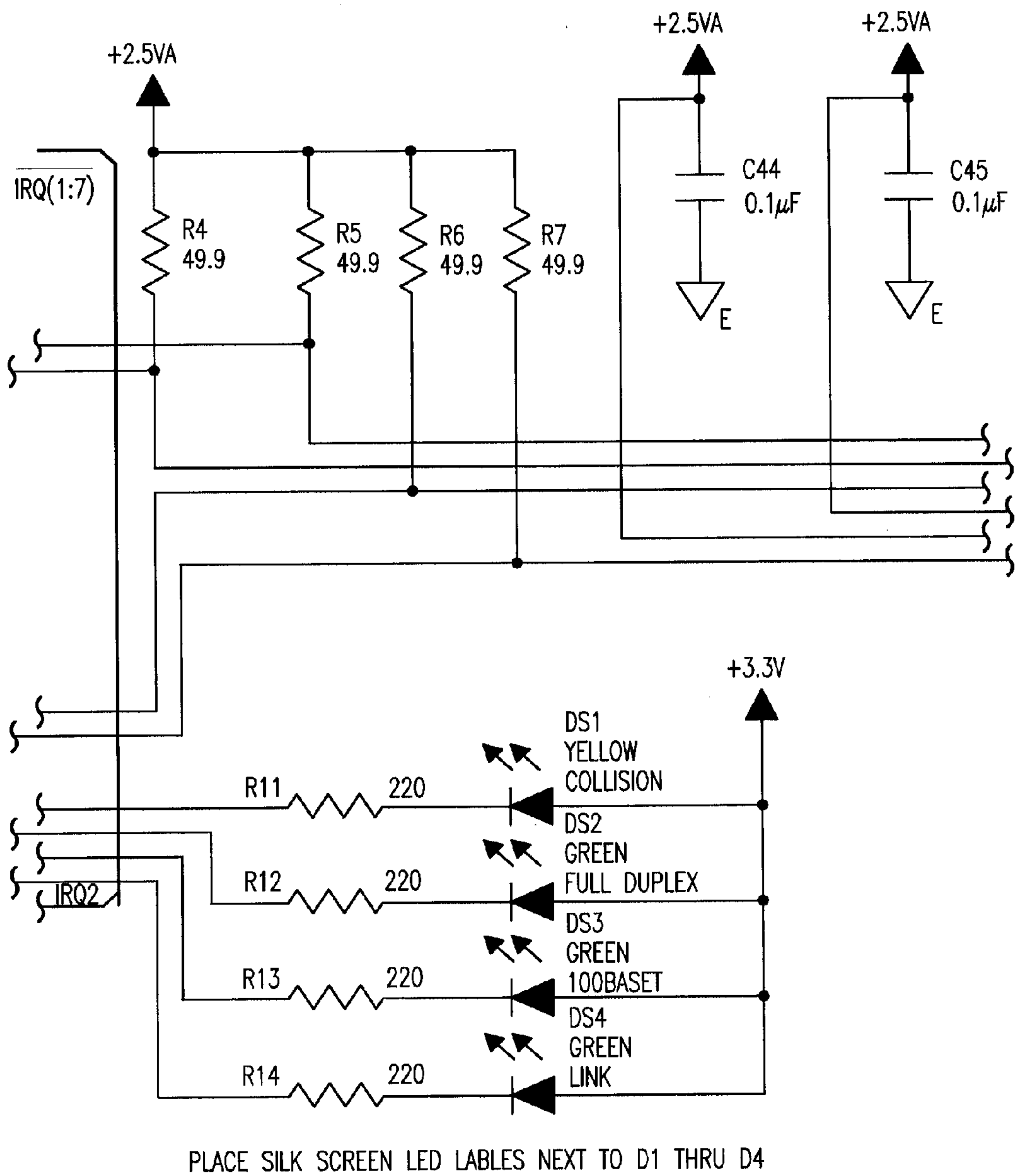
Figures 4, 20E:
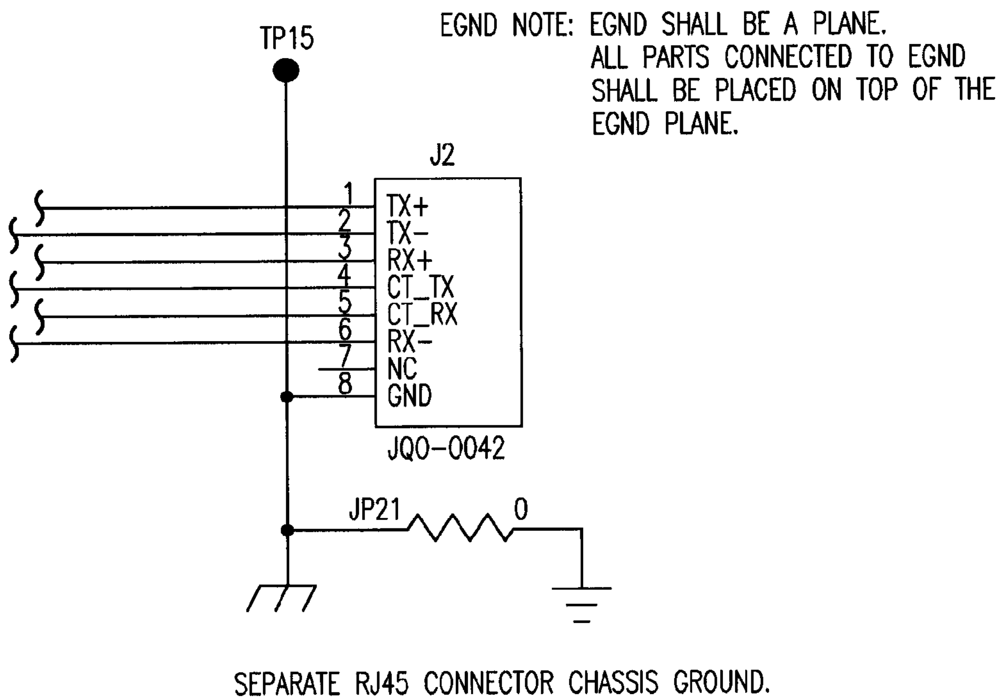
Figures 5, 20E:
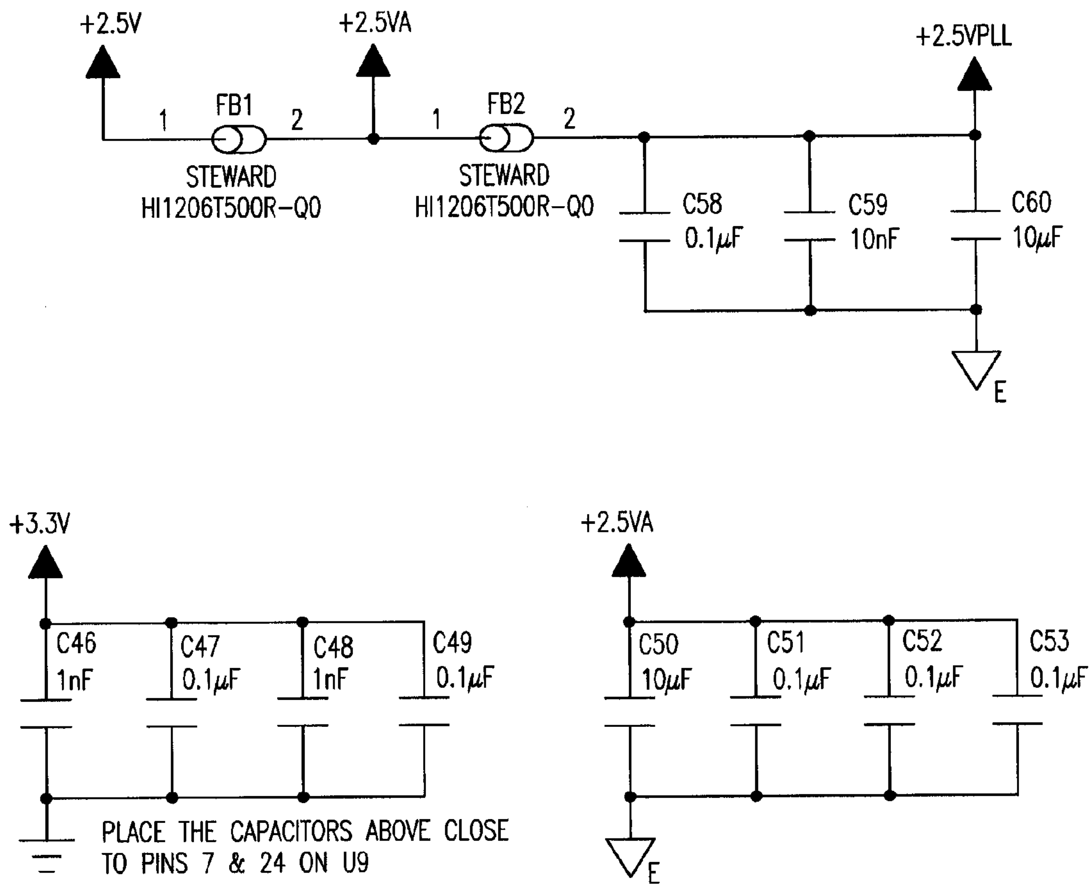
Figures 6, 20E:
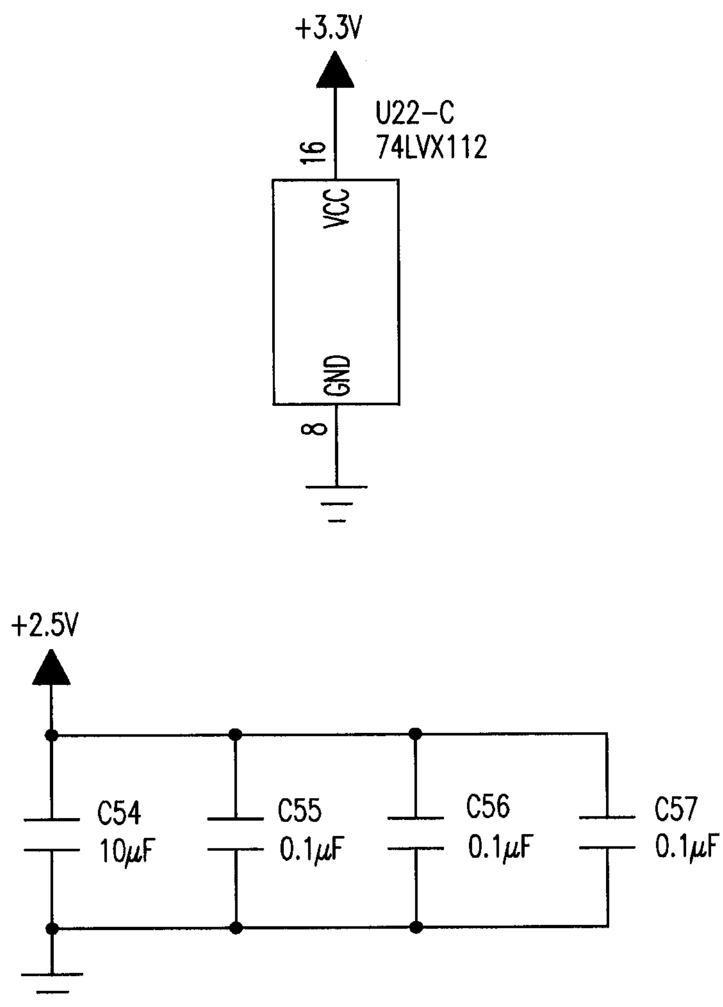
Figures 7, 20E:
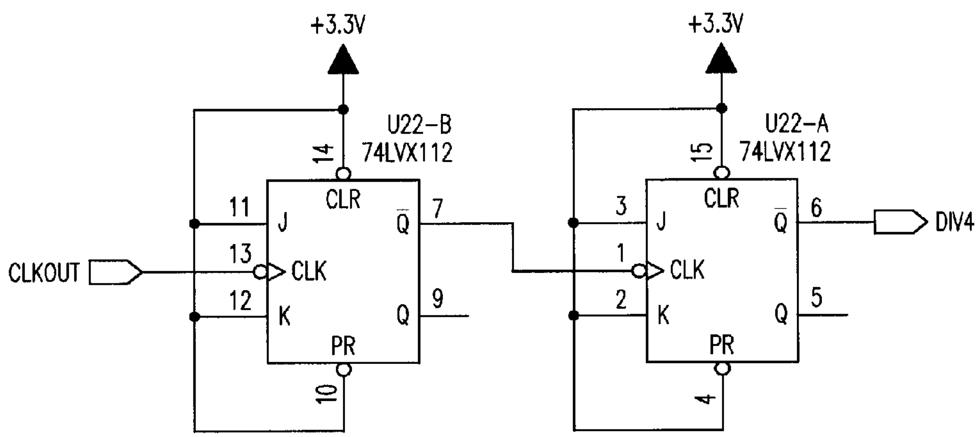
Figure 20F:
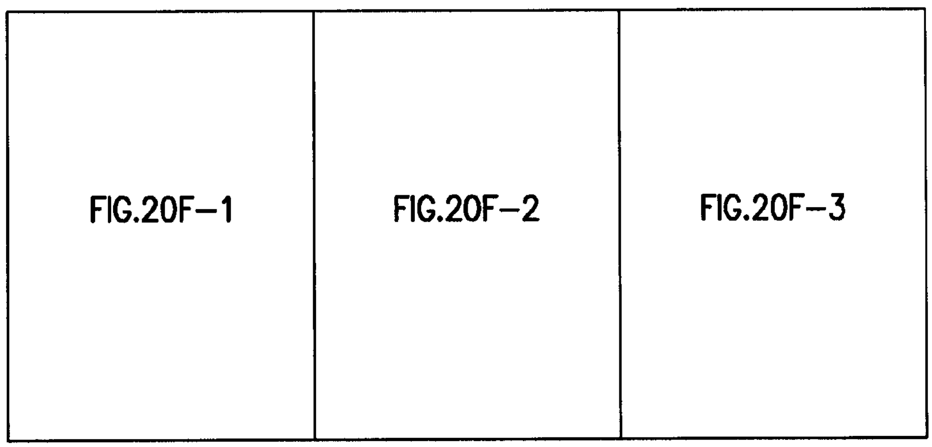
Figures 1, 20F:
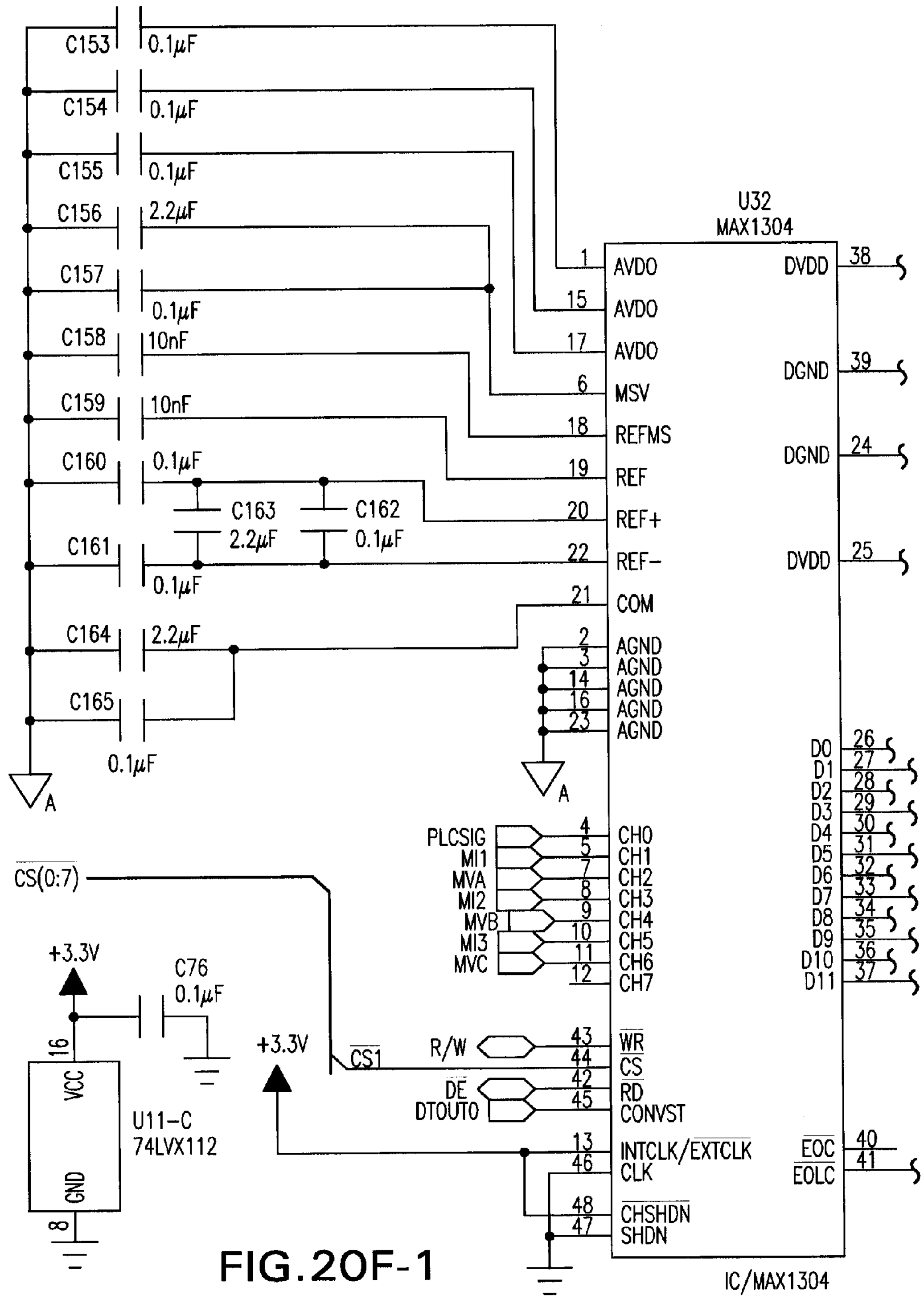
Figures 2, 20F:
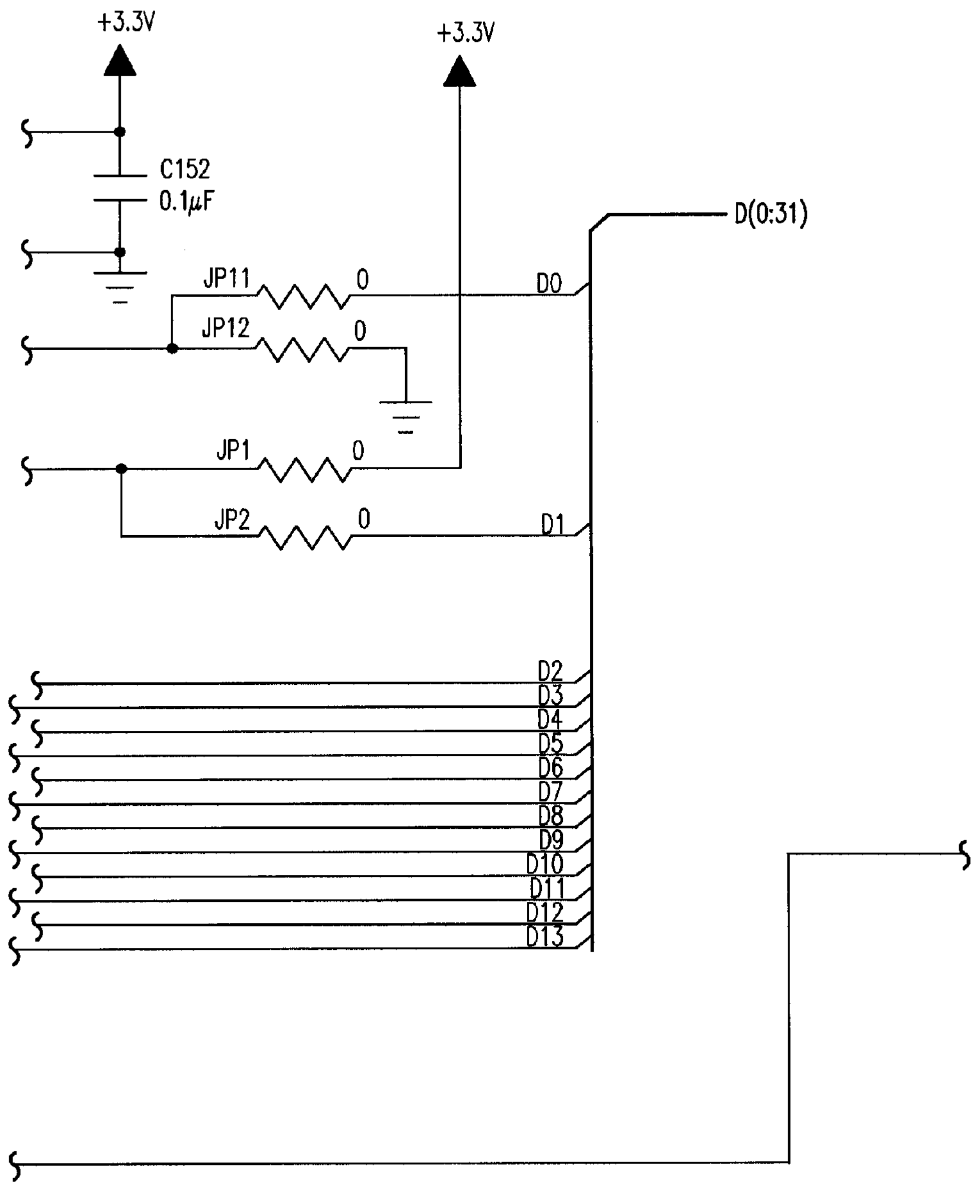
Figures 3, 20F:
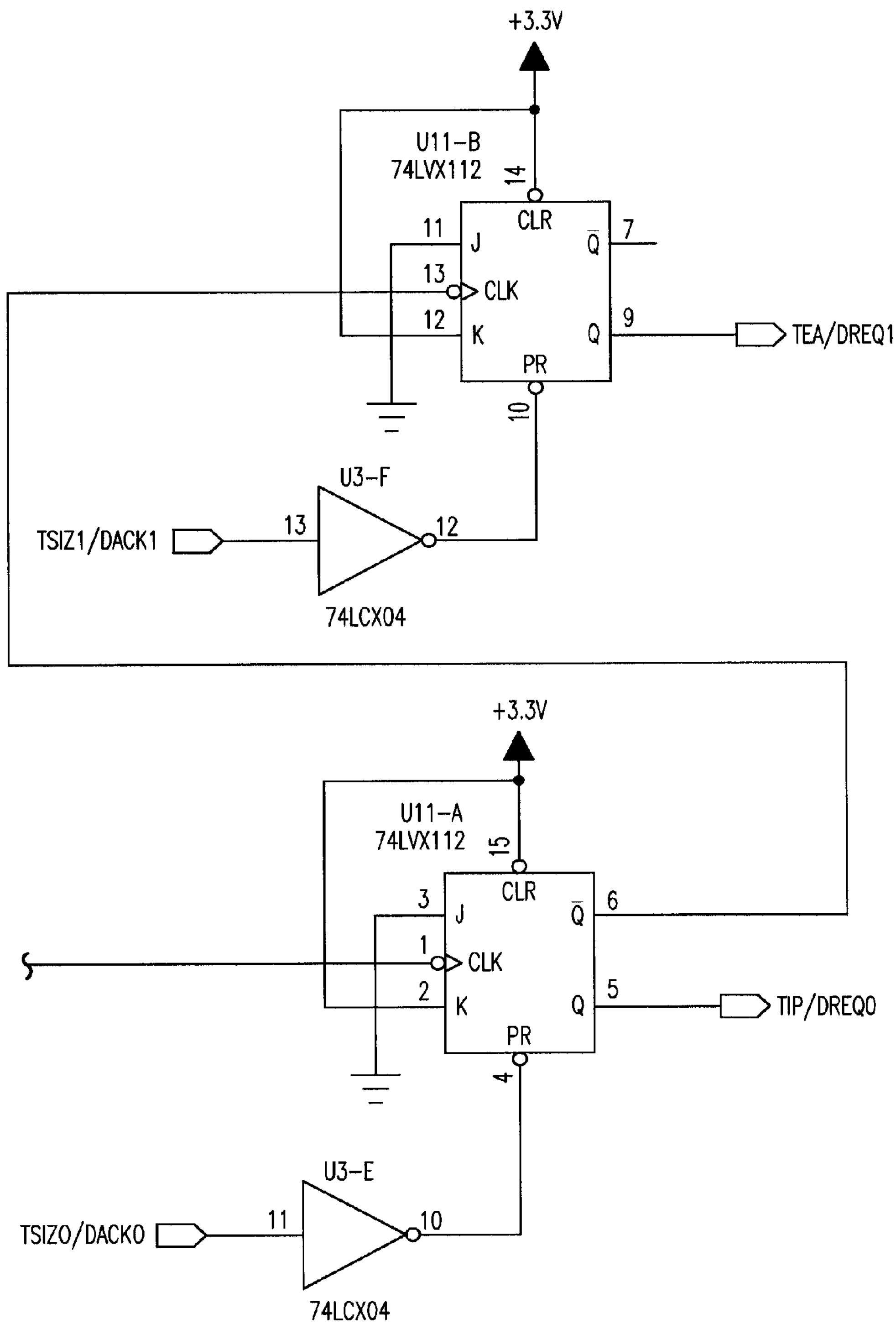
Figure 20G:
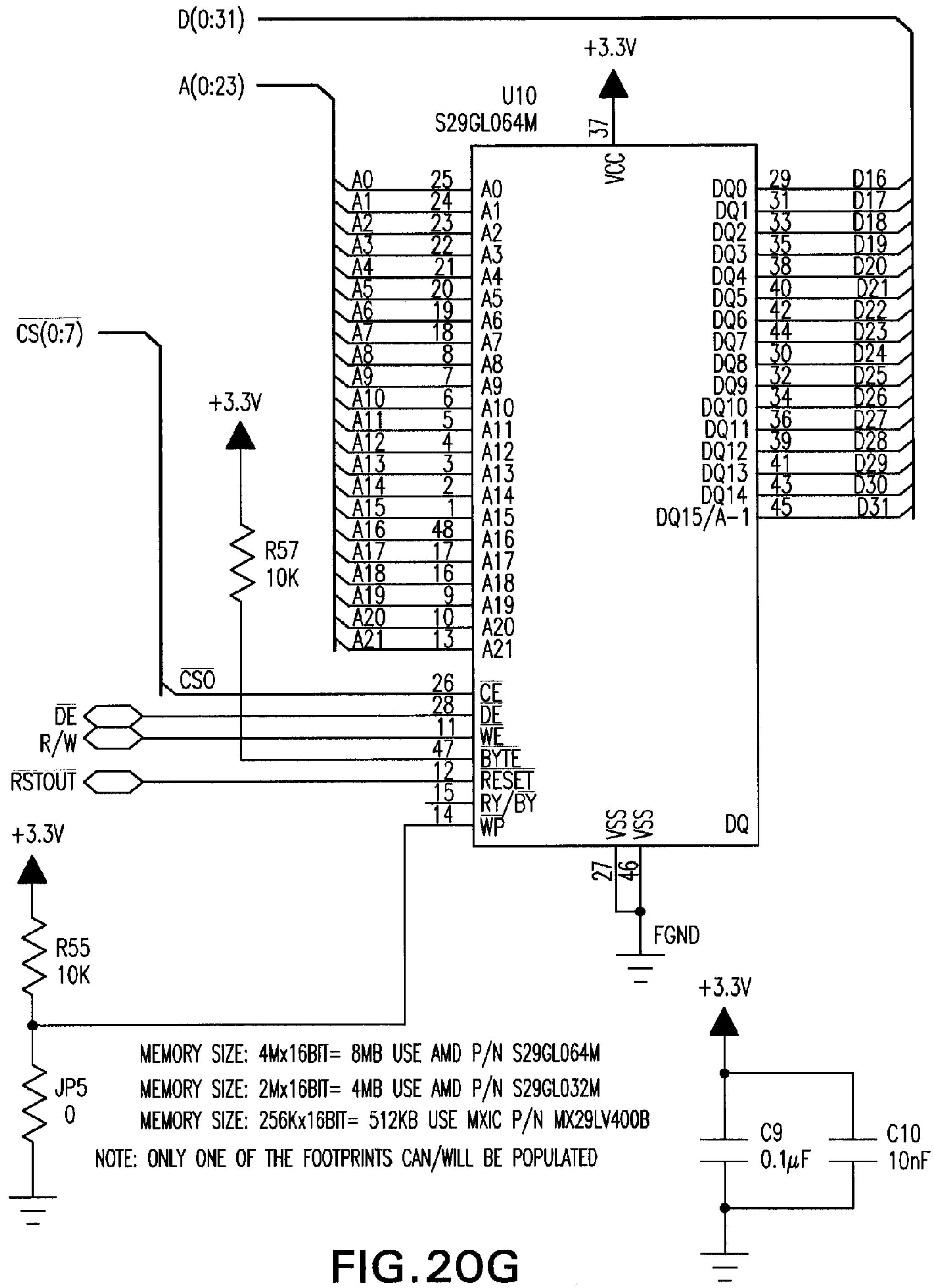
Figure 20H:
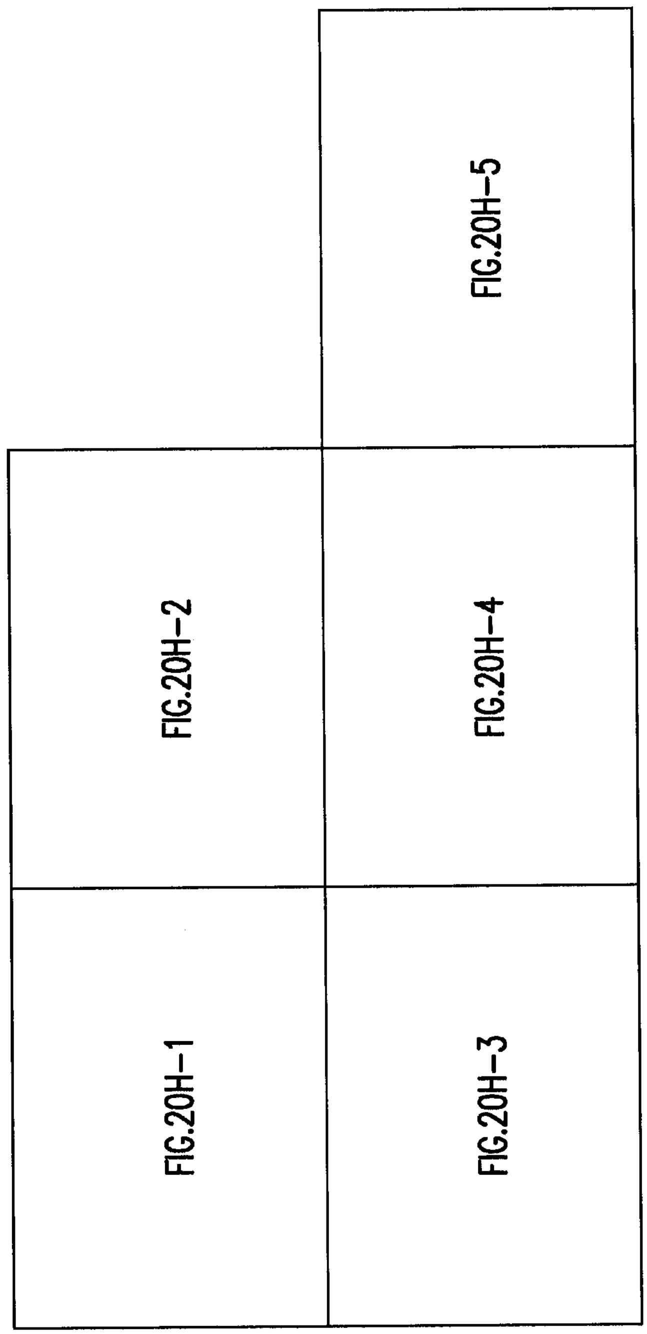
Figures 1, 20H:
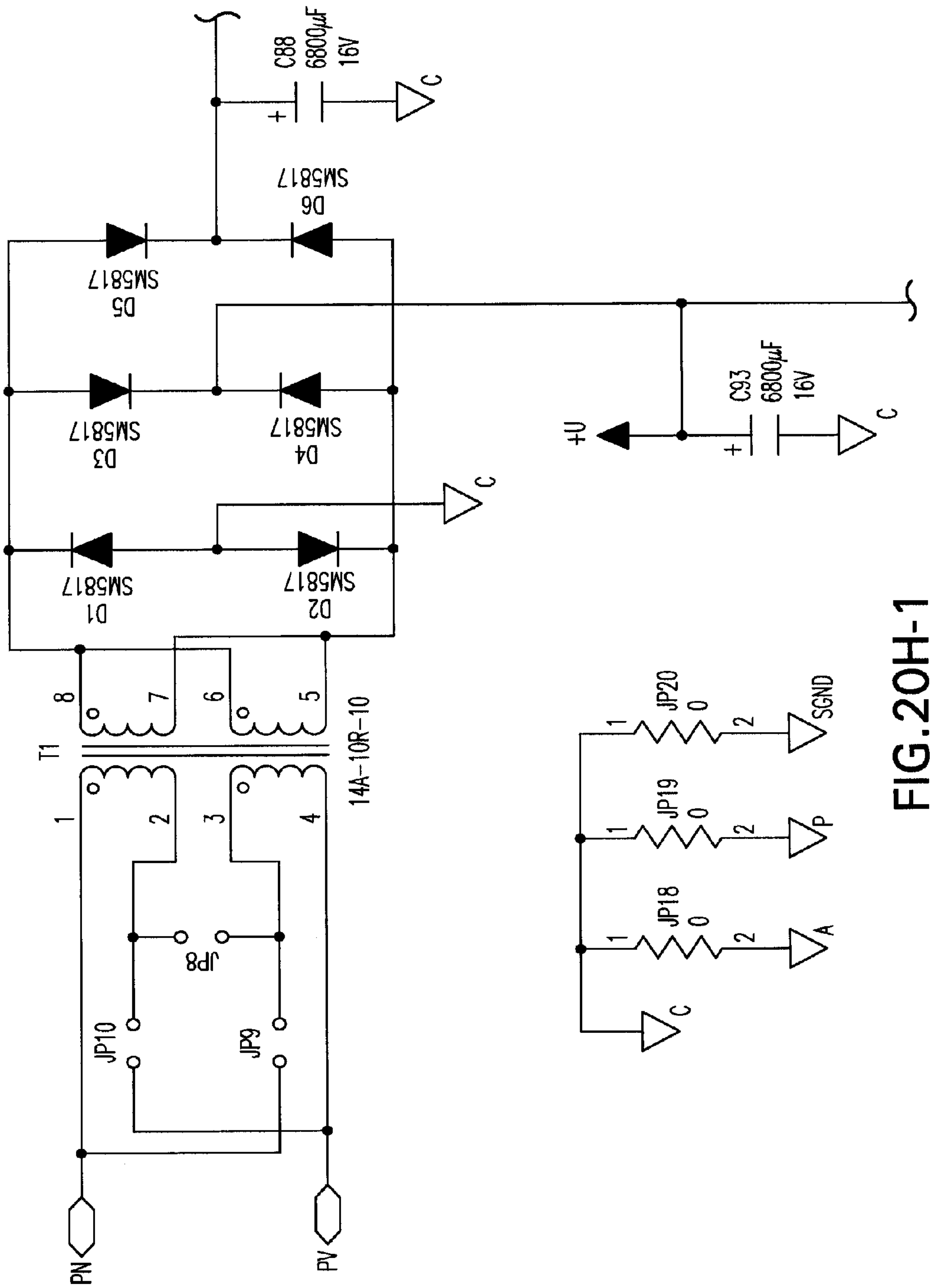
Figures 2, 20H:
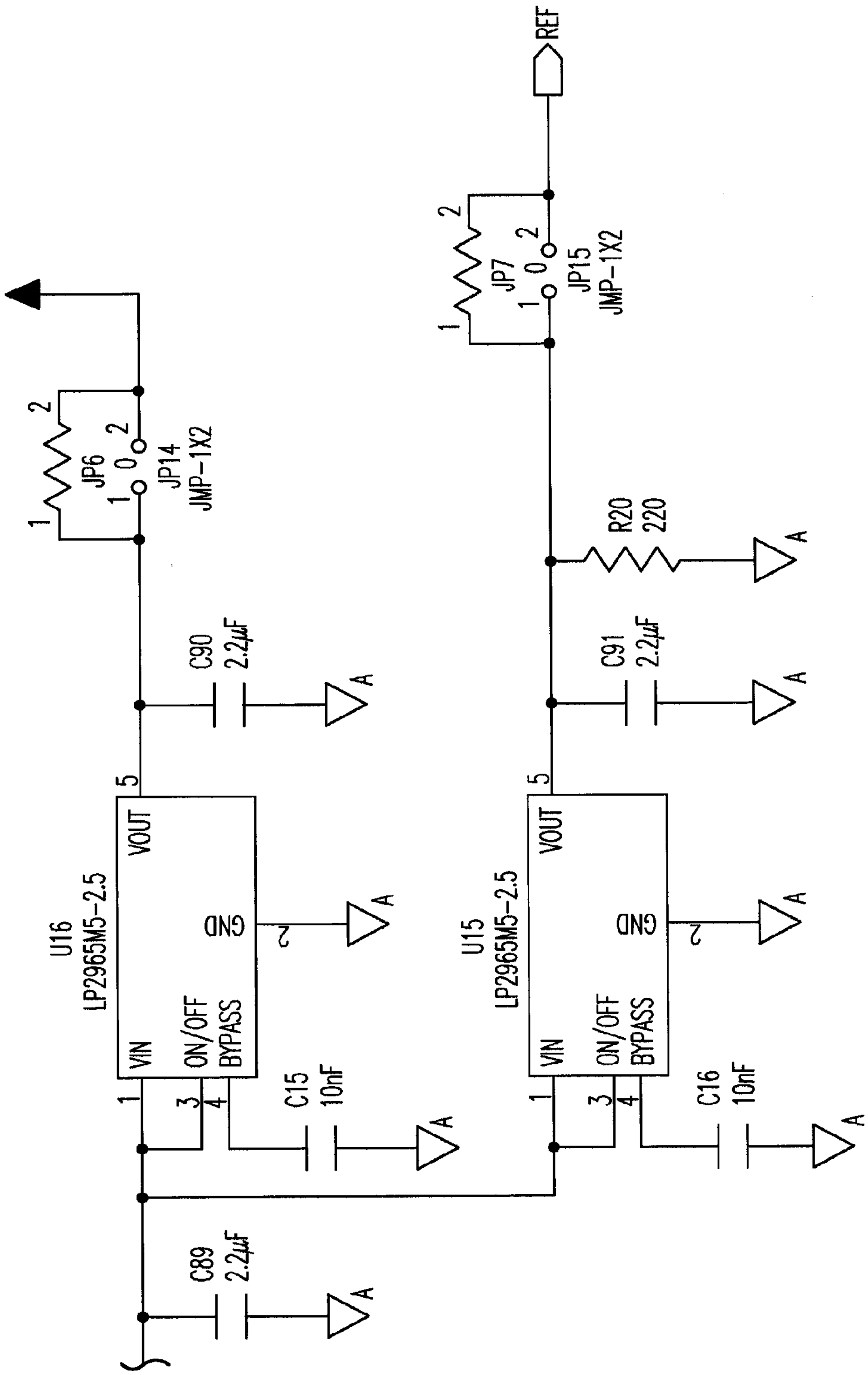
Figures 3, 20H:
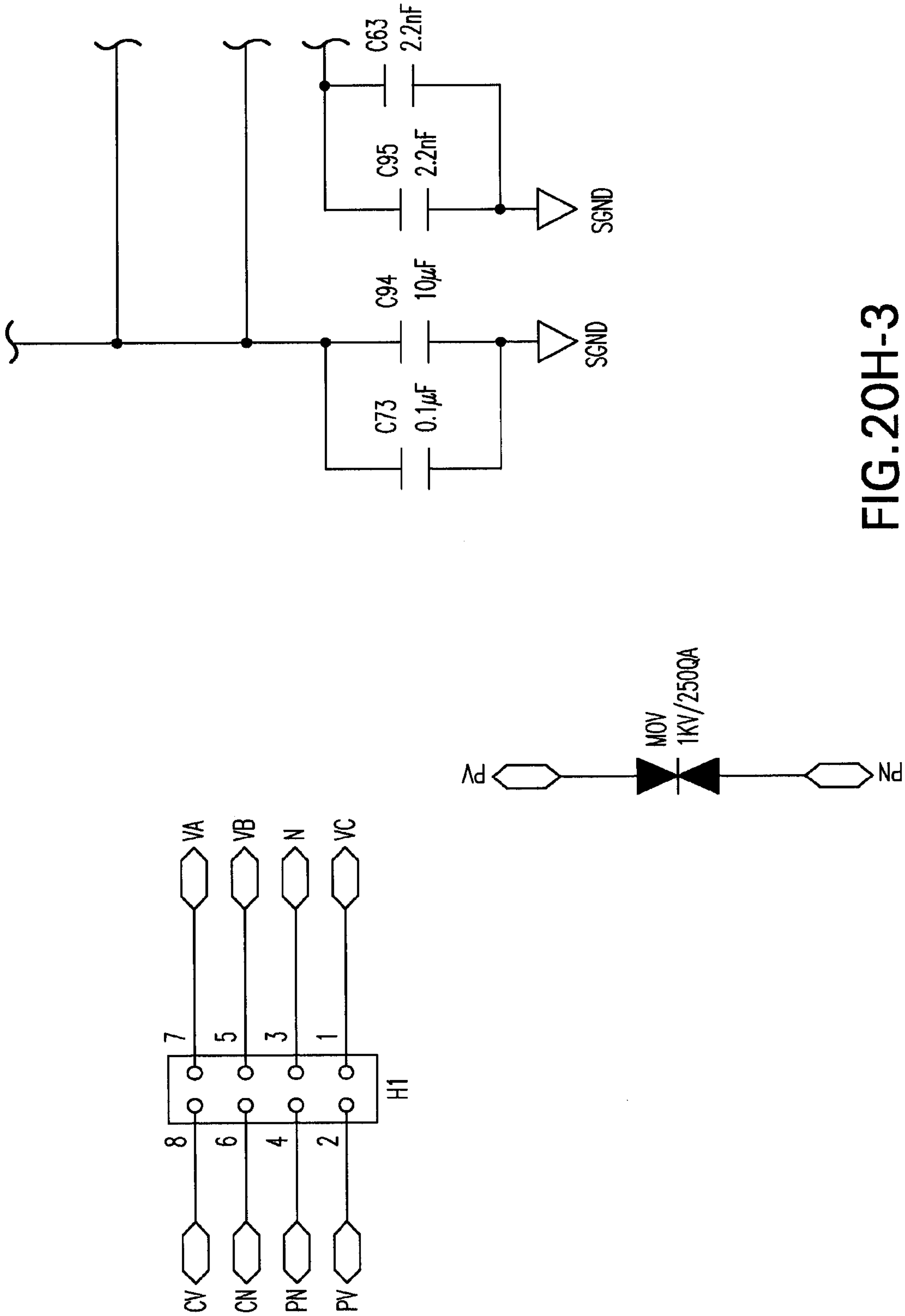
Figures 4, 20H:
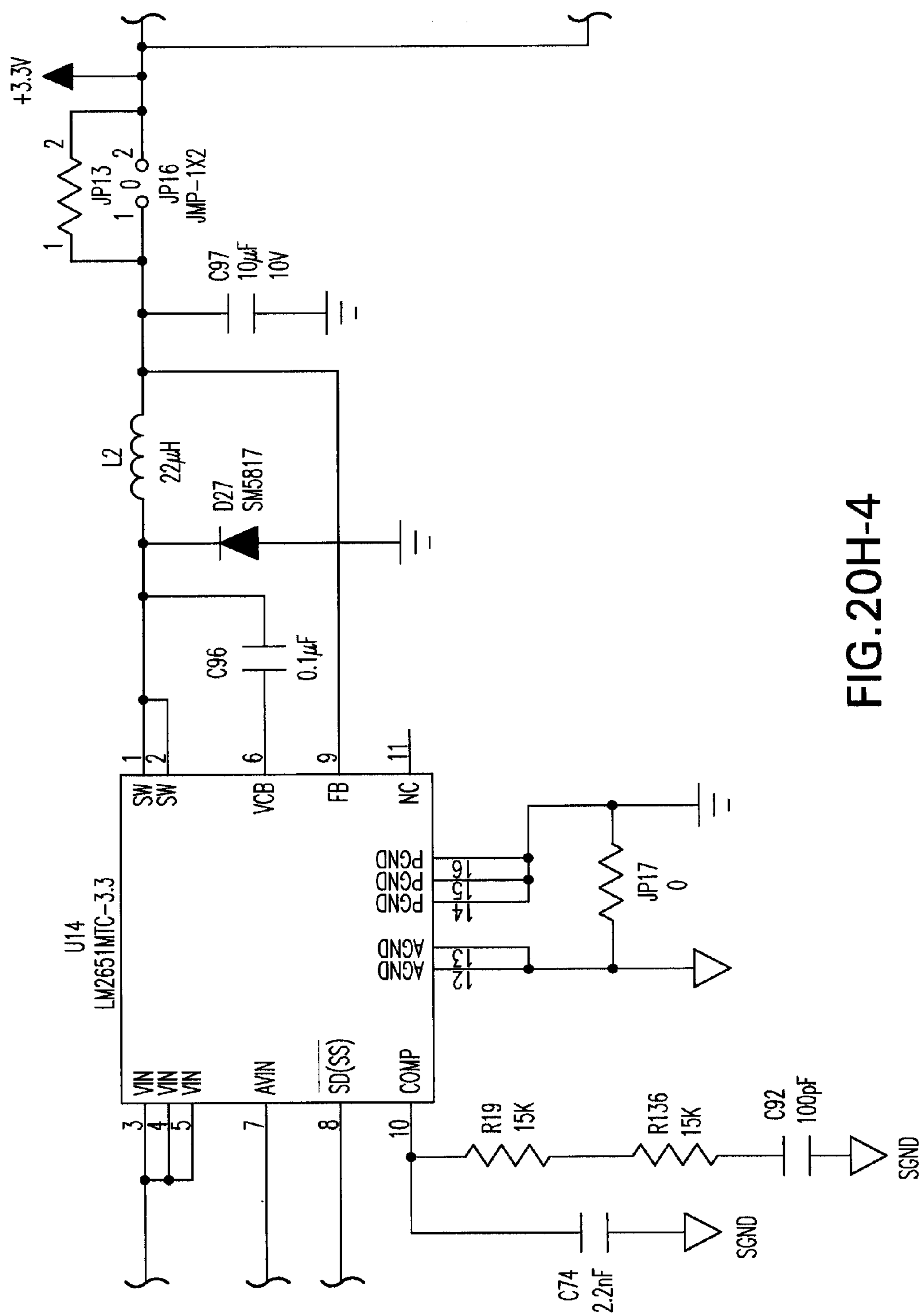
Figures 5, 20H:
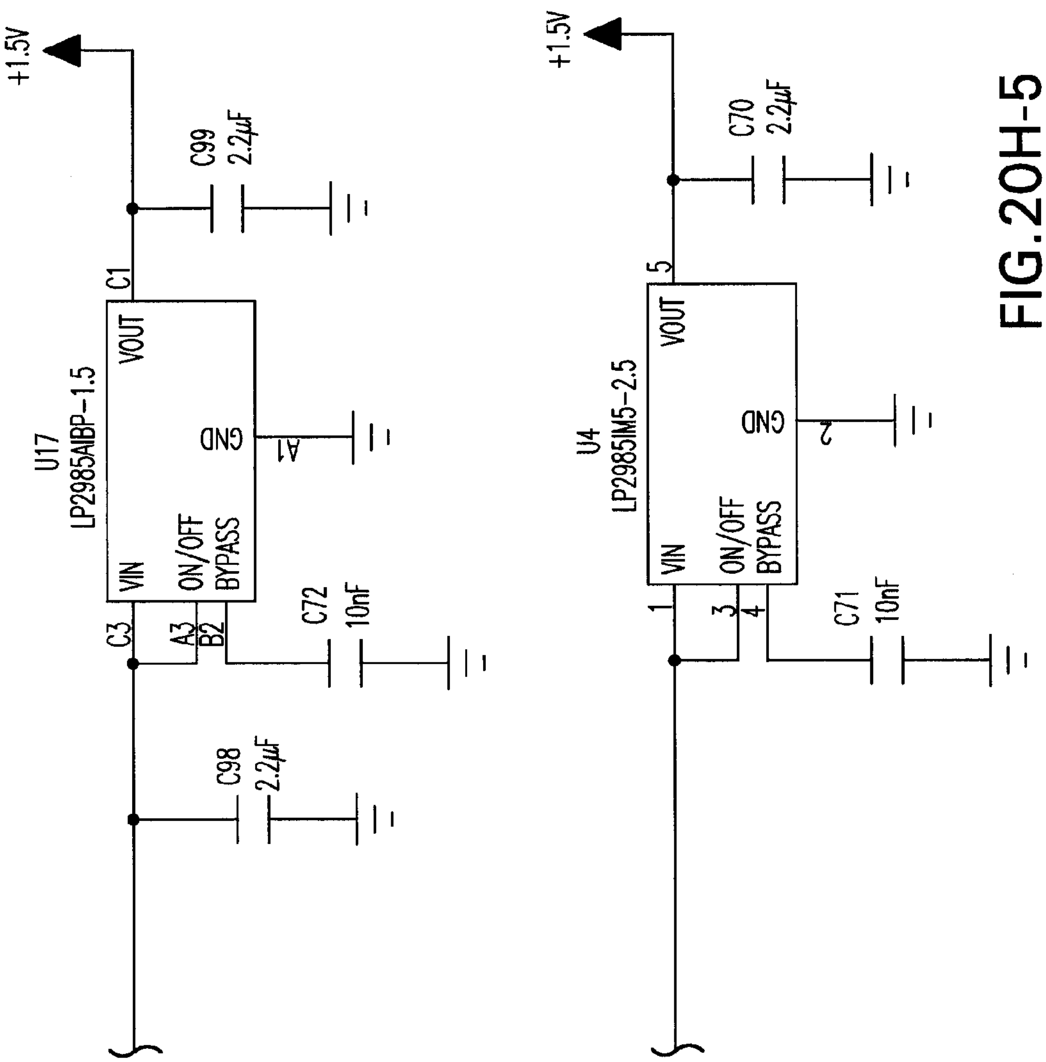
Figure 20I:
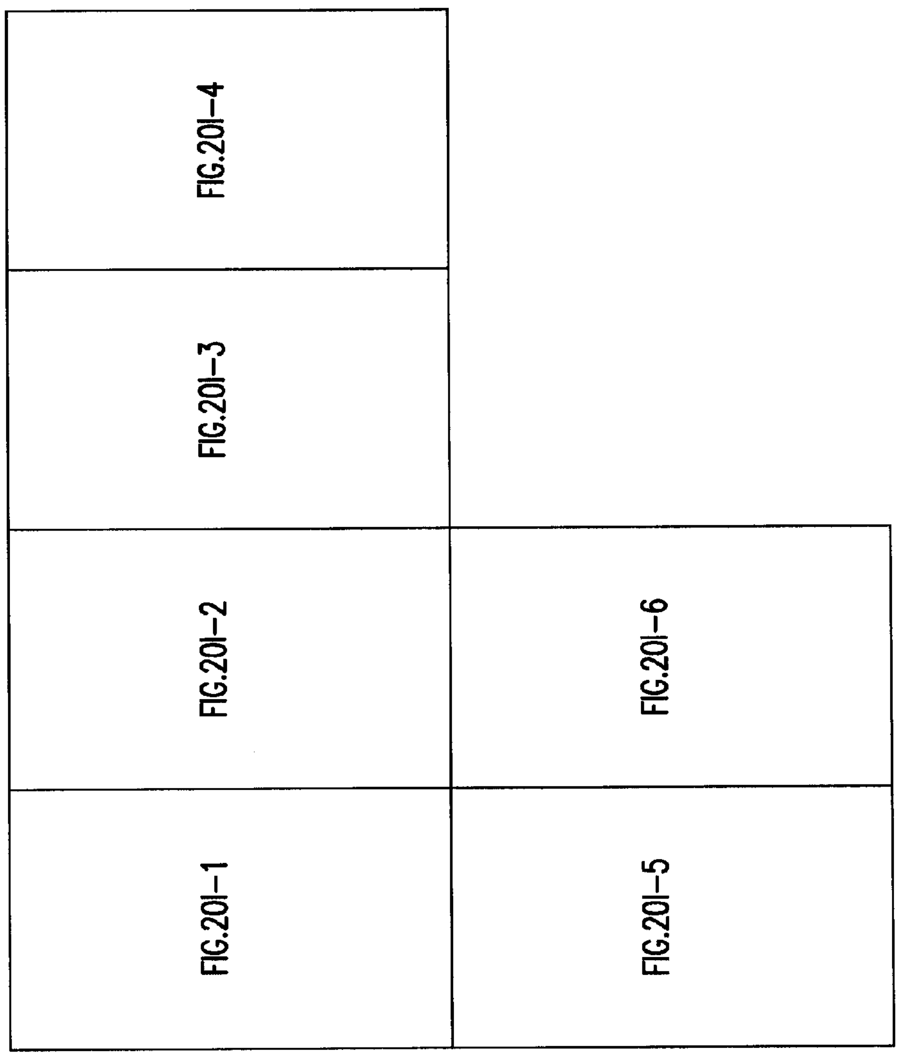
Figures 1, 20I:
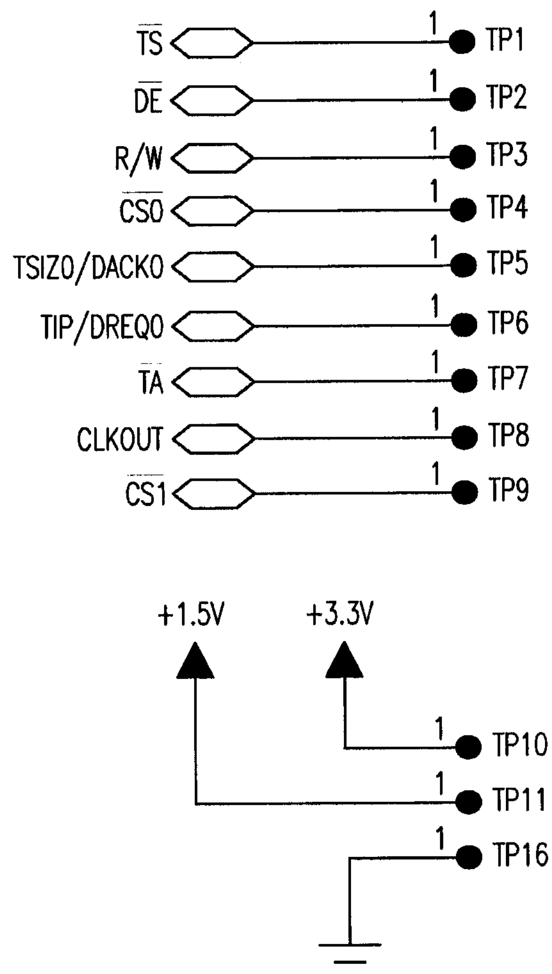
Figures 2, 20I:
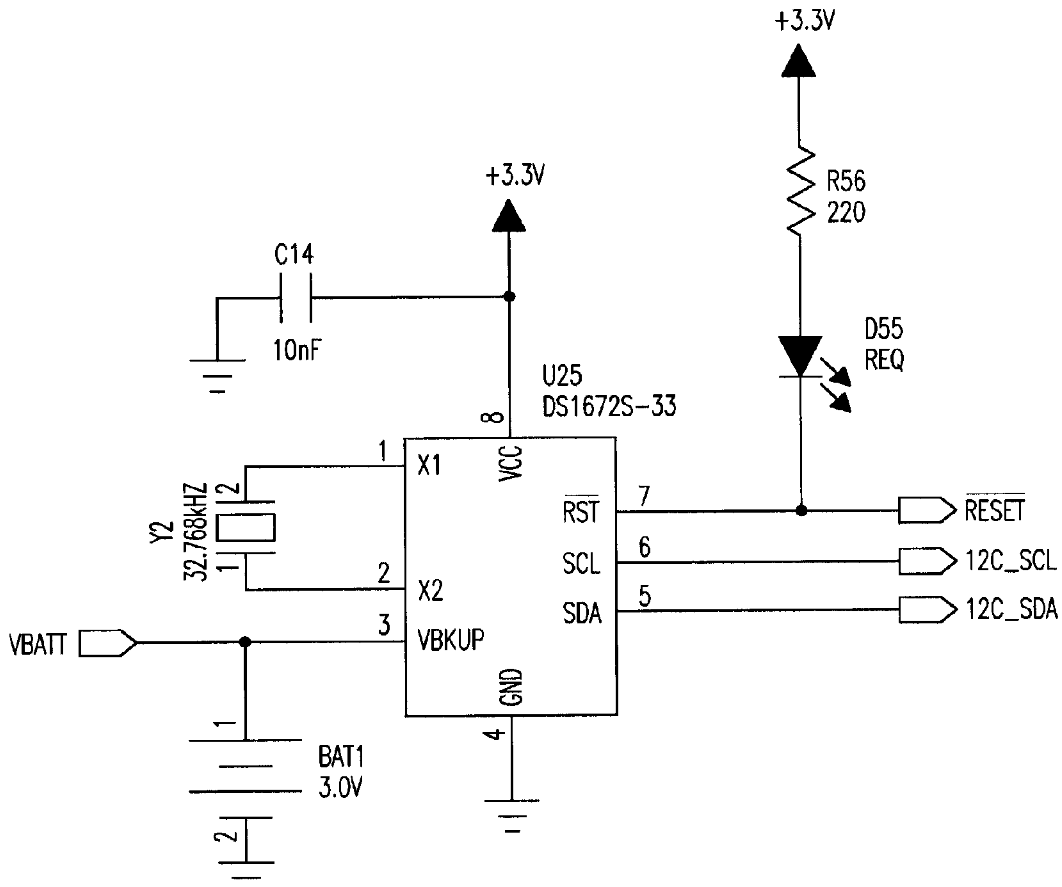
Figures 3, 20I:
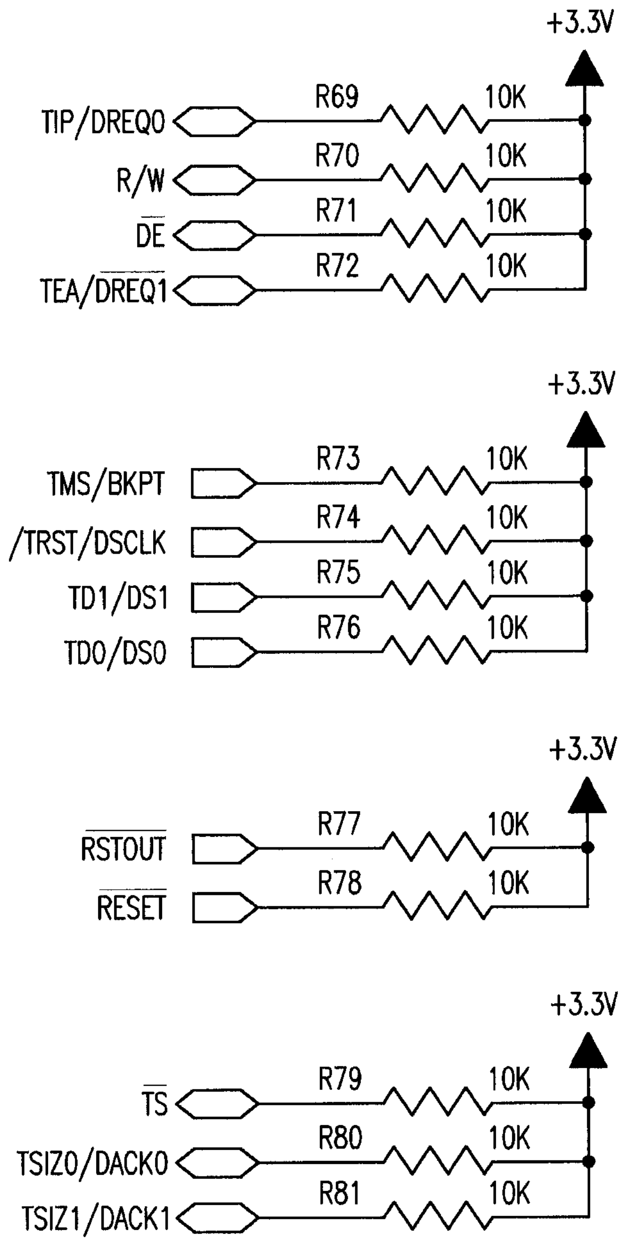
Figures 4, 20I:
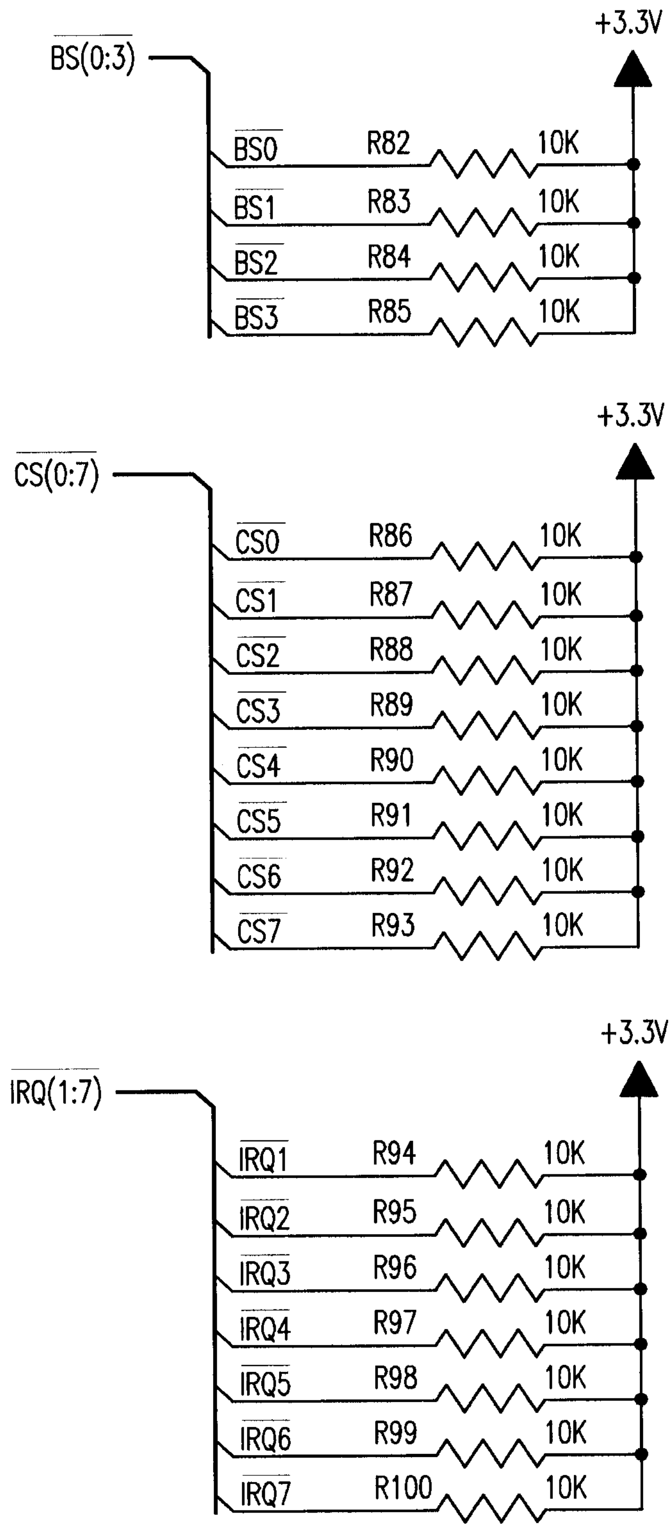
Figures 5, 20I:
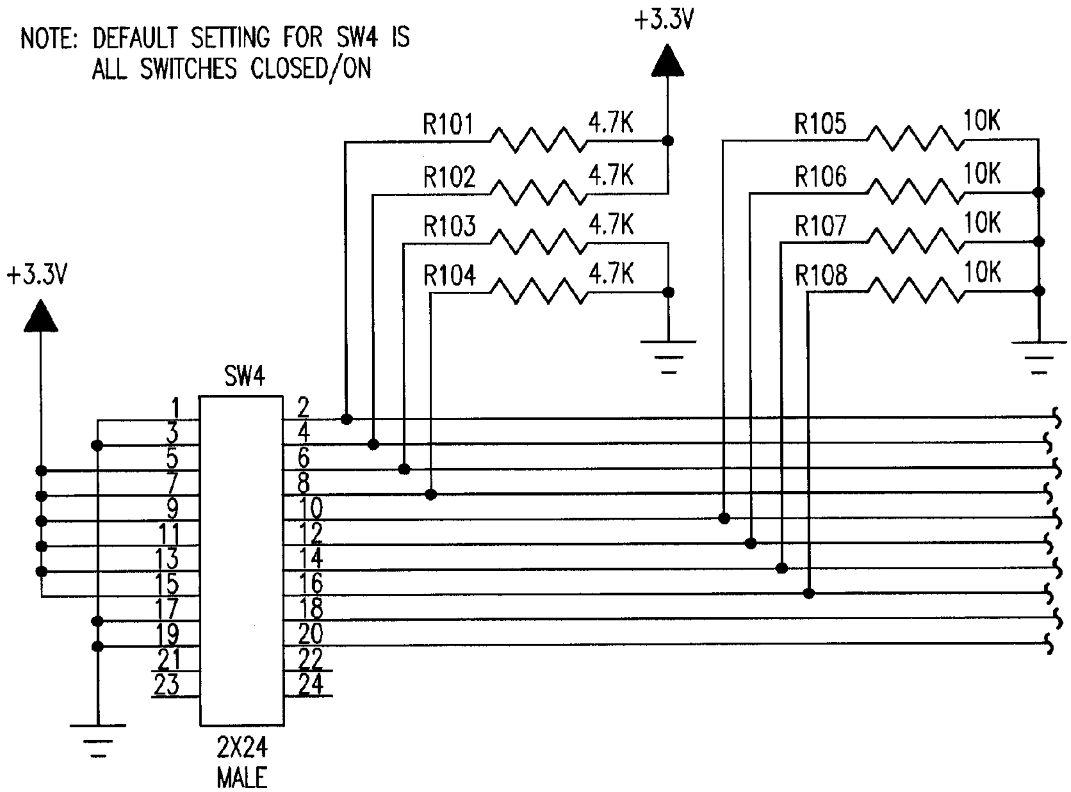
Figures 6, 20I:
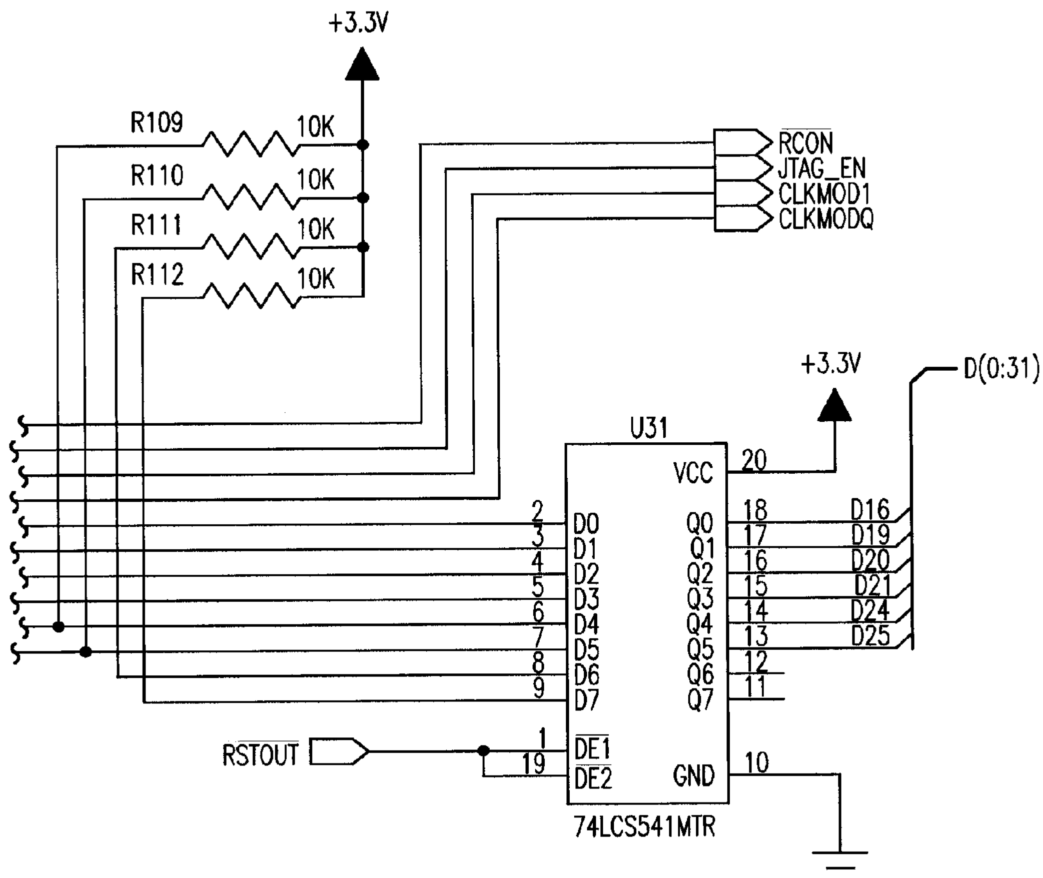
Figure 20J:
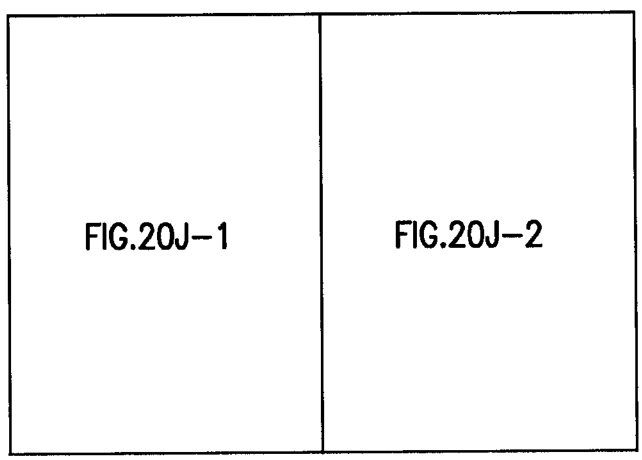
Figures 1, 20J:
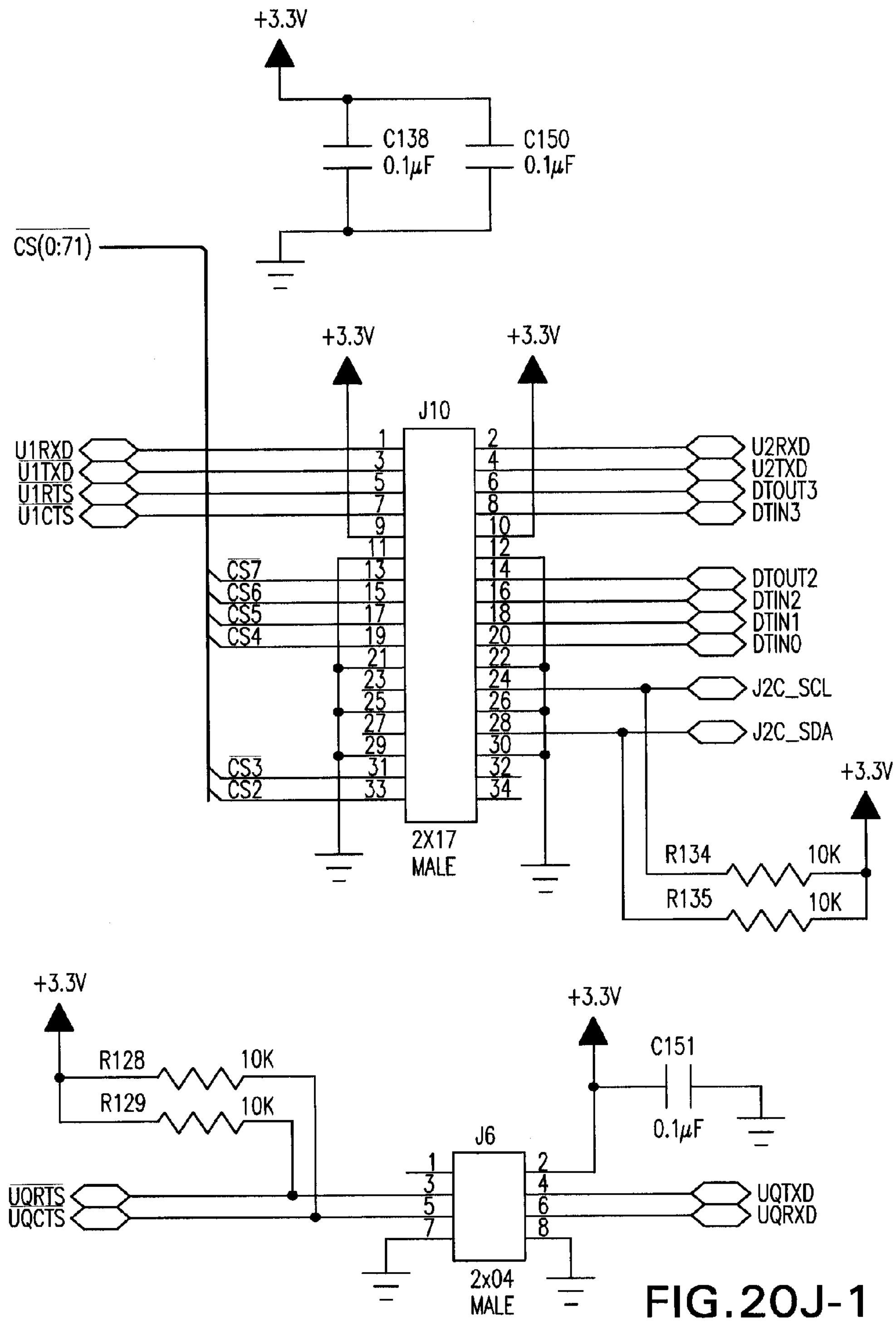
Figures 2, 20J:
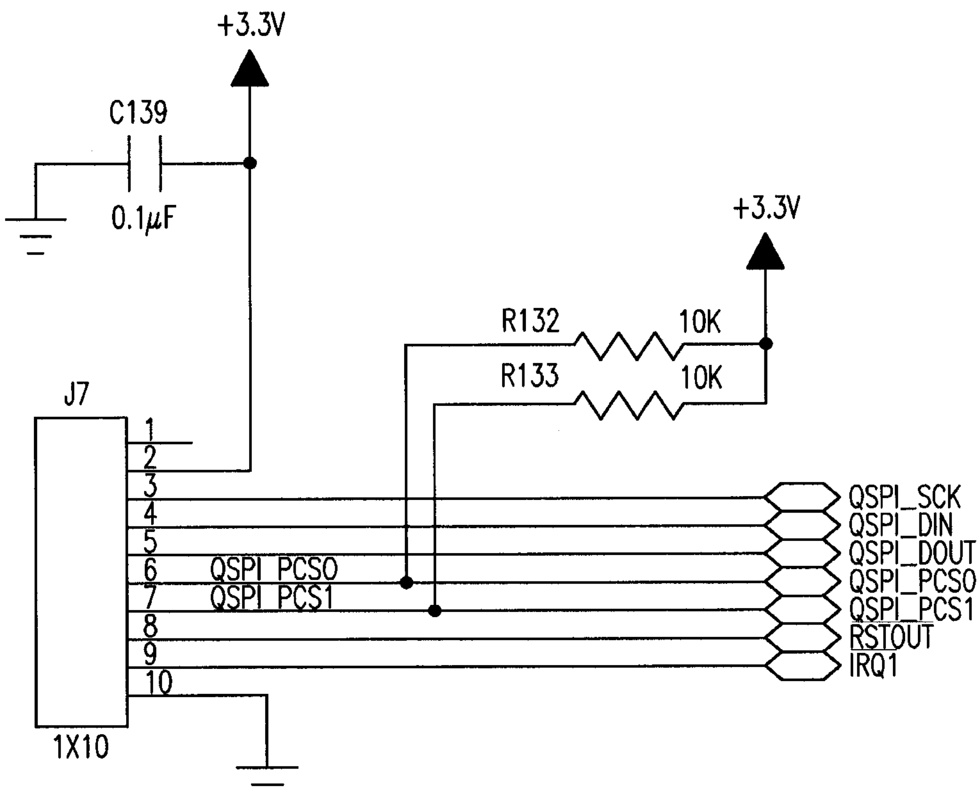
Figure 20K:
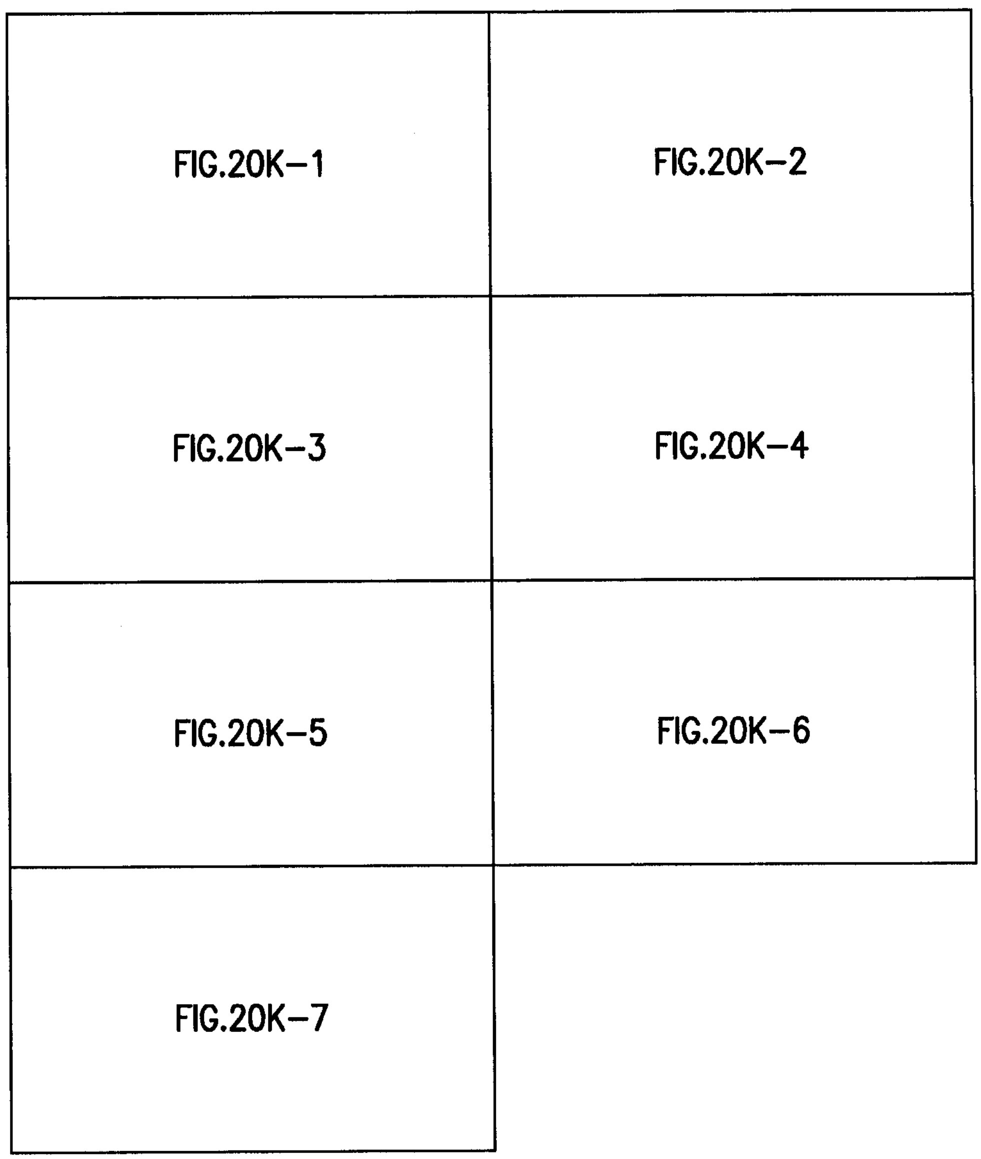
Figures 1, 20K:
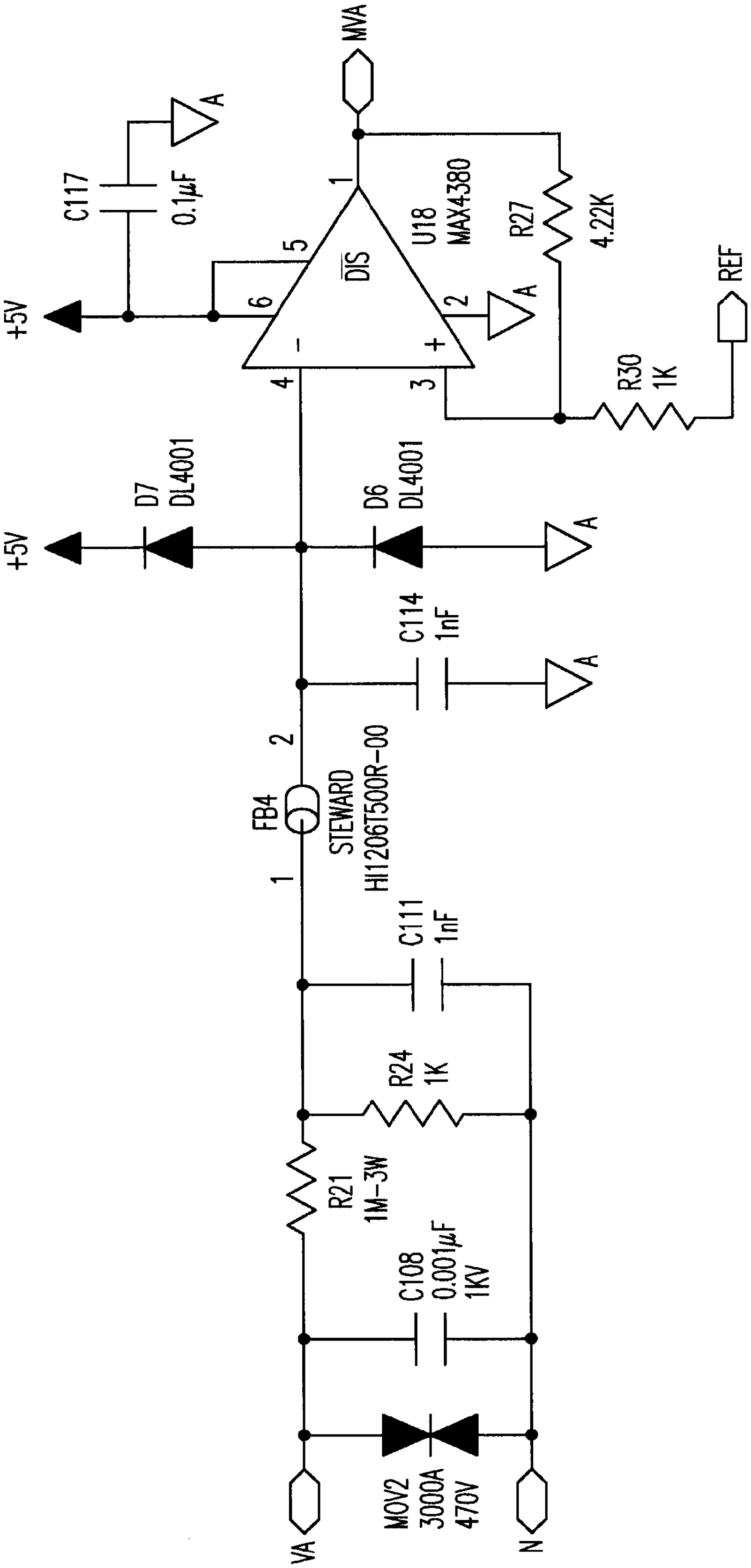
Figures 2, 20K:
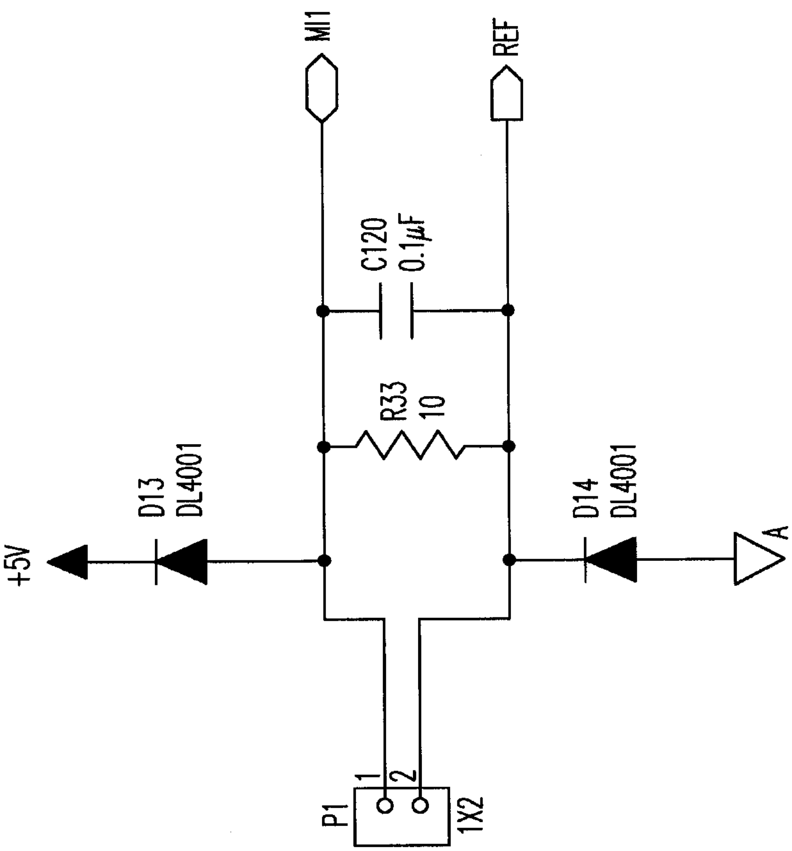
Figures 3, 20K:
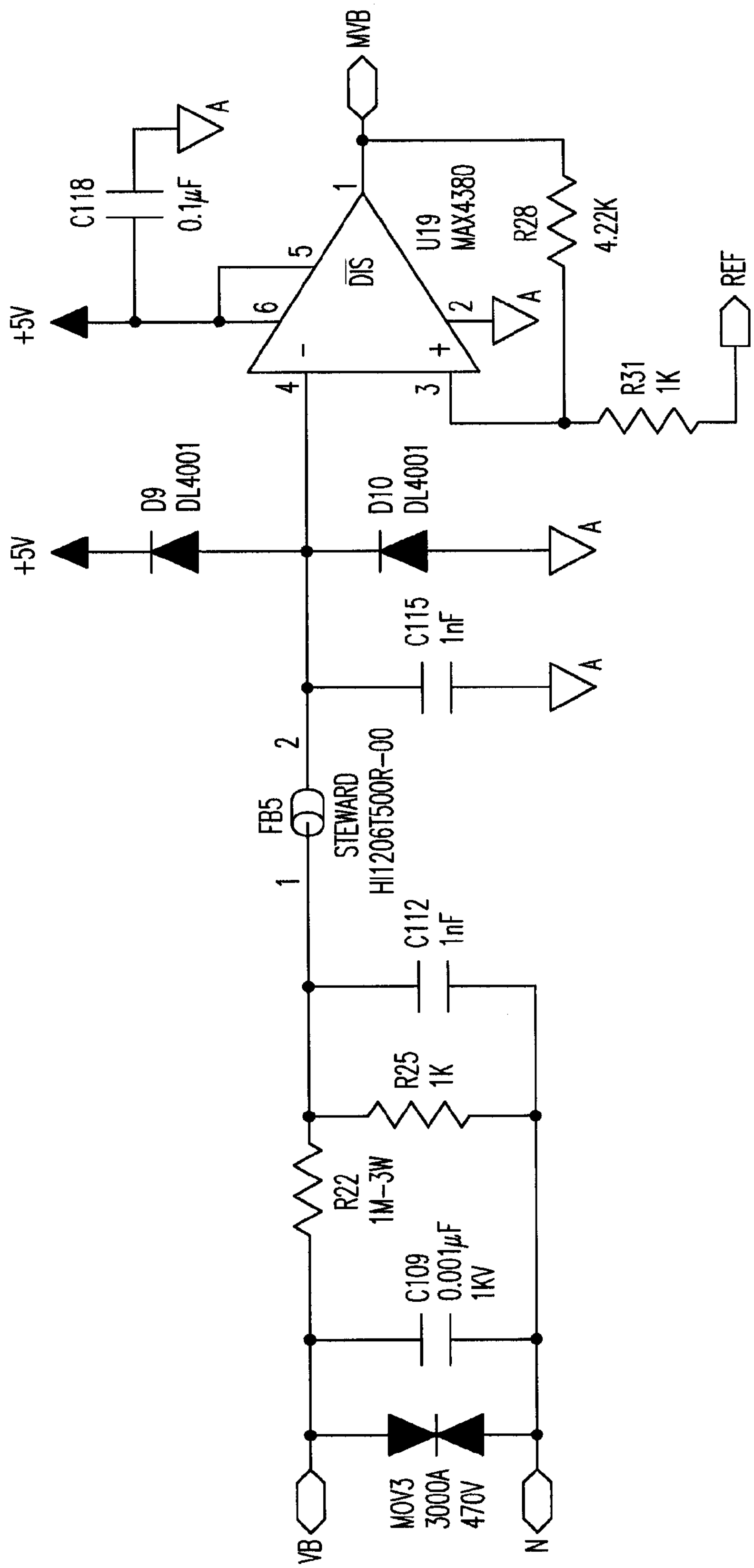
Figures 4, 20K:
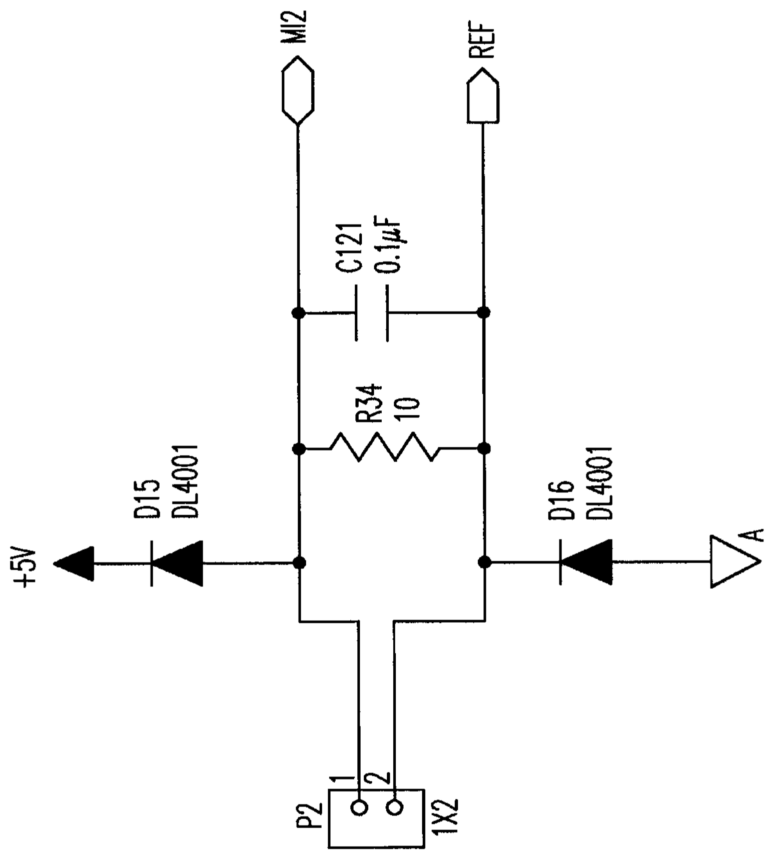
Figures 5, 20K:
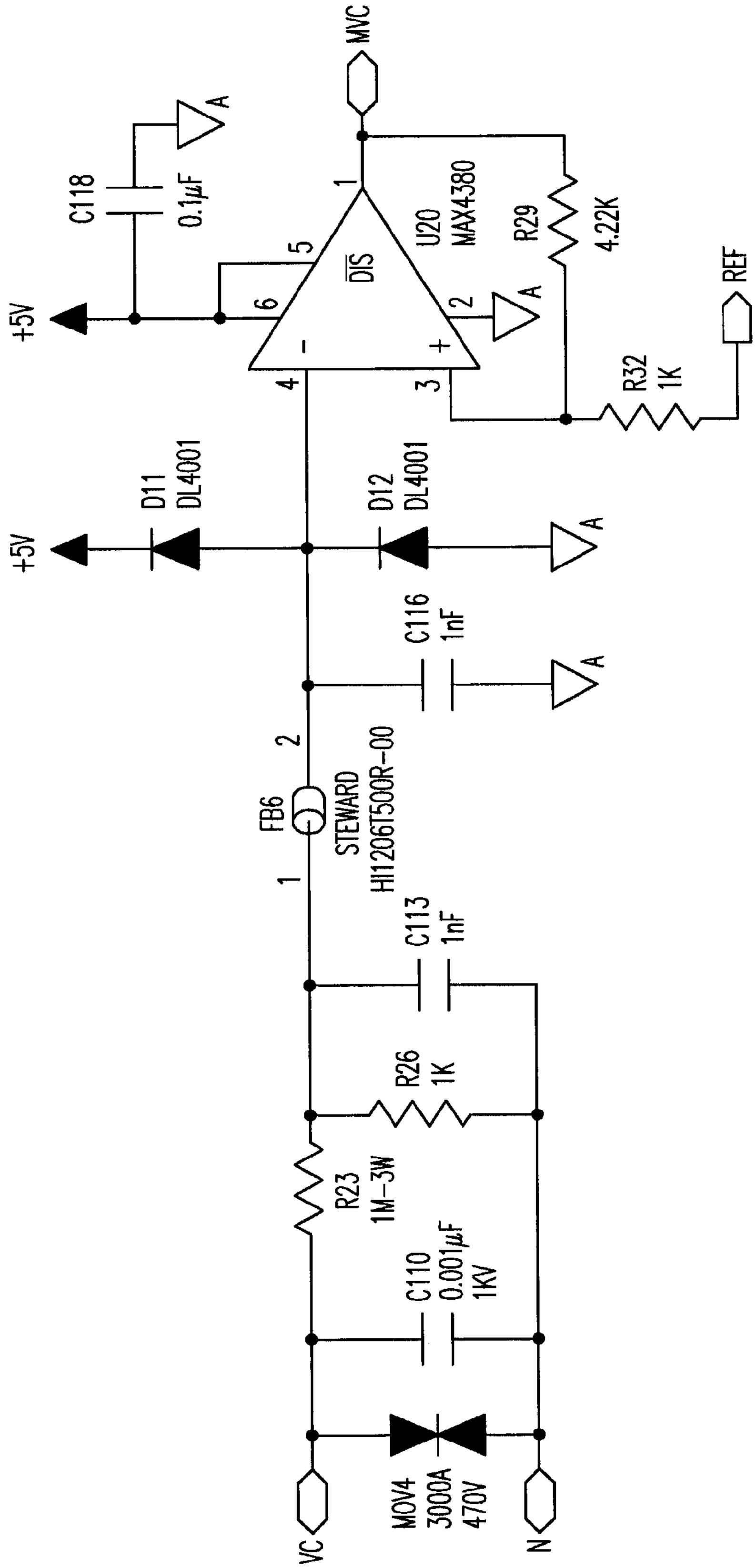
Figures 6, 20K:
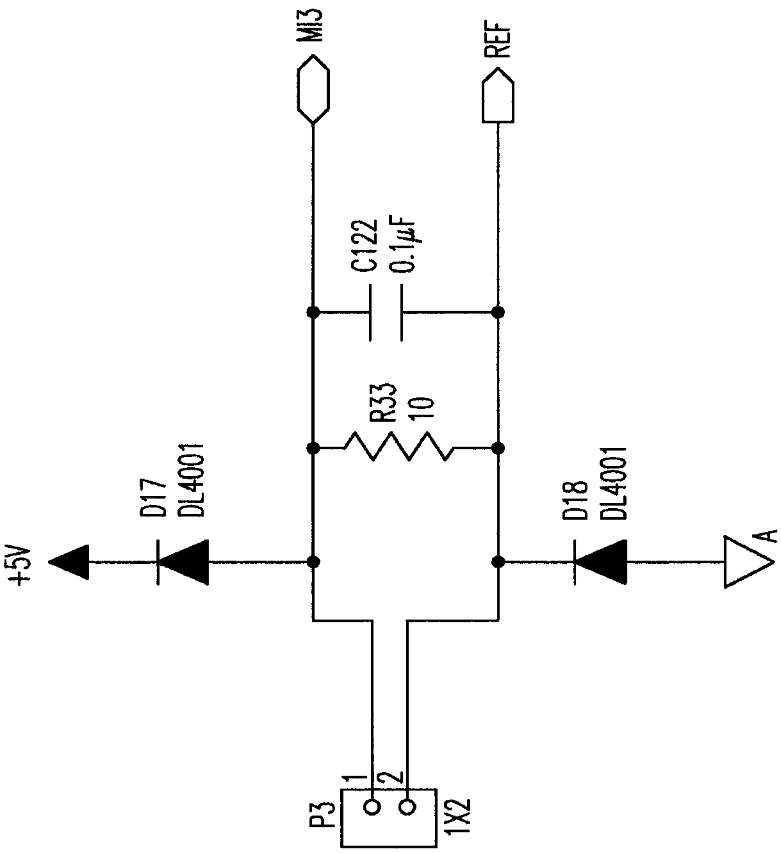
Figures 7, 20K:
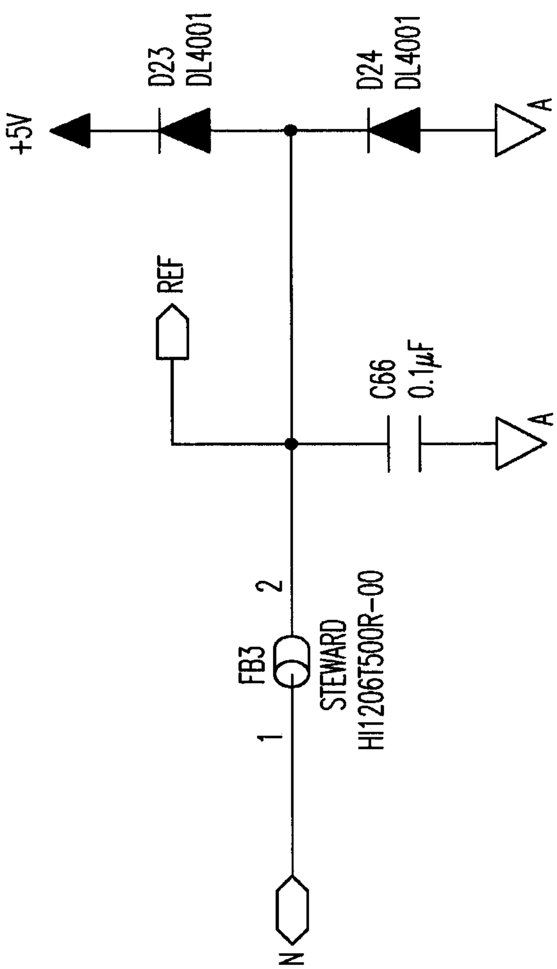
Figure 20L:
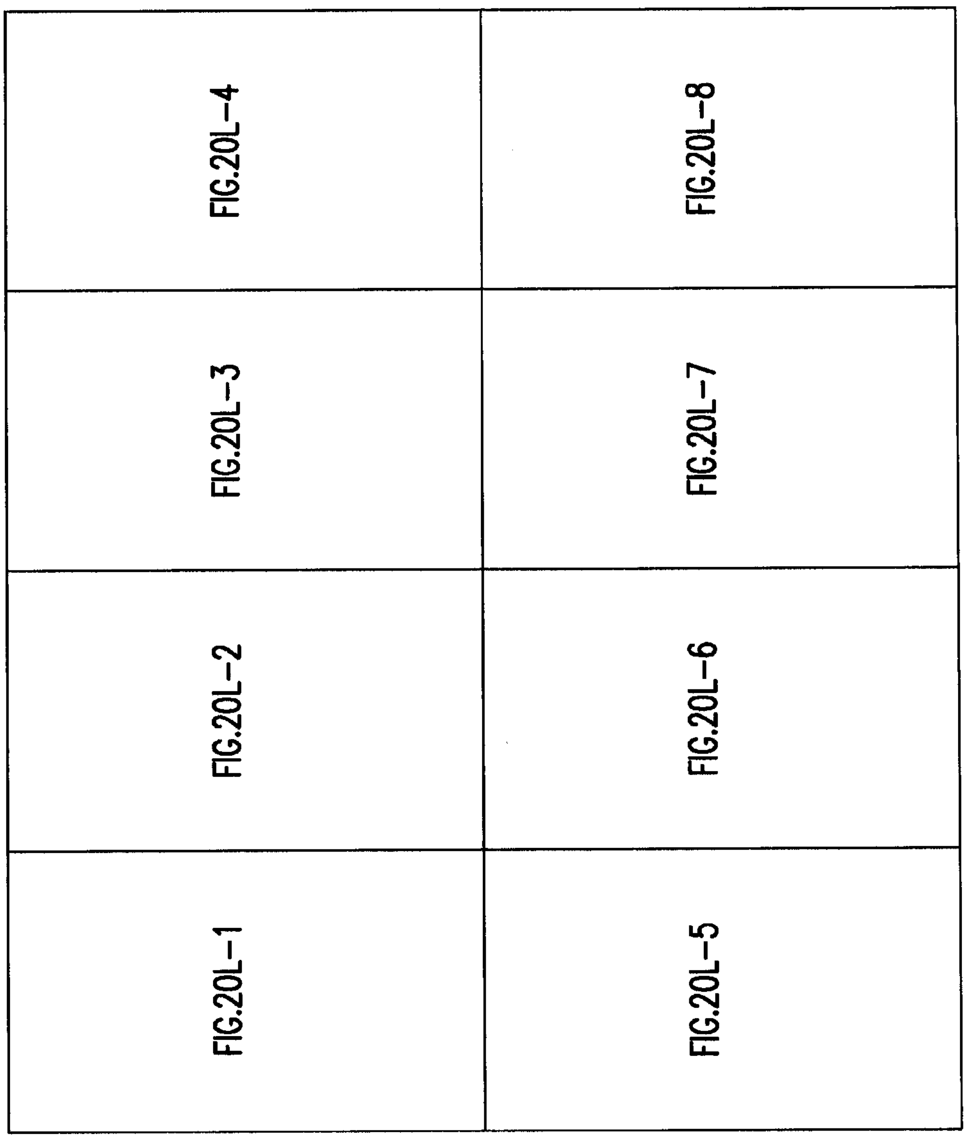
Figures 1, 20L:
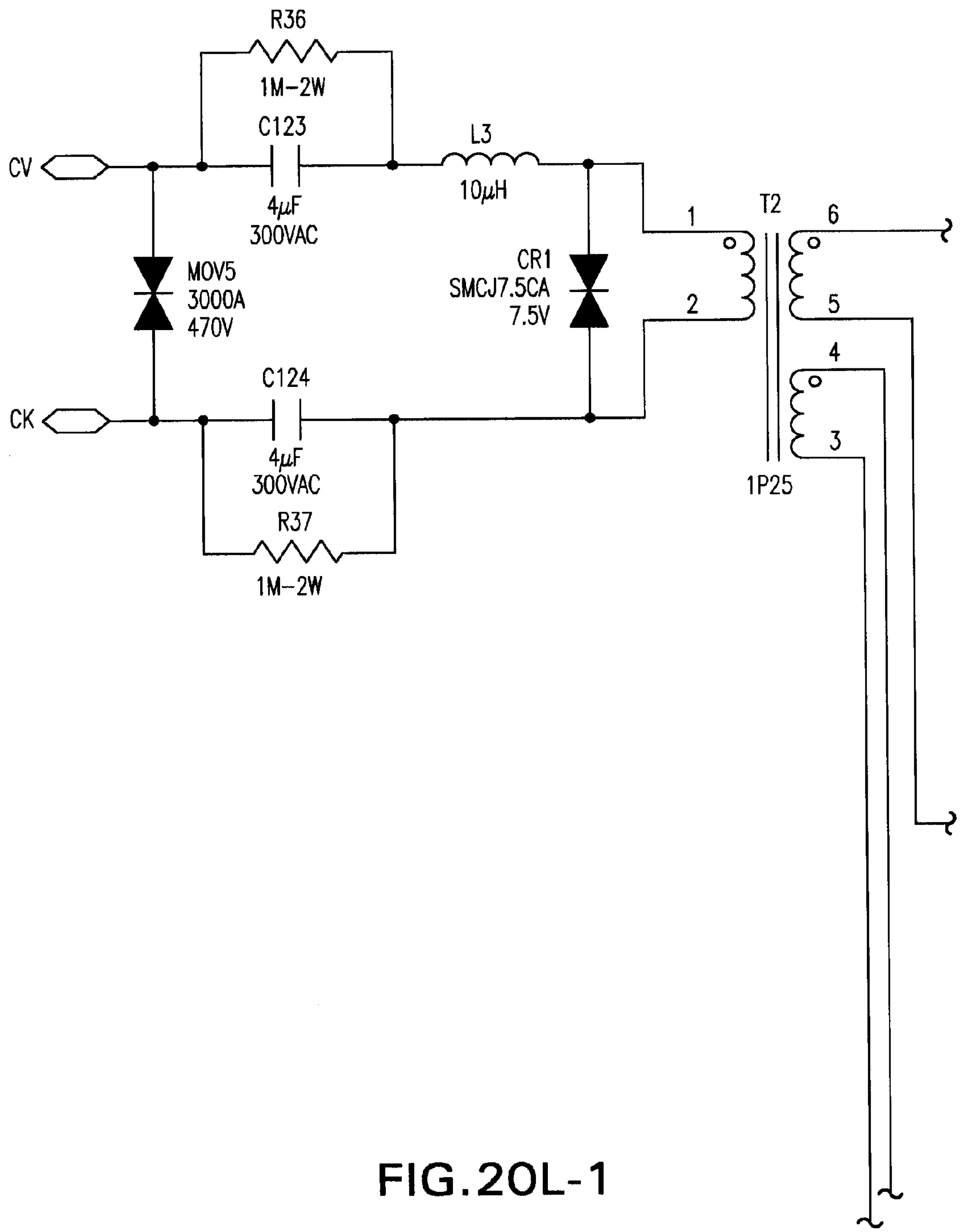
Figures 2, 20L:
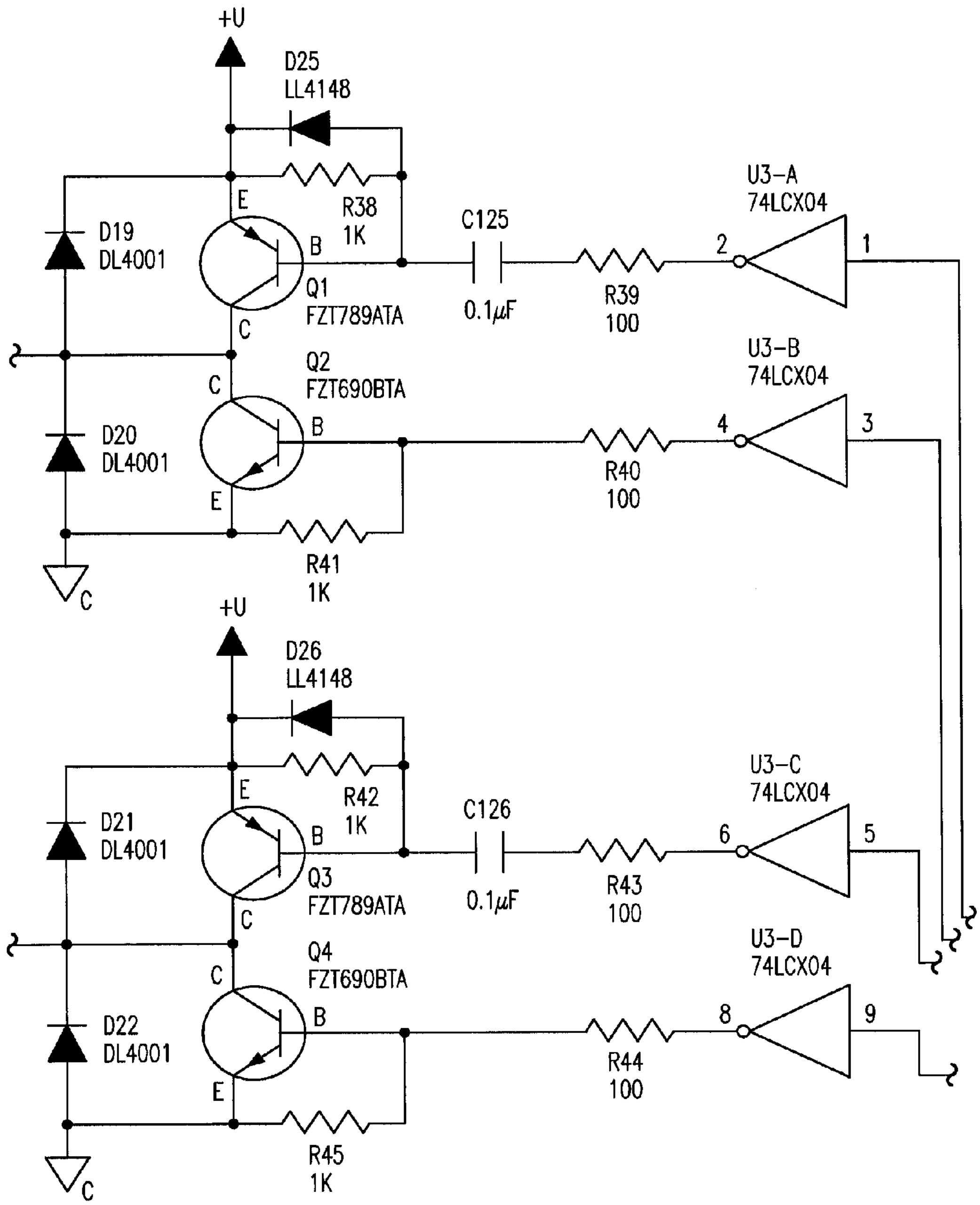
Figures 3, 20L:
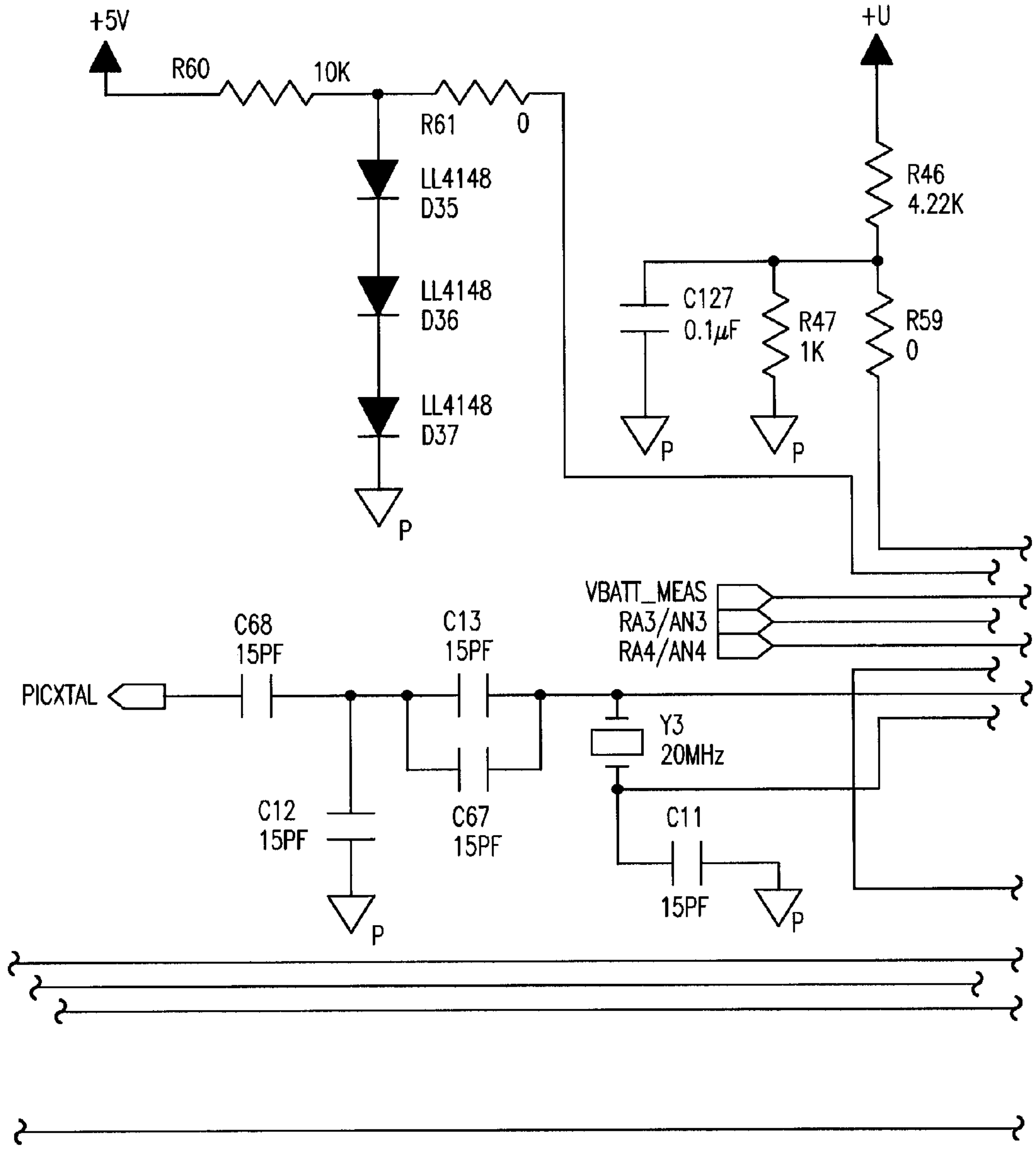
Figures 4, 20L:
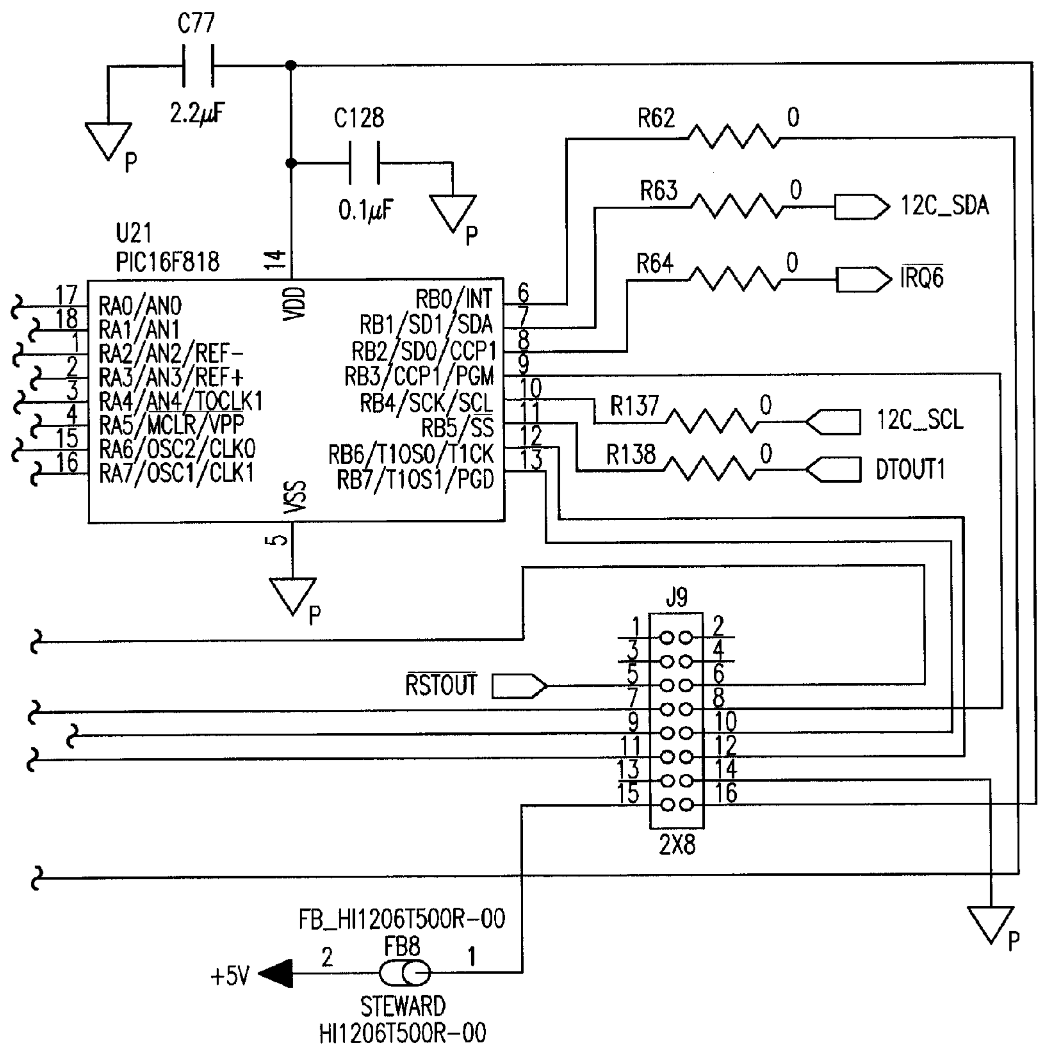
Figures 5, 20L:
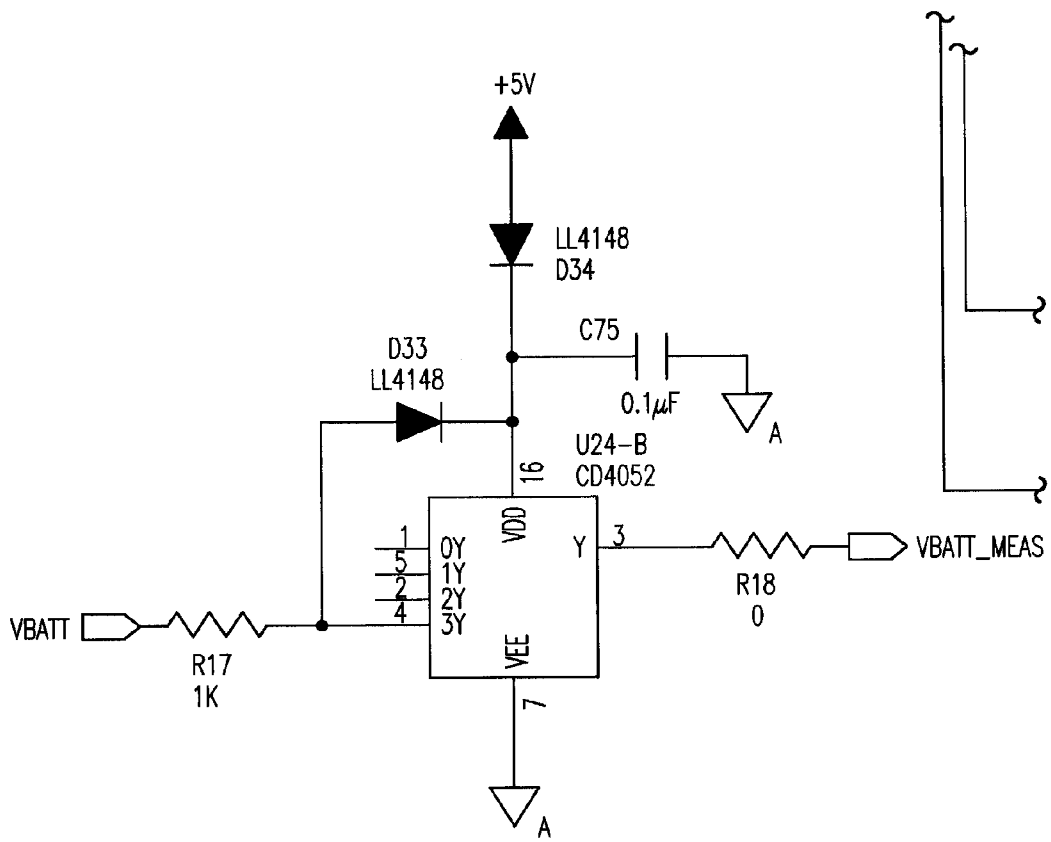
Figures 6, 20L:
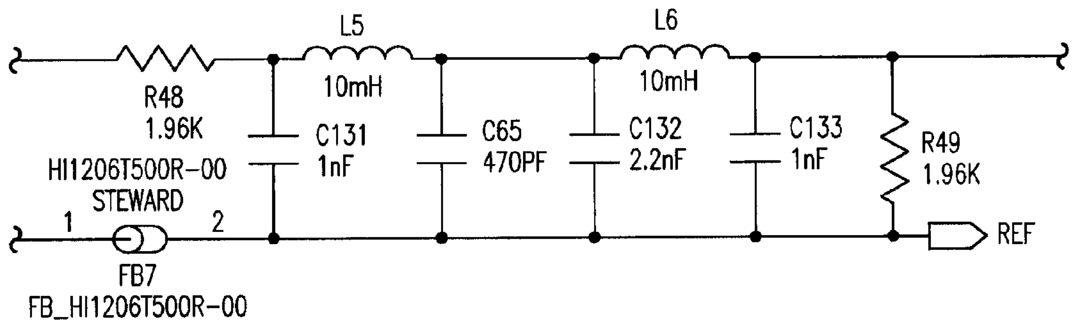
Figures 7, 20L:
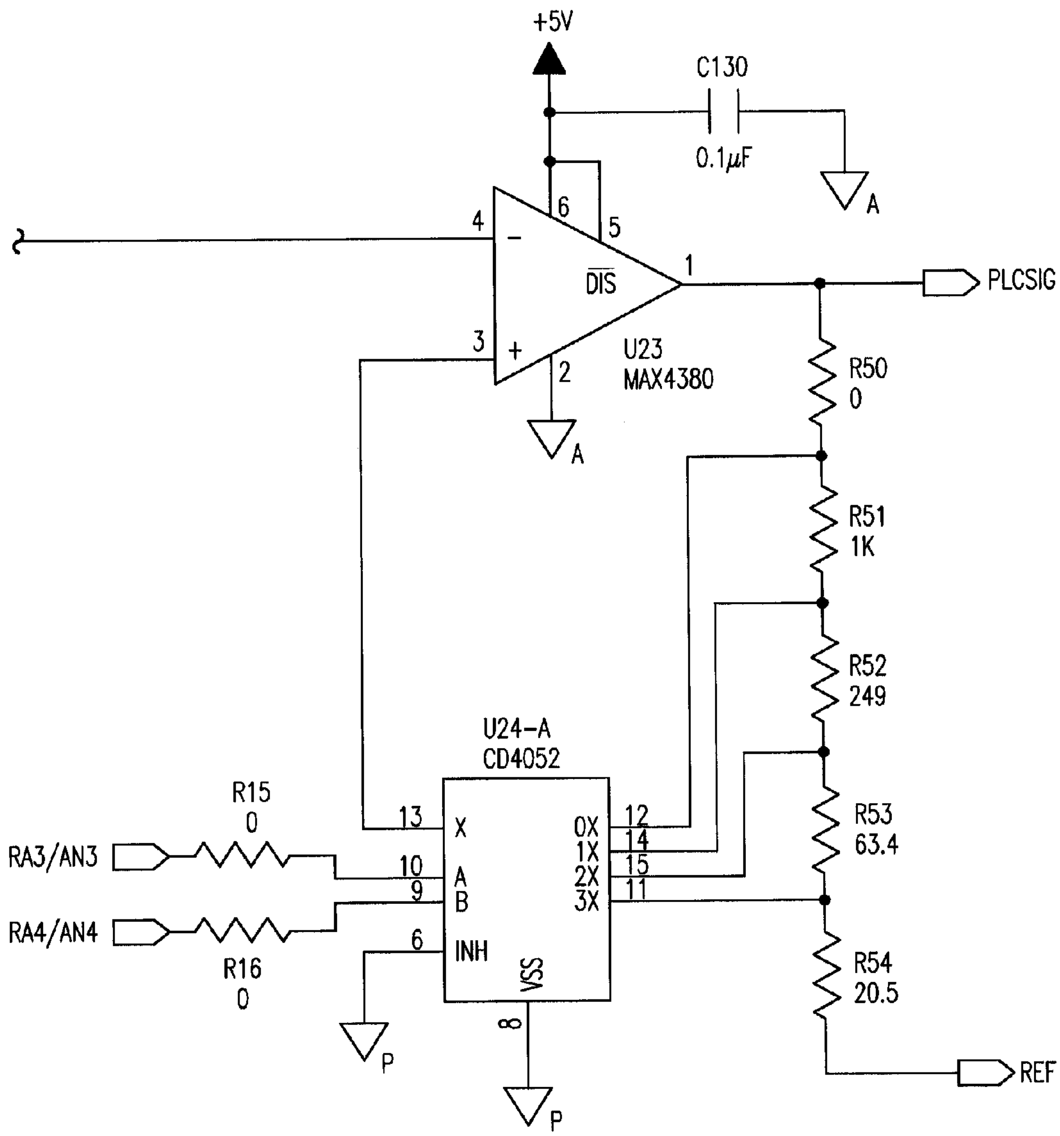
Figures 8, 20L:
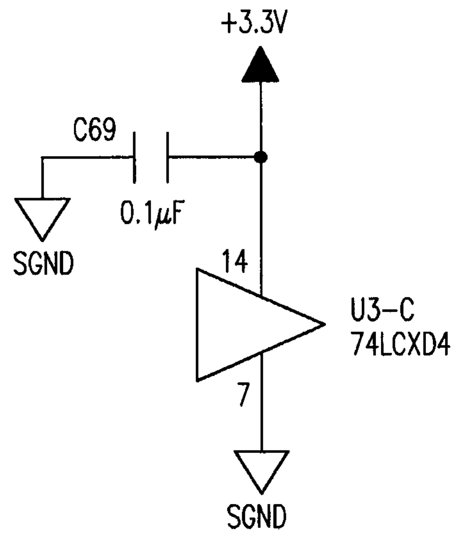
Figure 21A:
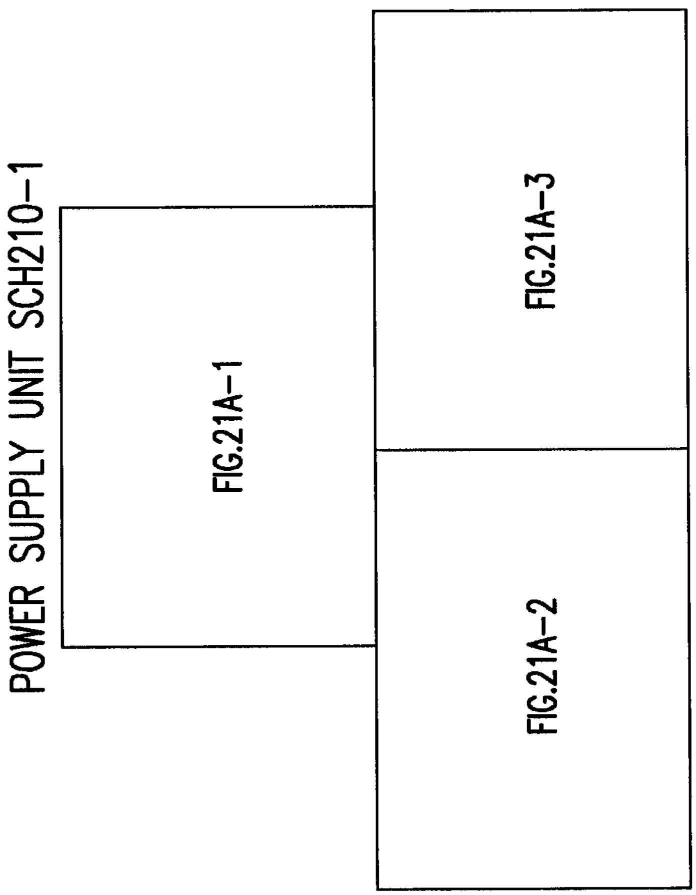
FIGS. 21A-B have preferred schematics for a power board.
Figures 1, 21A:
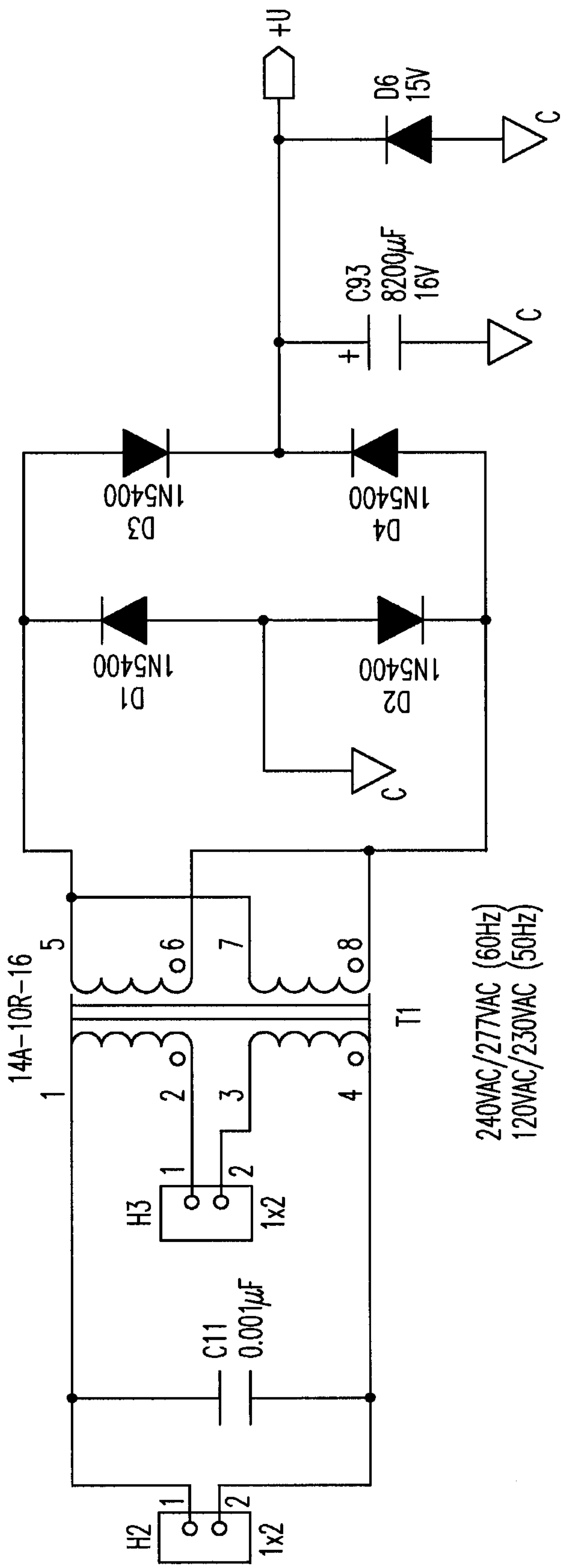
Figures 2, 21A:
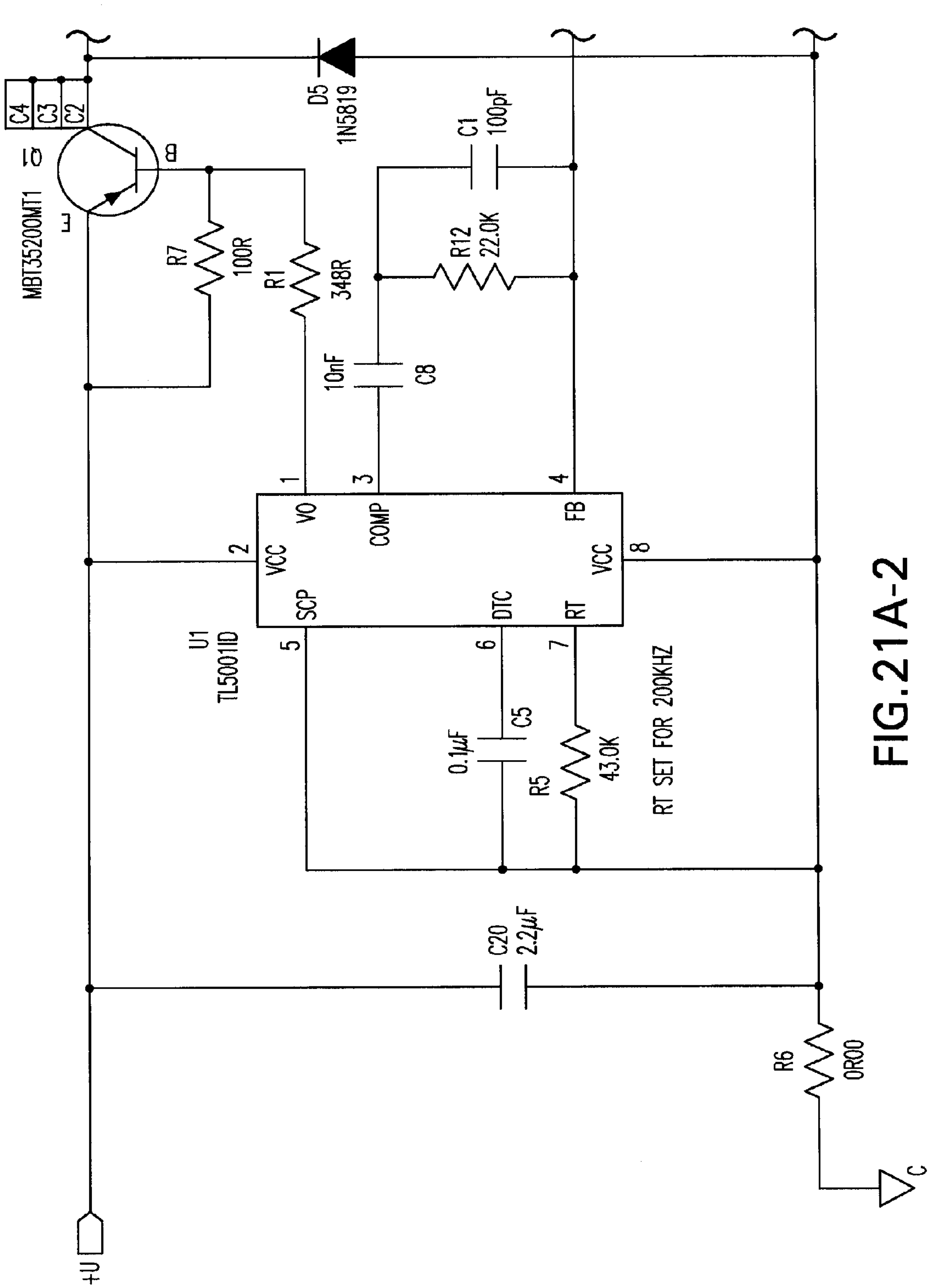
Figures 3, 21A:
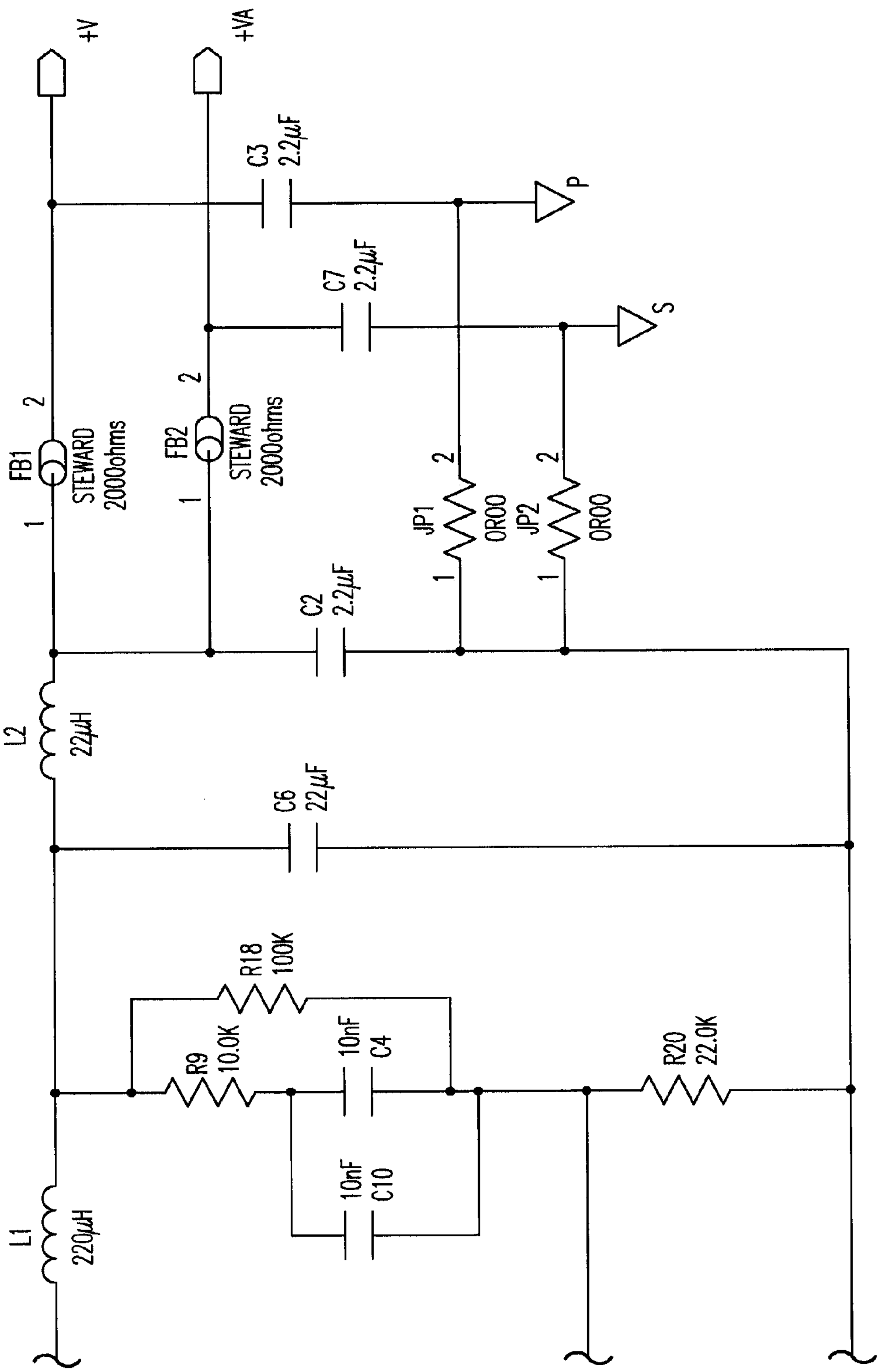
Figure 21B:
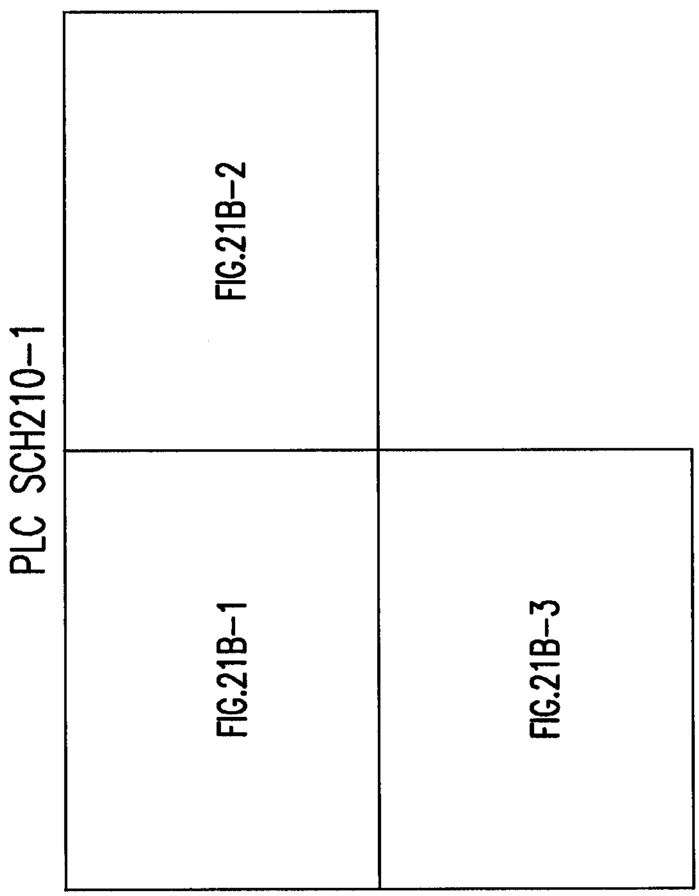
Figures 1, 21B:
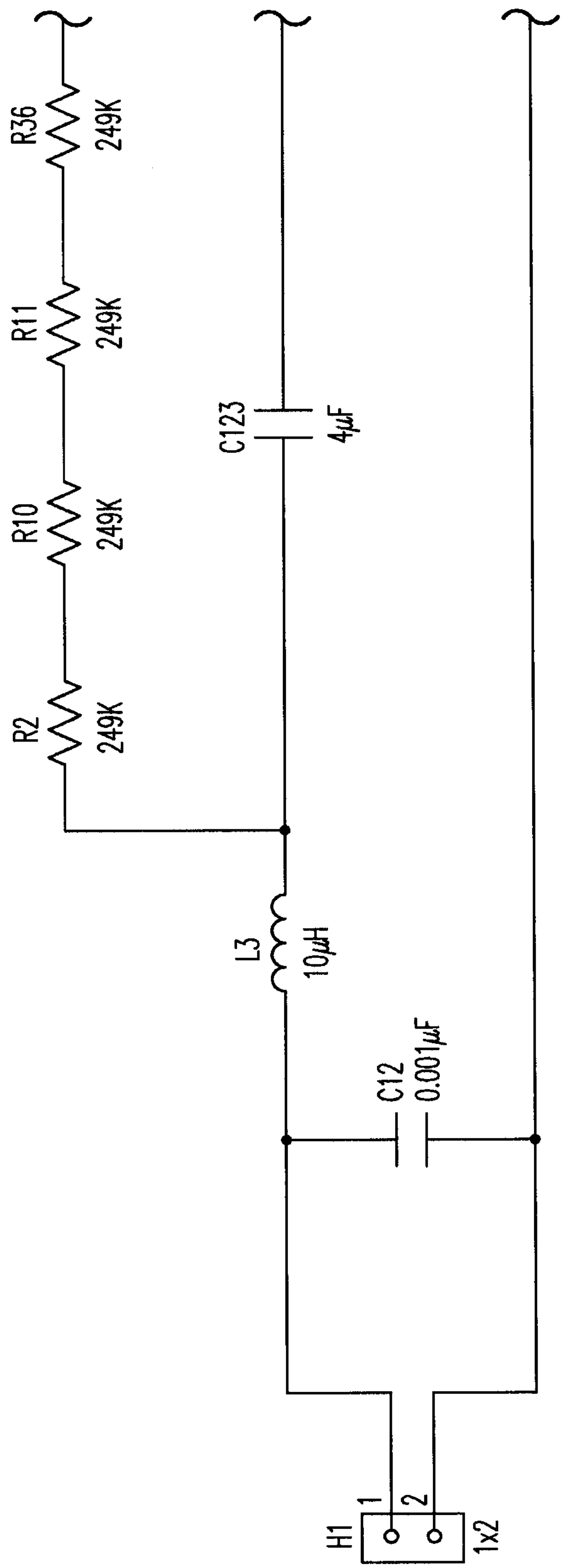
Figures 2, 21B:
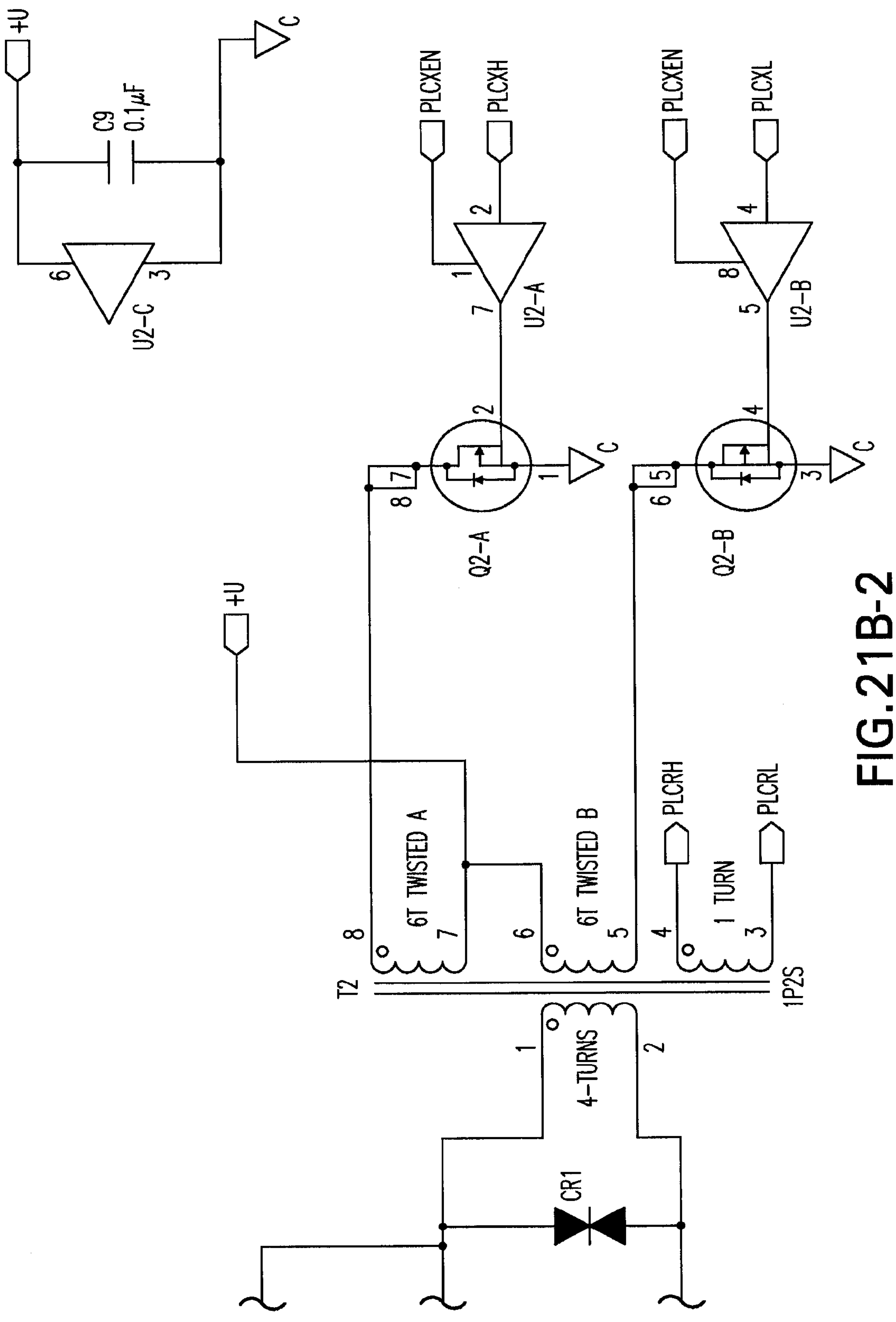
Figures 3, 21B:
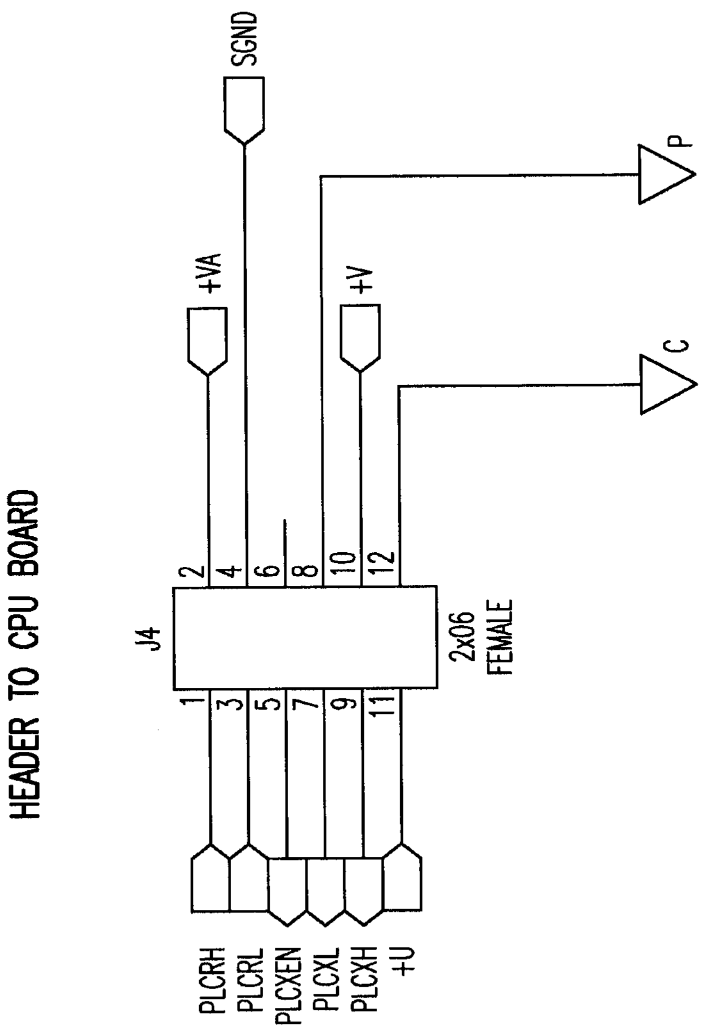
Figure 22A:
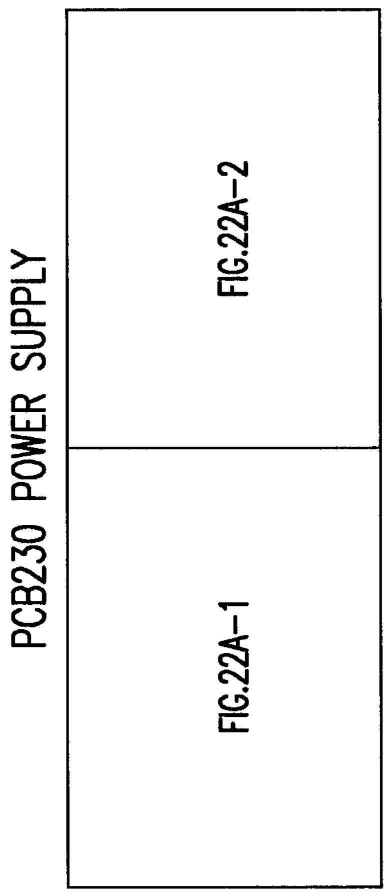
FIGS. 22A-G have preferred schematics for an I/O extension board.
Figures 1, 22A:
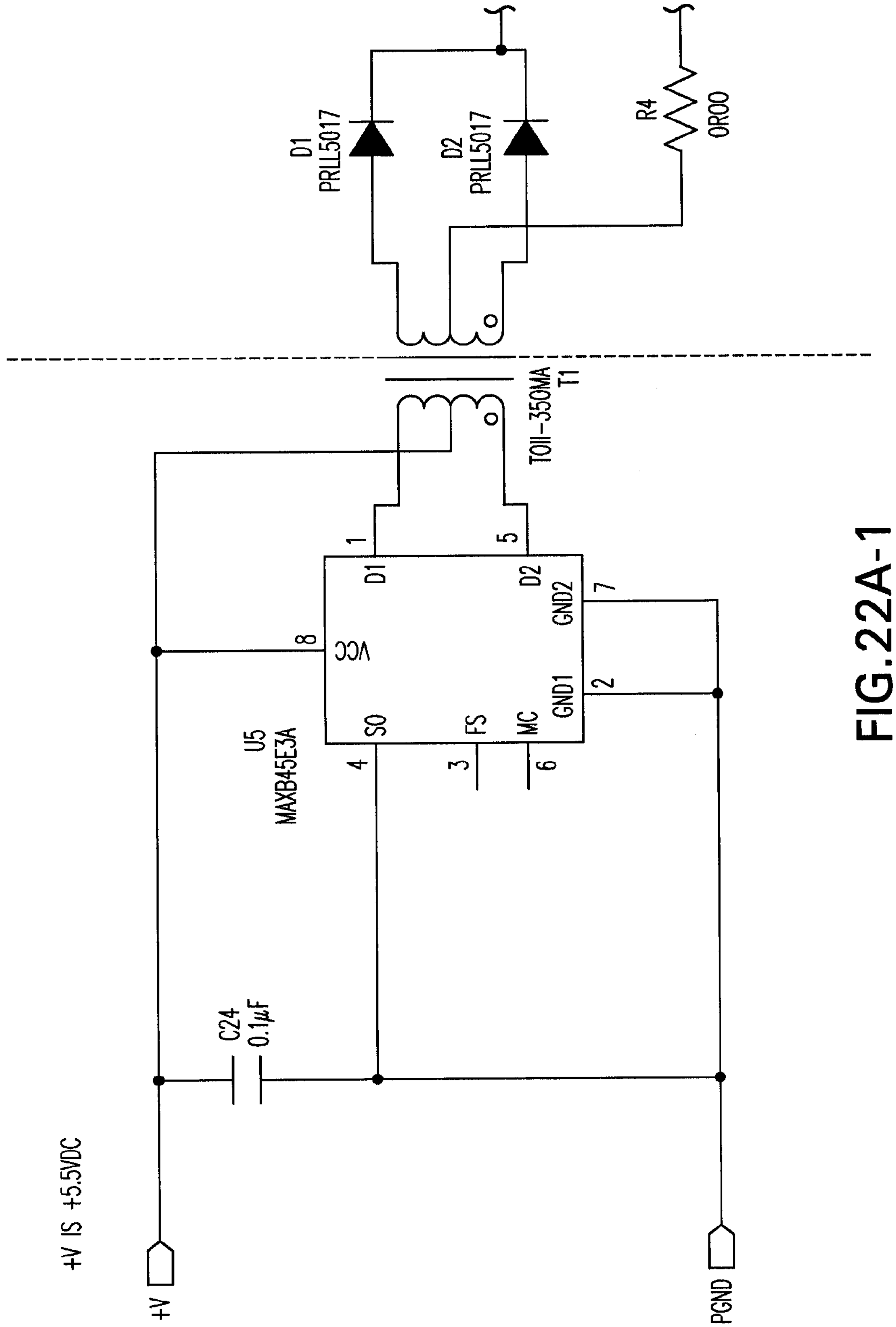
Figures 2, 22A:
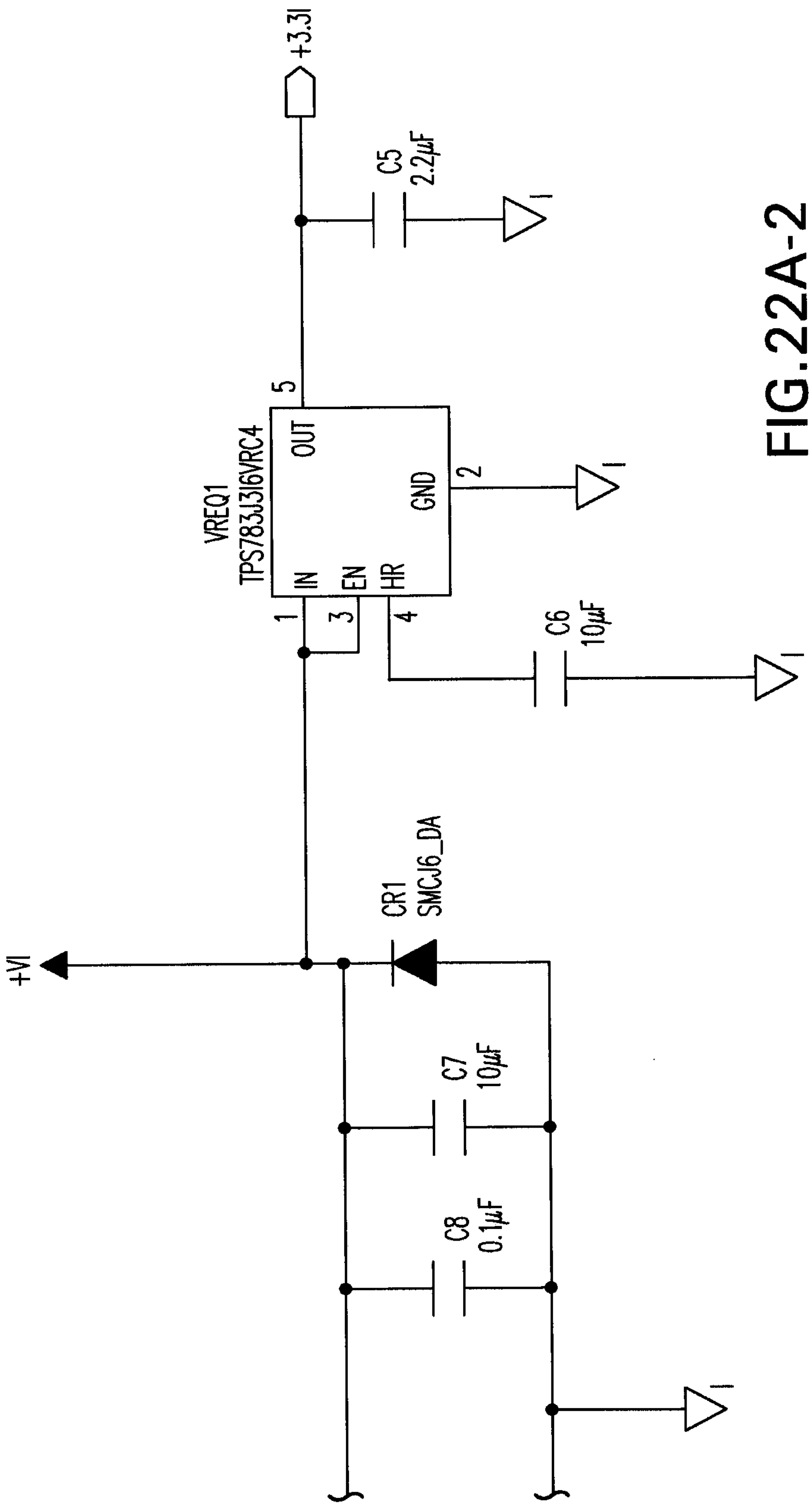
Figure 22B:
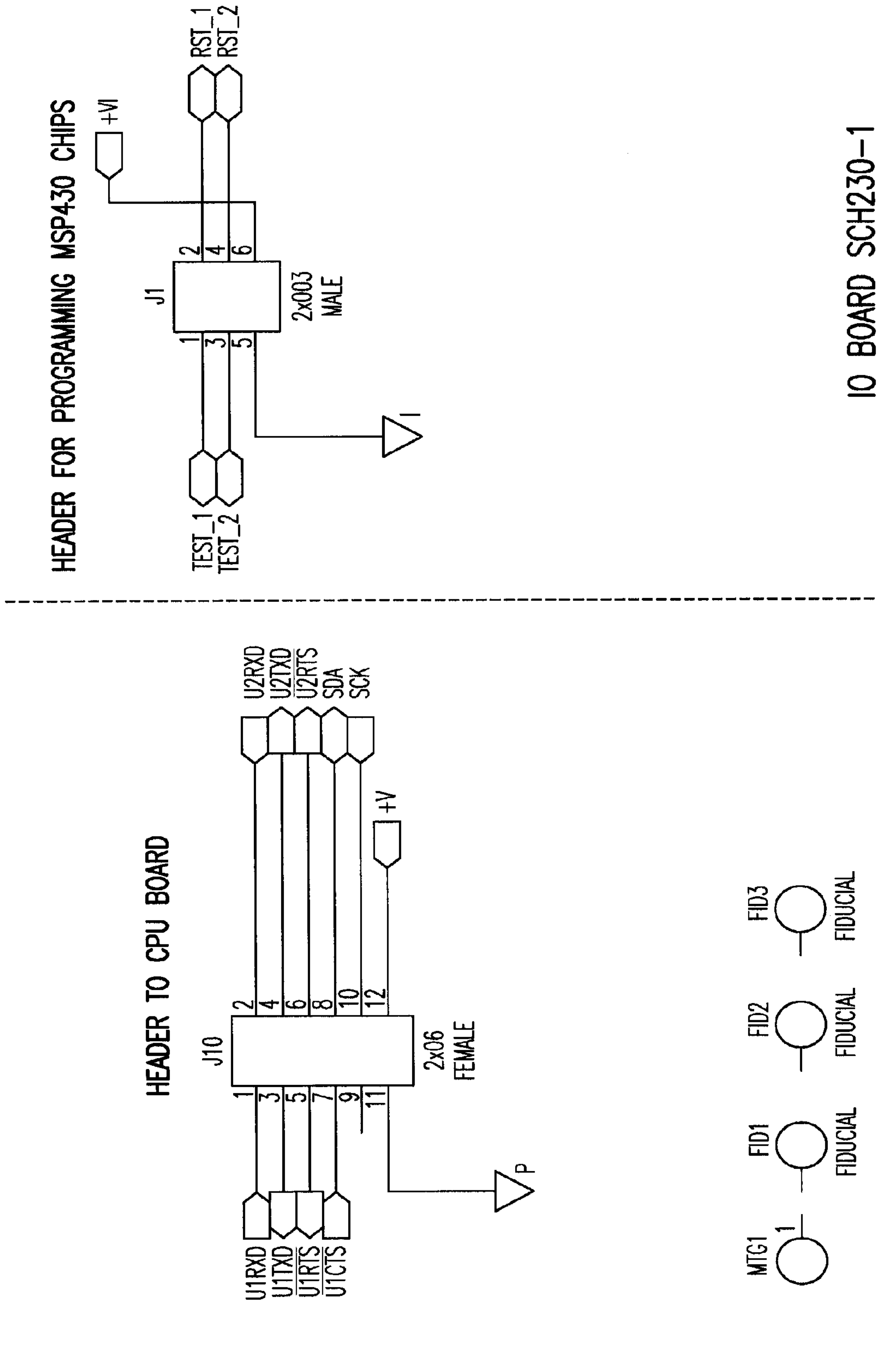
Figure 22C:
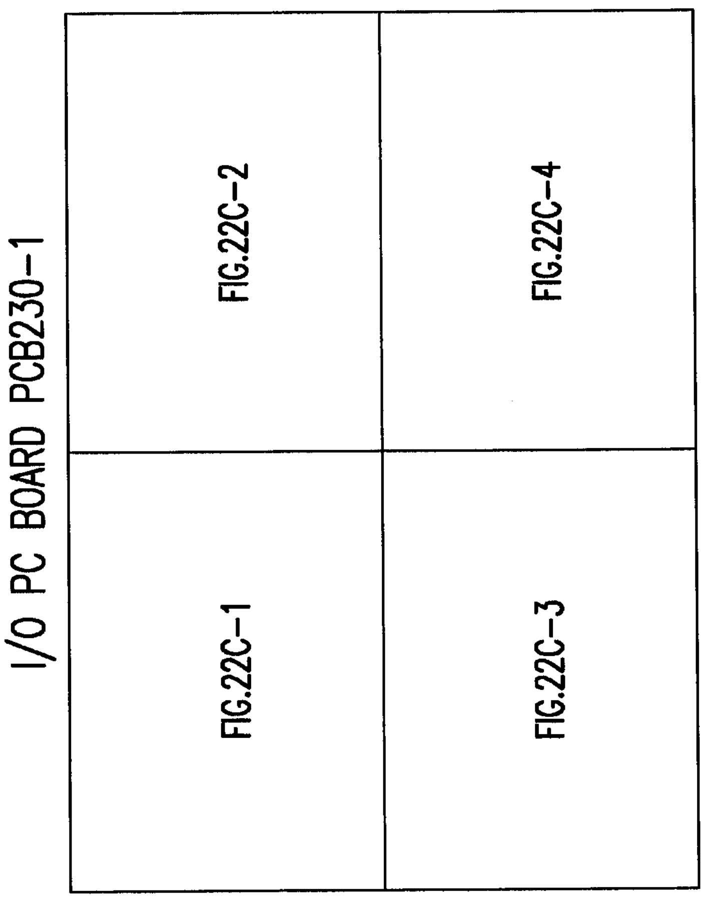
Figures 1, 22C:
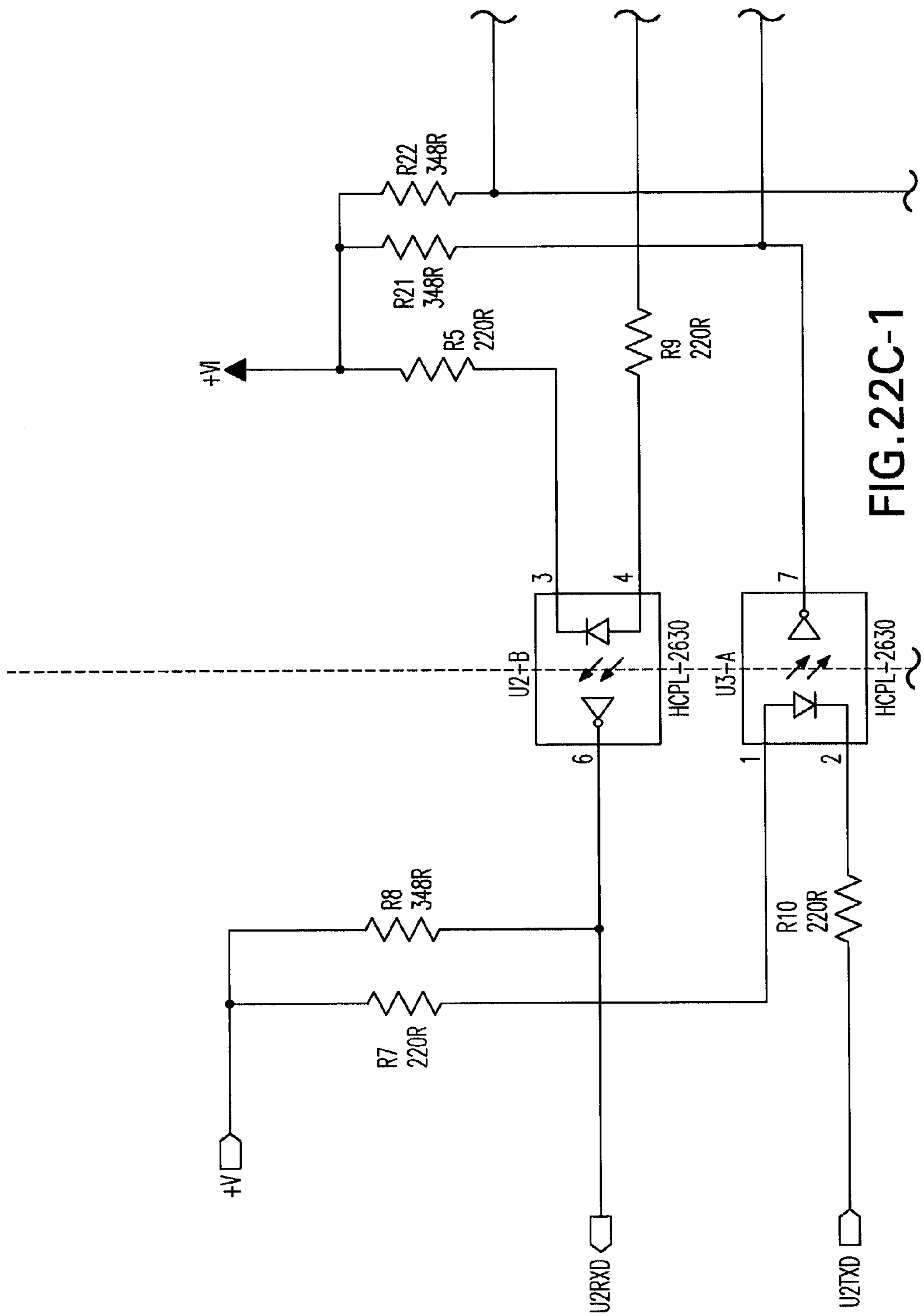
Figures 2, 22C:
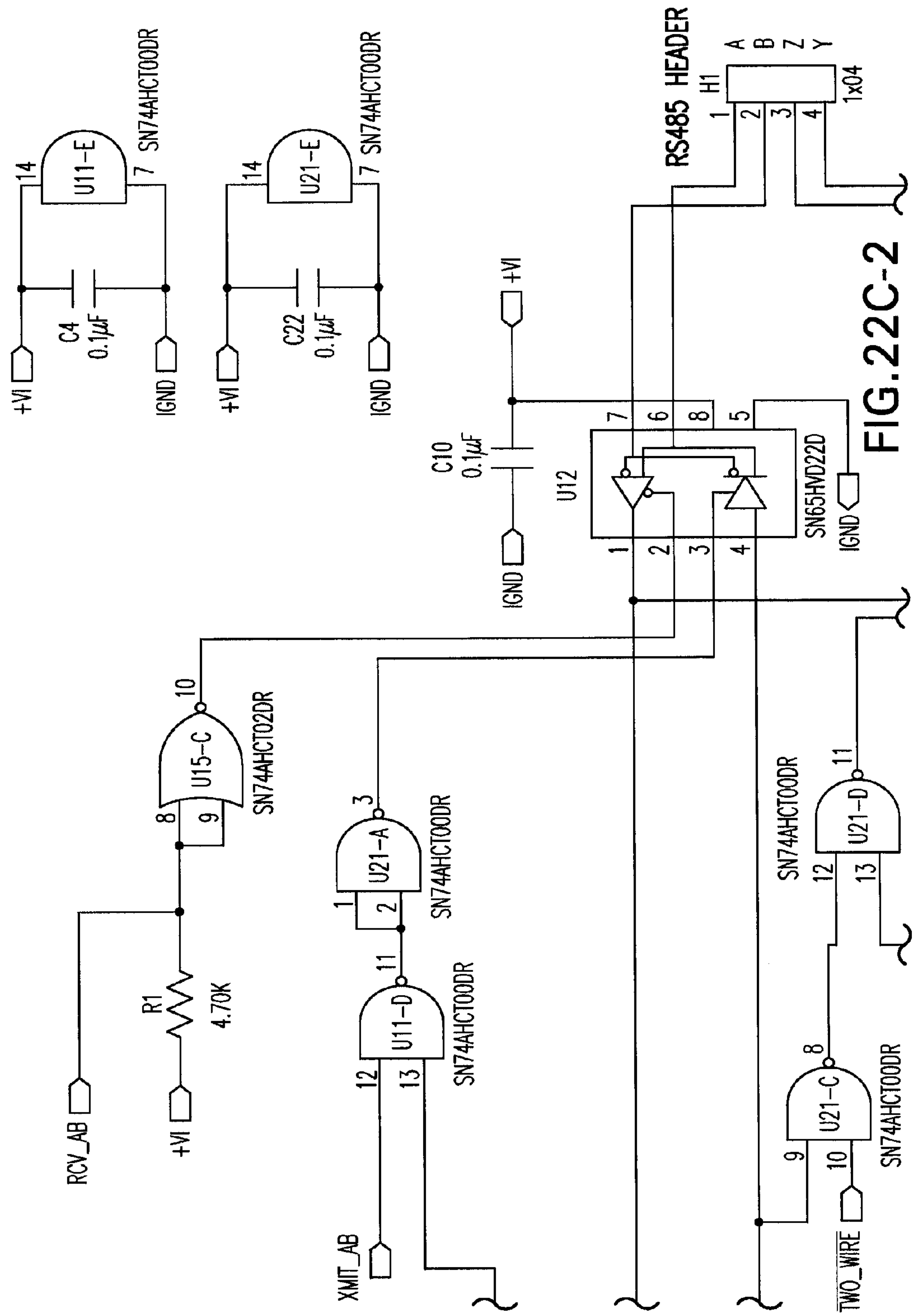
Figures 3, 22C:
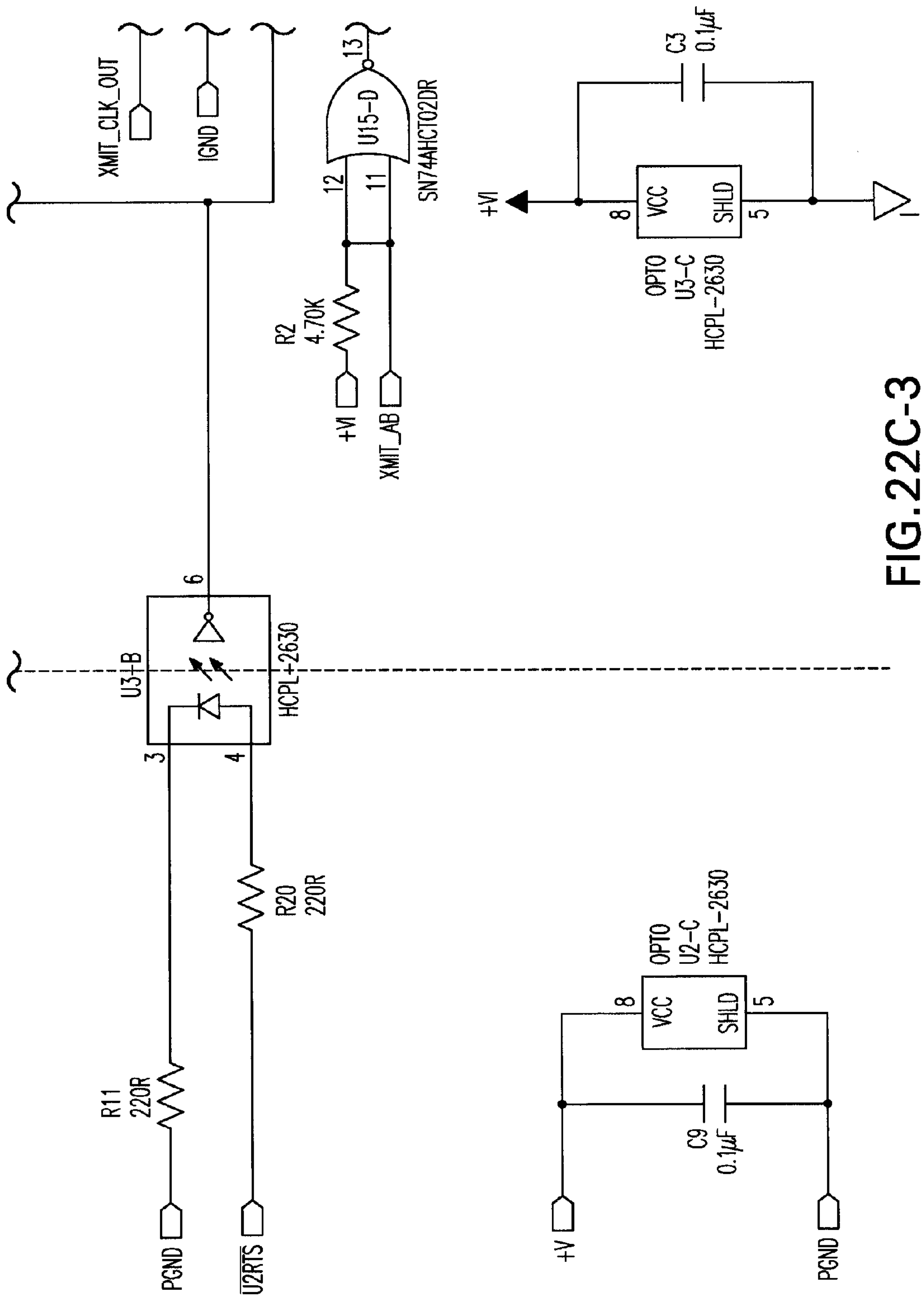
Figures 4, 22C:
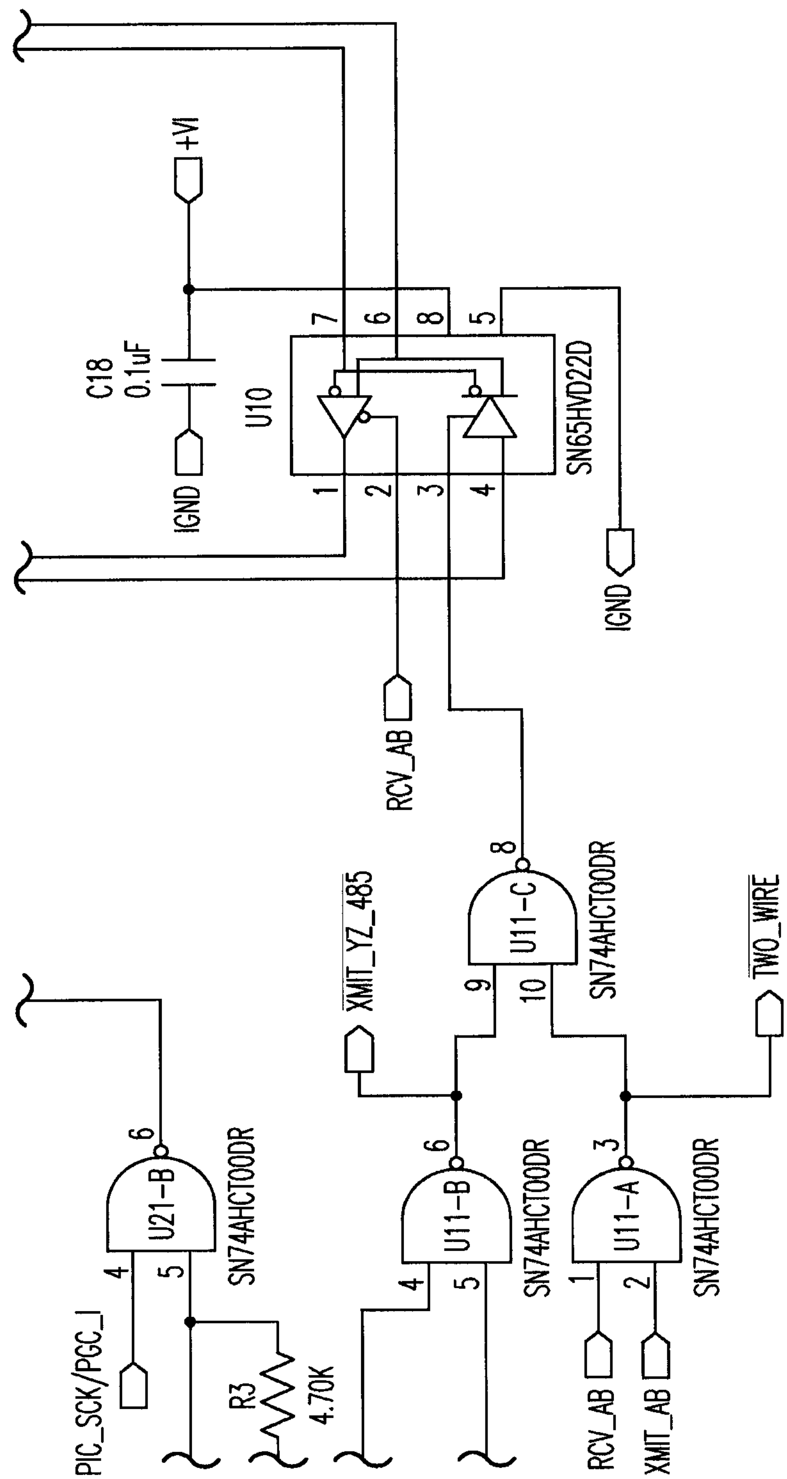
Figure 22D:
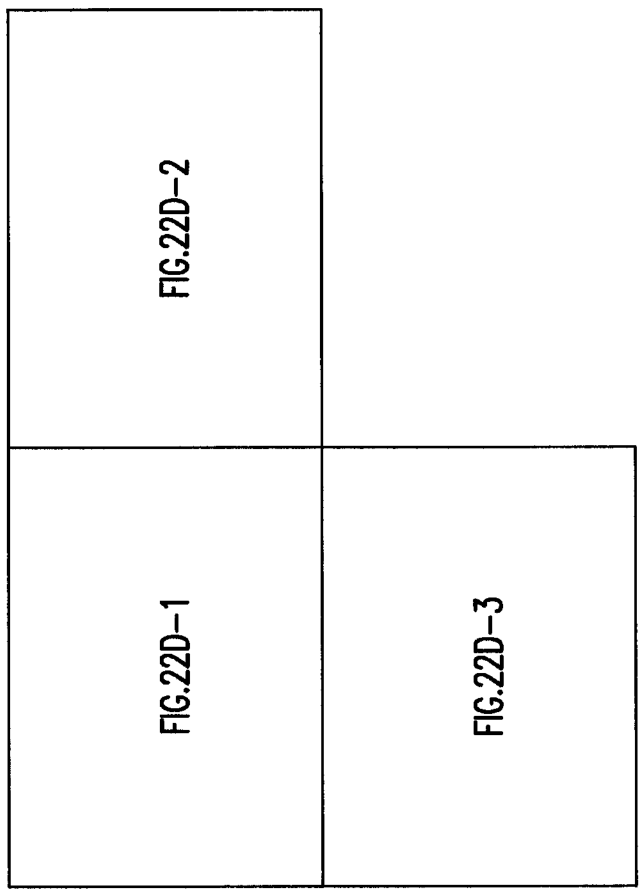
Figures 1, 22D:
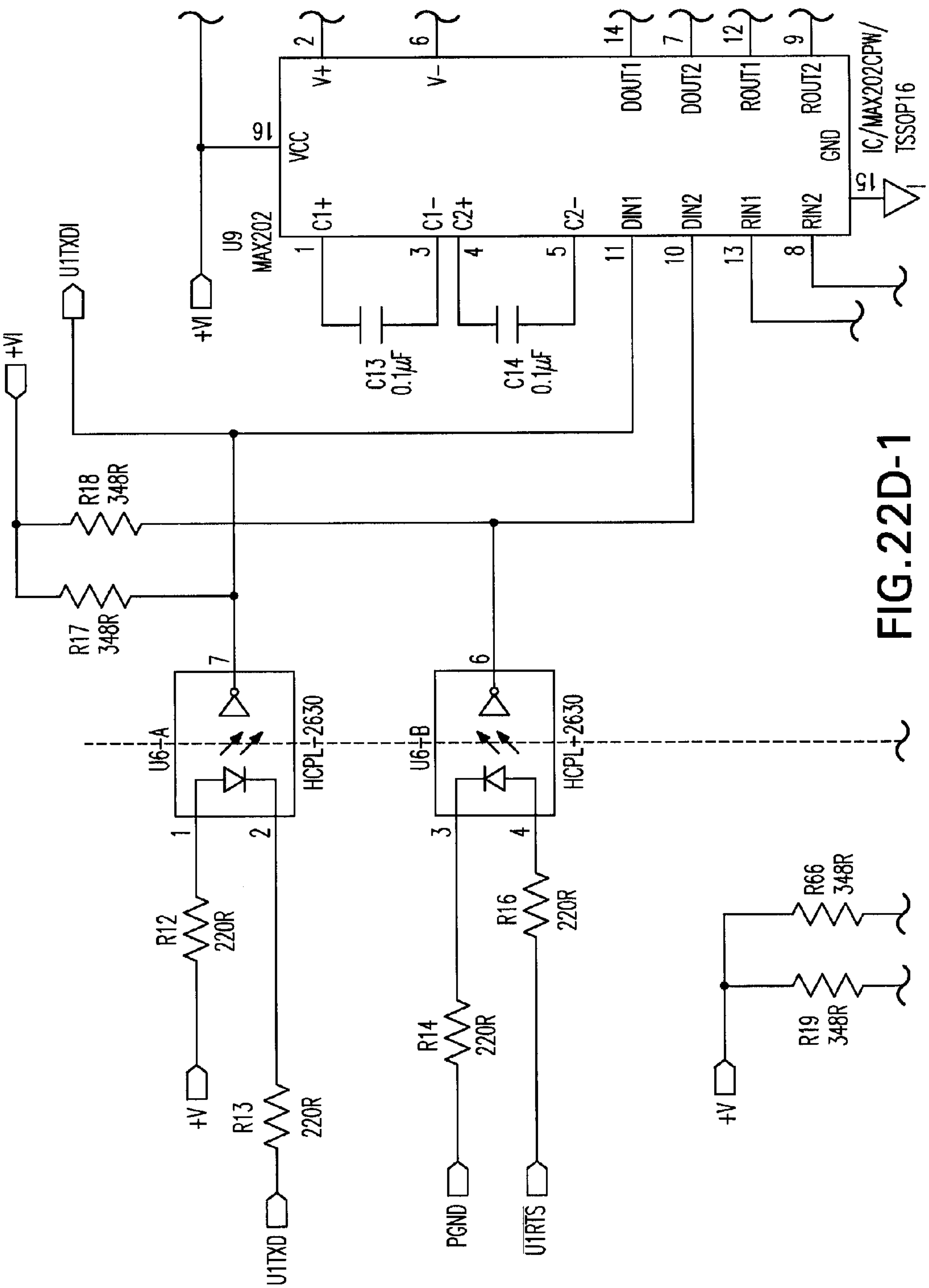
Figures 2, 22D:
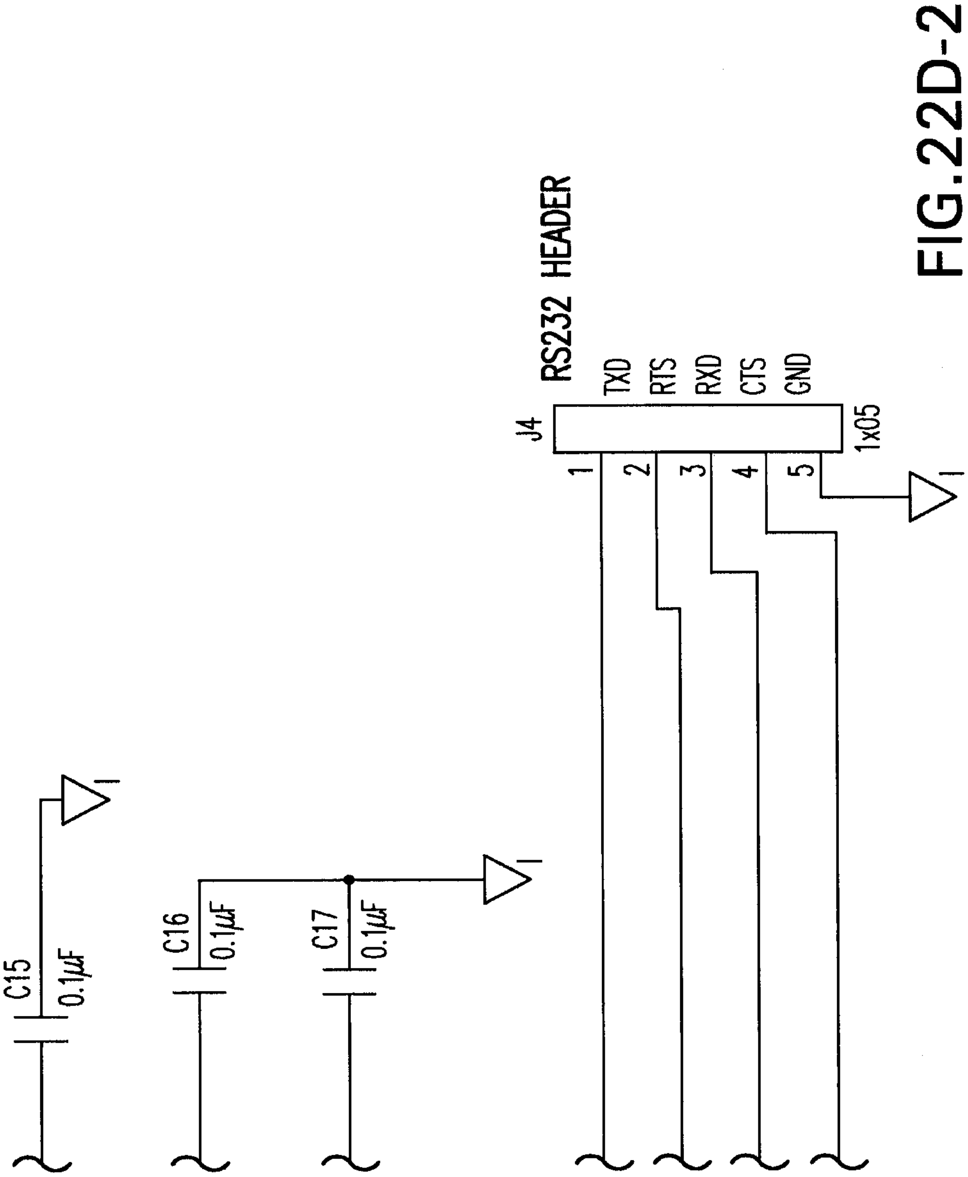
Figures 3, 22D:
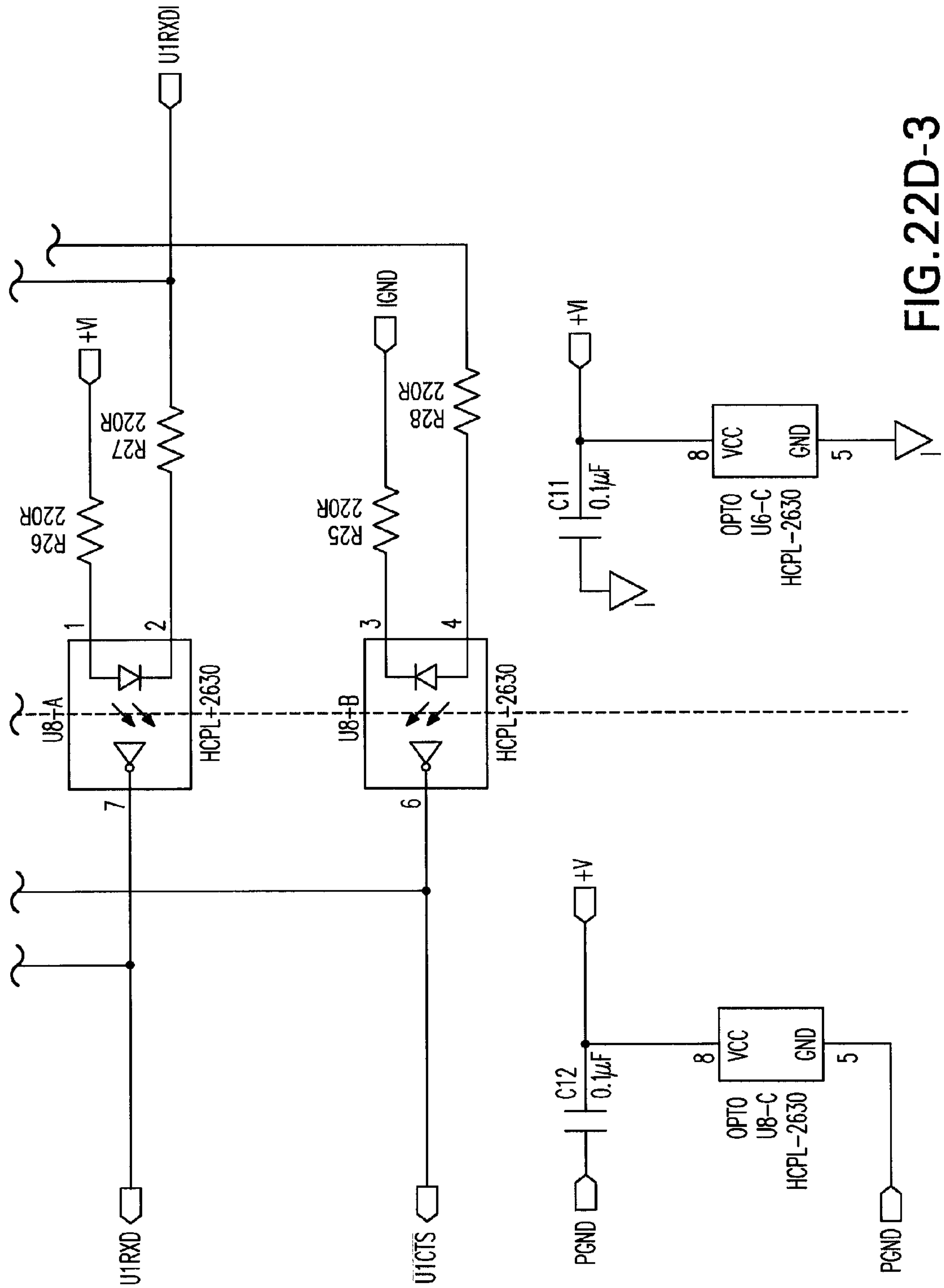
Figure 22E:
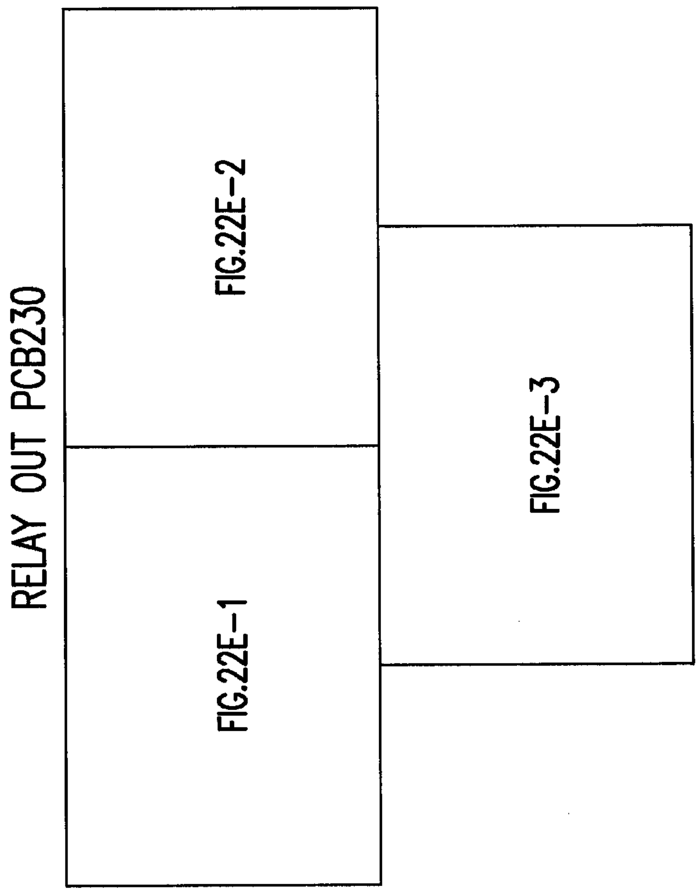
Figures 1, 22E:
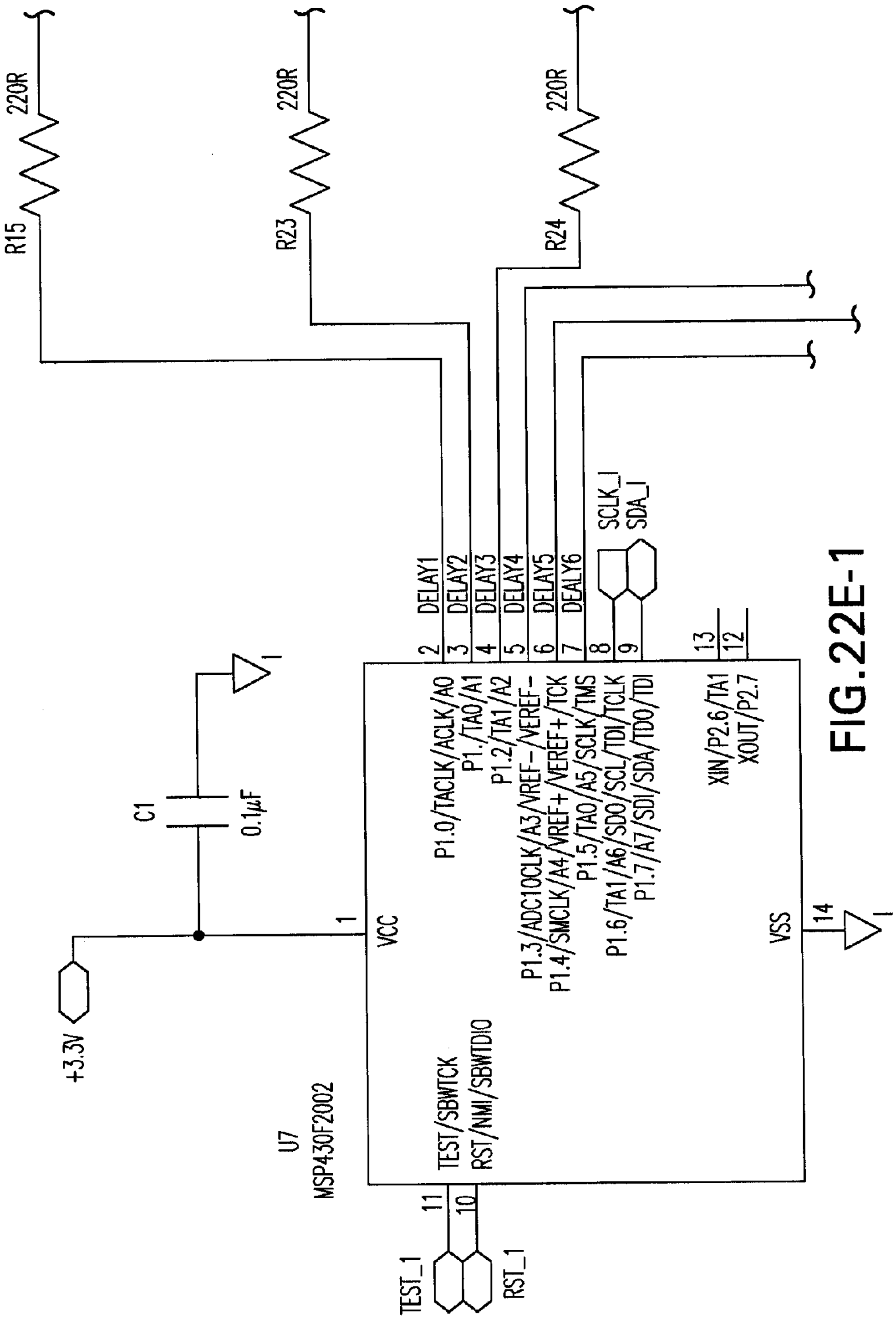
Figures 2, 22E:
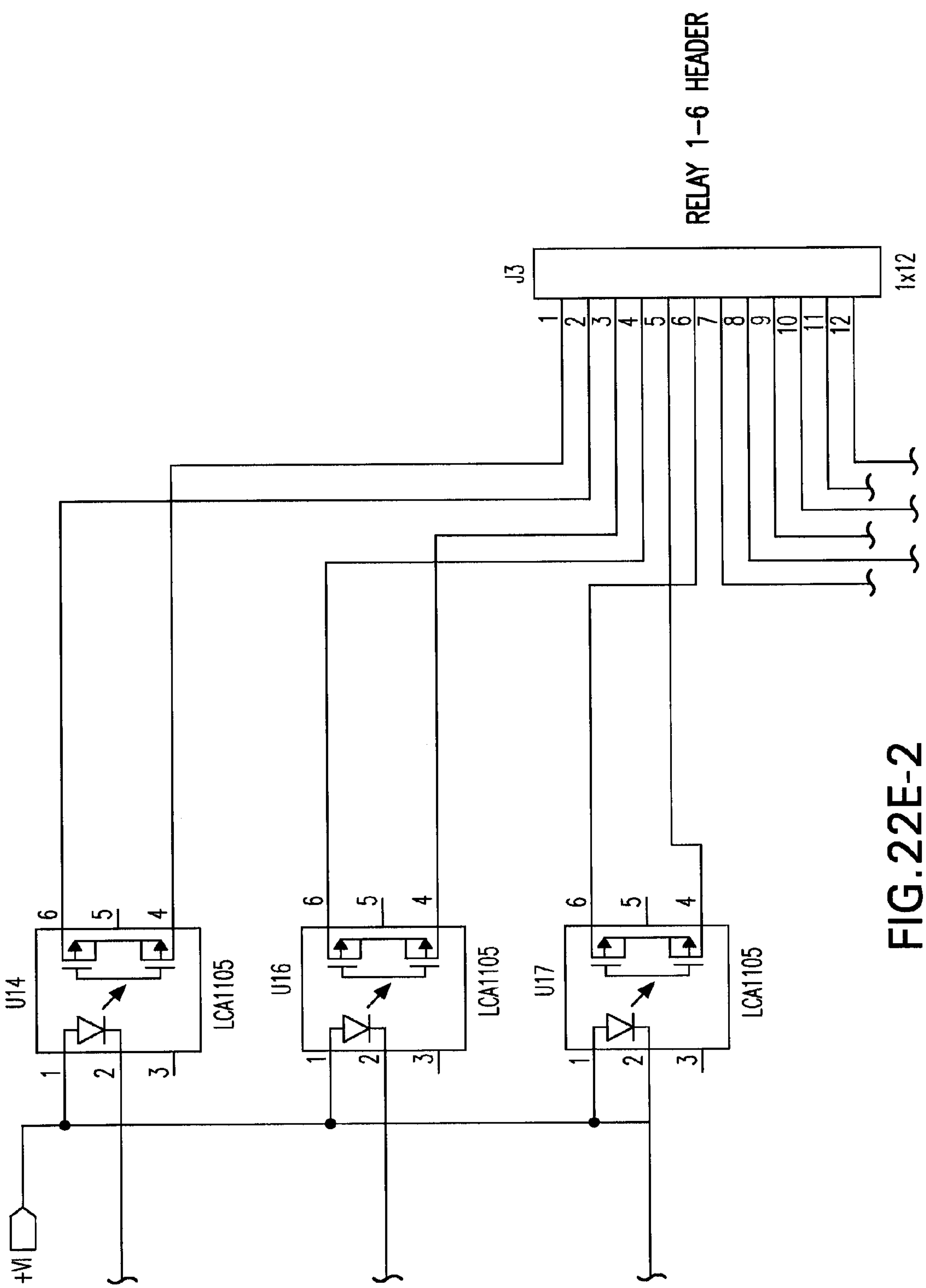
Figures 3, 22E:
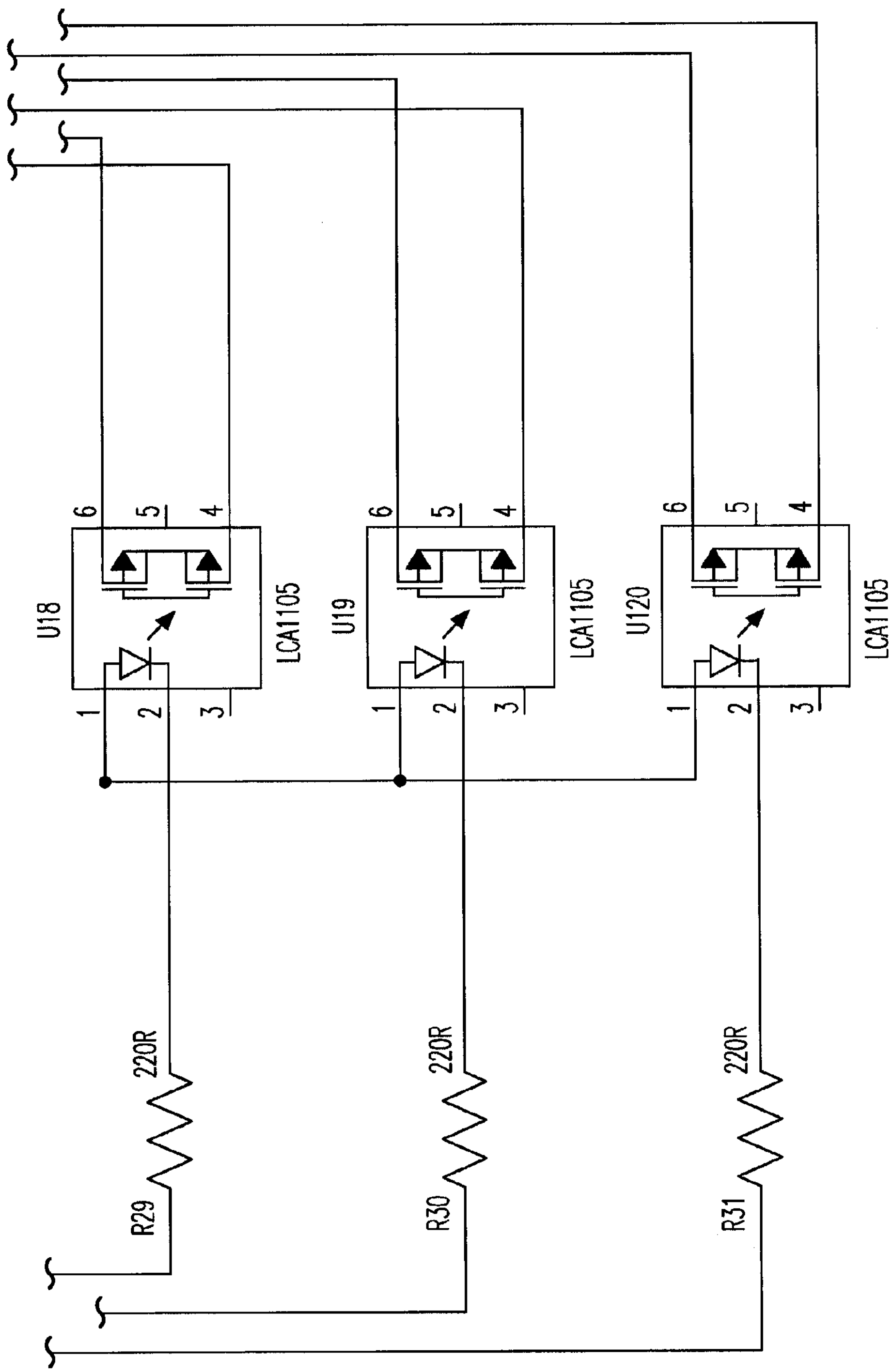
Figure 22F:
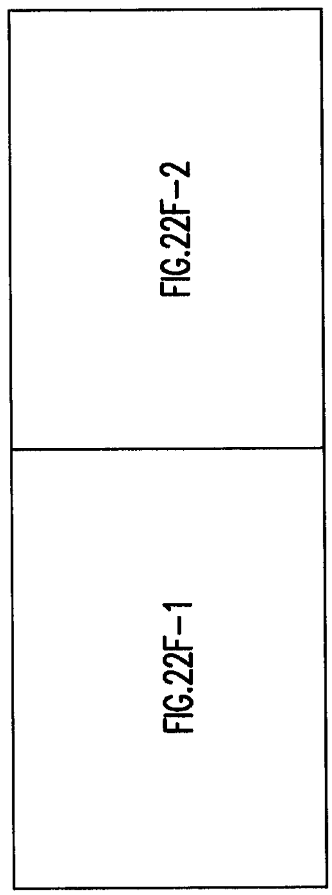
Figures 1, 22F:
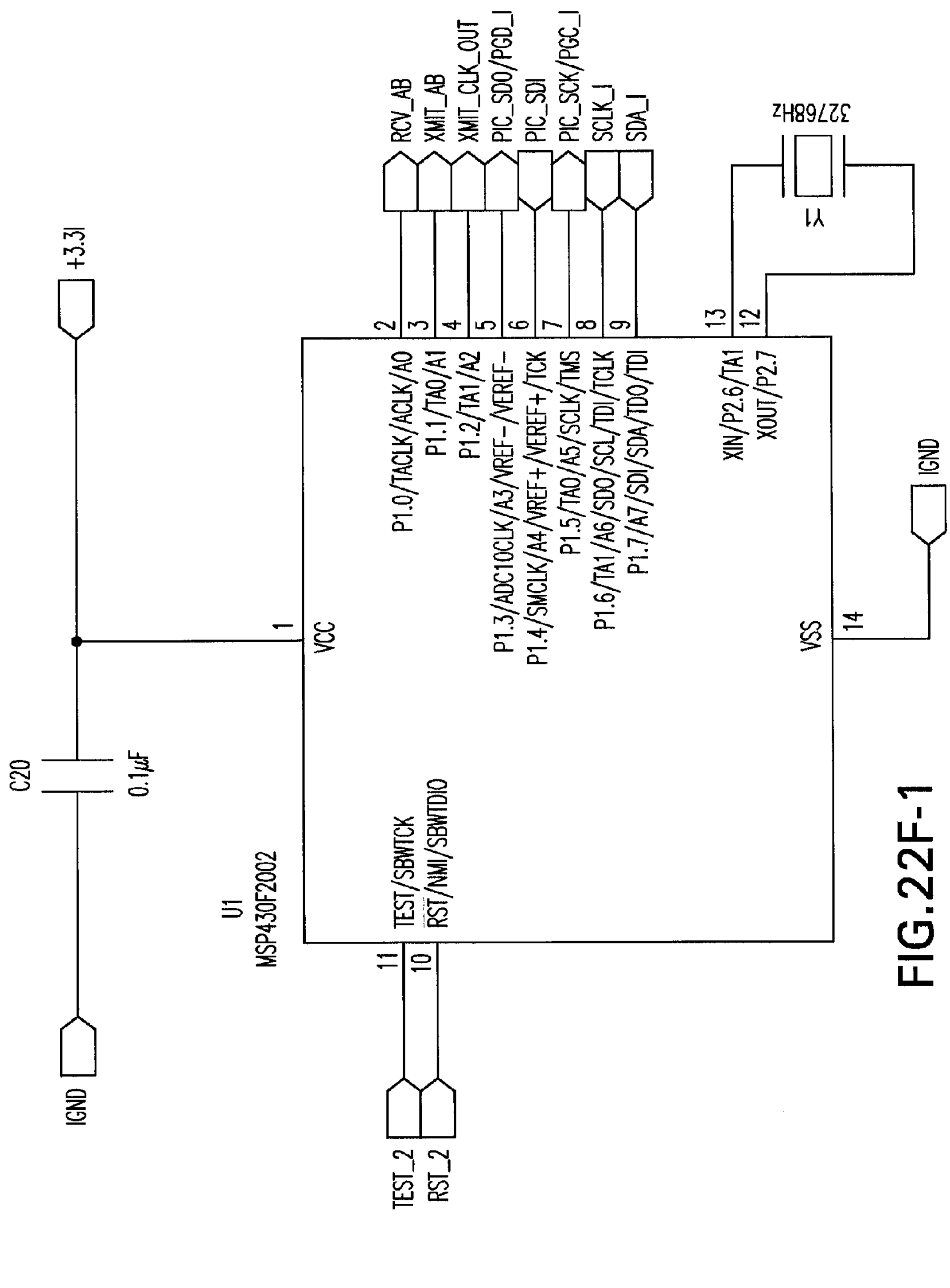
Figures 2, 22F:
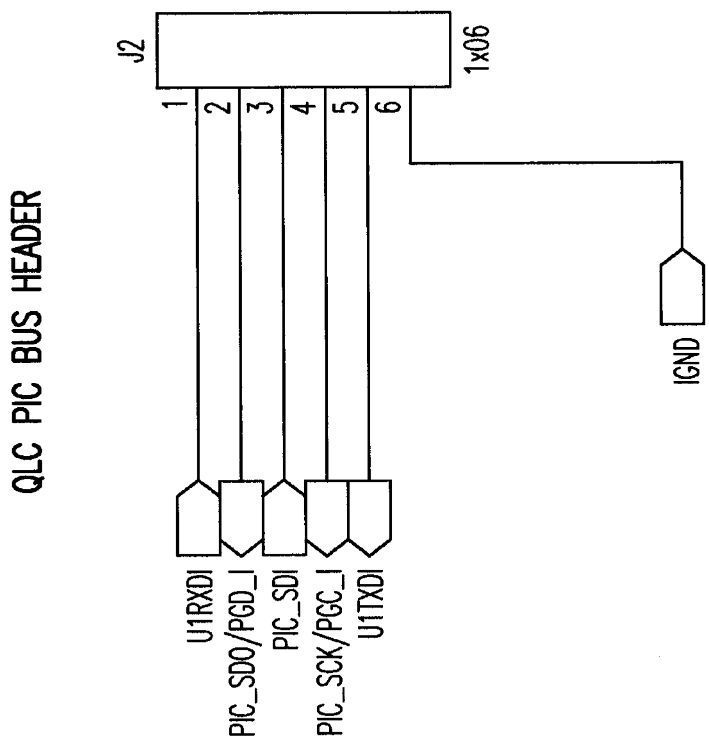
Figure 22G:
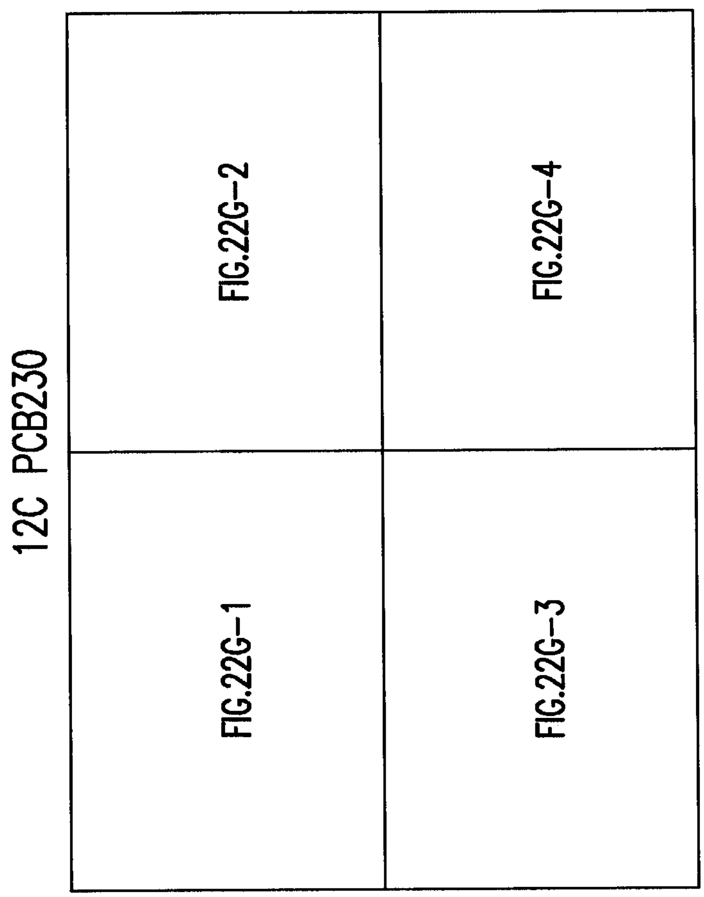
Figures 1, 22G:
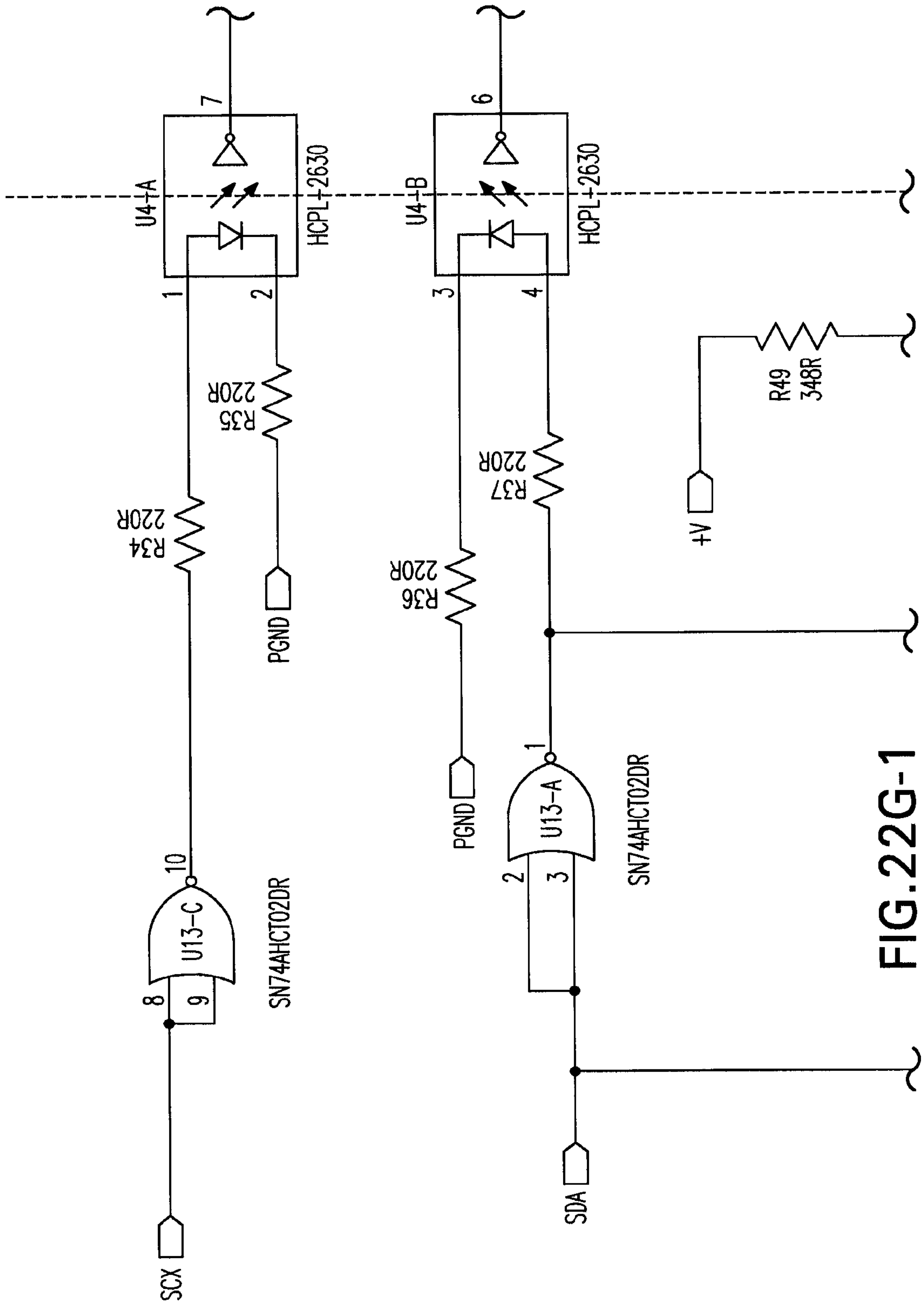
Figures 2, 22G:
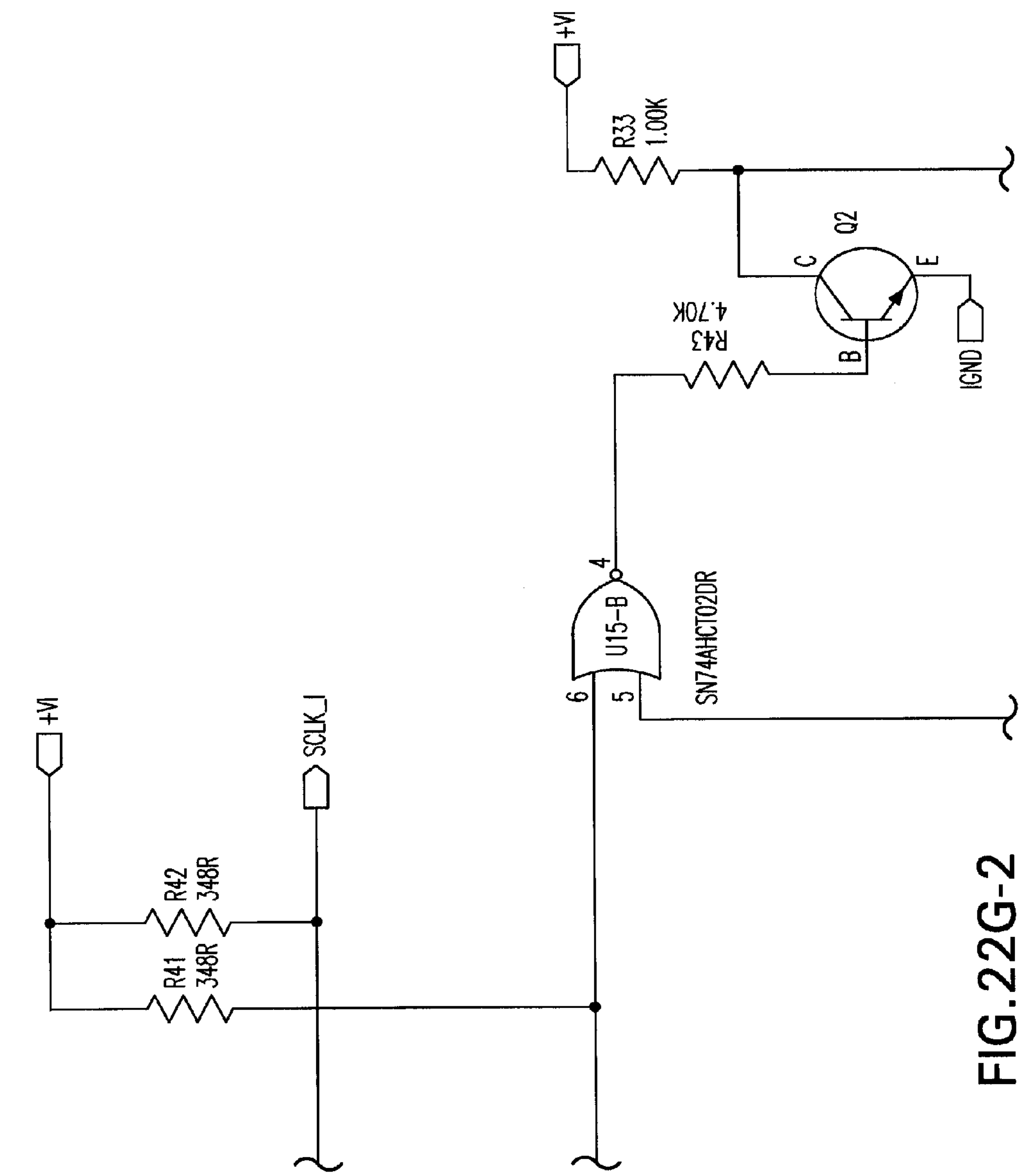
Figures 3, 22G:
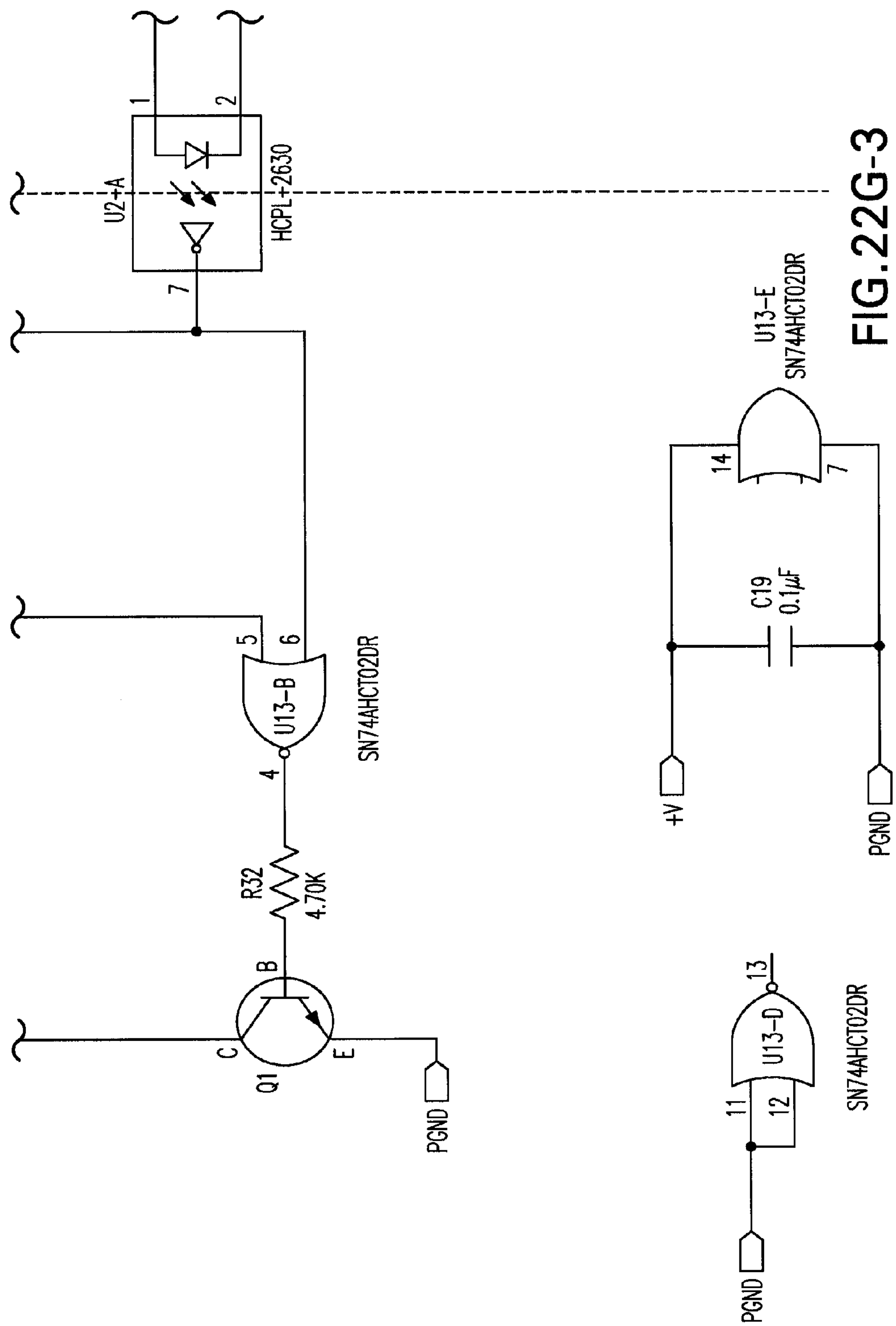
Figures 4, 22G:
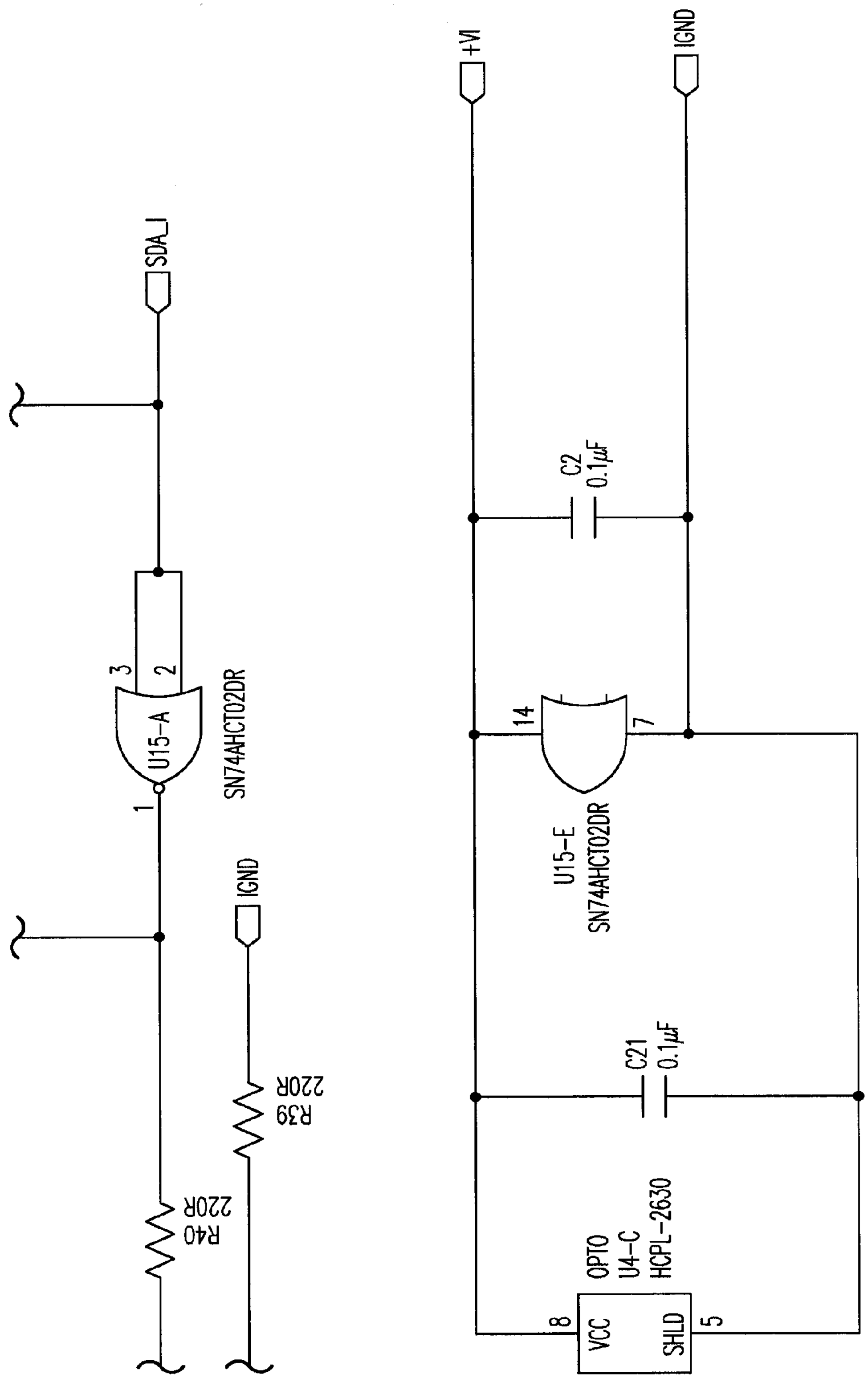
Figure 23A:
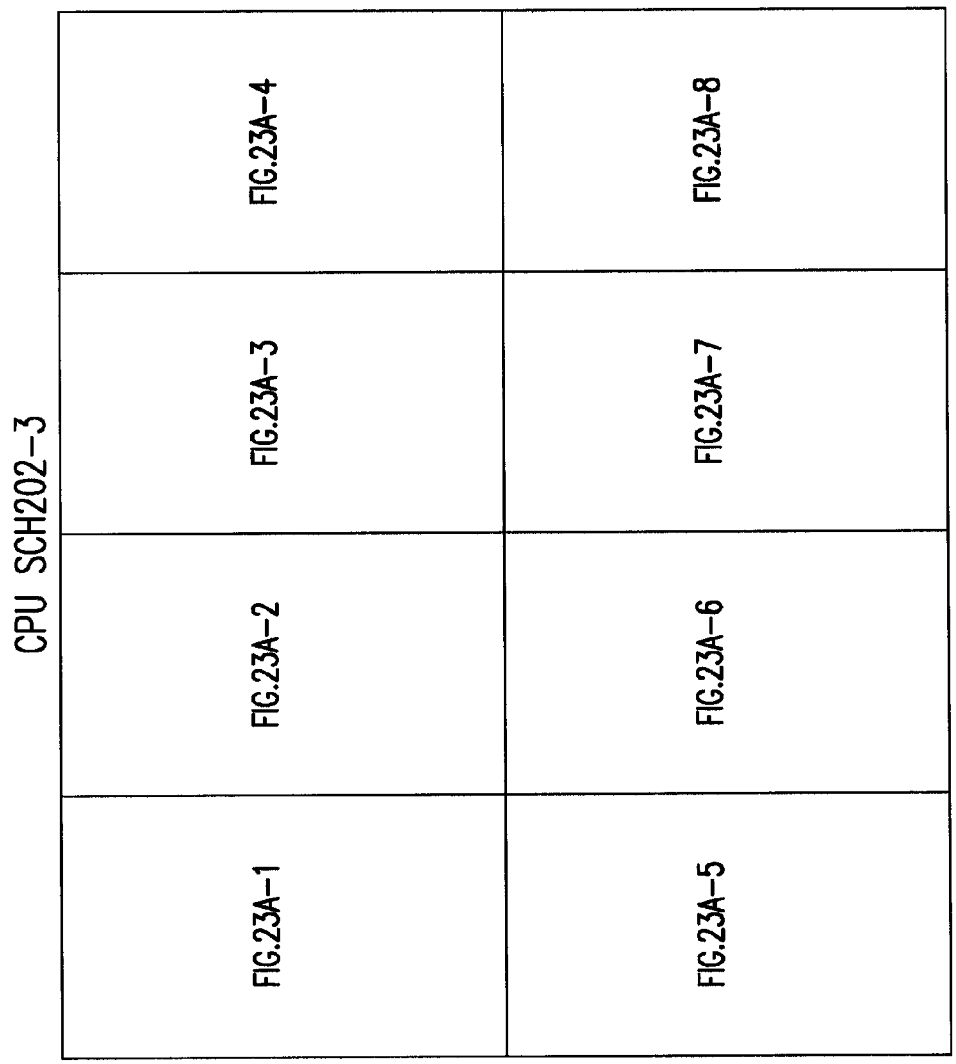
FIGS. 23A-R have preferred schematics for a CPU board (PCB 202).
Figures 1, 23A:
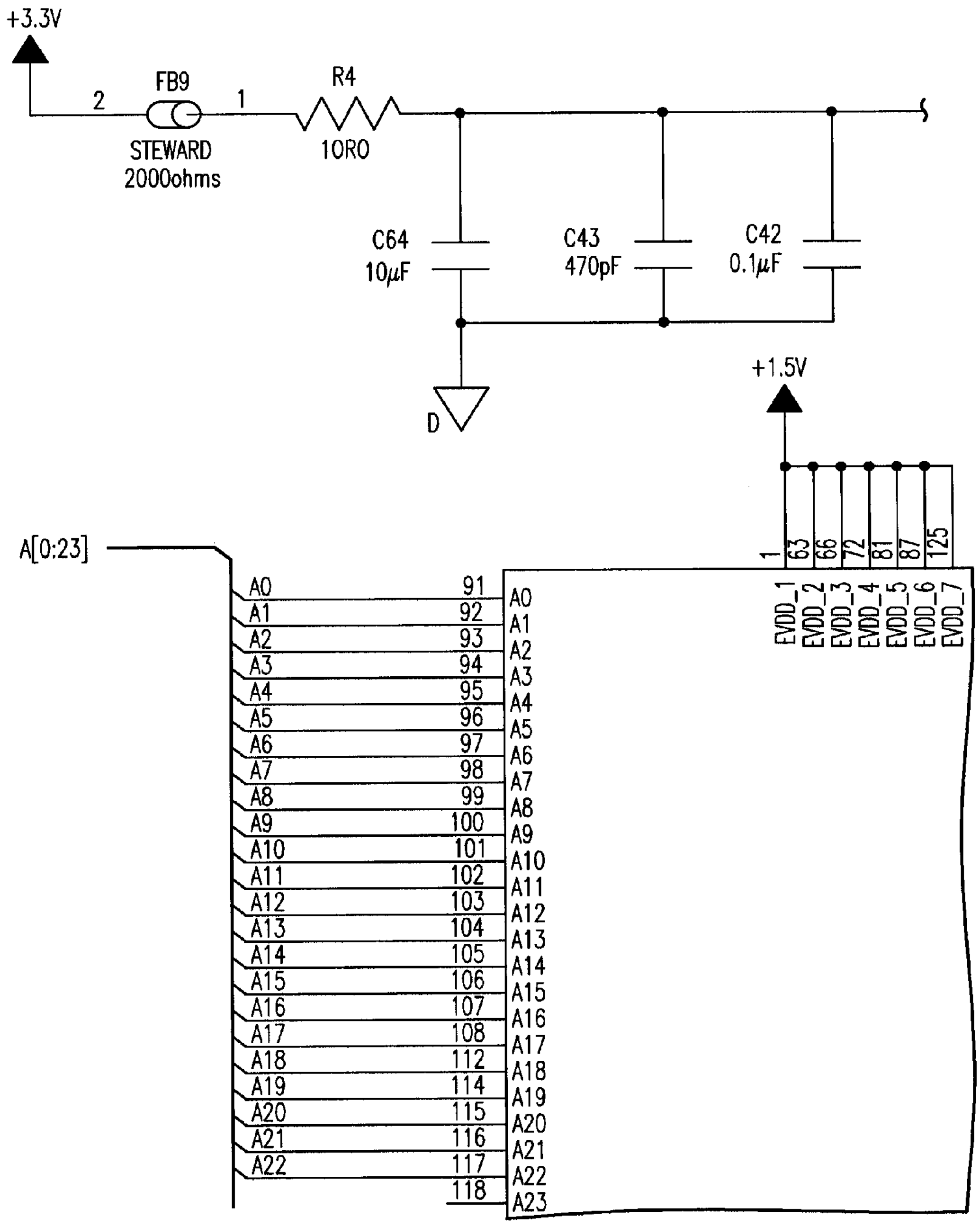
Figures 2, 23A:
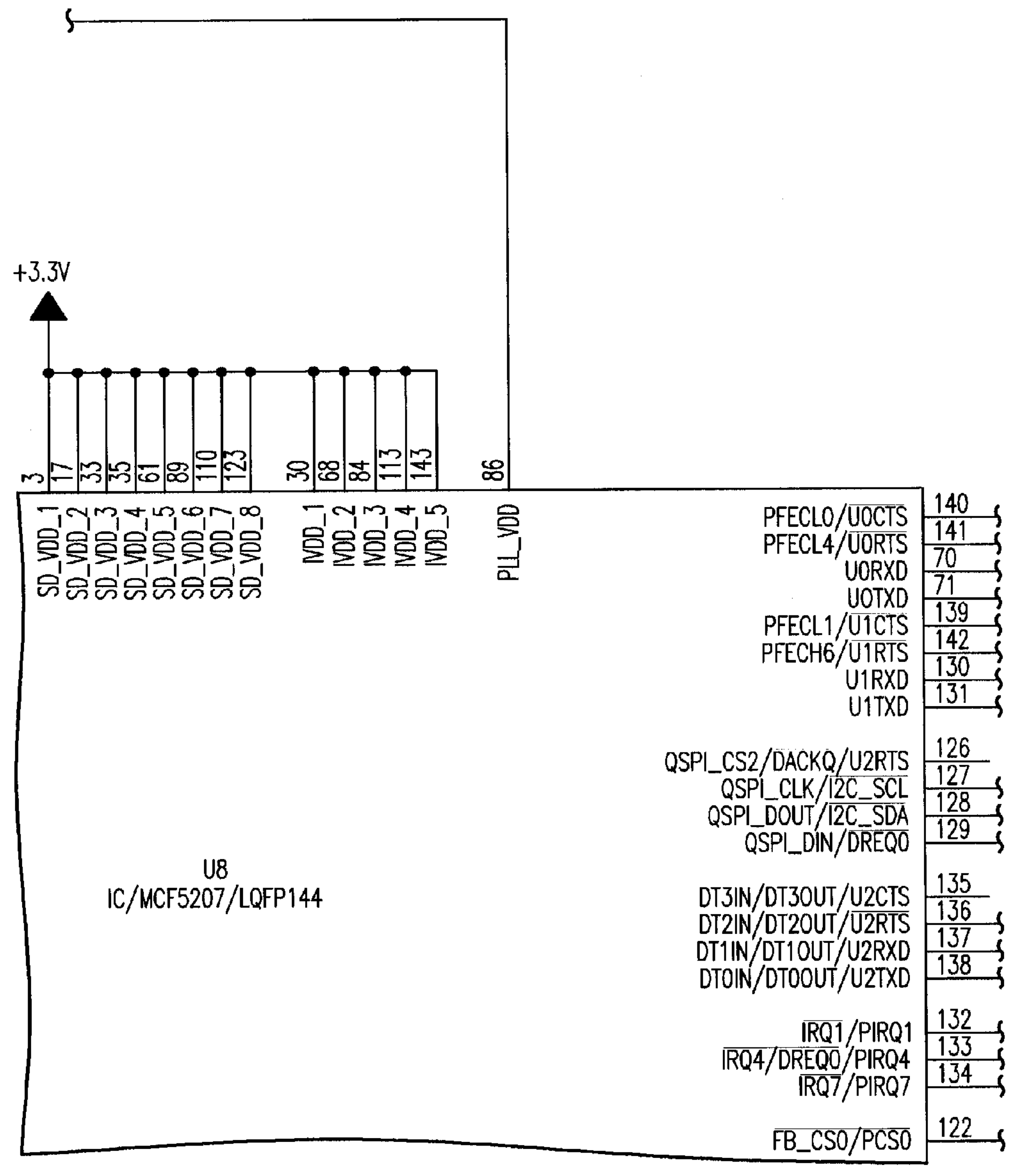
Figures 3, 23A:
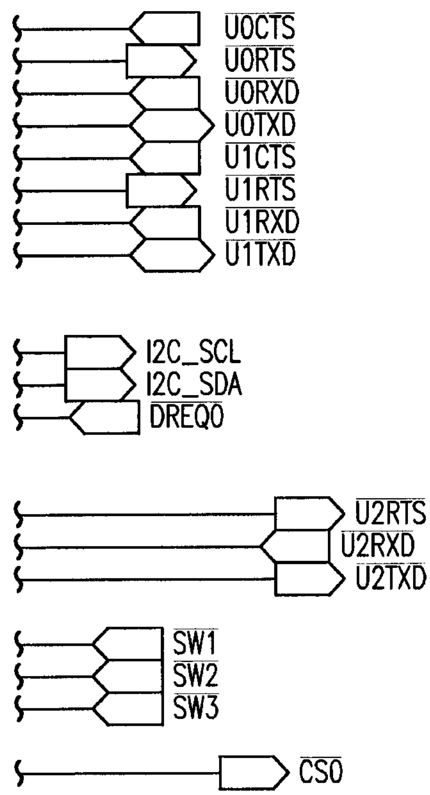
Figures 4, 23A:
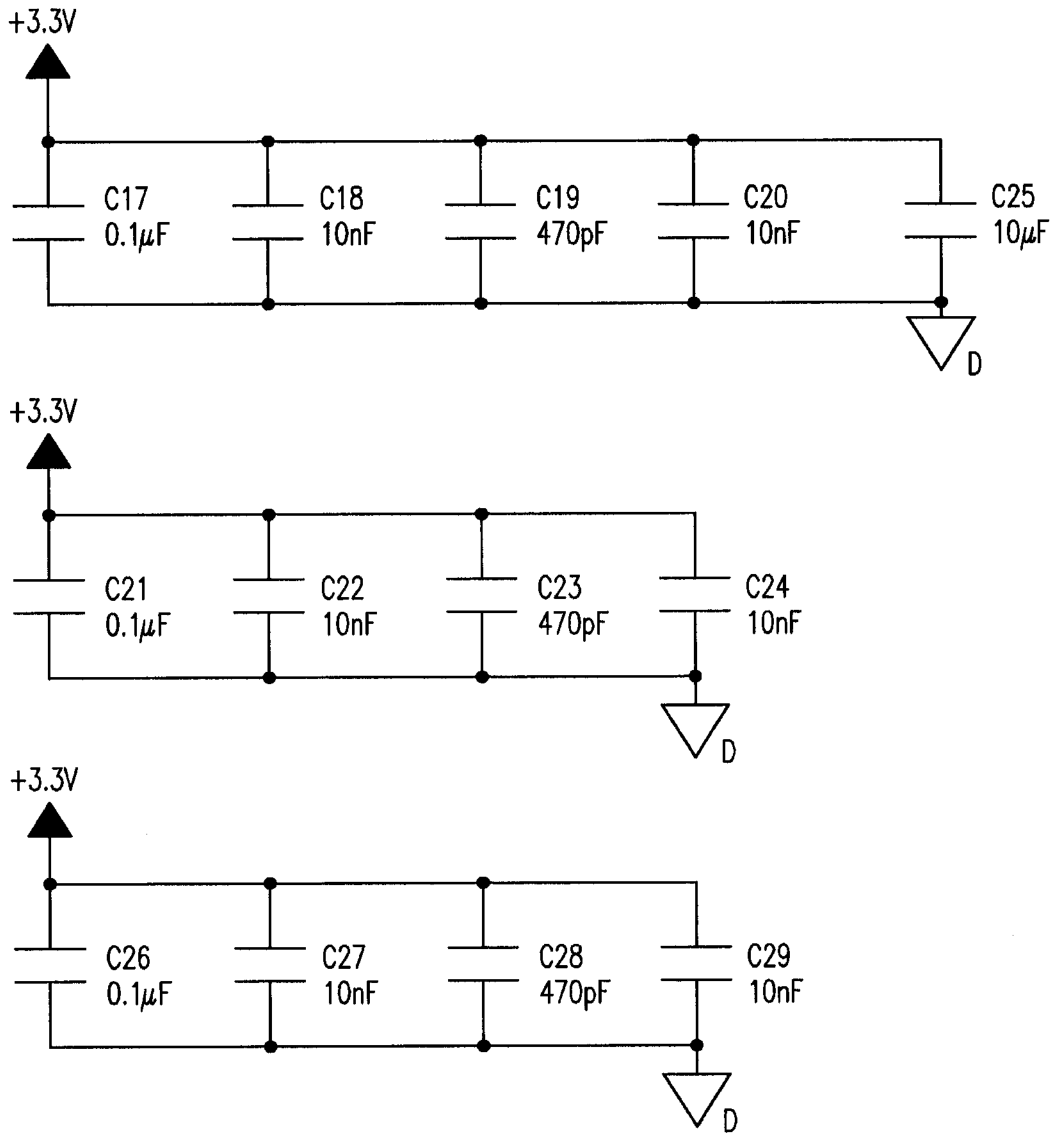
Figures 5, 23A:
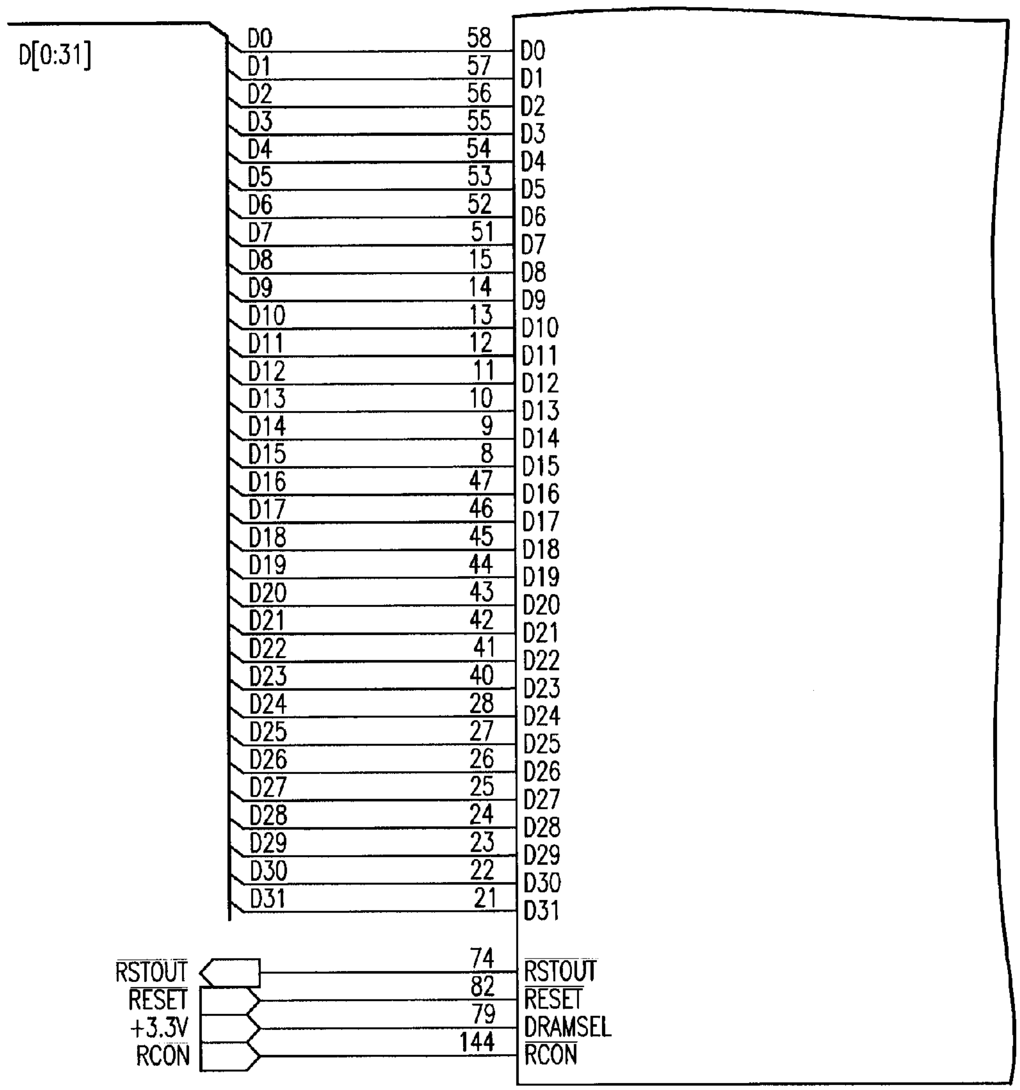
Figures 6, 23A:
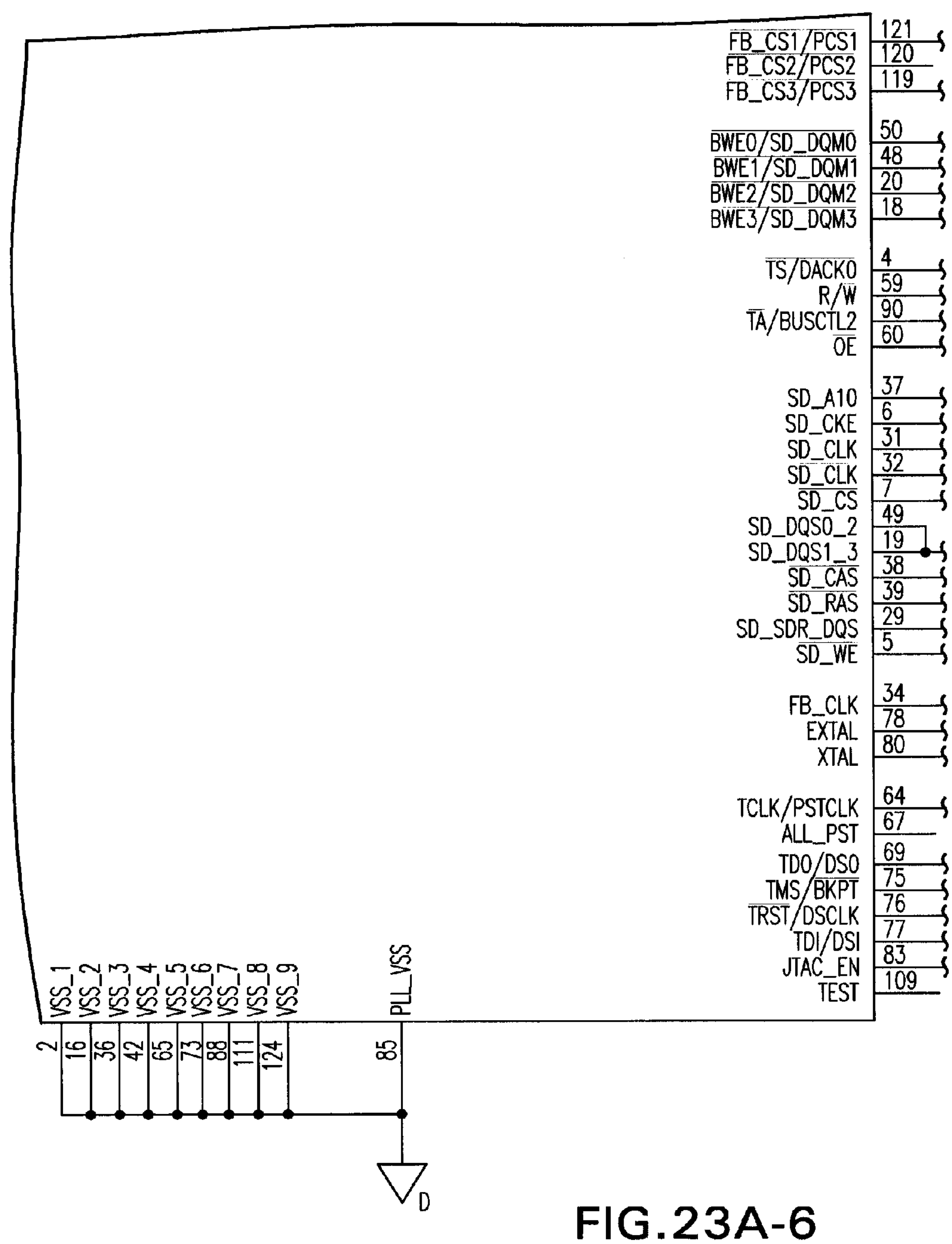
Figures 7, 23A:
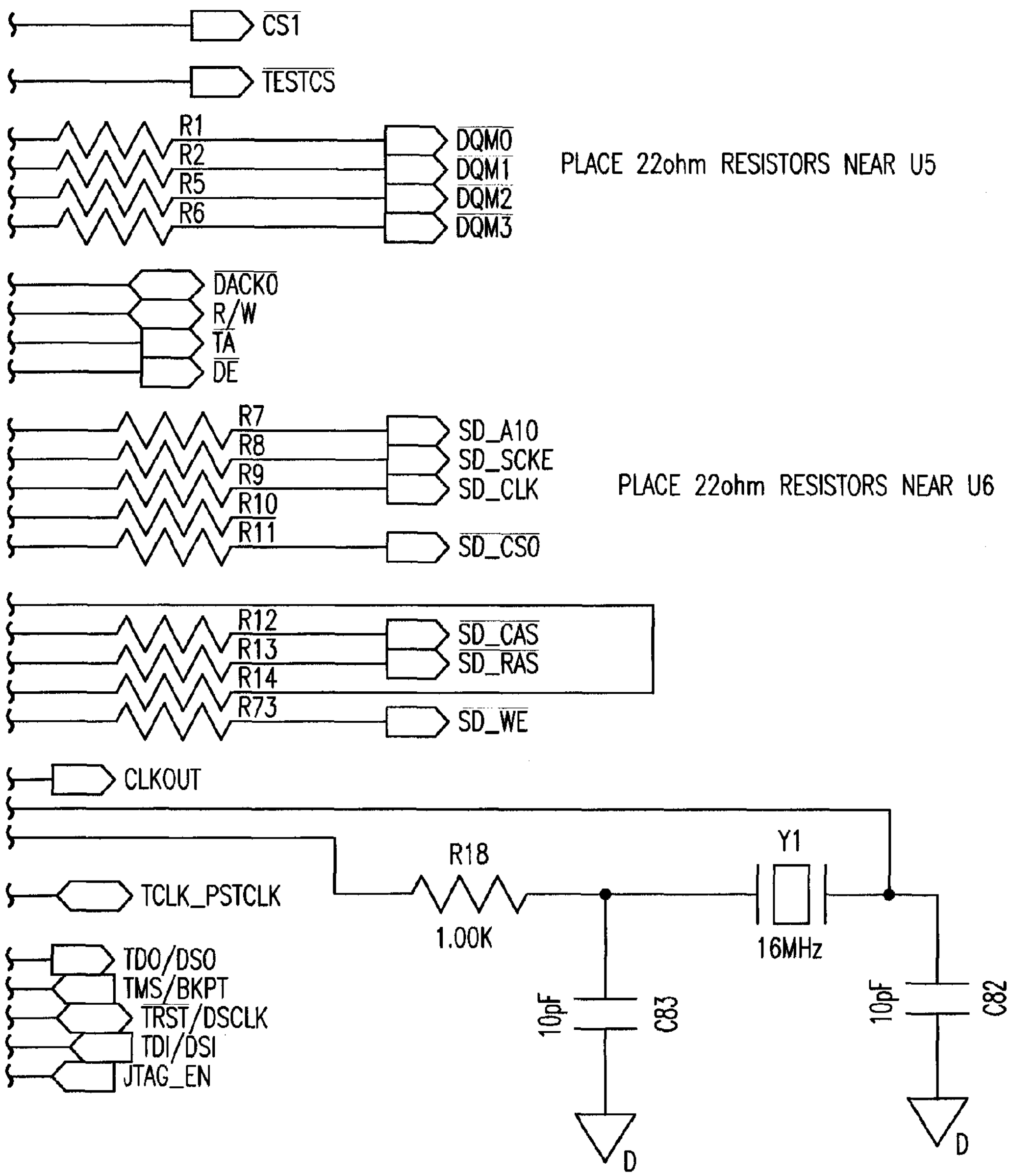
Figures 8, 23A:
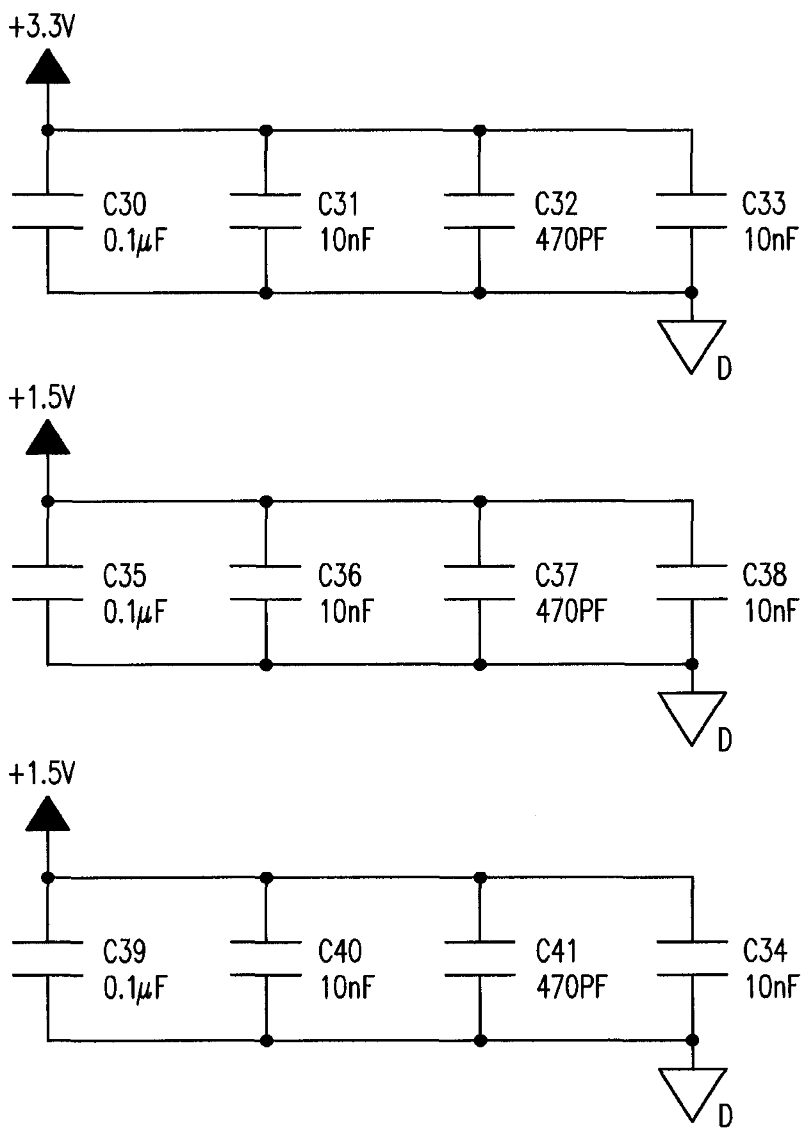
Figure 23B:
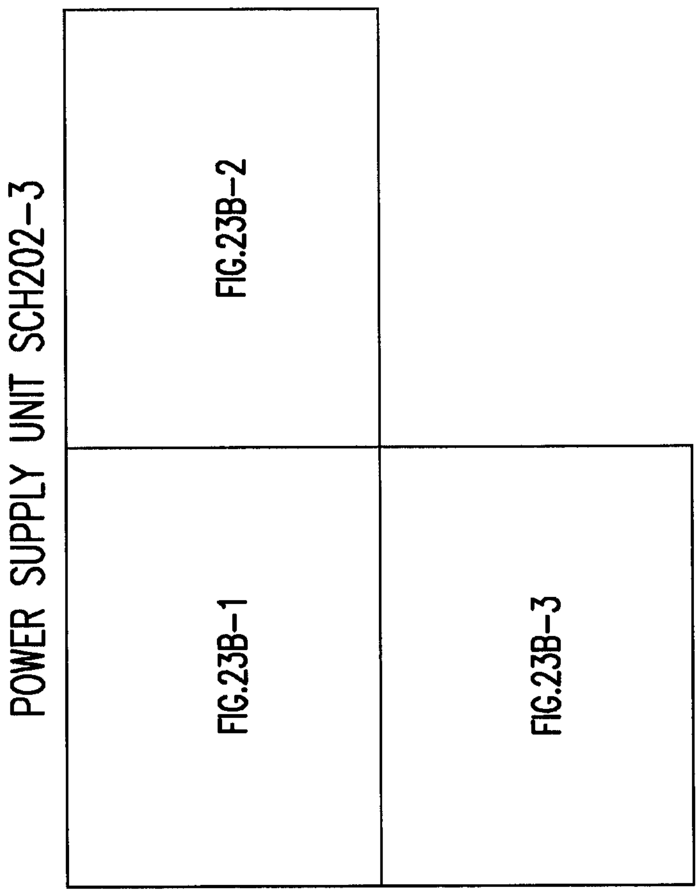
Figures 1, 23B:
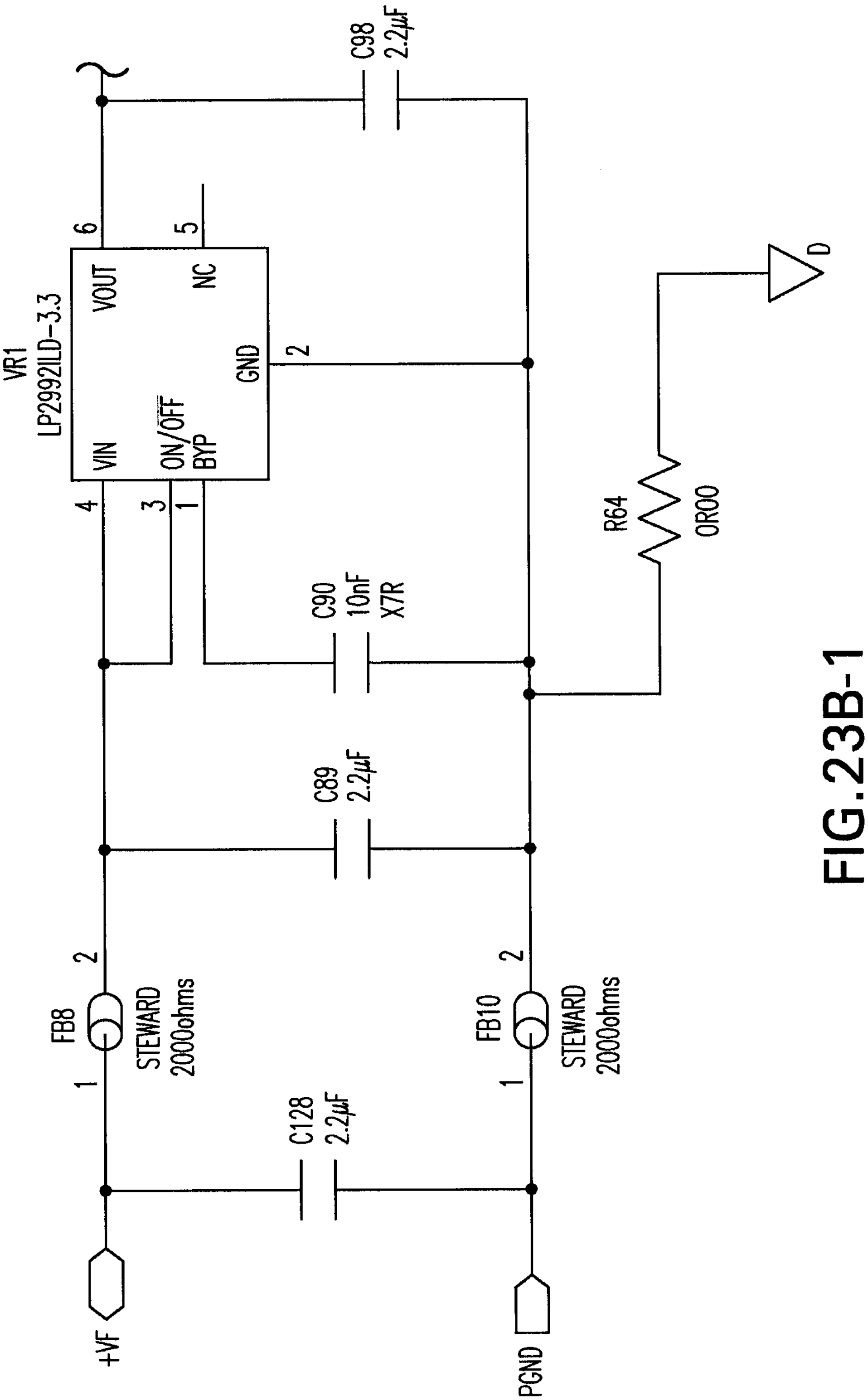
Figures 2, 23B:
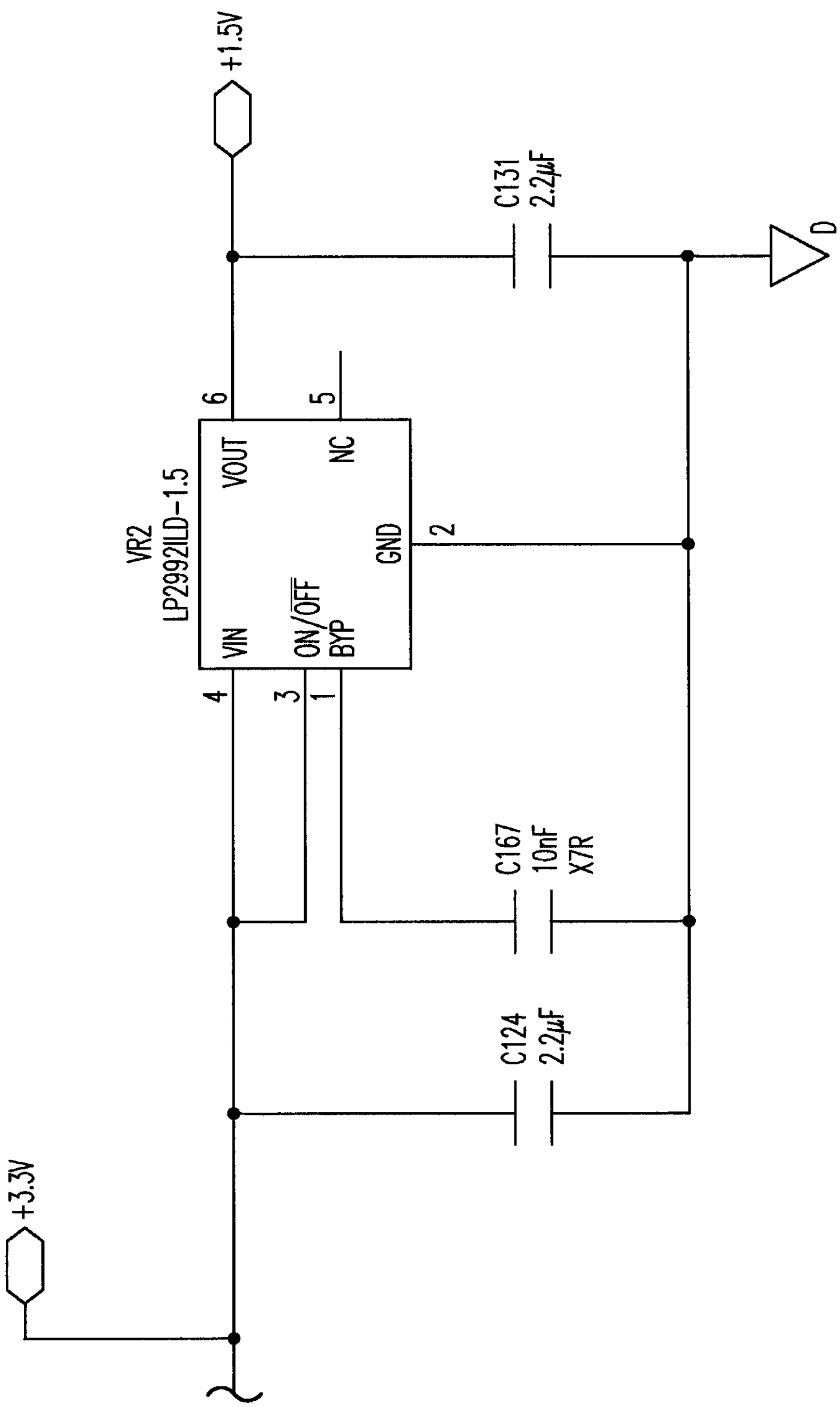
Figures 3, 23B:
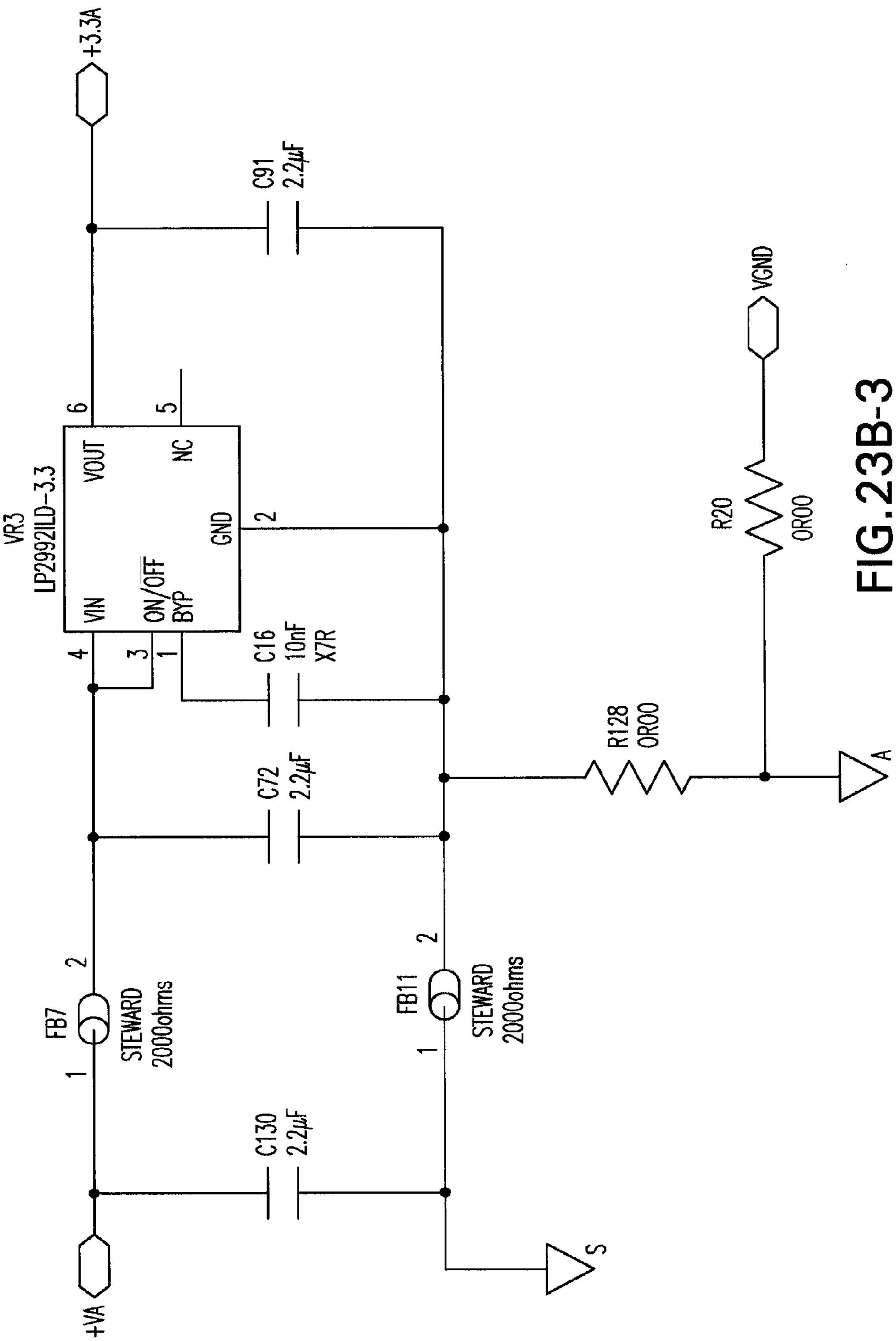
Figure 23C:
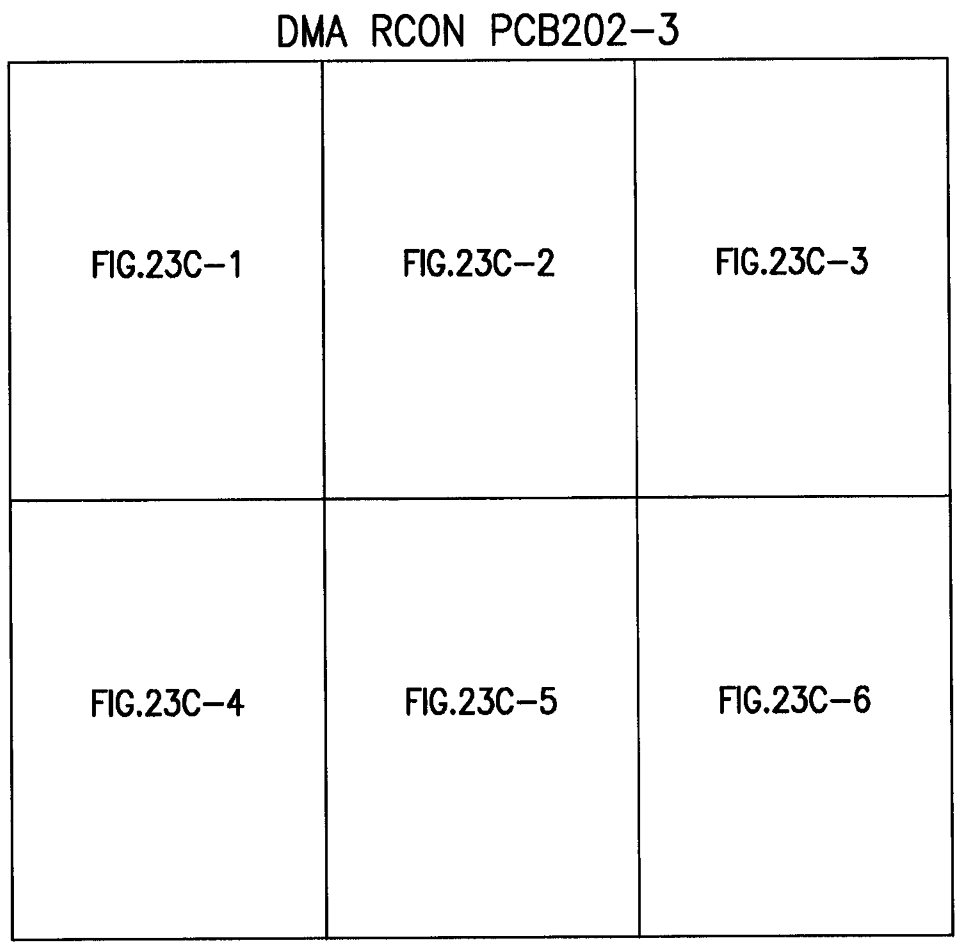
Figures 1, 23C:
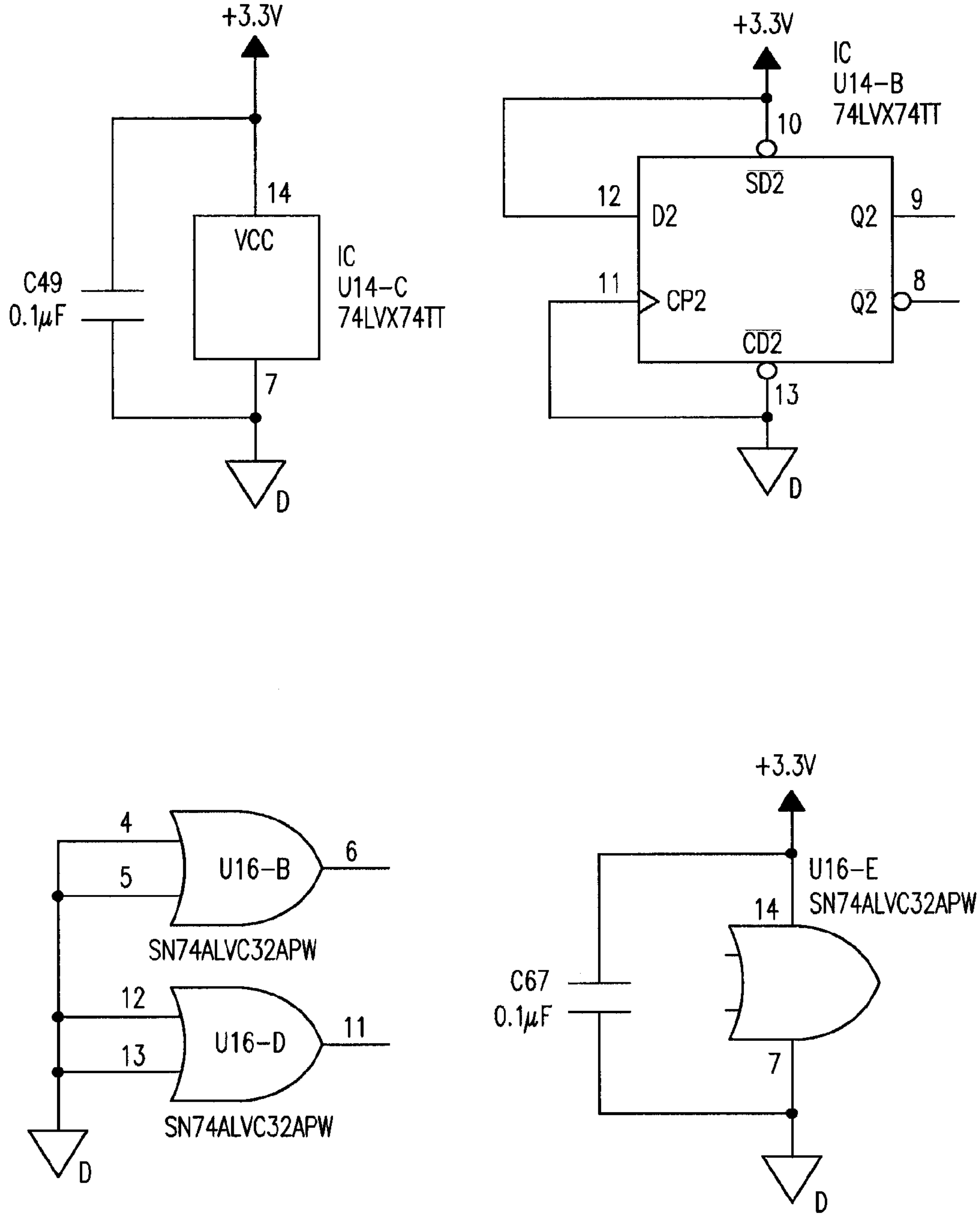
Figures 2, 23C:
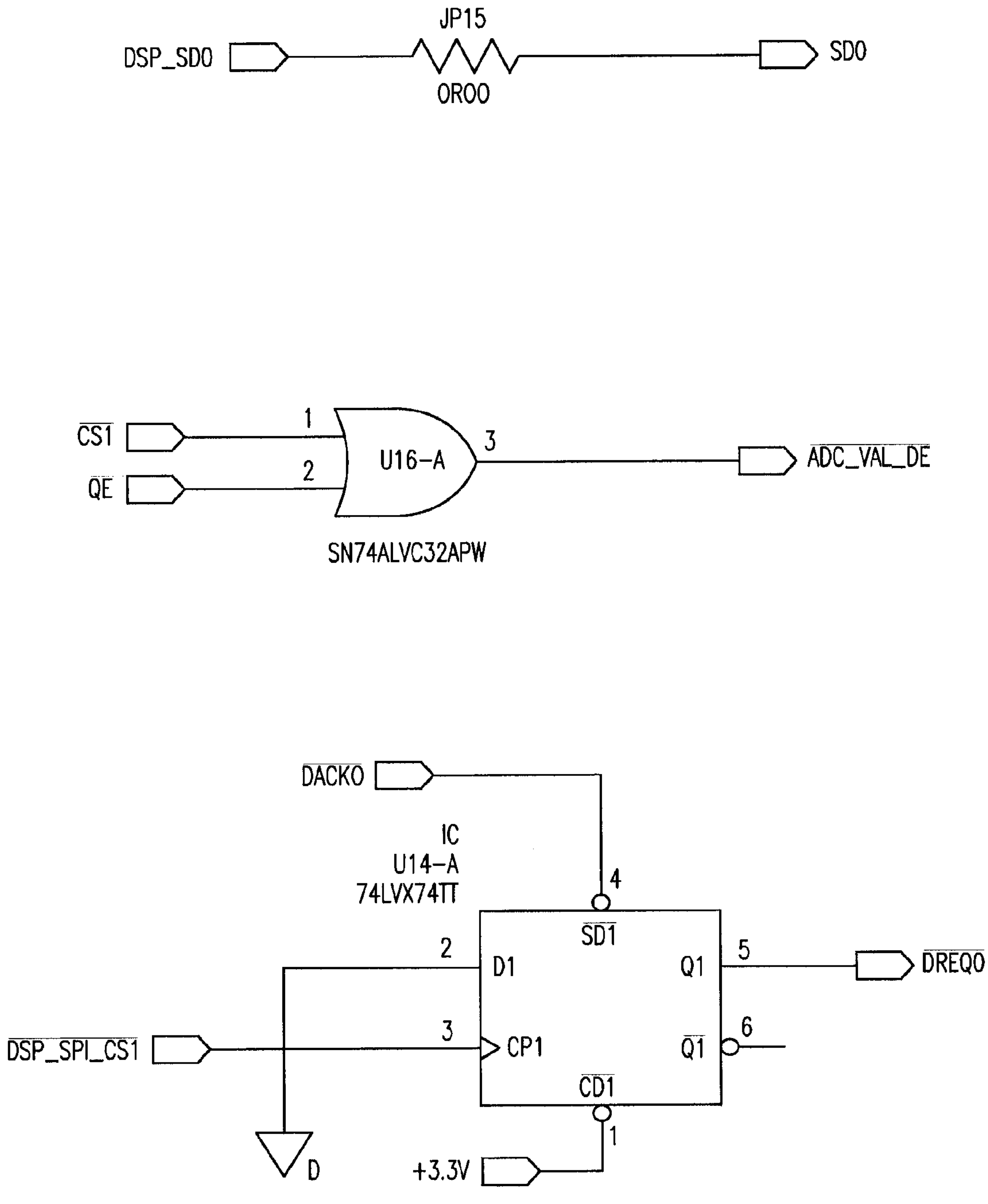
Figures 3, 23C:
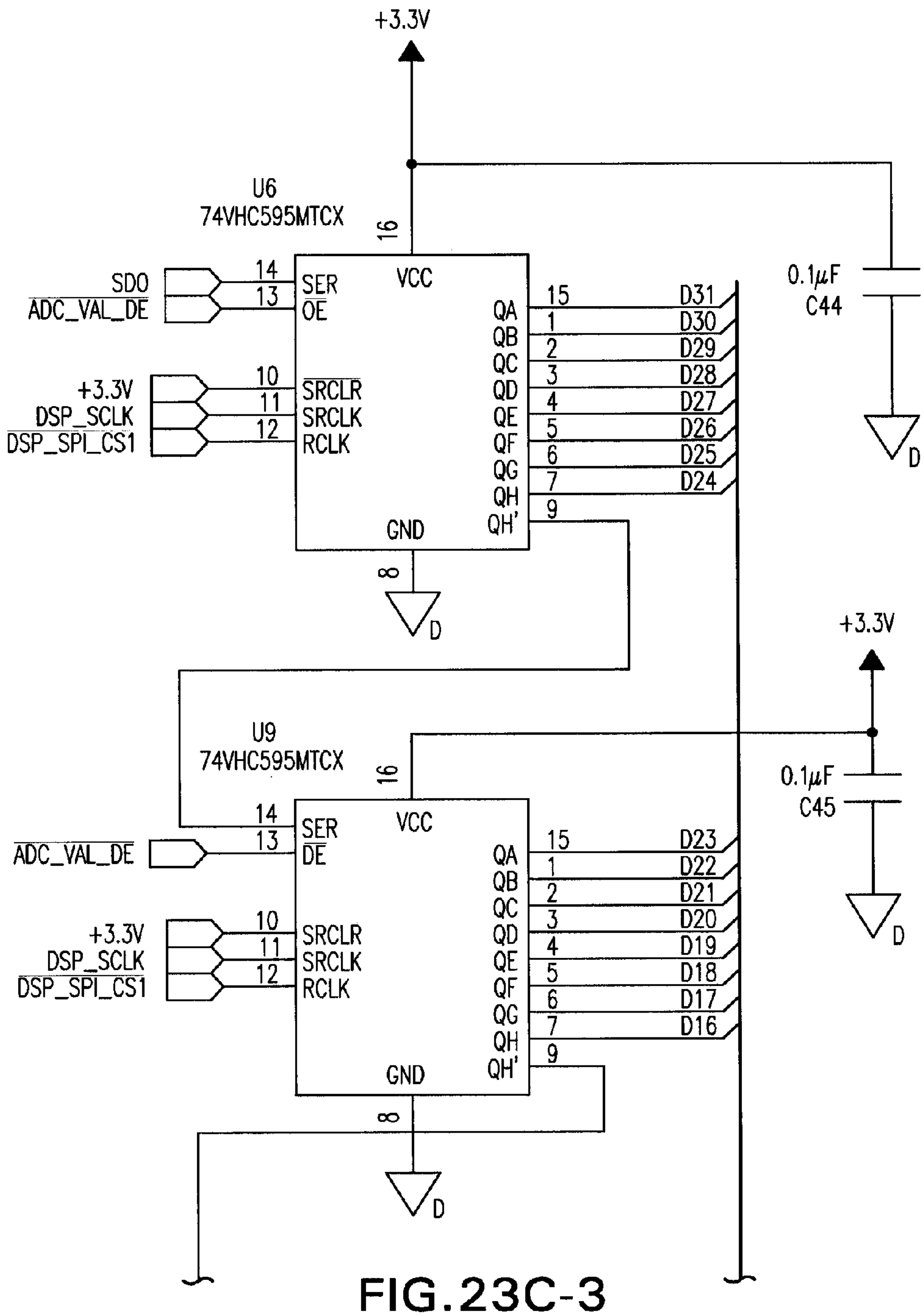
Figures 4, 23C:
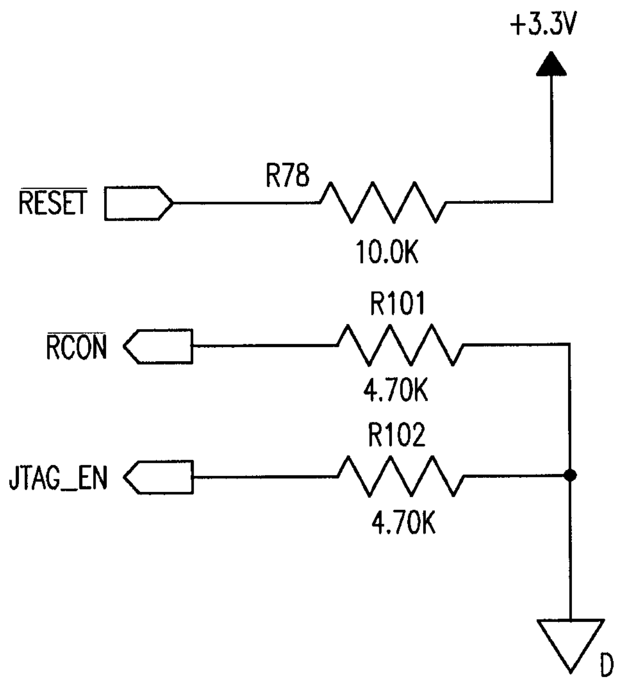
Figures 5, 23C:
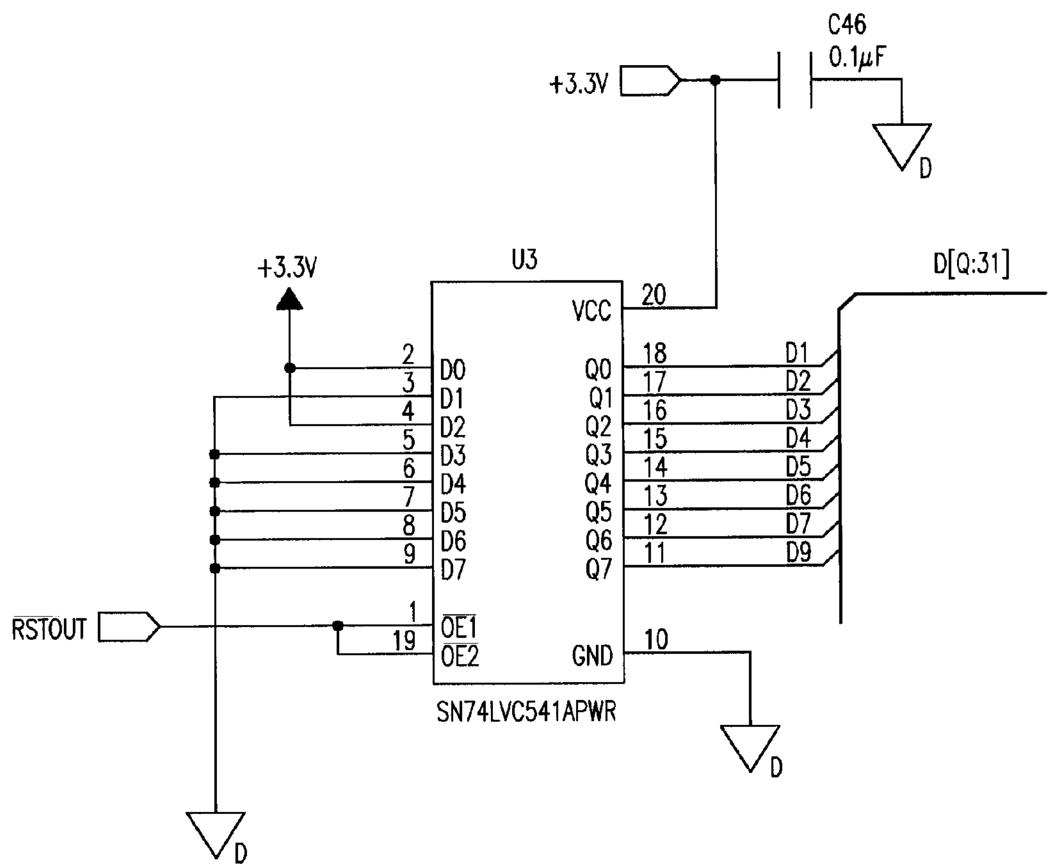
Figures 6, 23C:
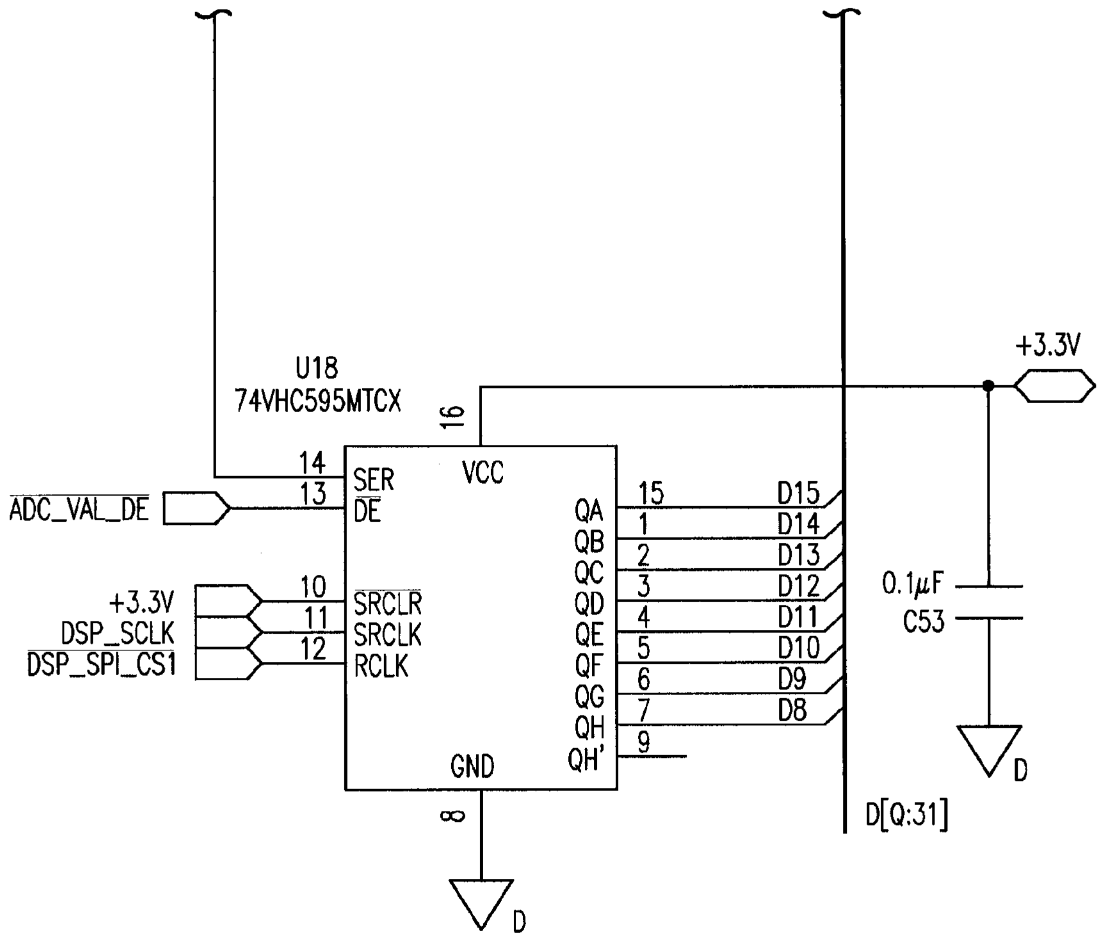
Figure 23D:
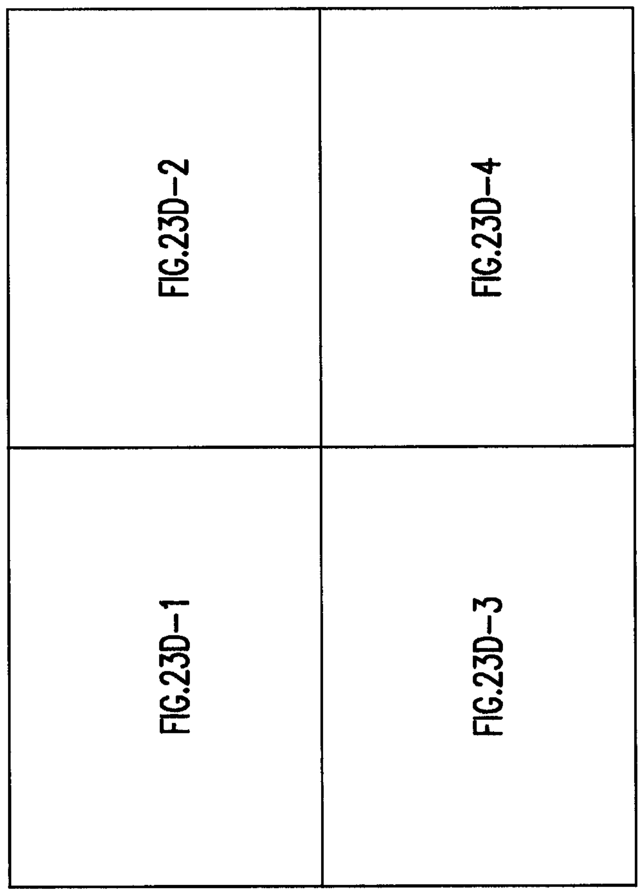
Figures 1, 23D:
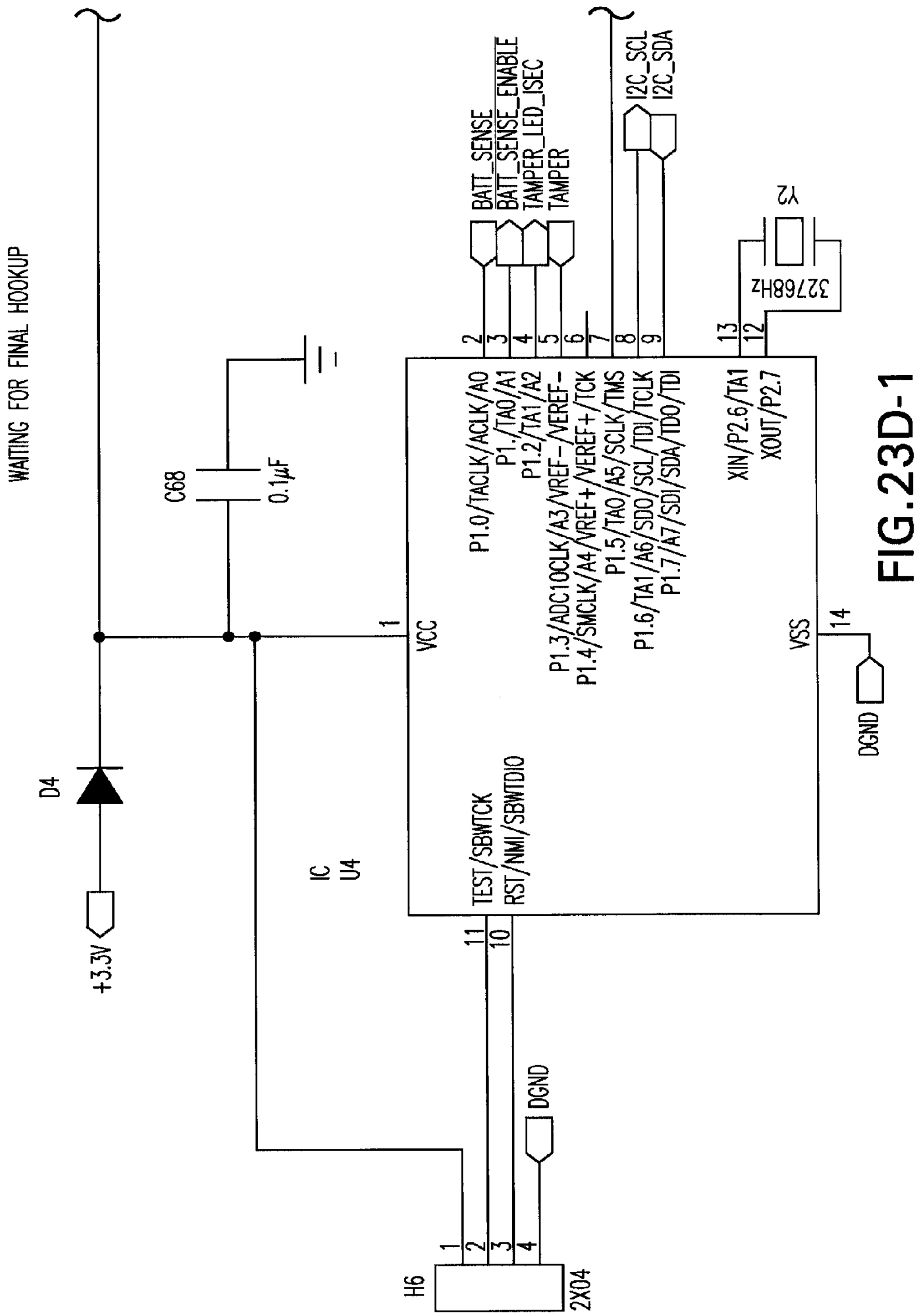
Figures 2, 23D:
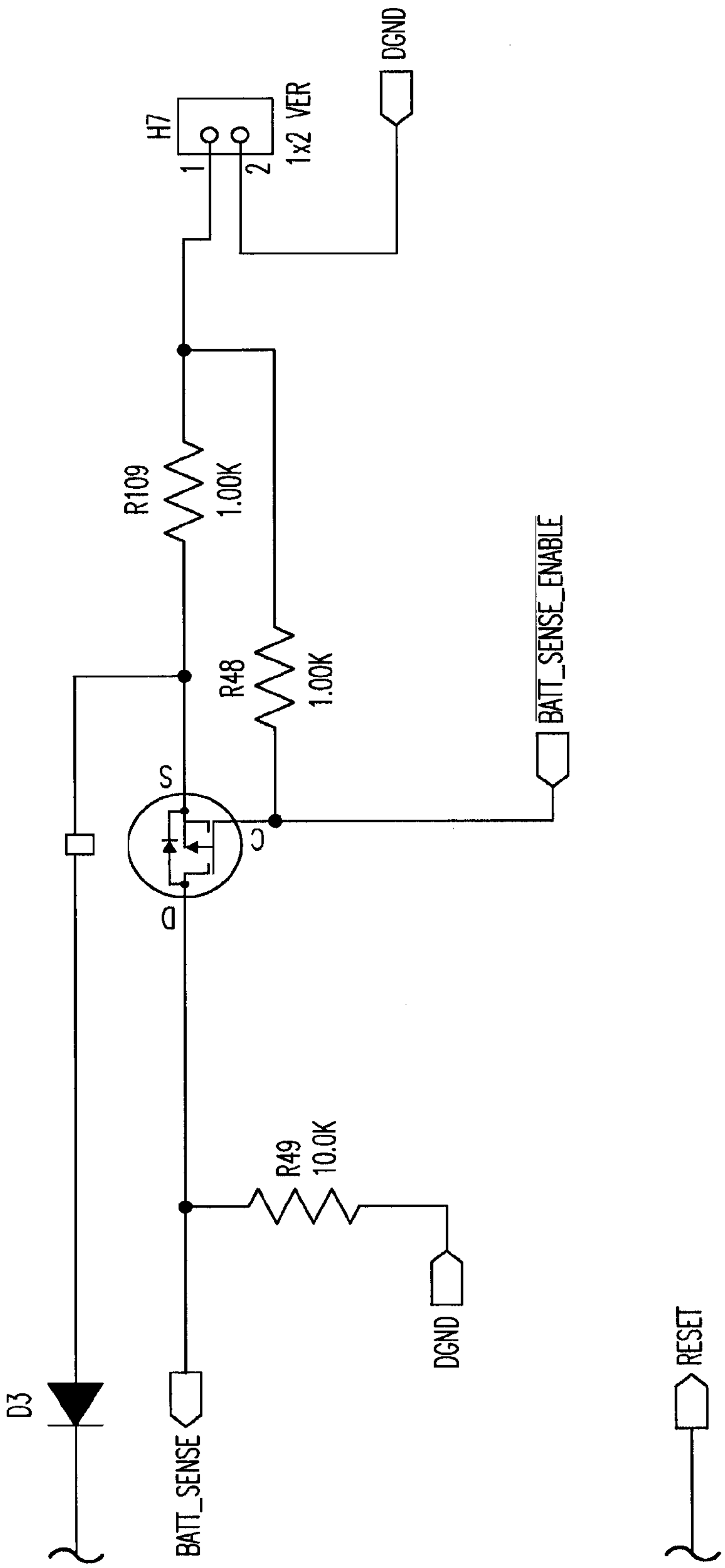
Figures 3, 23D:
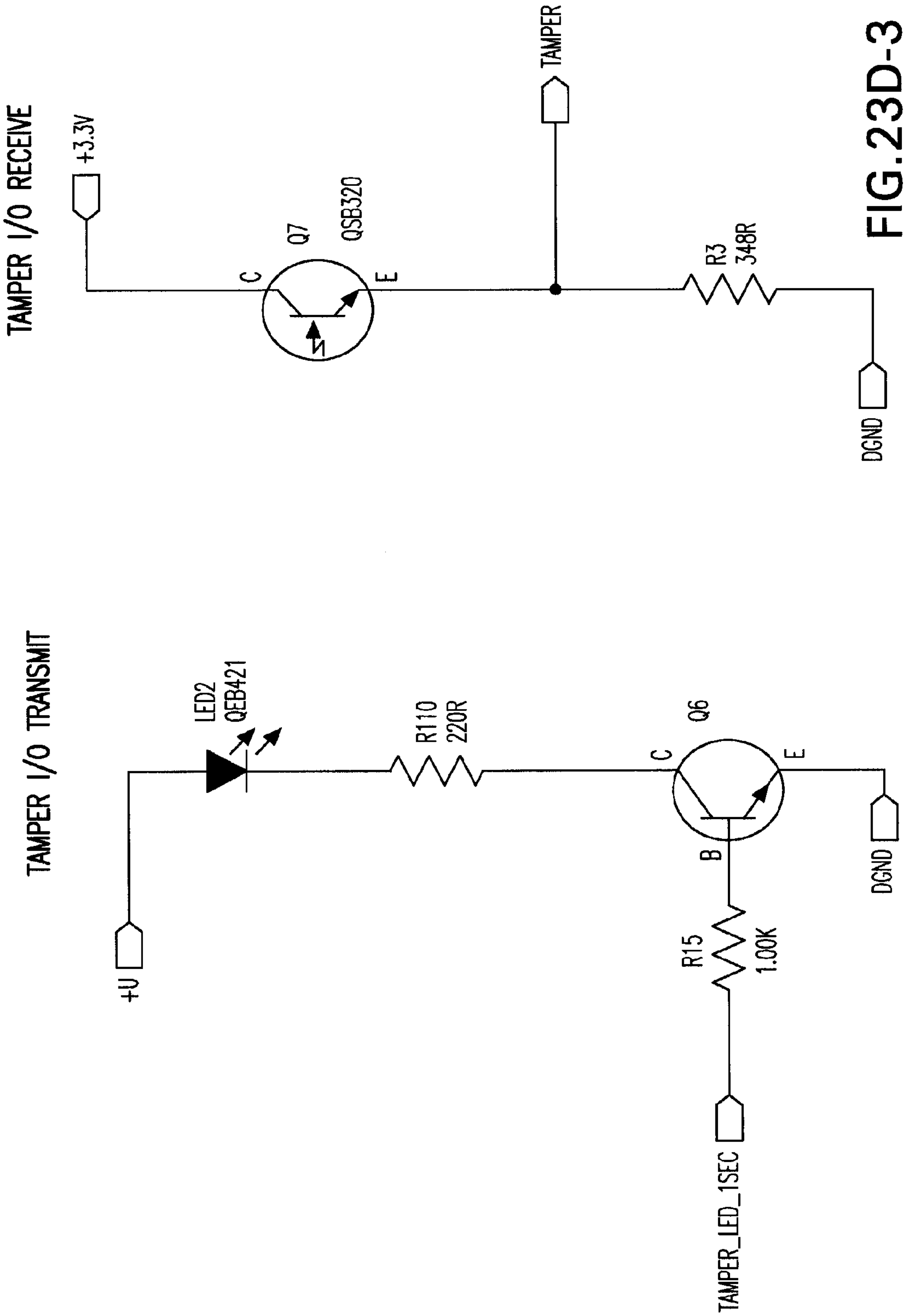
Figures 4, 23D:
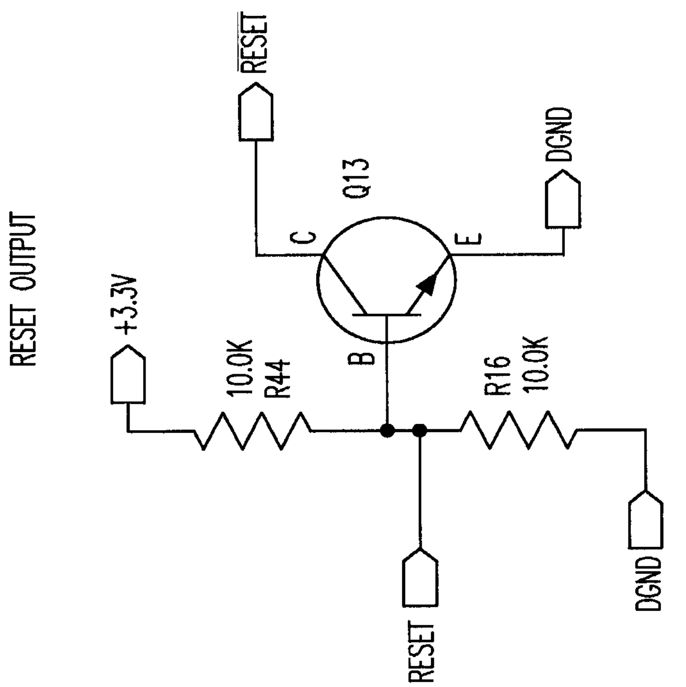
Figure 23E:
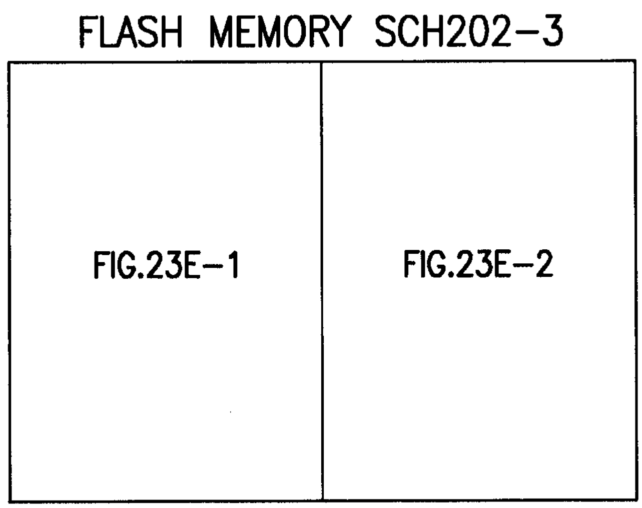
Figures 1, 23E:
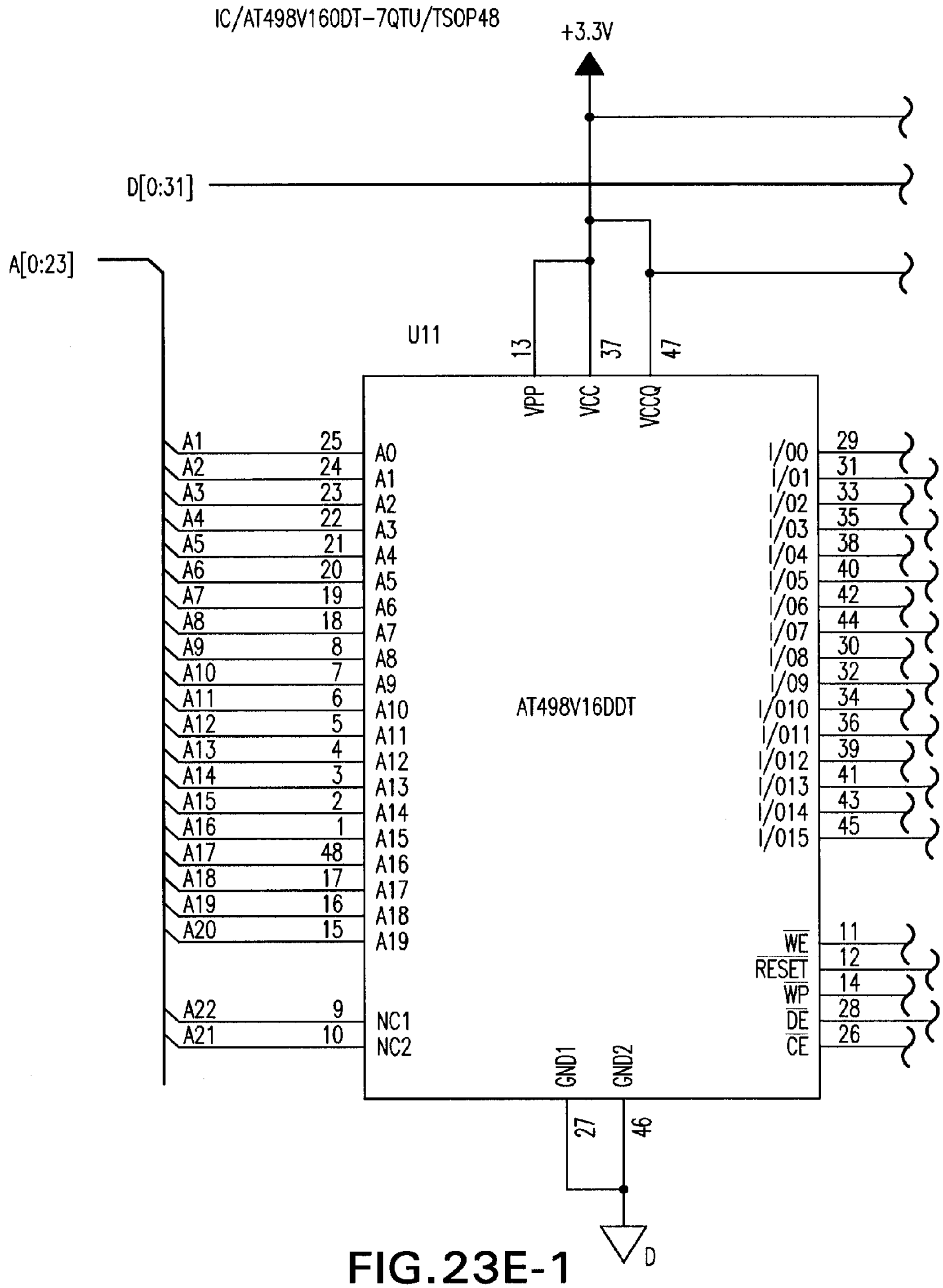
Figures 2, 23E:
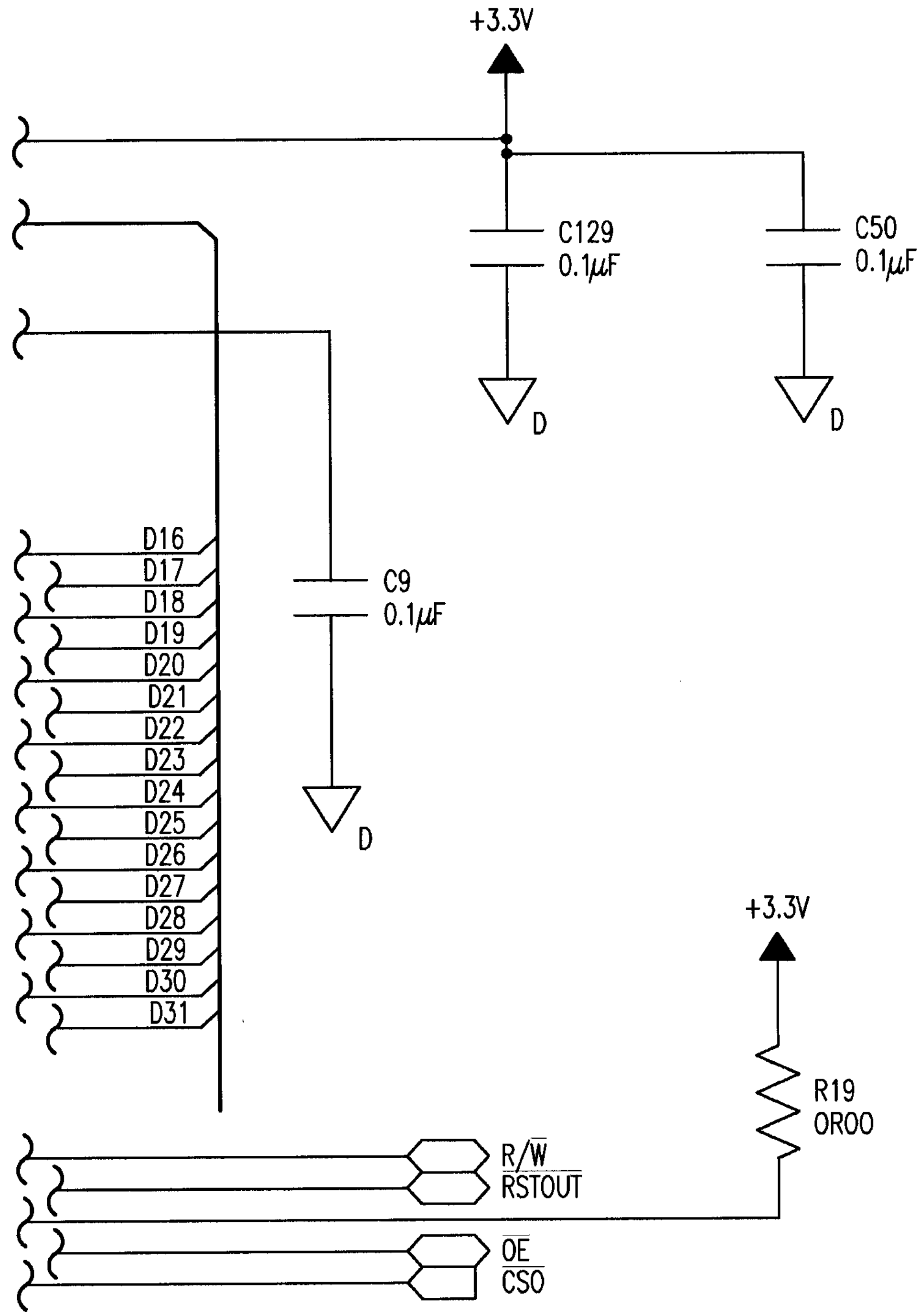
Figure 23F:
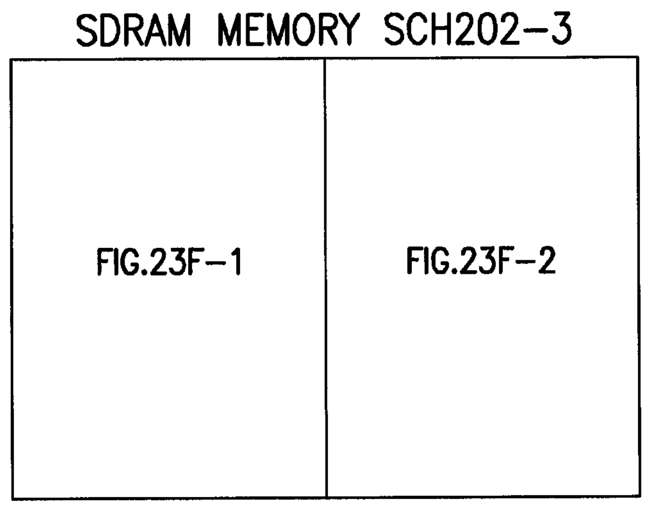
Figures 1, 23F:
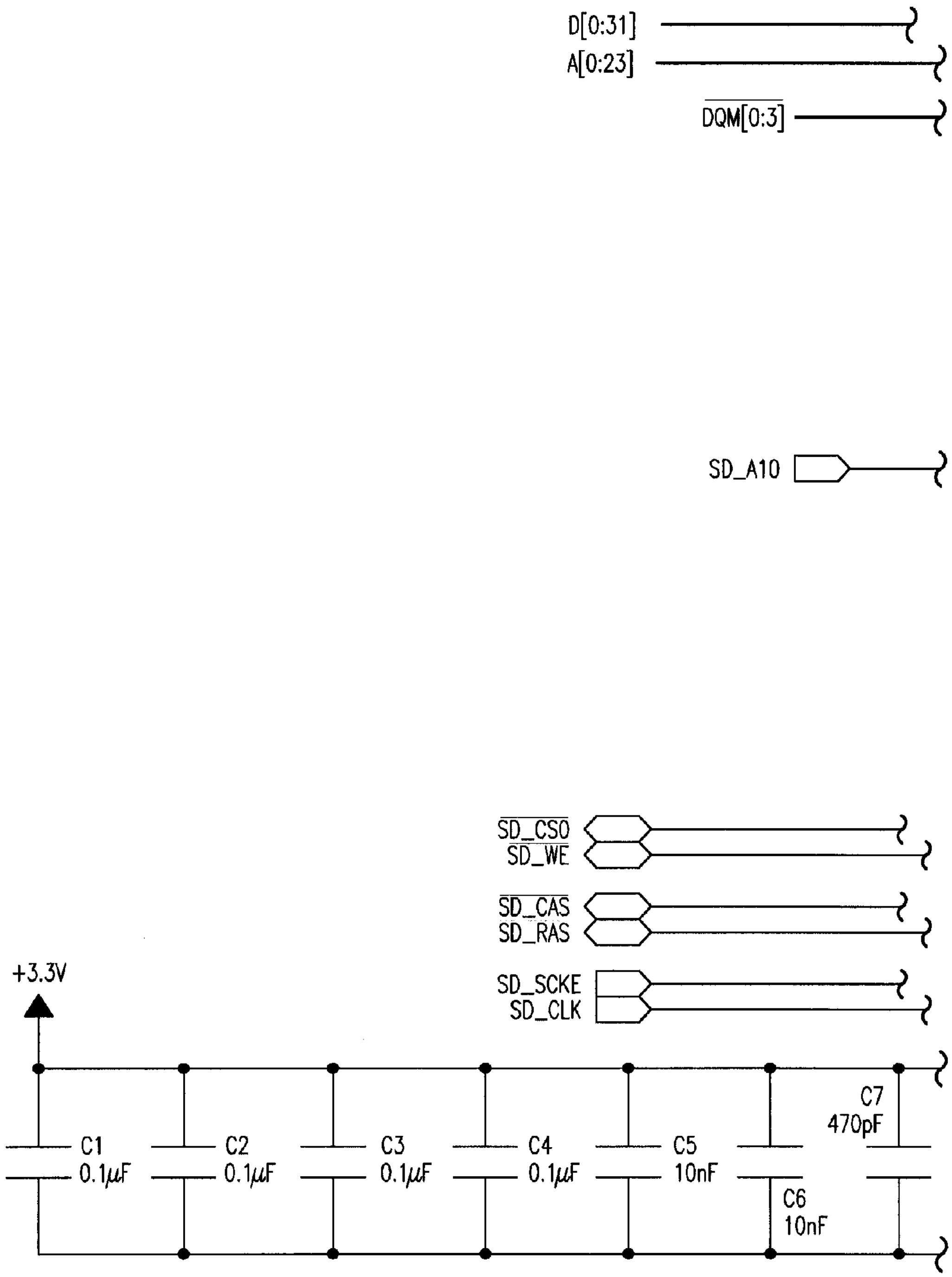
Figures 2, 23F:
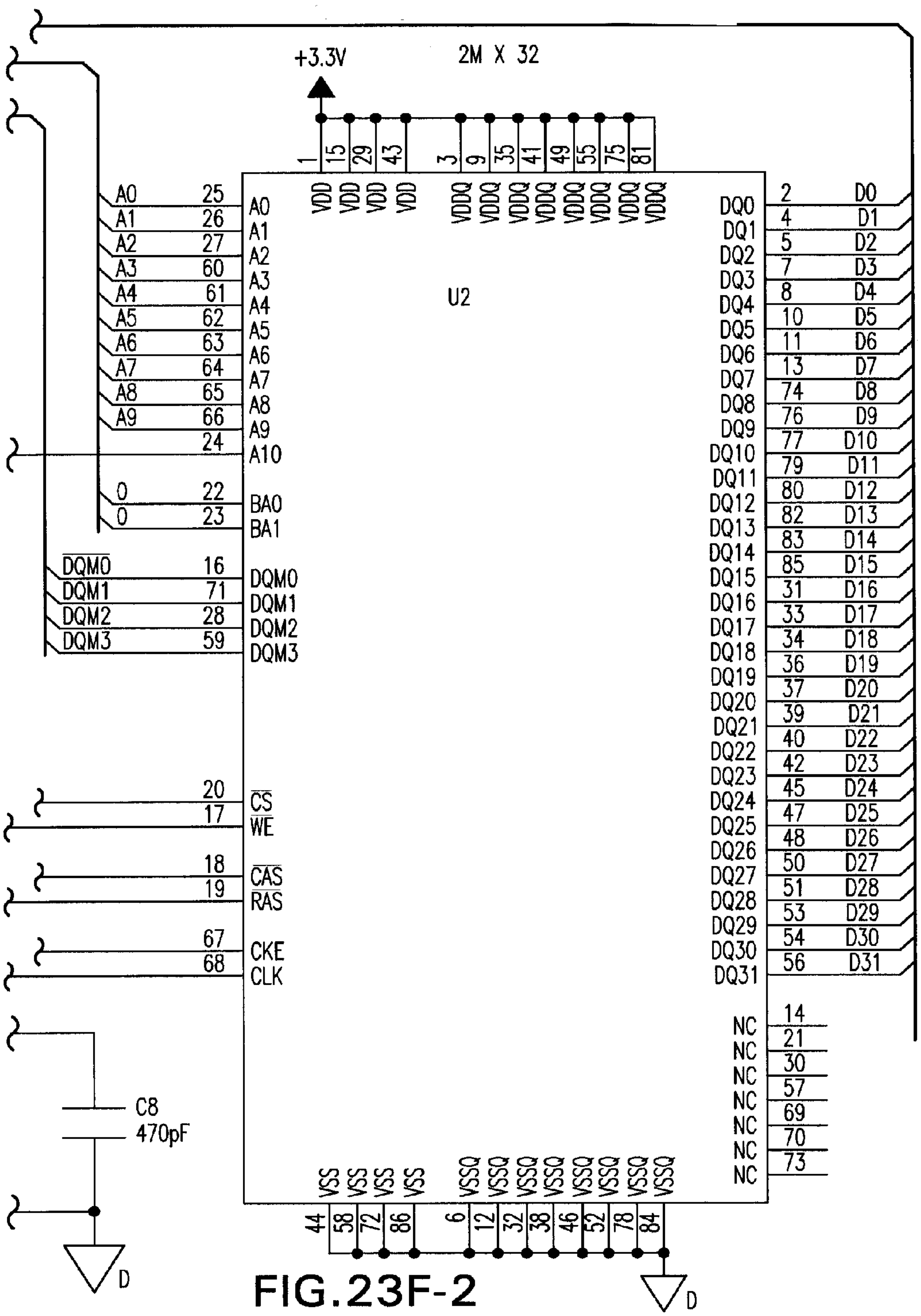
Figure 23G:
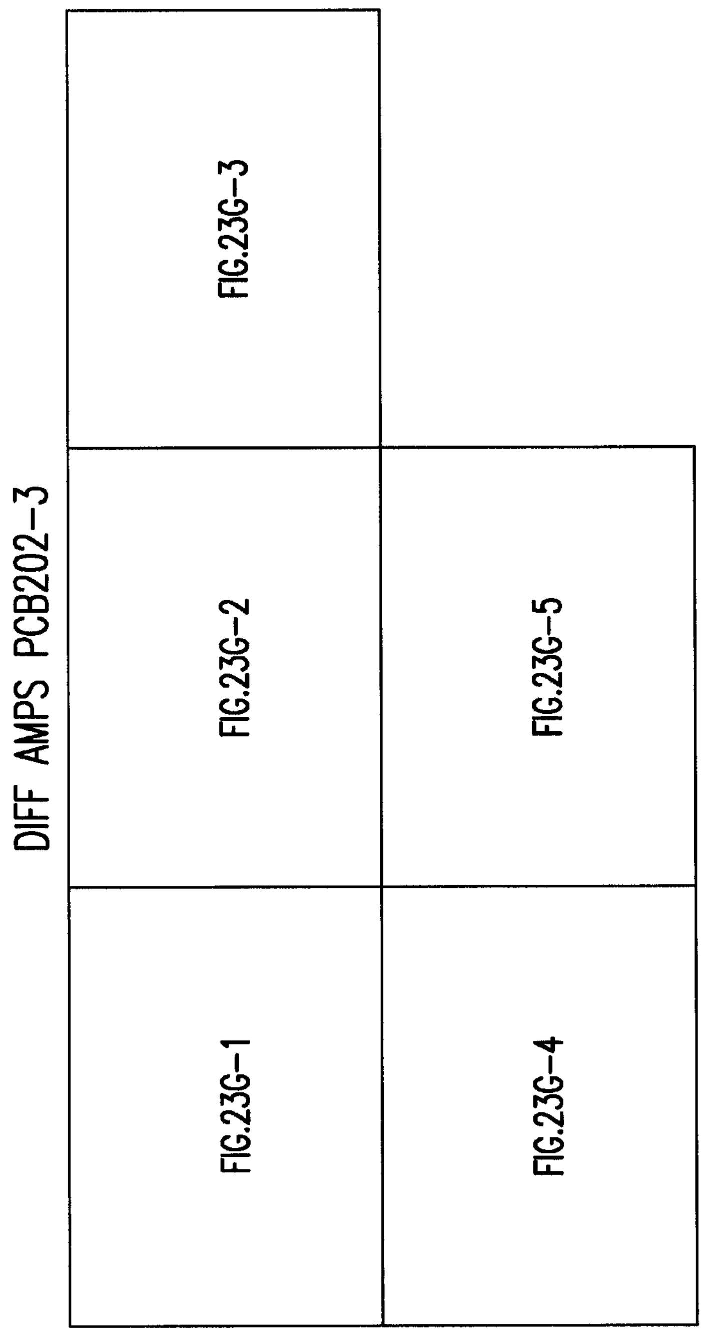
Figures 1, 23G:
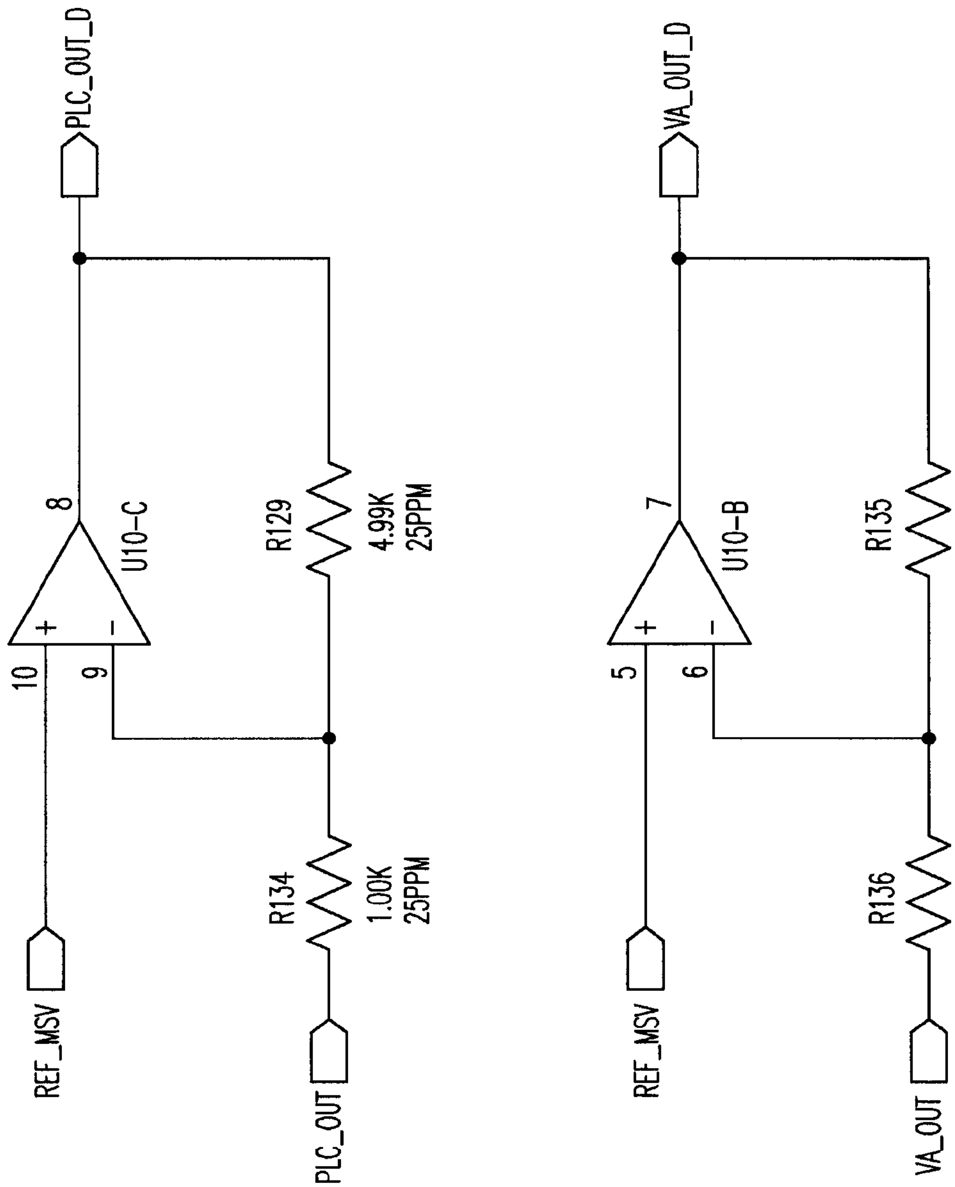
Figures 2, 23G:
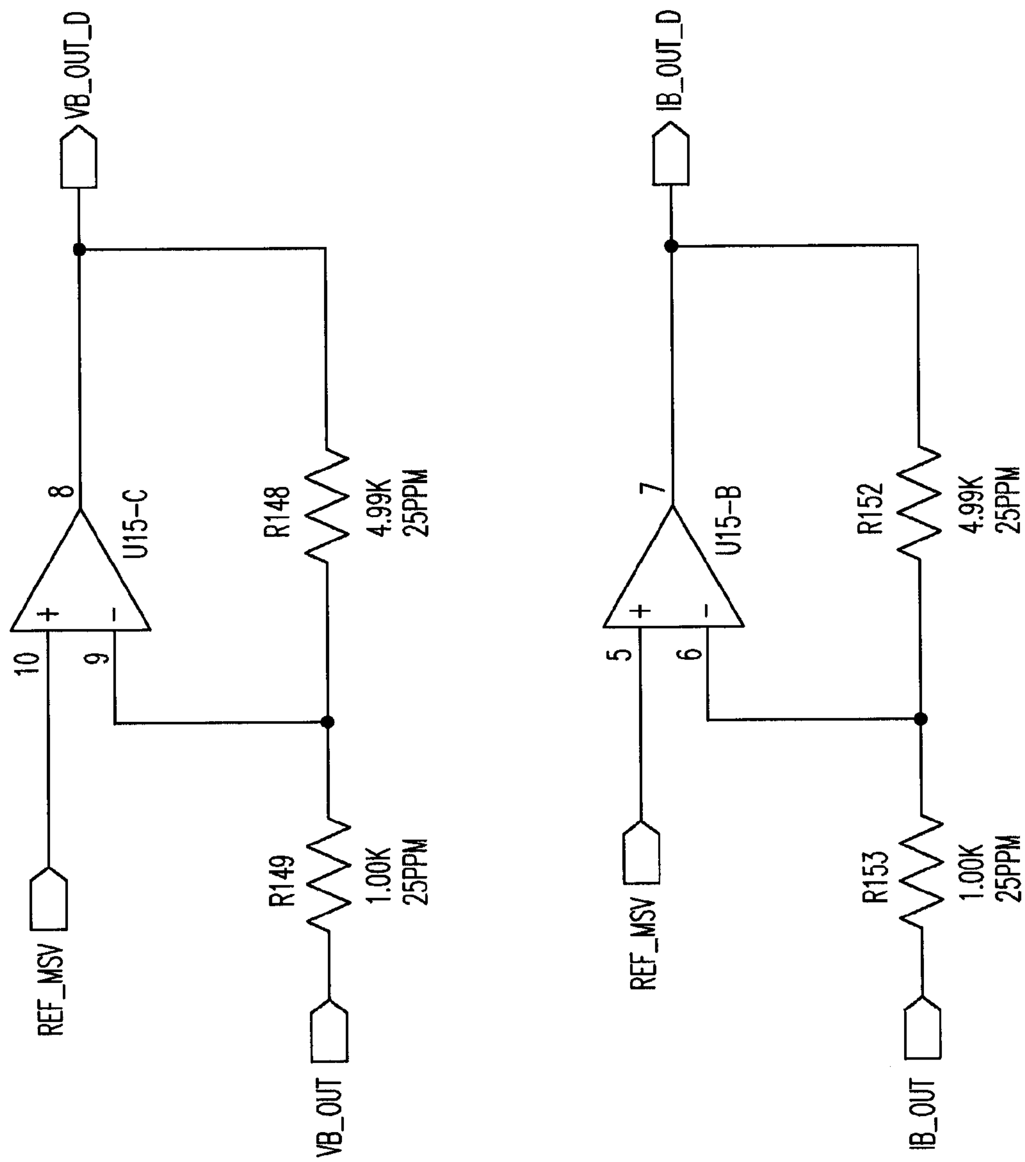
Figures 3, 23G:
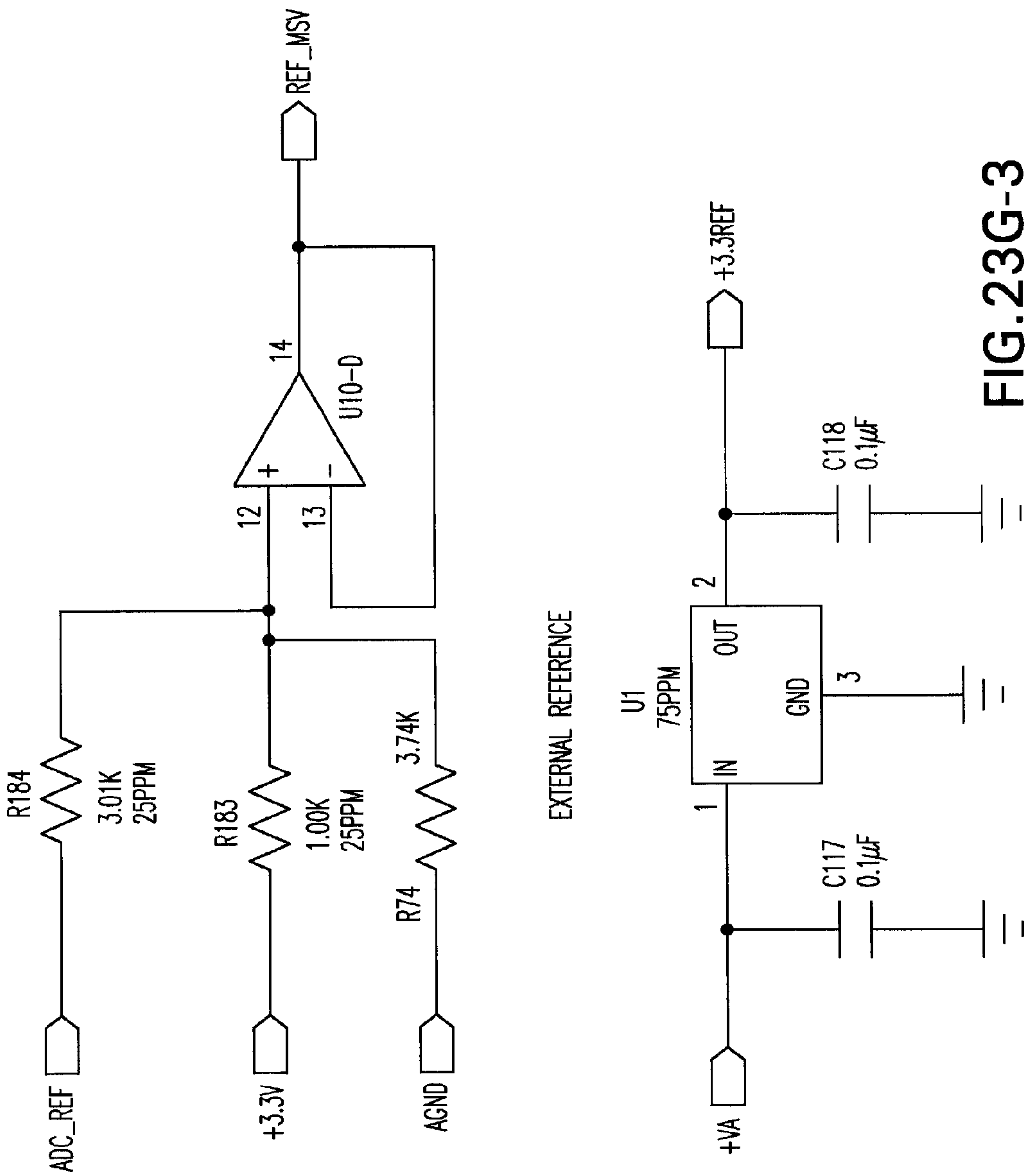
Figures 4, 23G:
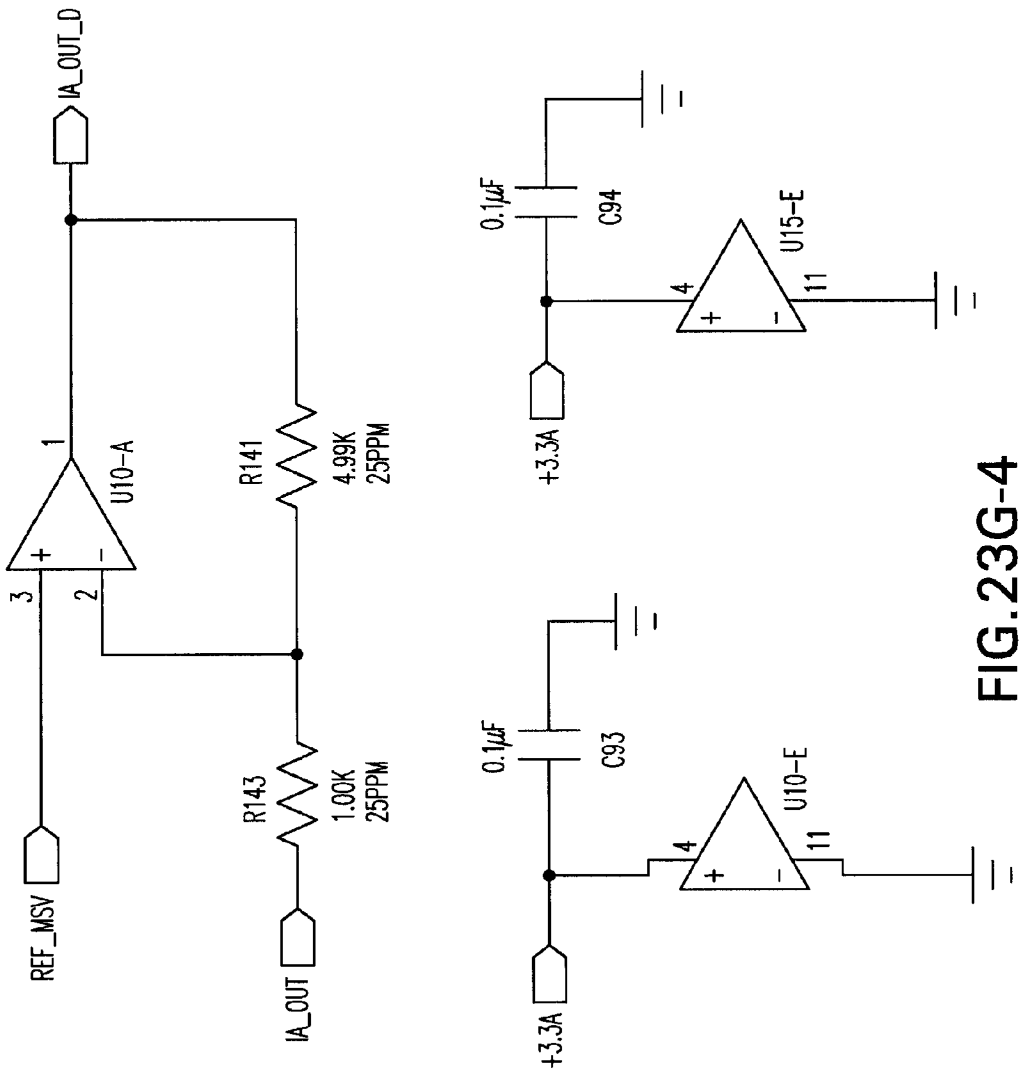
Figures 5, 23G:
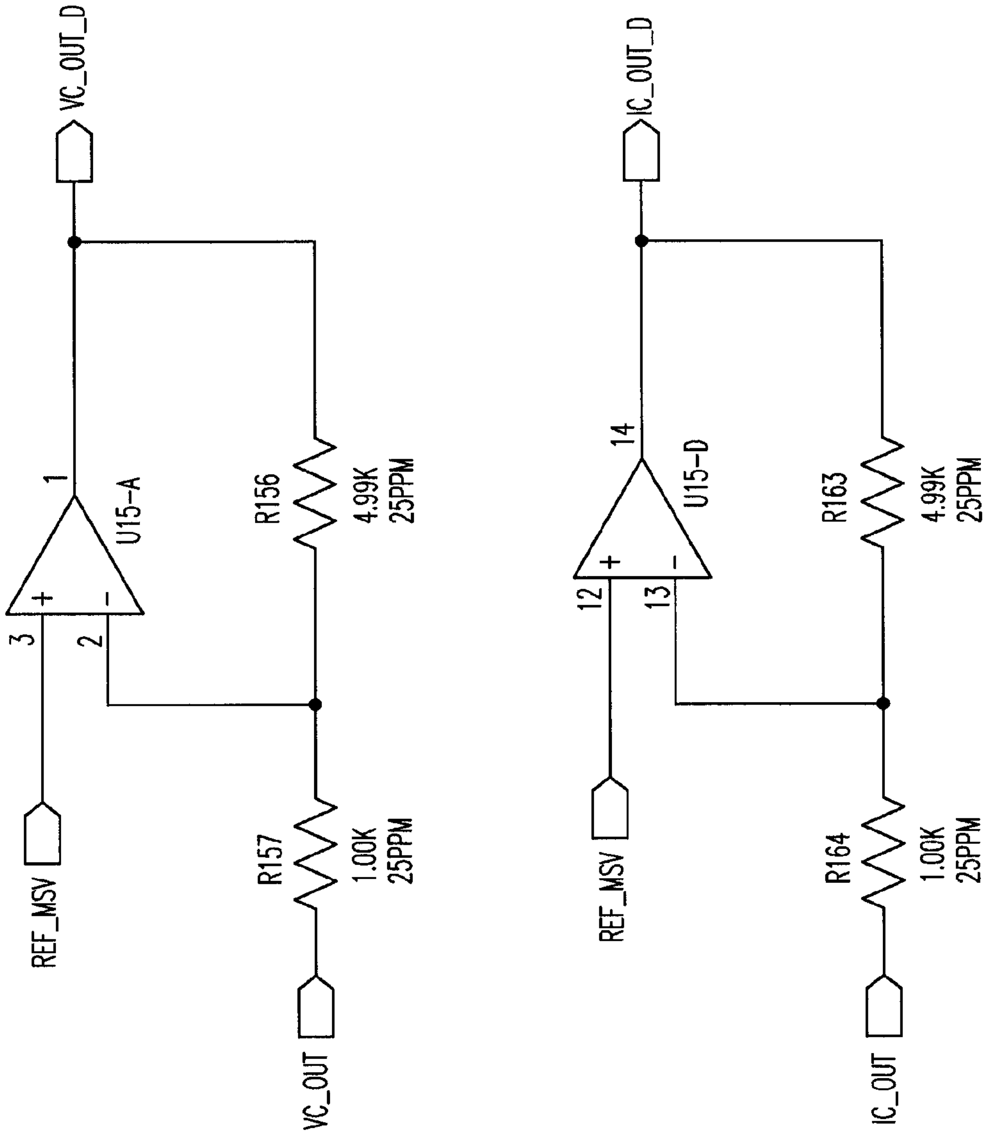
Figure 23H:
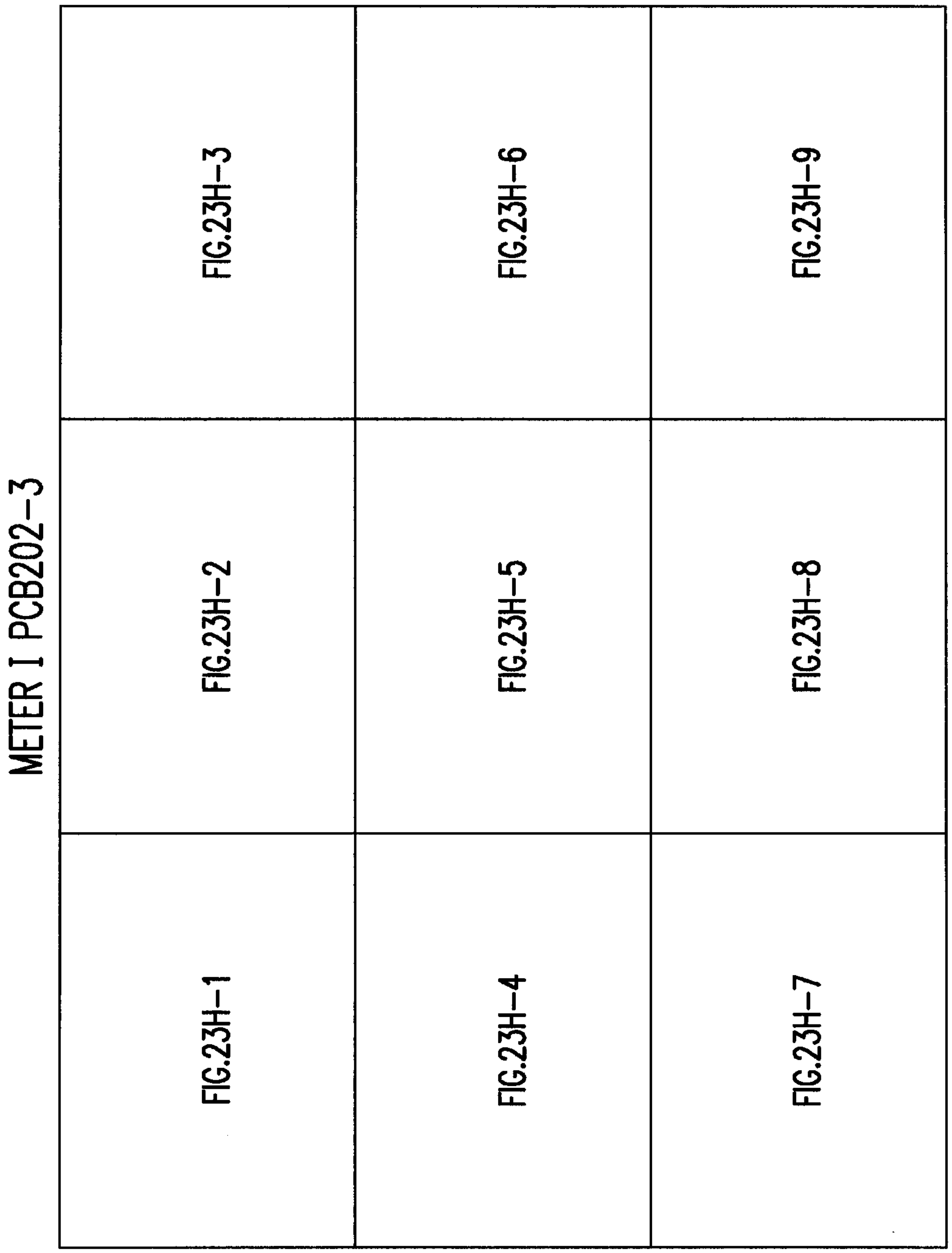
Figures 1, 23H:
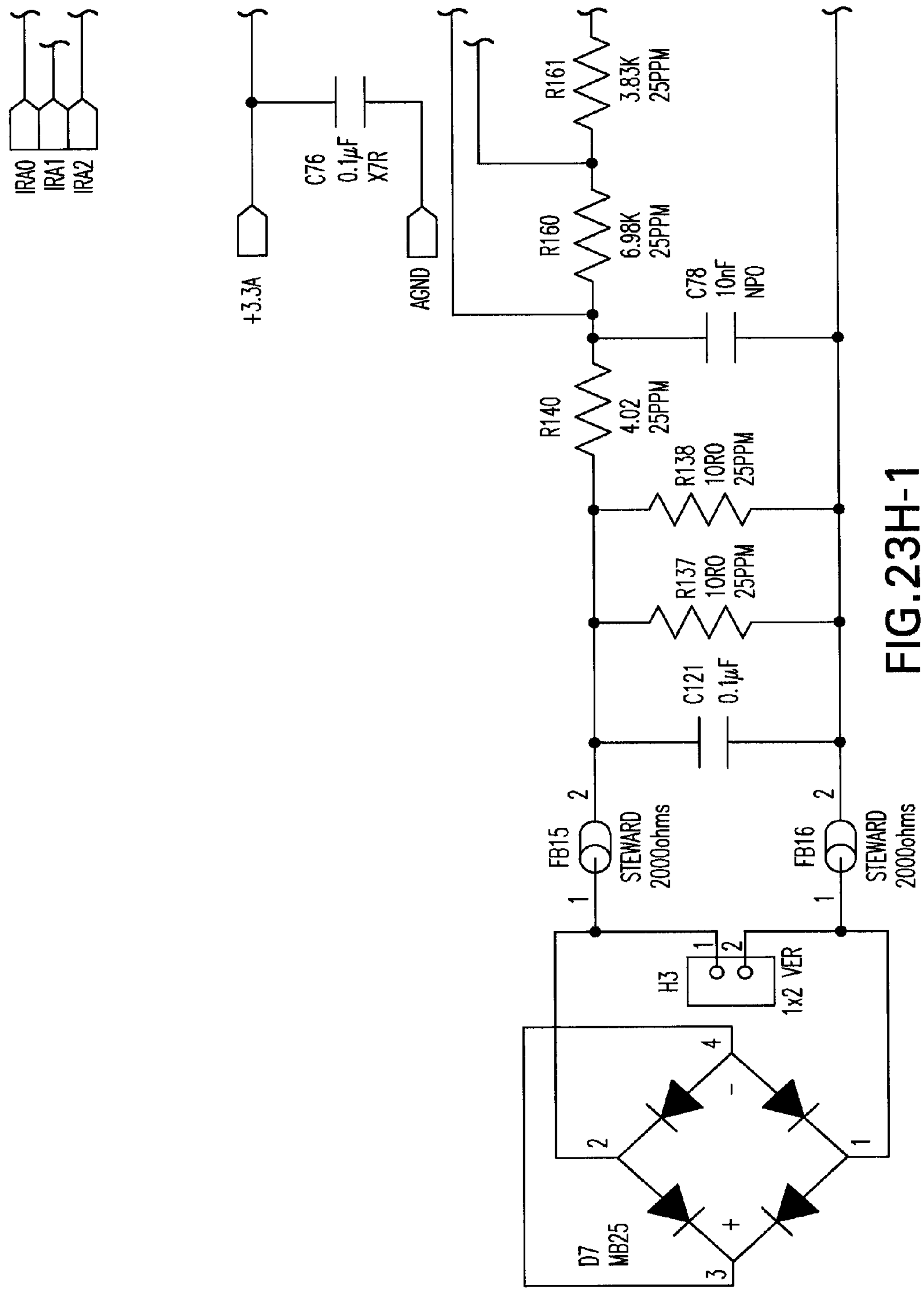
Figures 2, 23H:
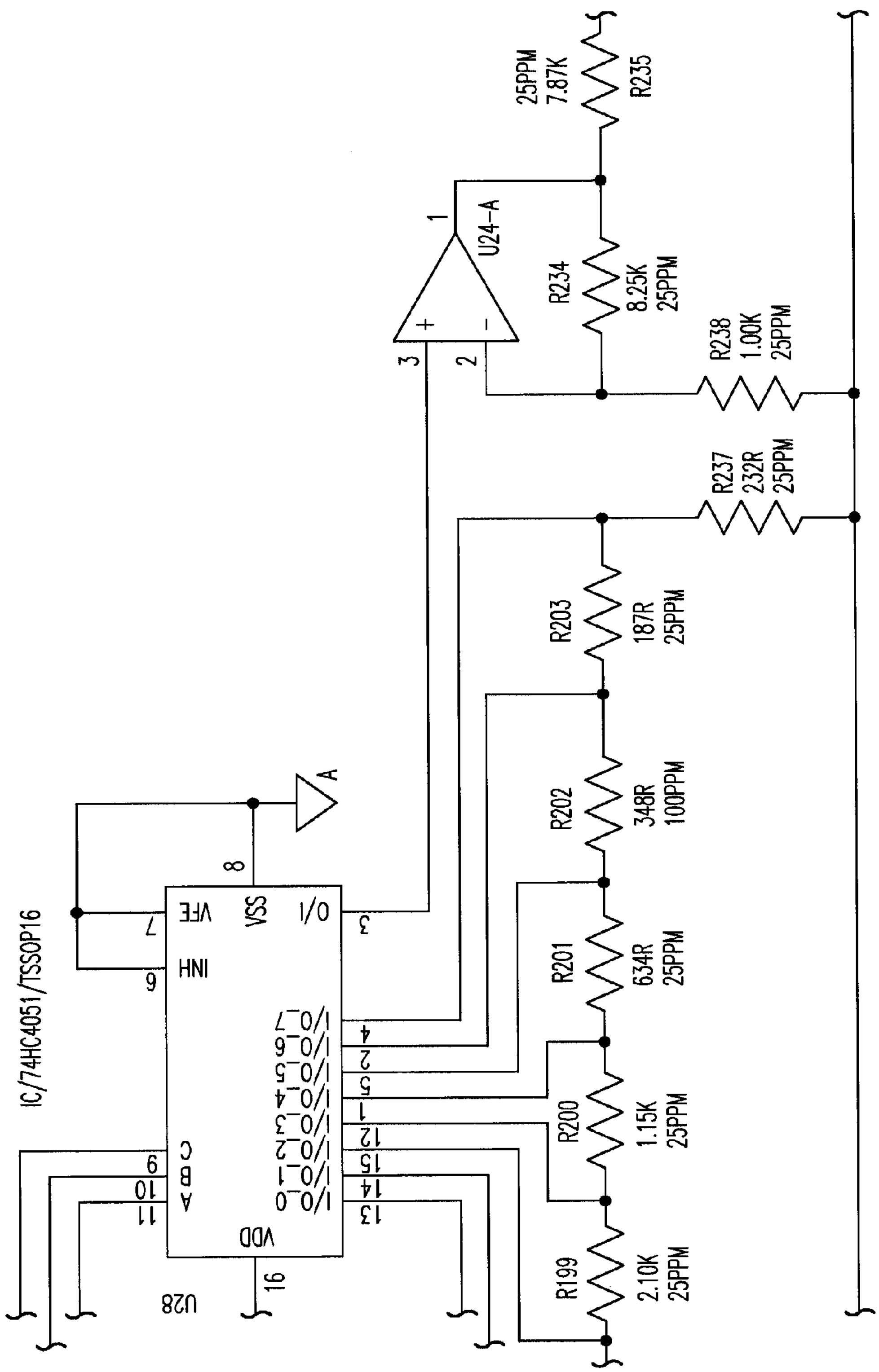
Figures 3, 23H:
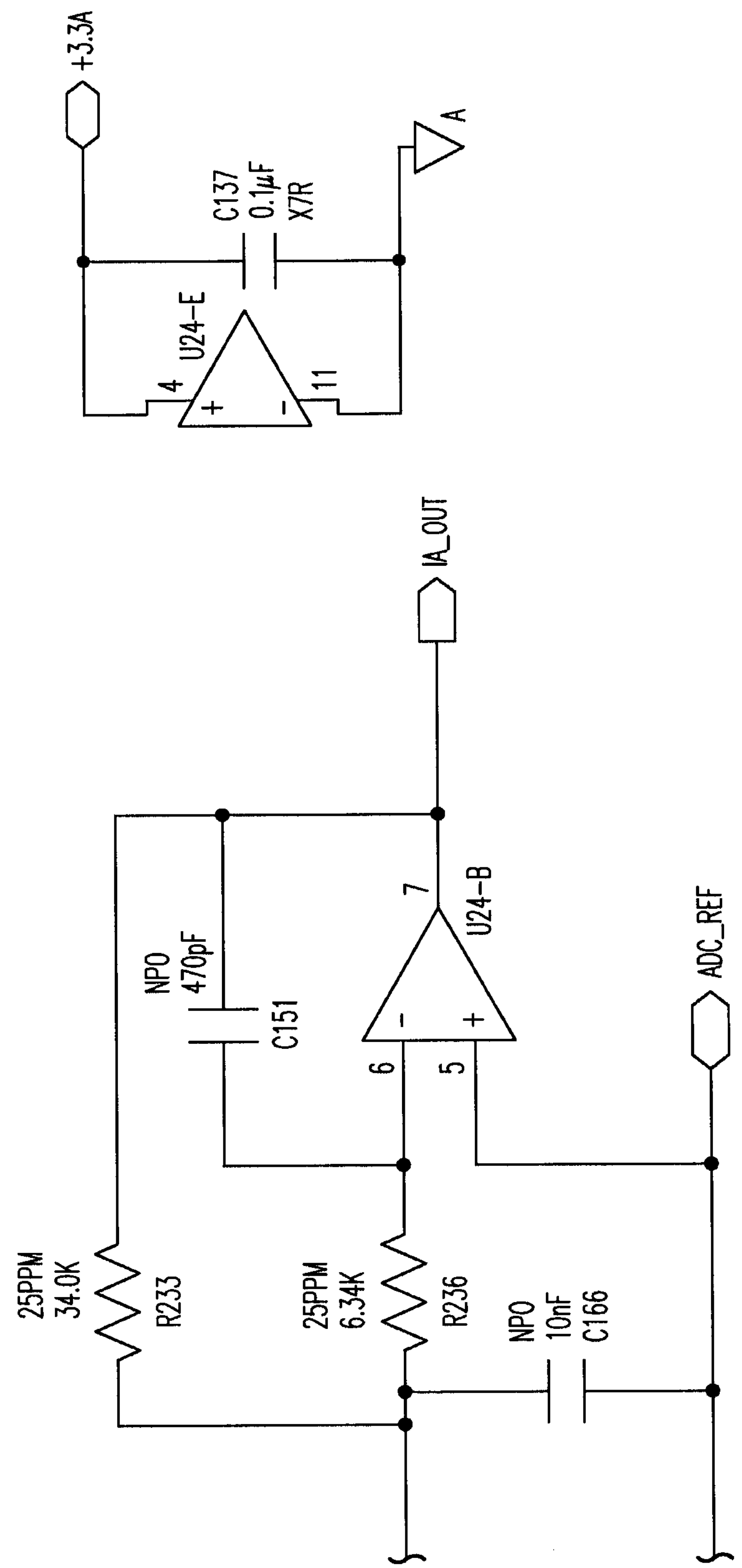
Figures 4, 23H:
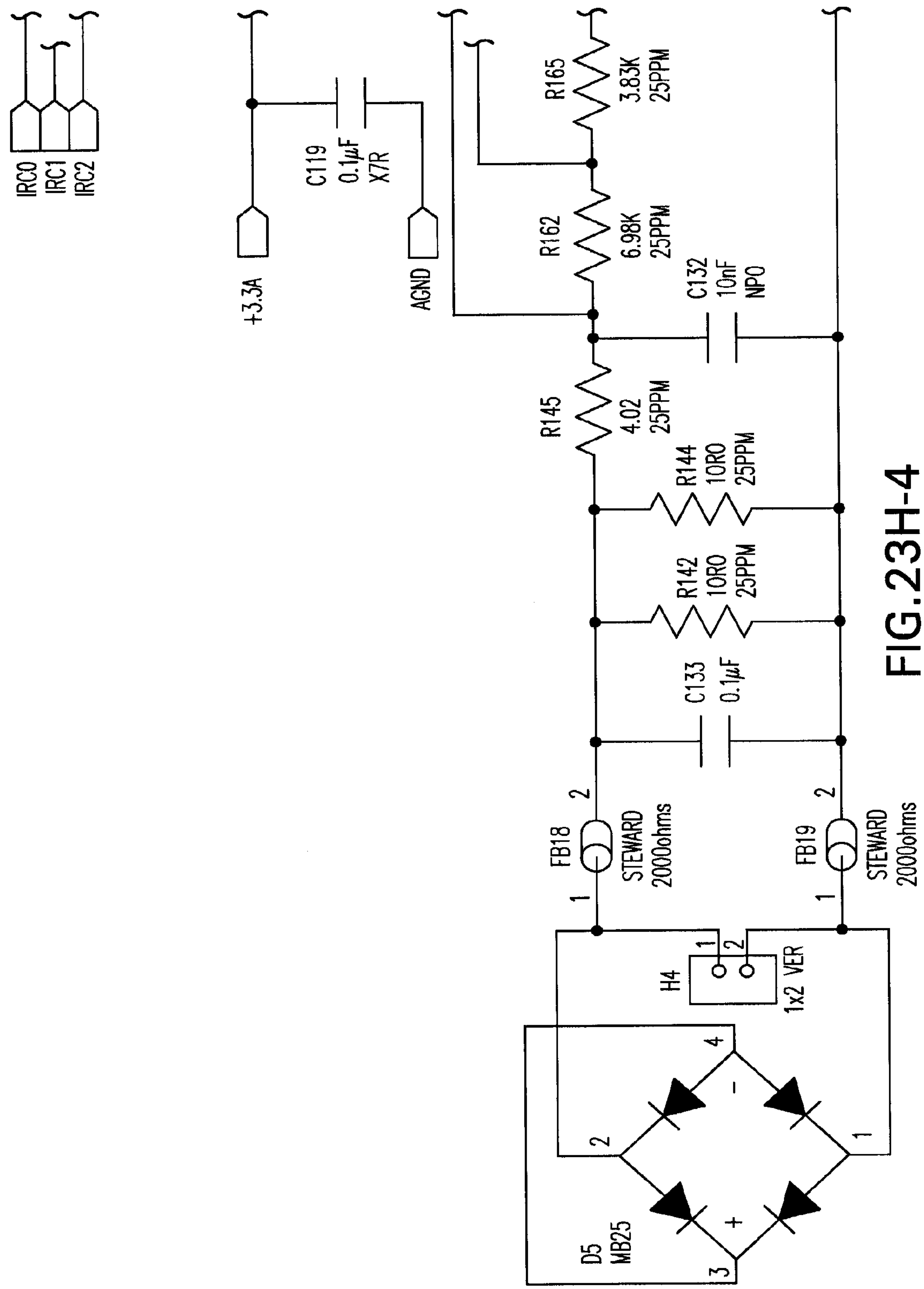
Figures 5, 23H:
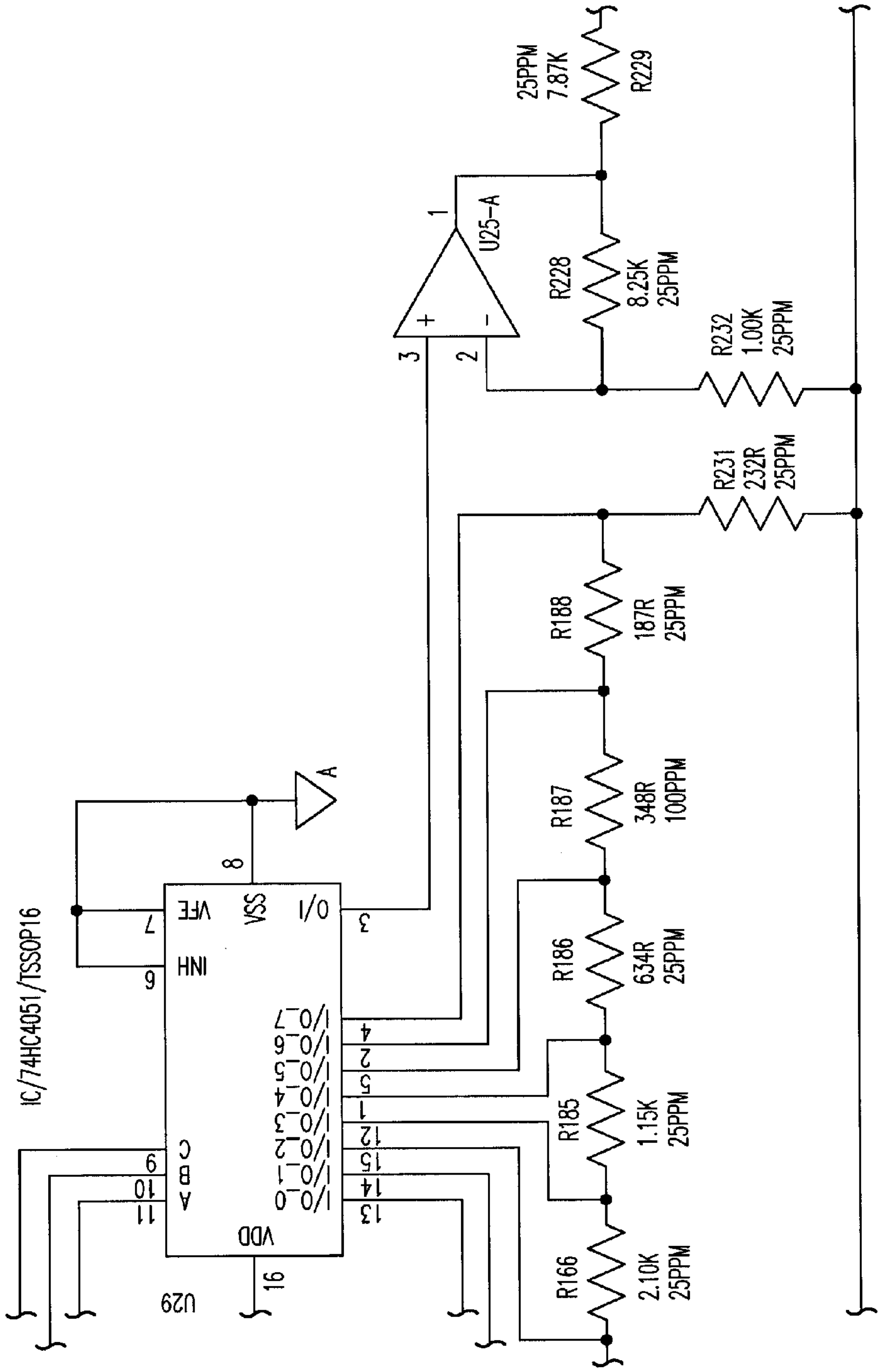
Figures 6, 23H:
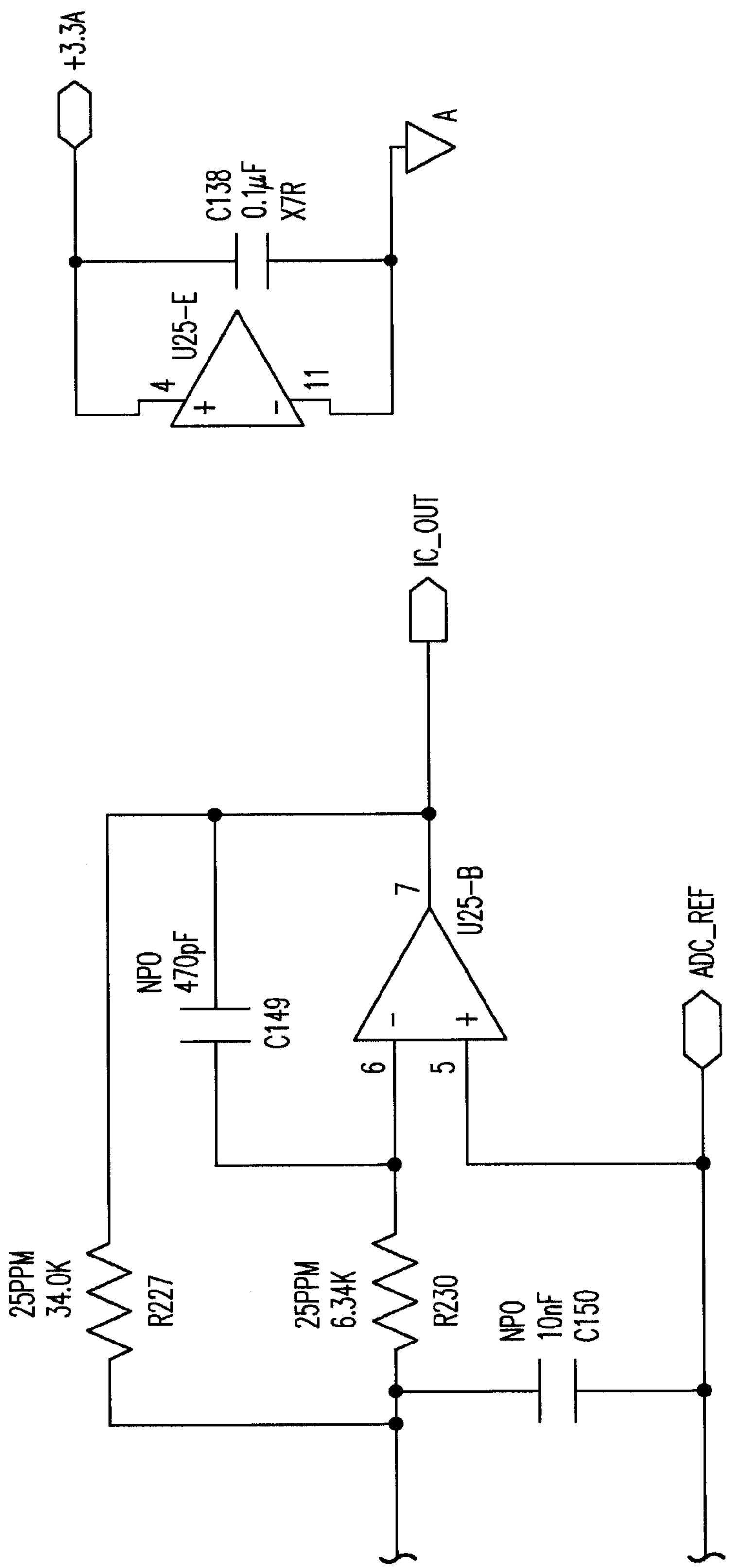
Figures 7, 23H:
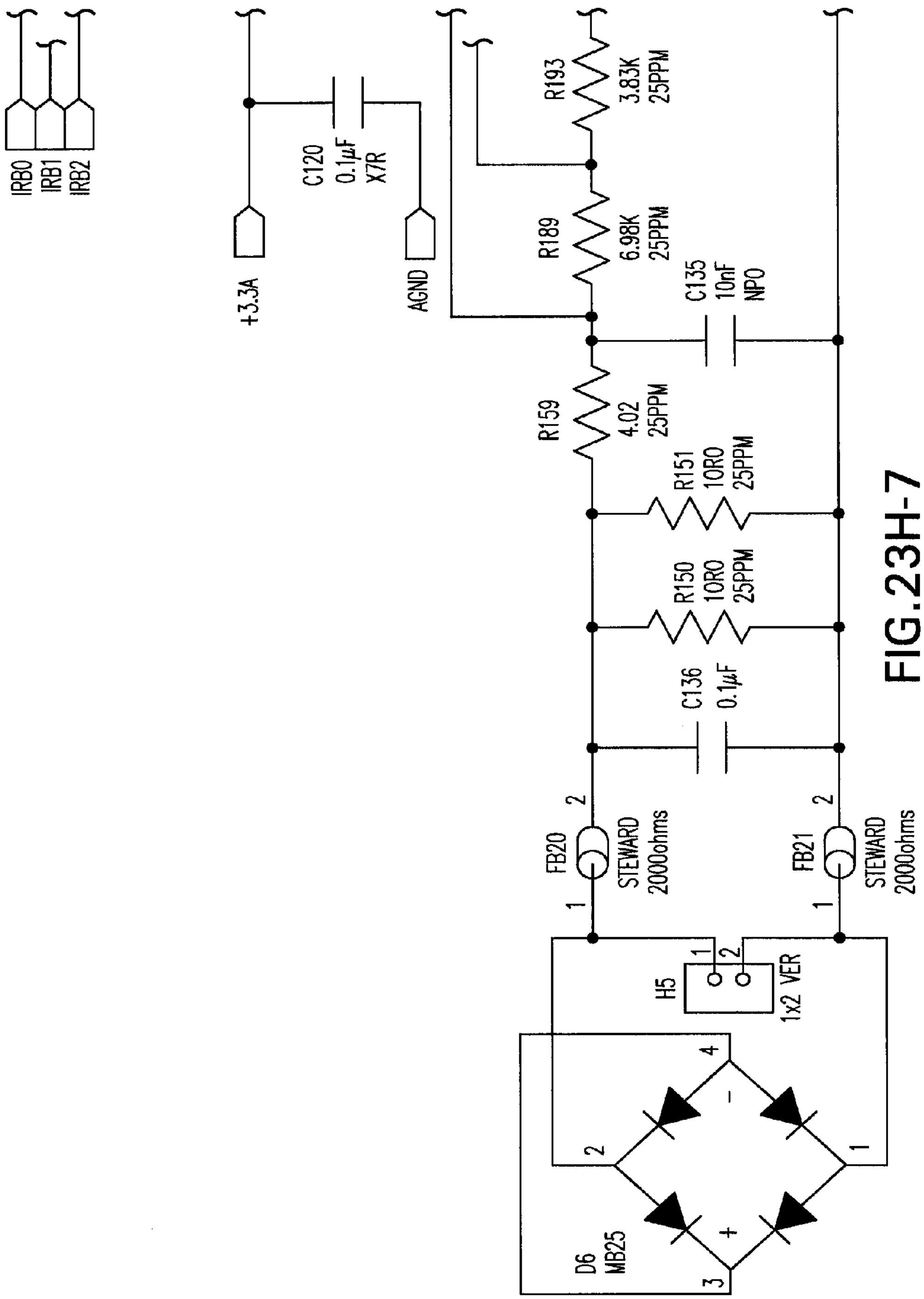
Figures 8, 23H:
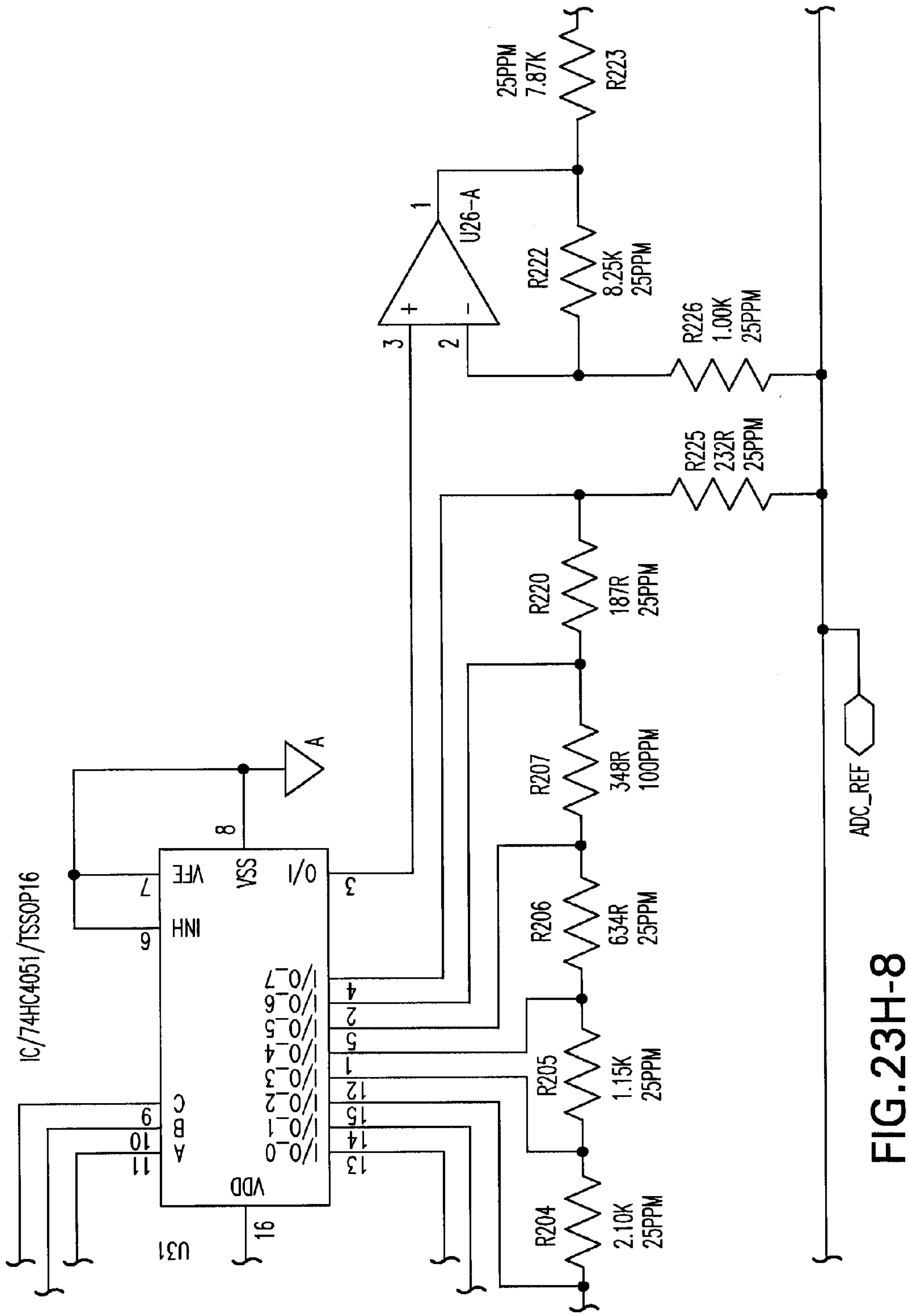
Figures 9, 23H:
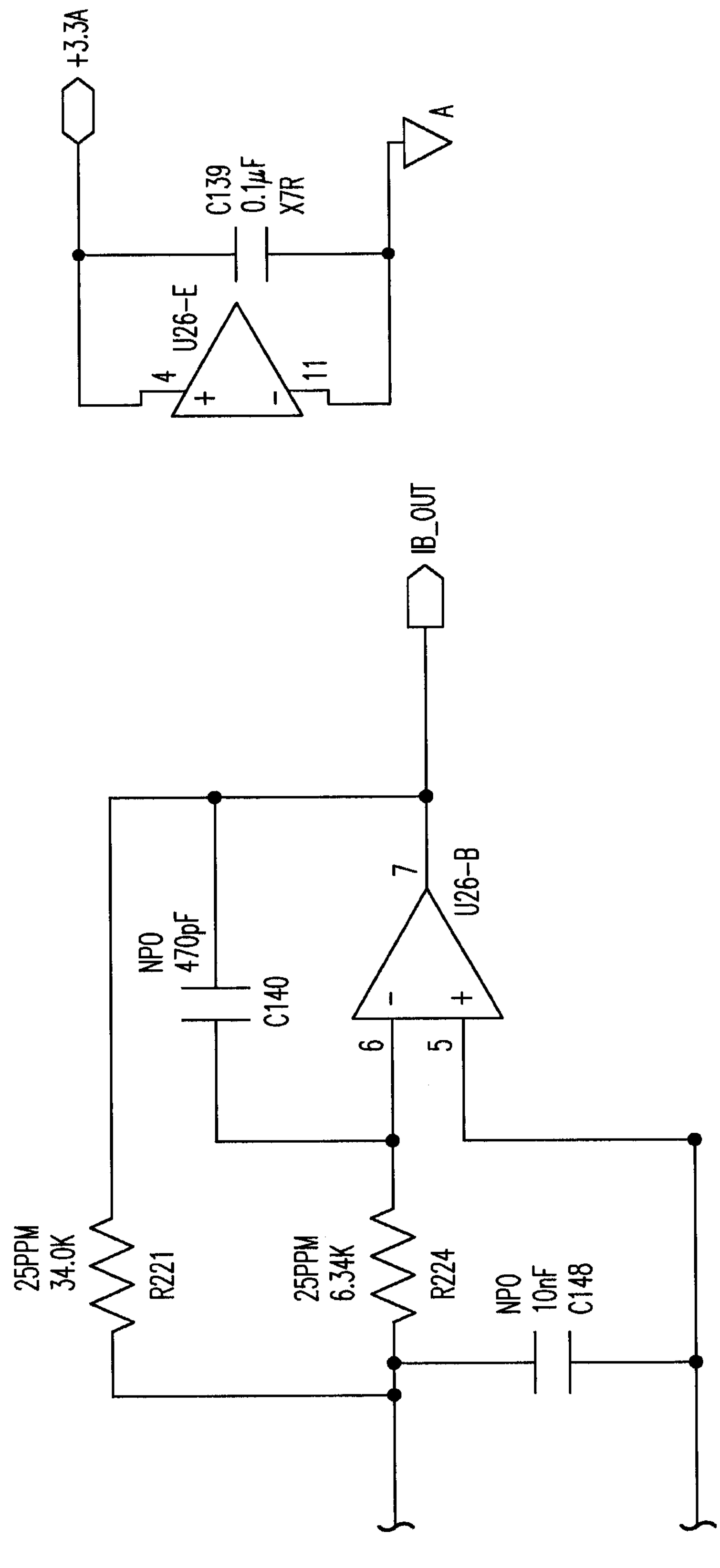
Figure 23I:
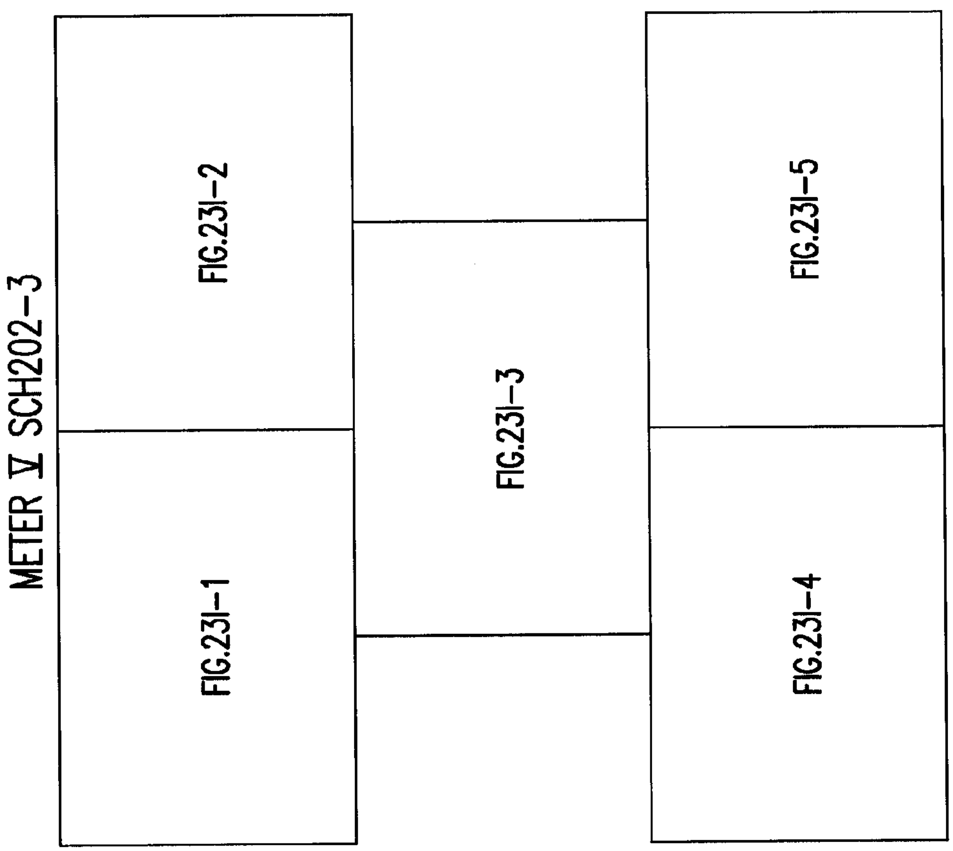
Figures 1, 23I:
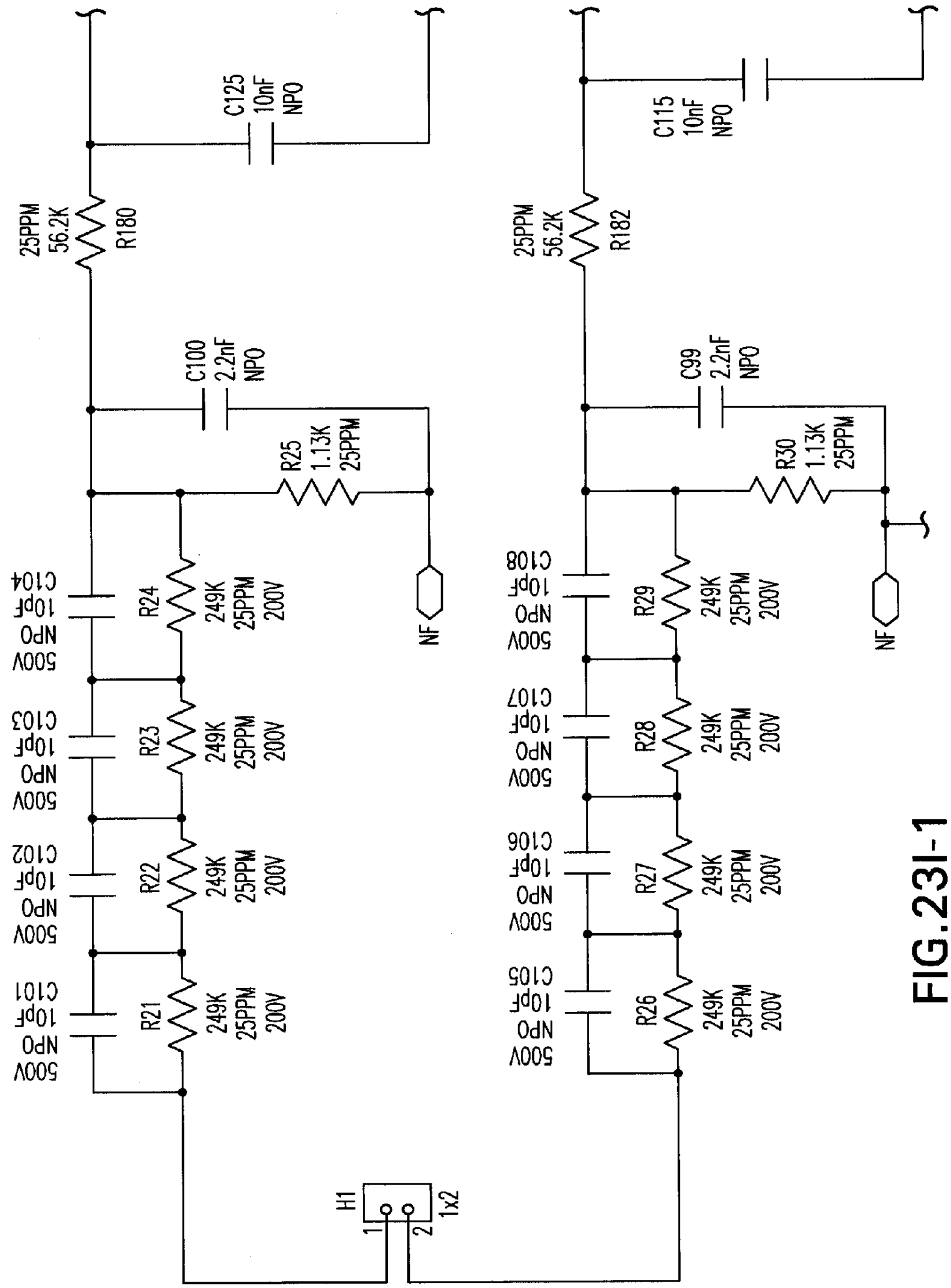
Figures 2, 23I:
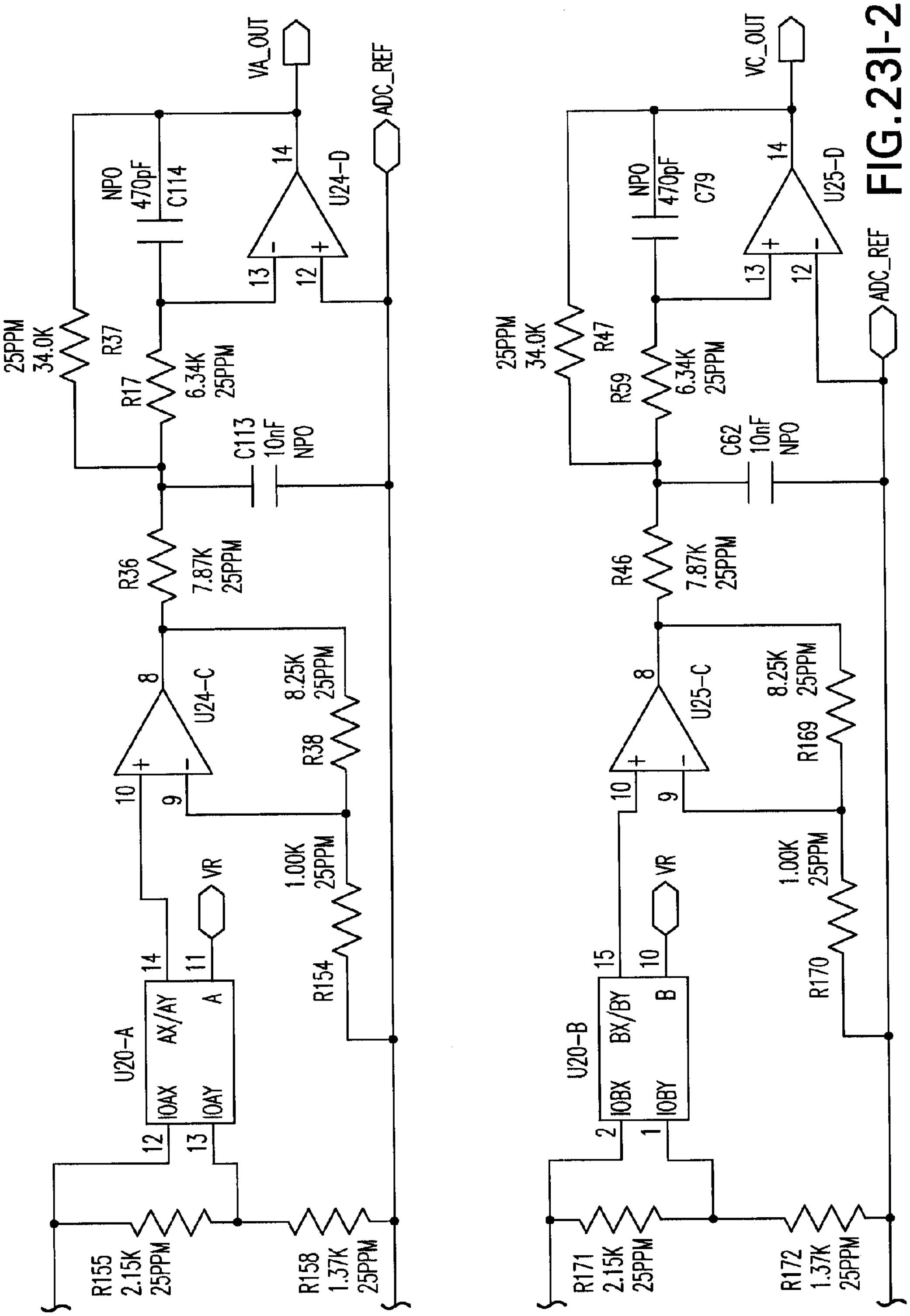
Figures 3, 23I:
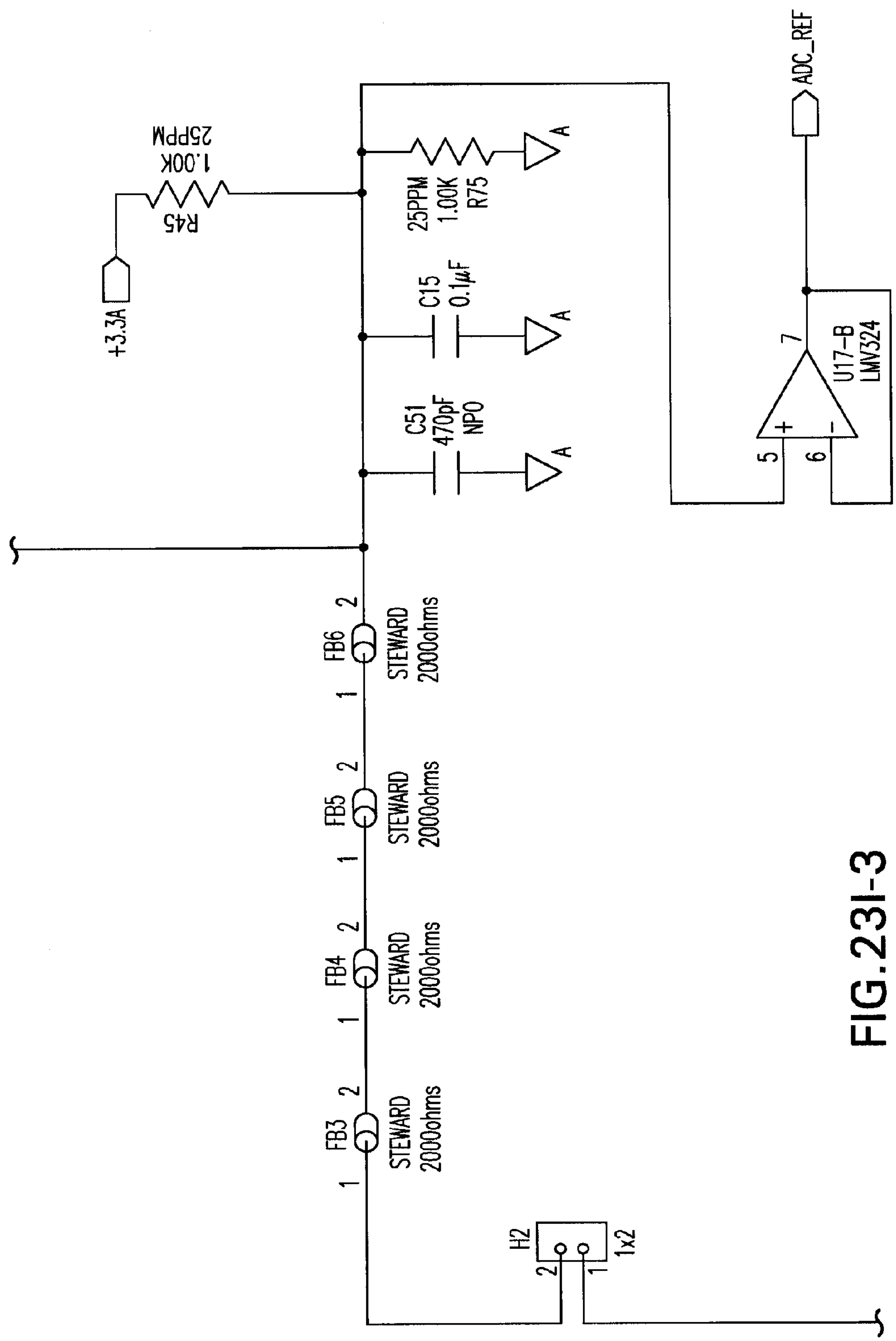
Figures 4, 23I:
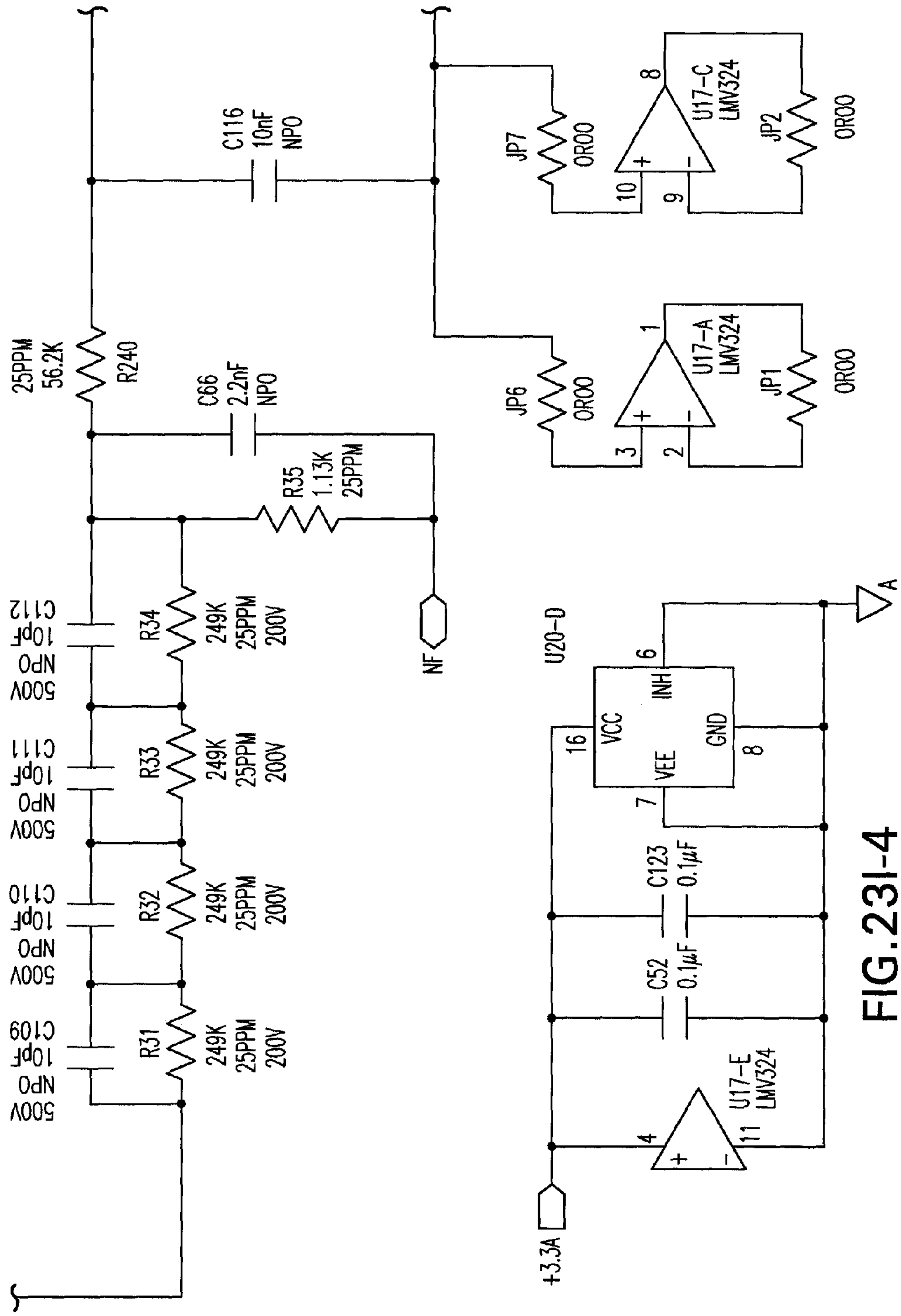
Figures 5, 23I:
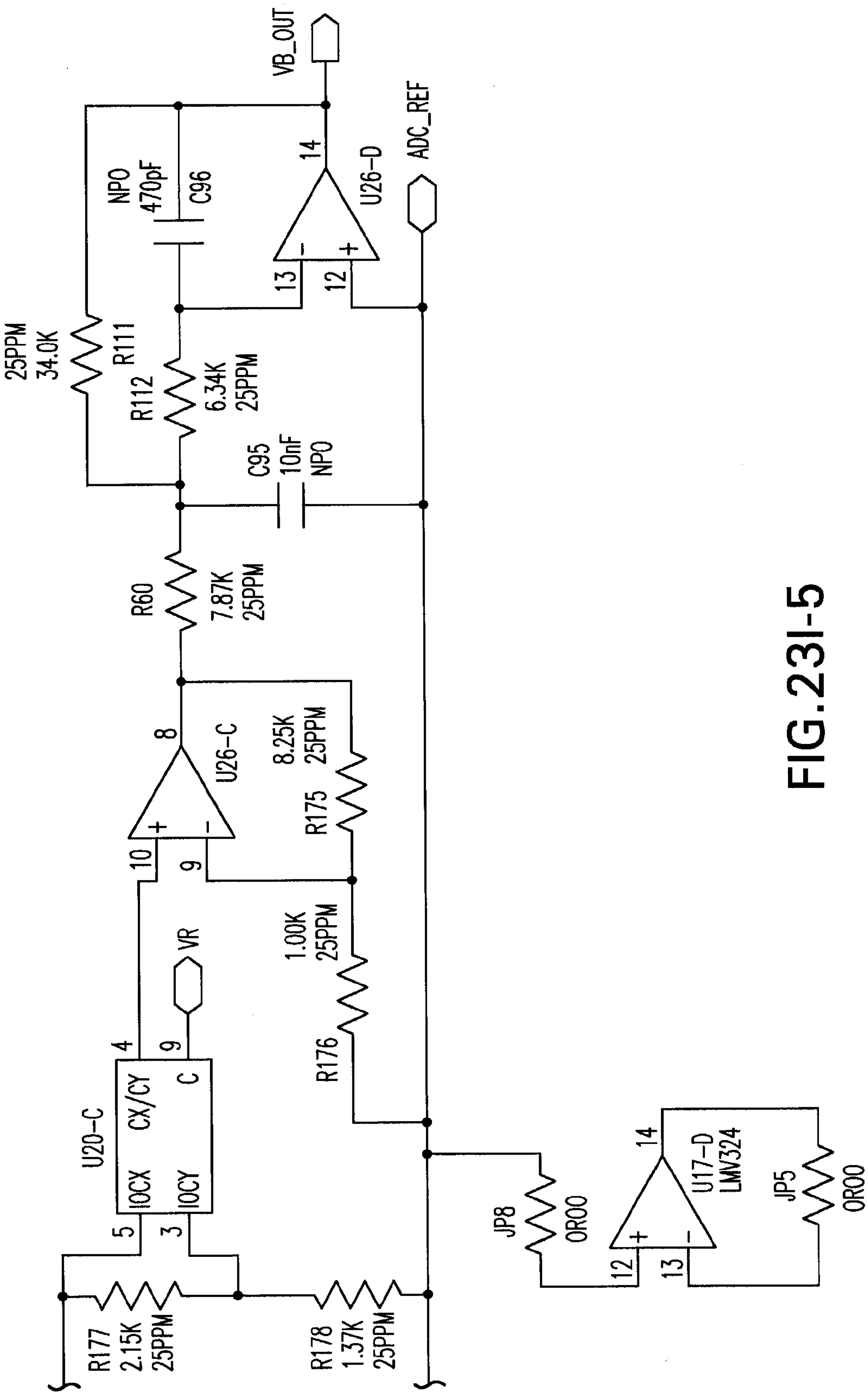
Figures 1, 23J:
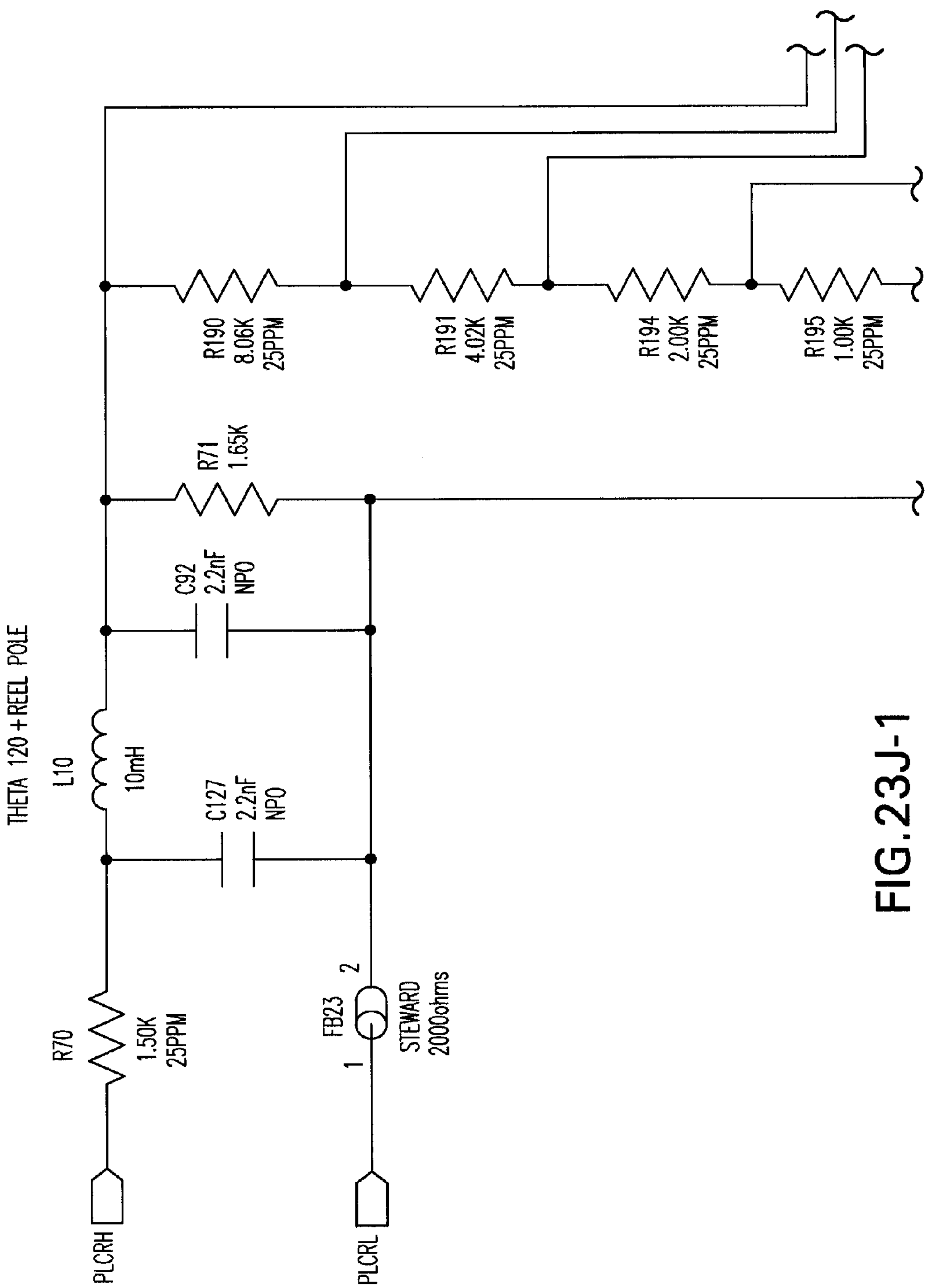
Figures 2, 23J:
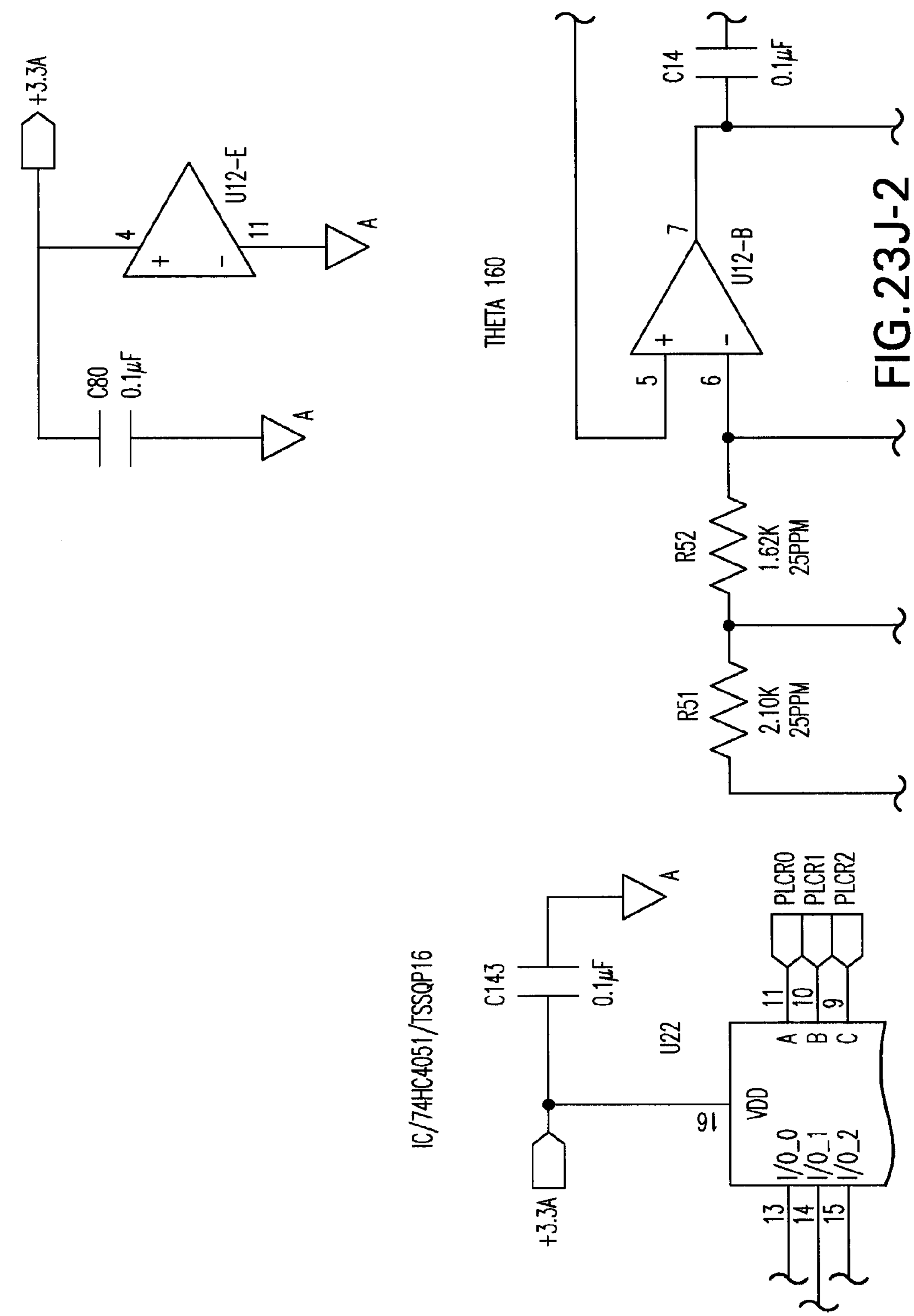
Figures 3, 23J:
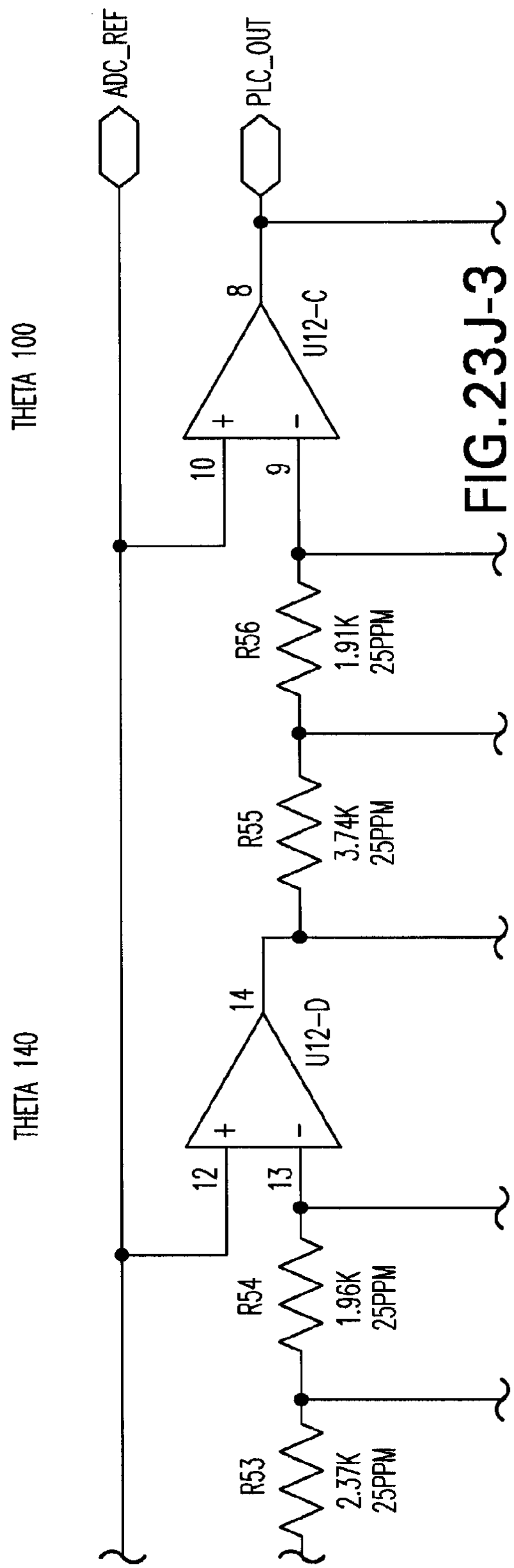
Figures 4, 23J:
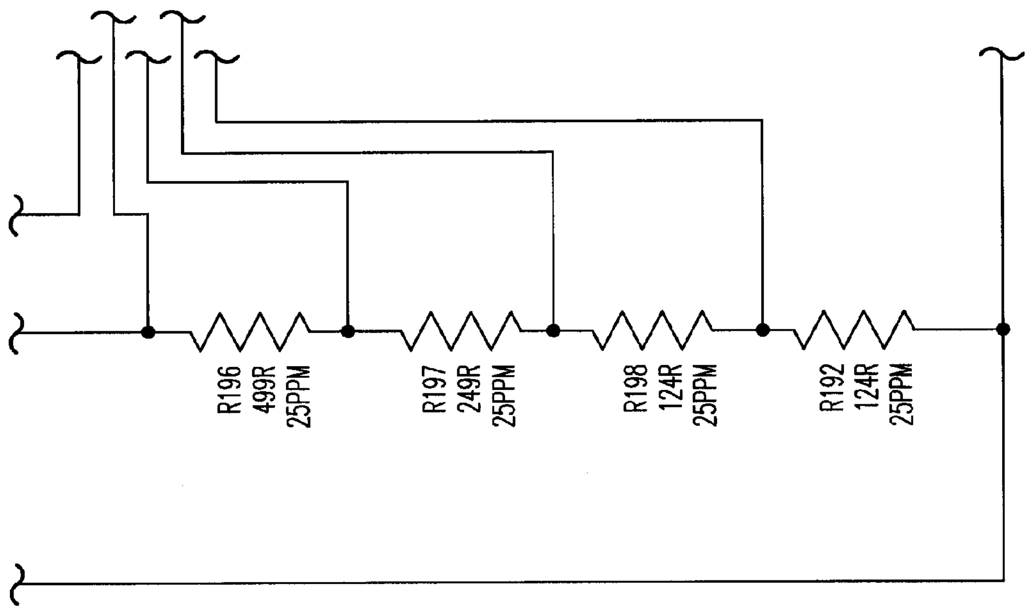
Figures 5, 23J:
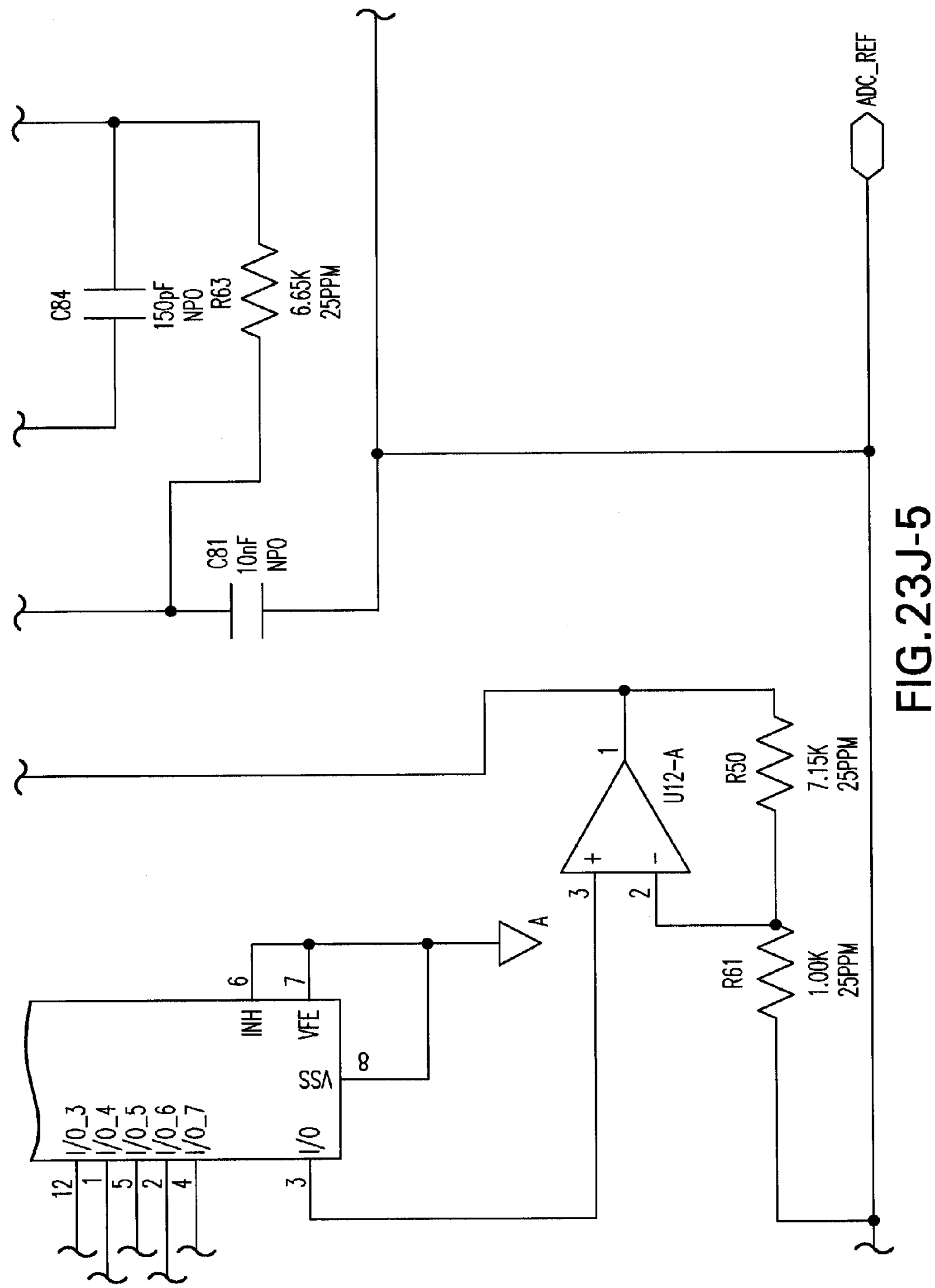
Figures 6, 23J:
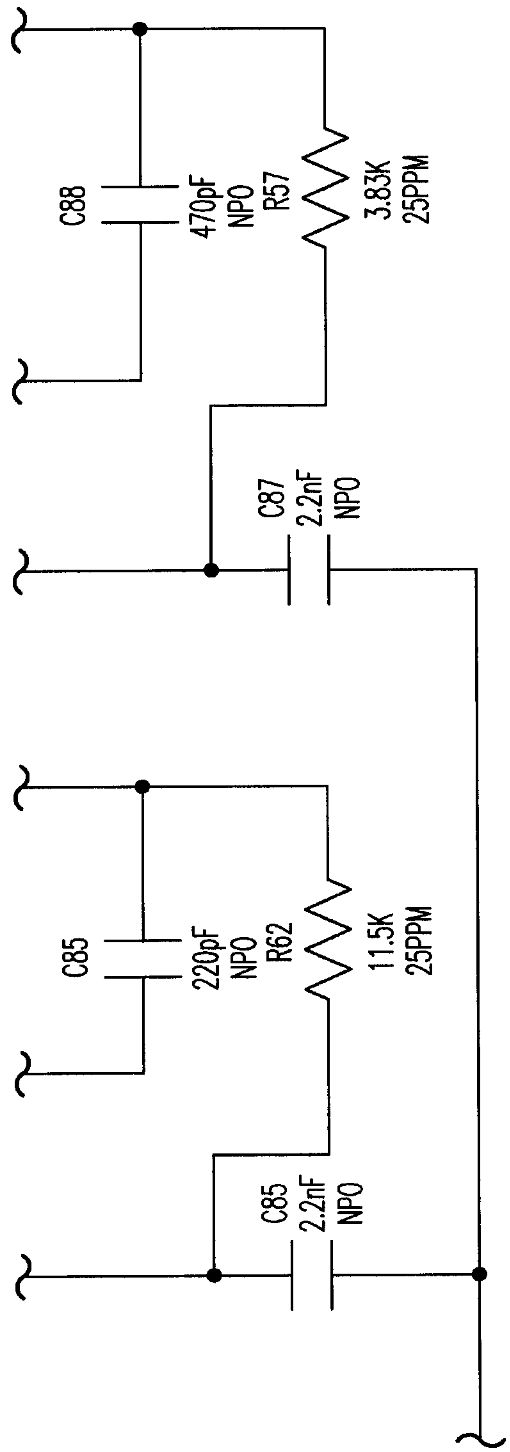
Figure 23K:
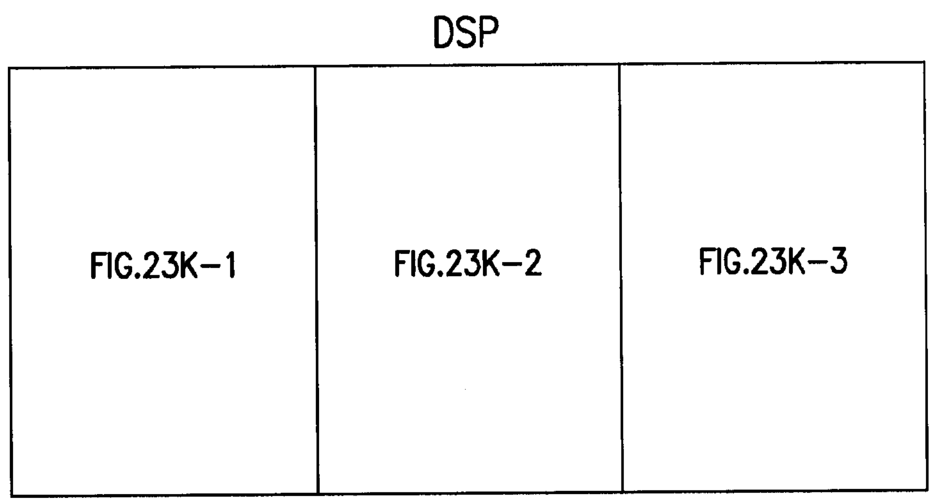
Figure 23K:
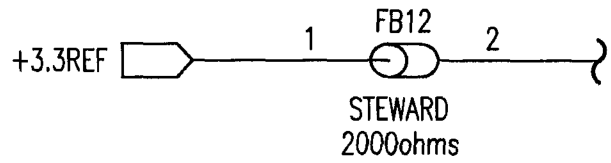
Figure 1:
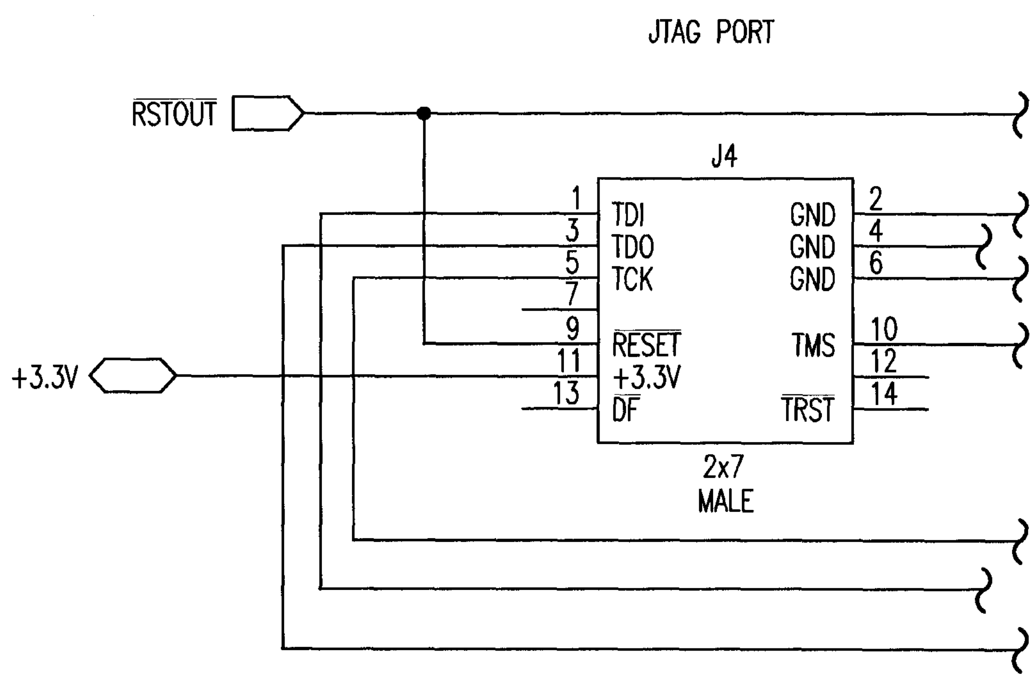
Figures 2, 23K:
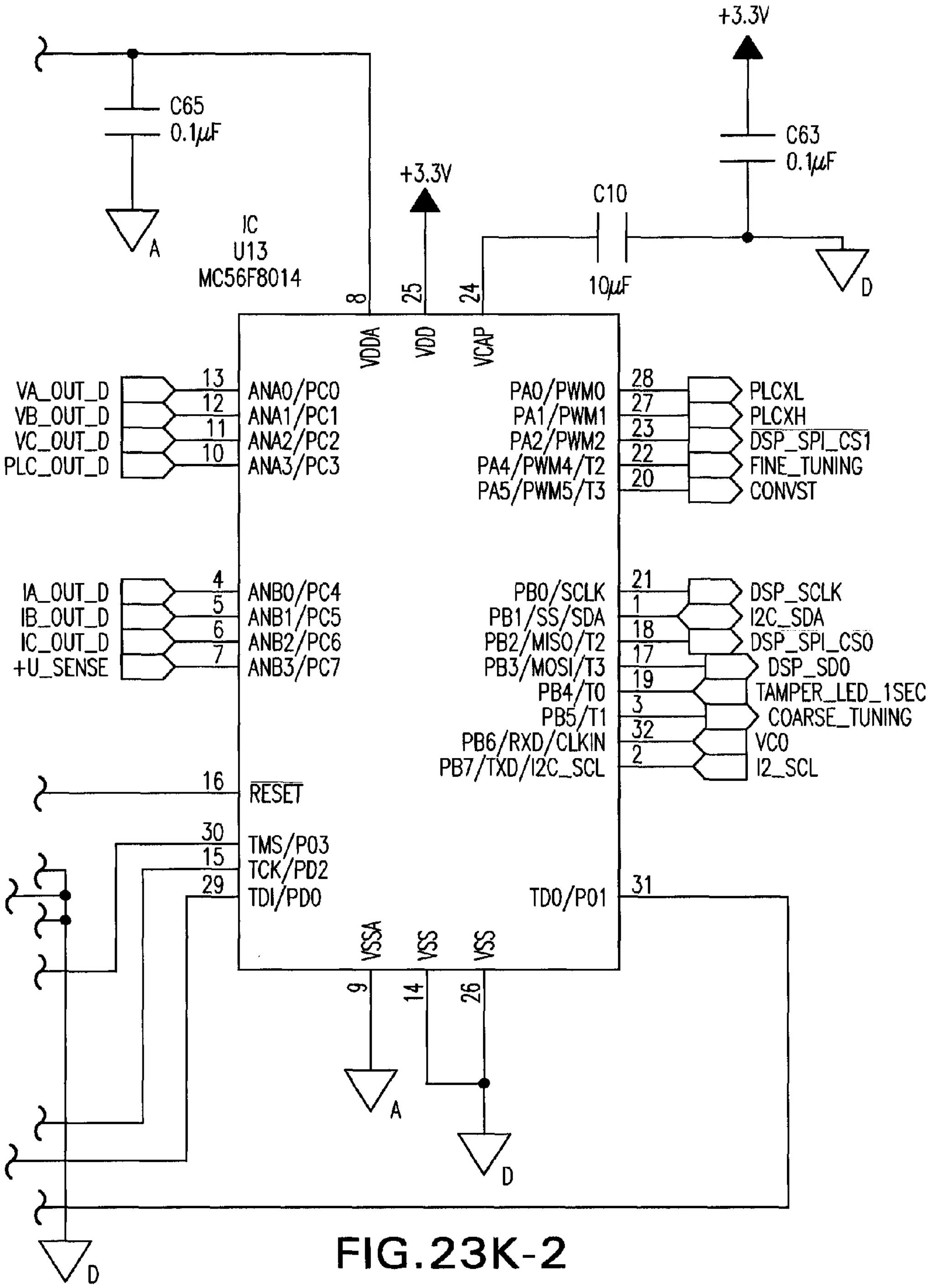
Figures 3, 23K:
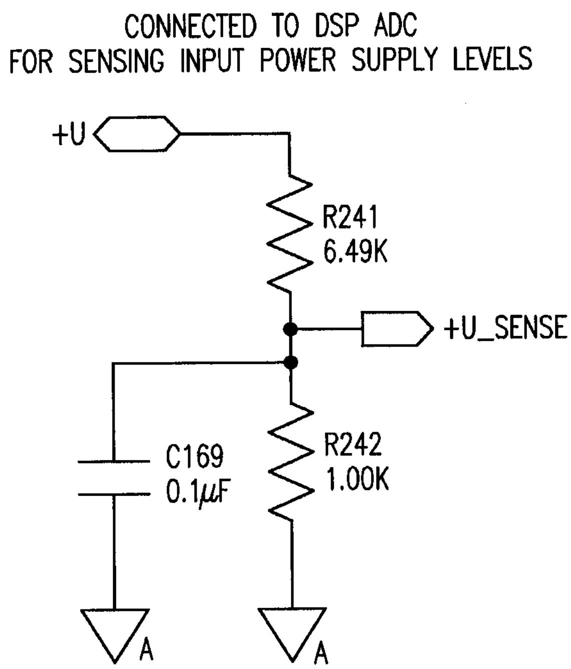
Figure 23L:
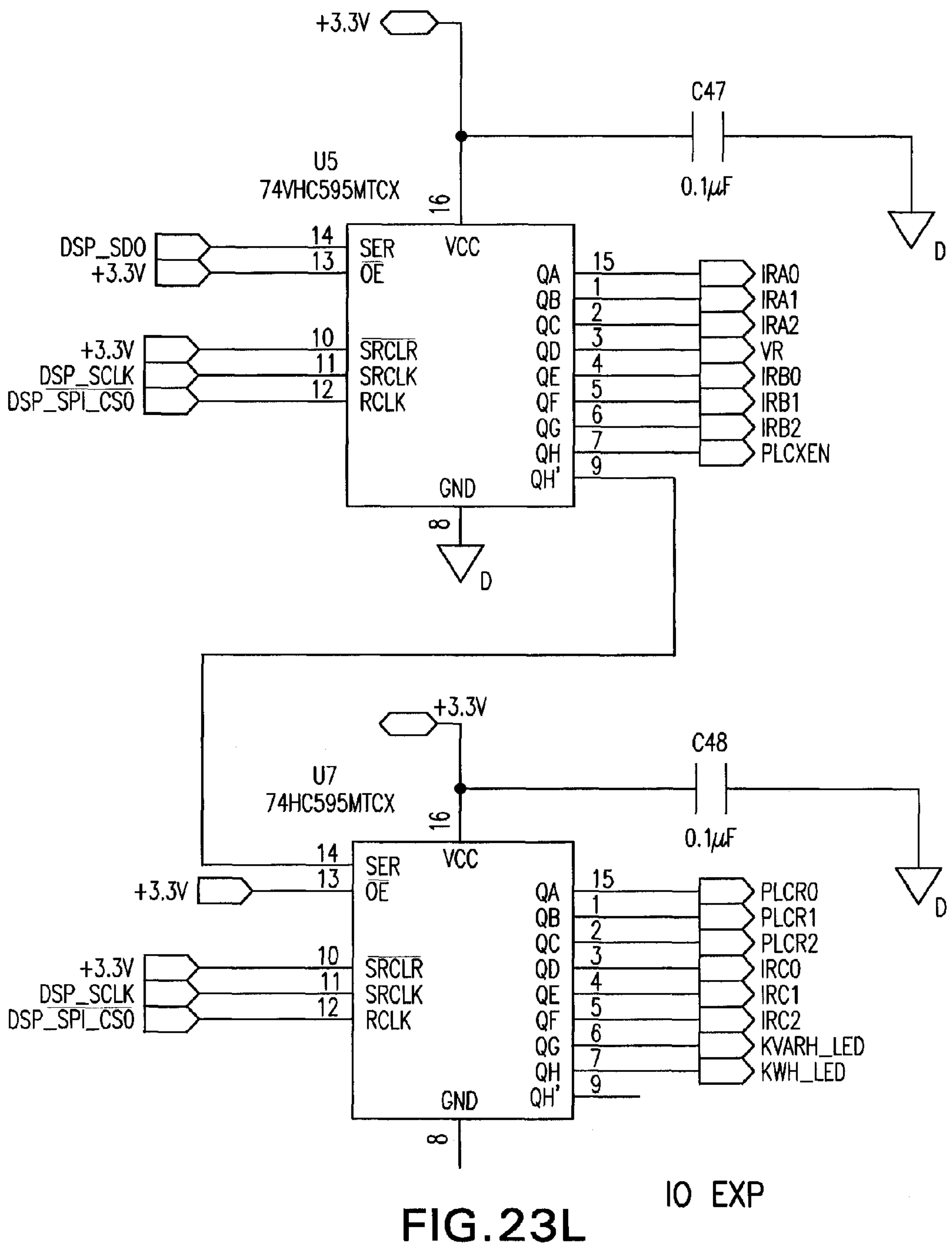
Figure 23M:
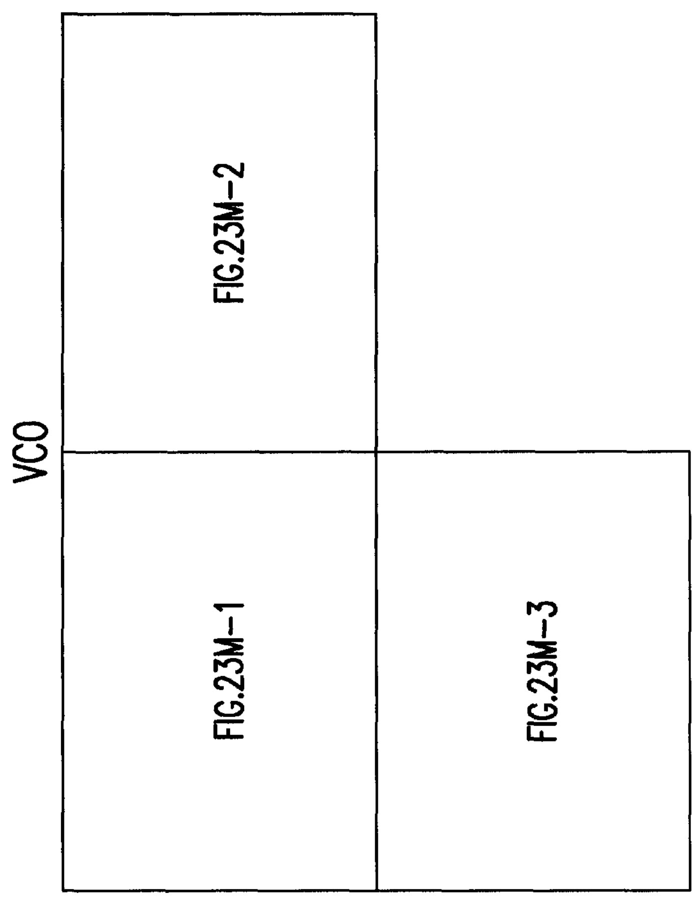
Figures 1, 23M:
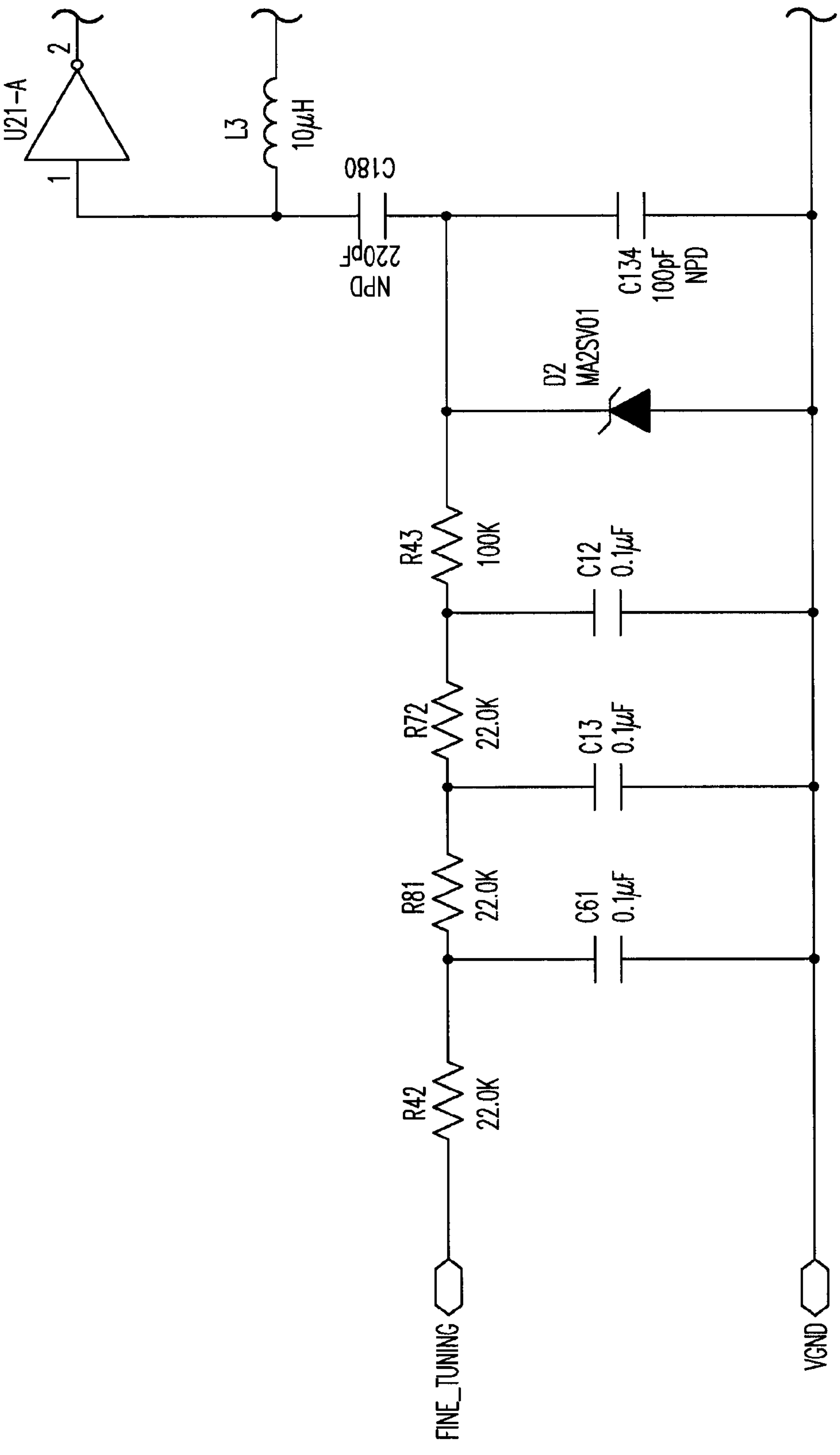
Figures 2, 23M:
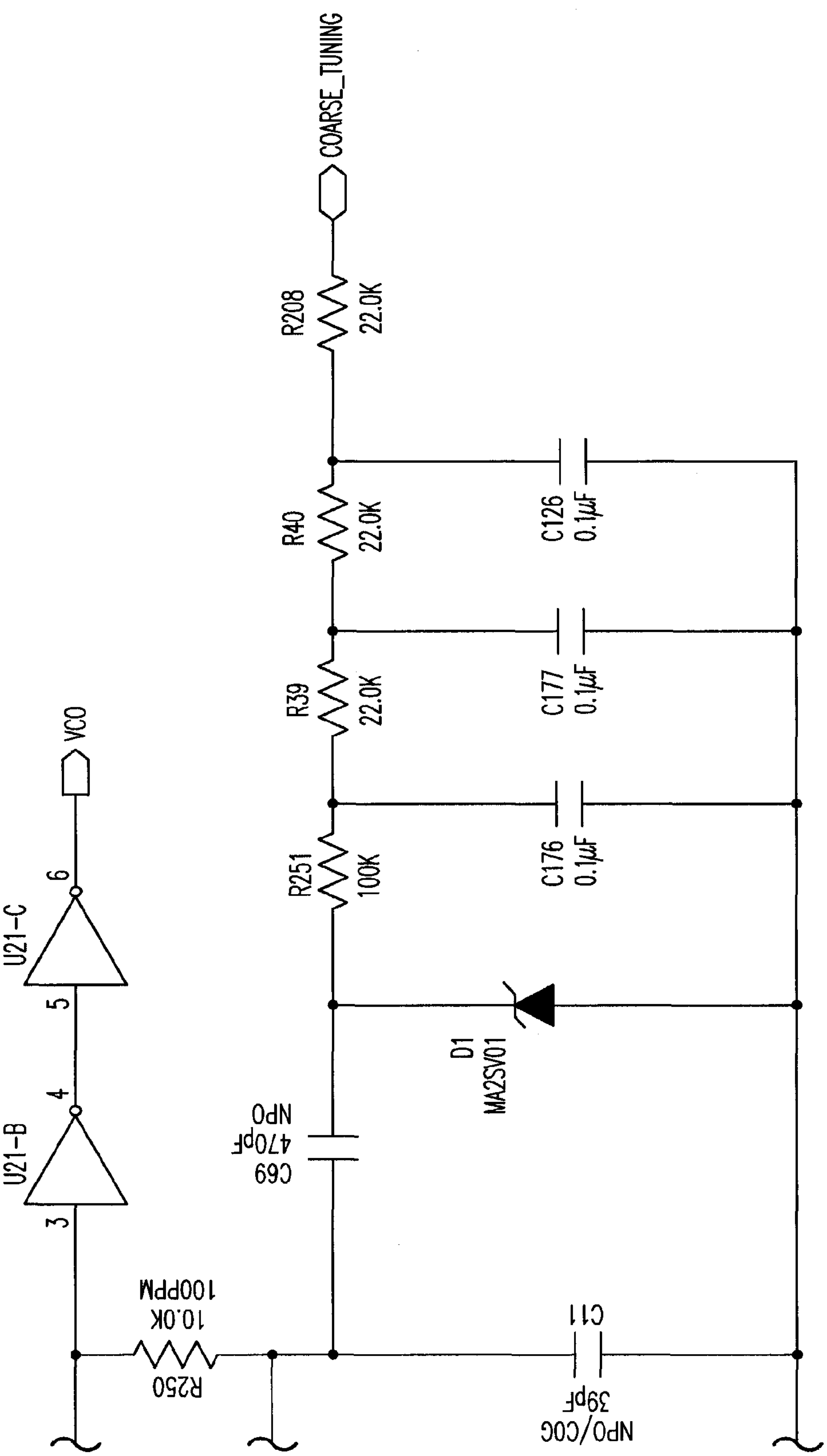
Figures 3, 23M:
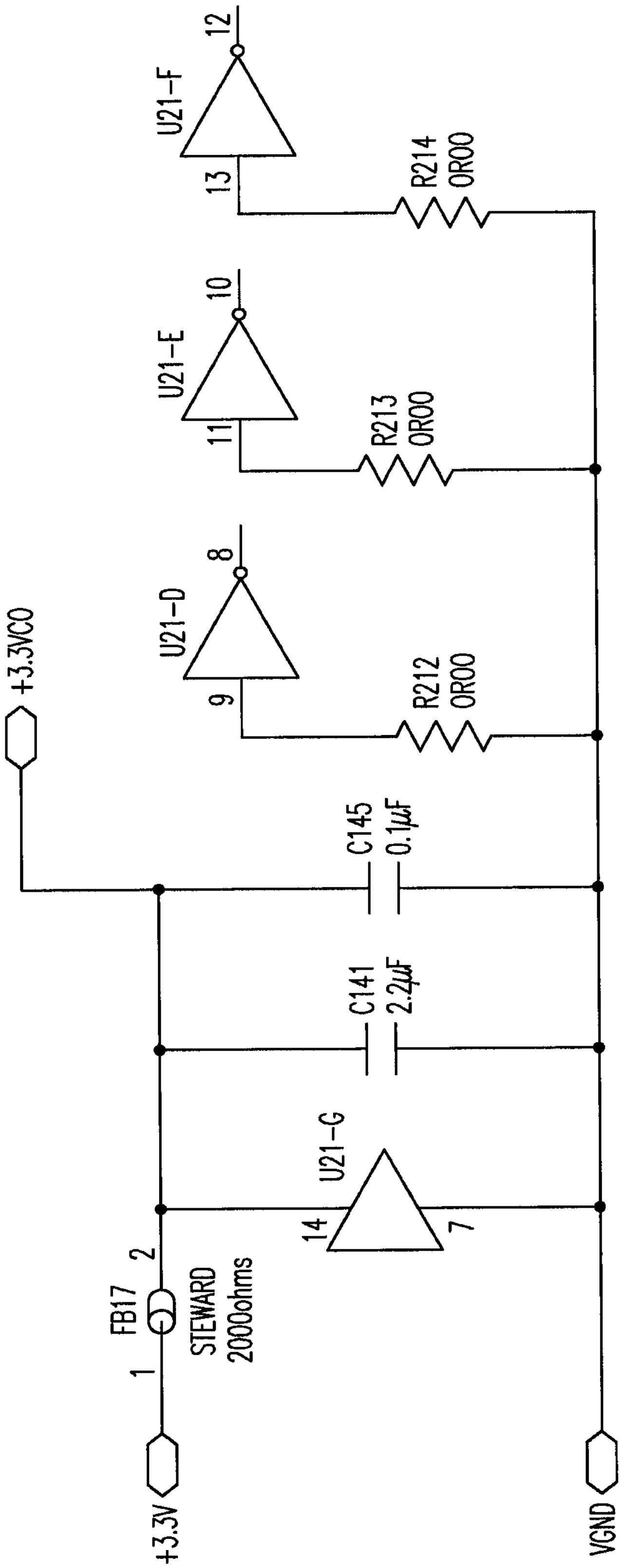
Figure 23N:
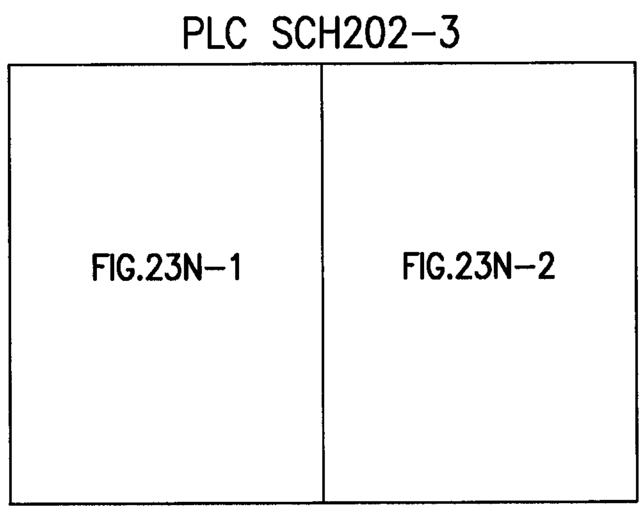
Figures 1, 23N:
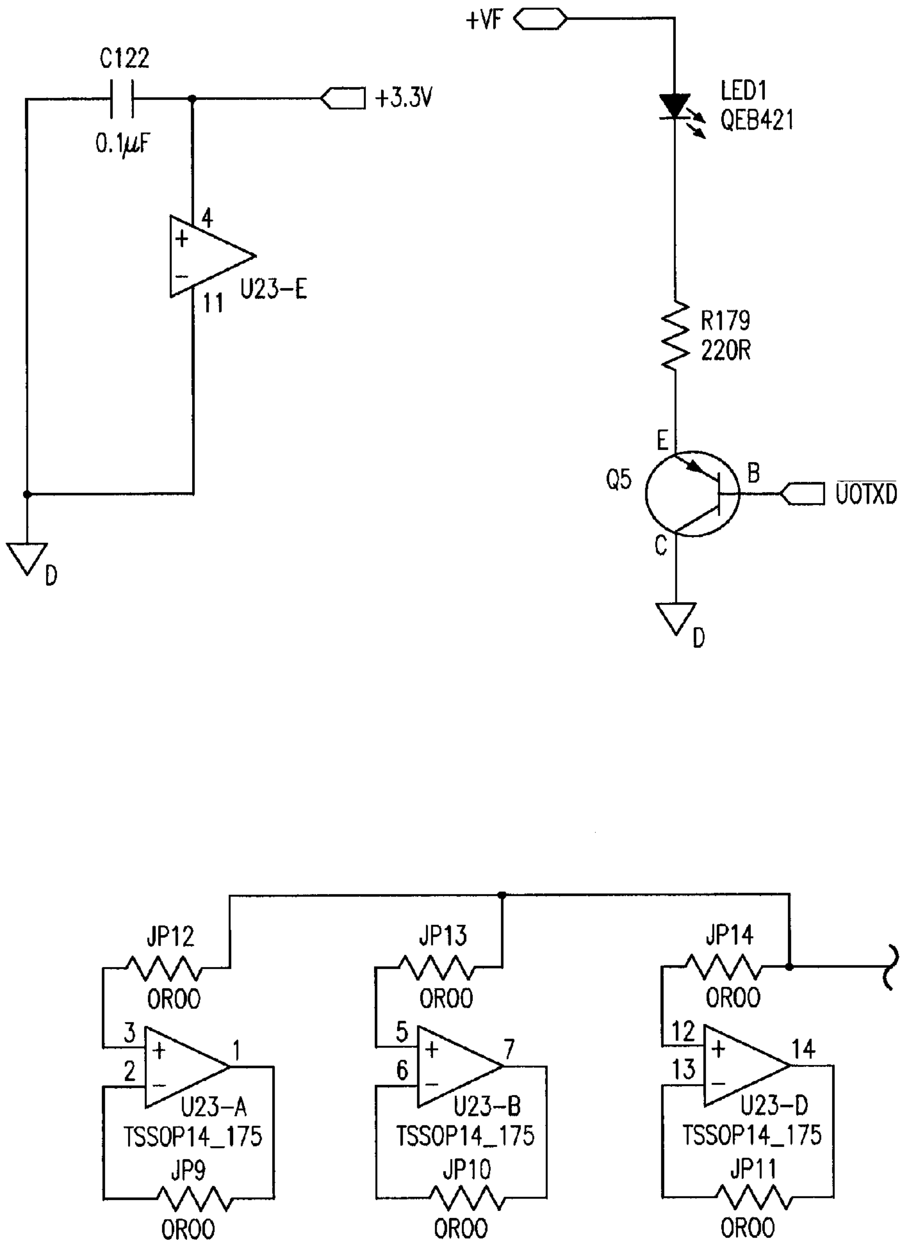
Figures 2, 23N:
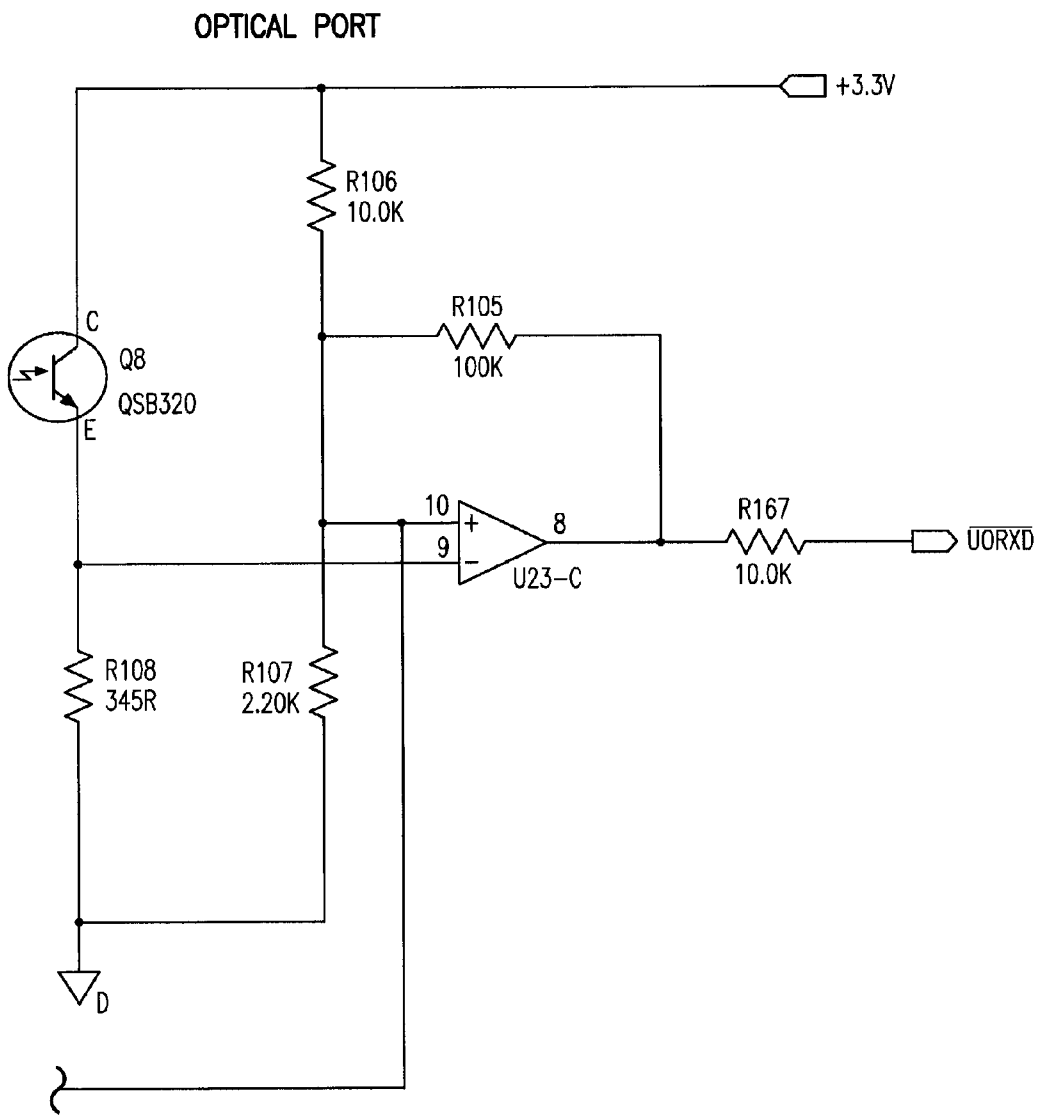
Figure 230:
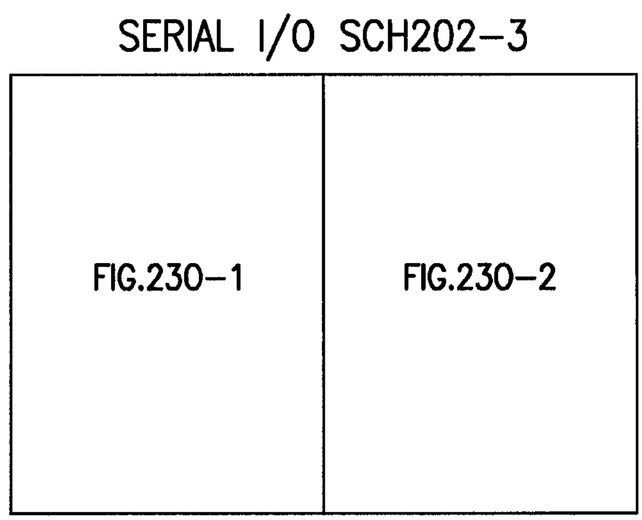
Figures 1, 23O:
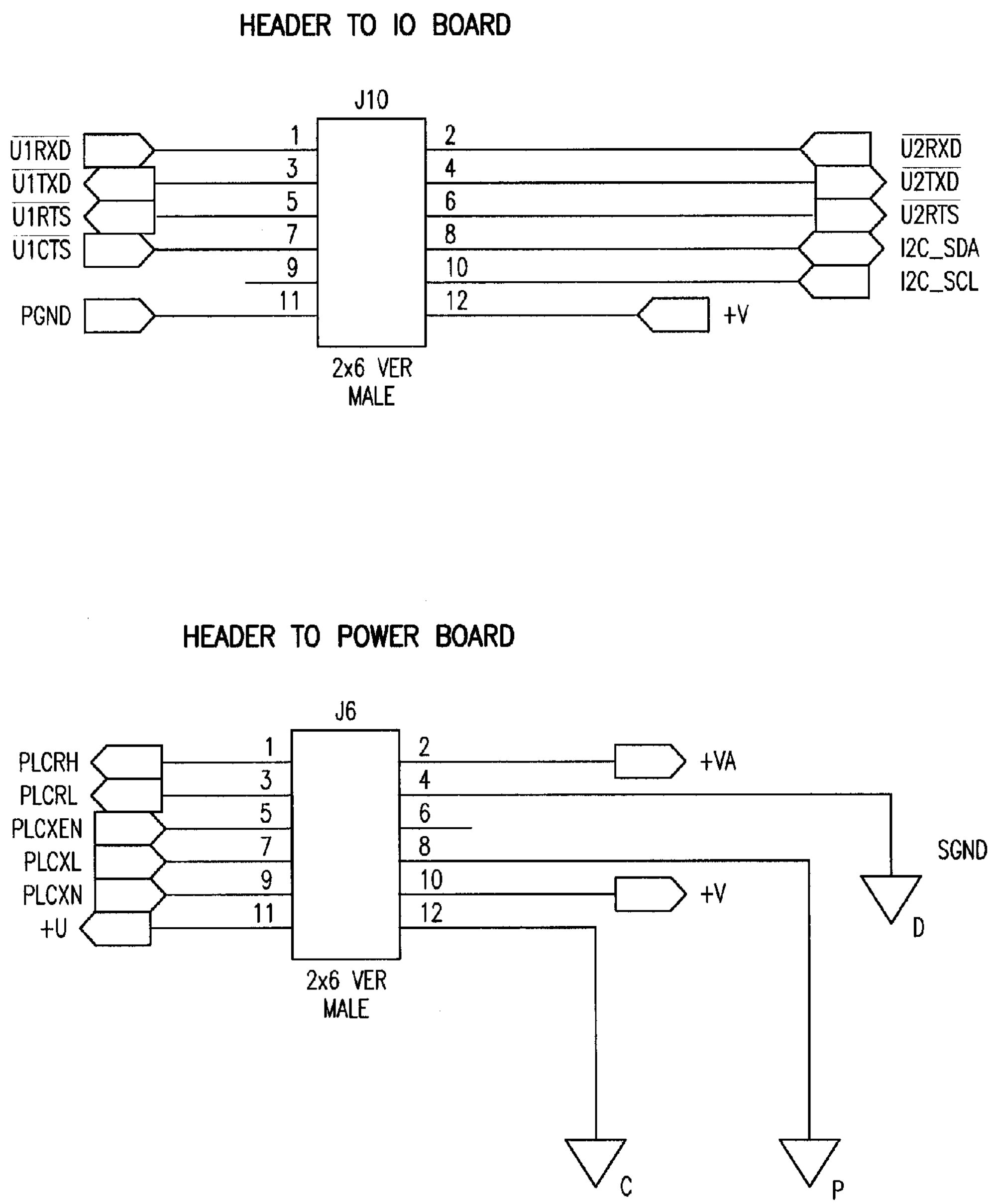
Figures 2, 23O:
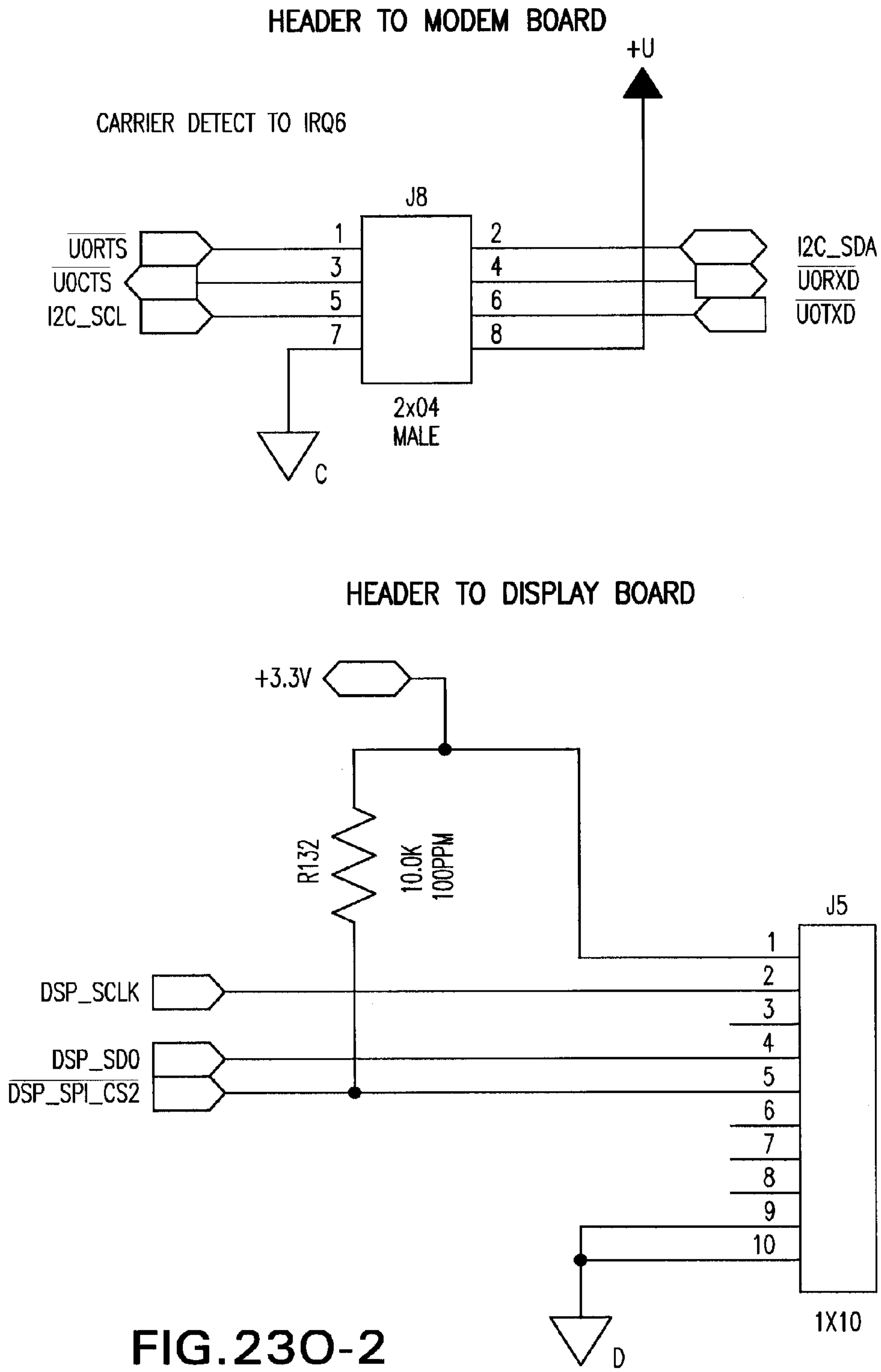
Figure 23P:
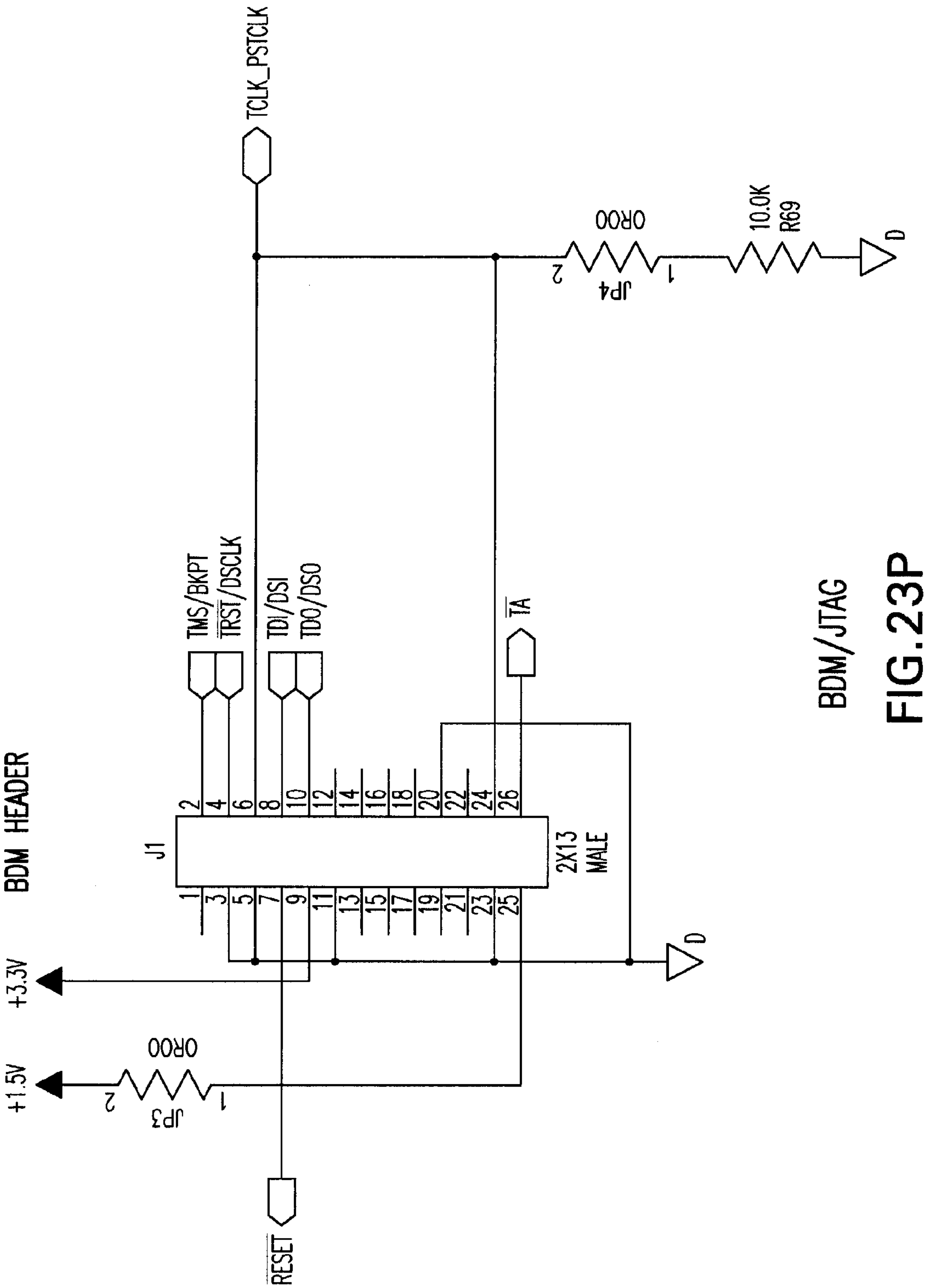
Figure 23Q:
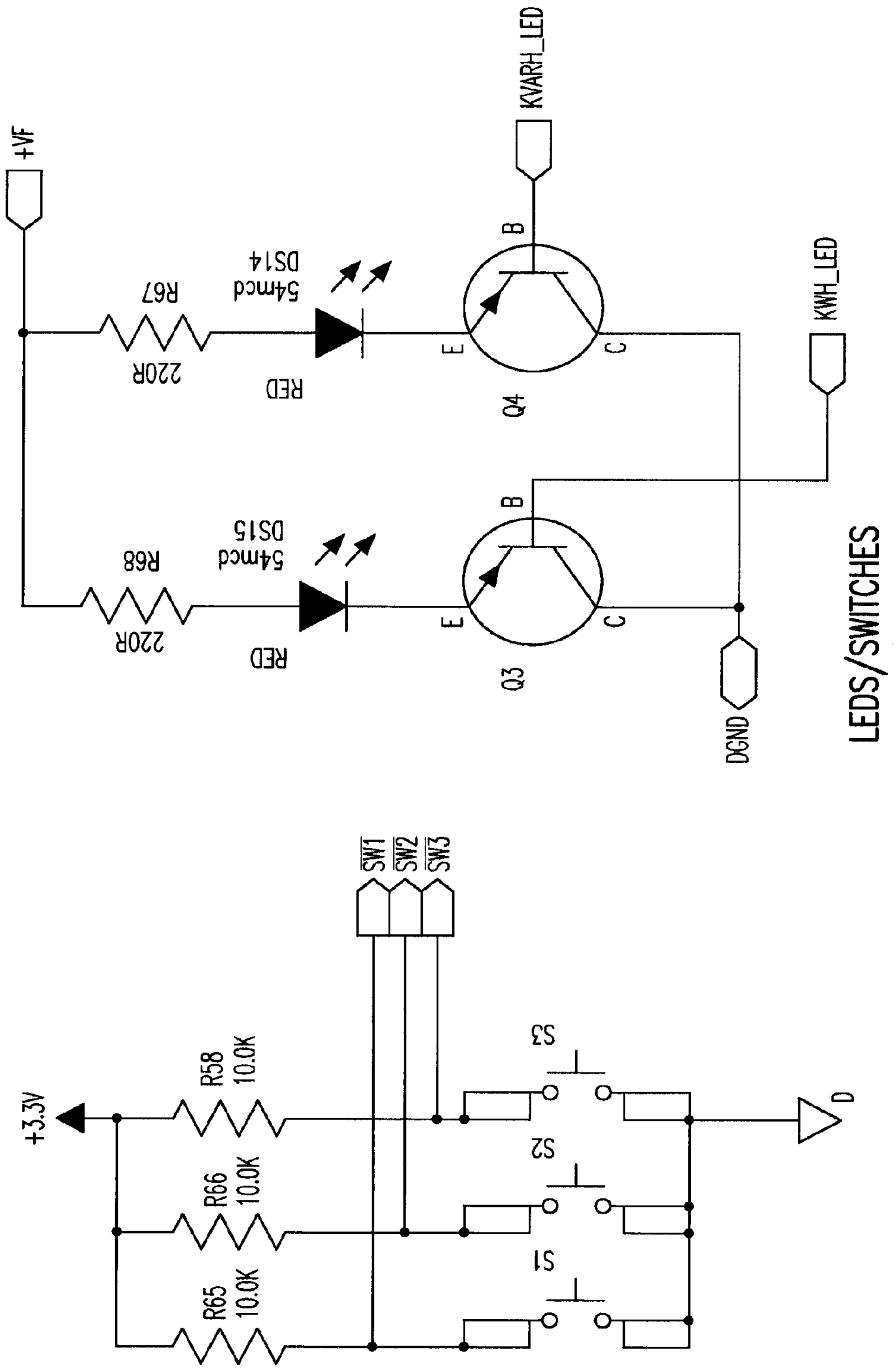
Figures 1, 23R:
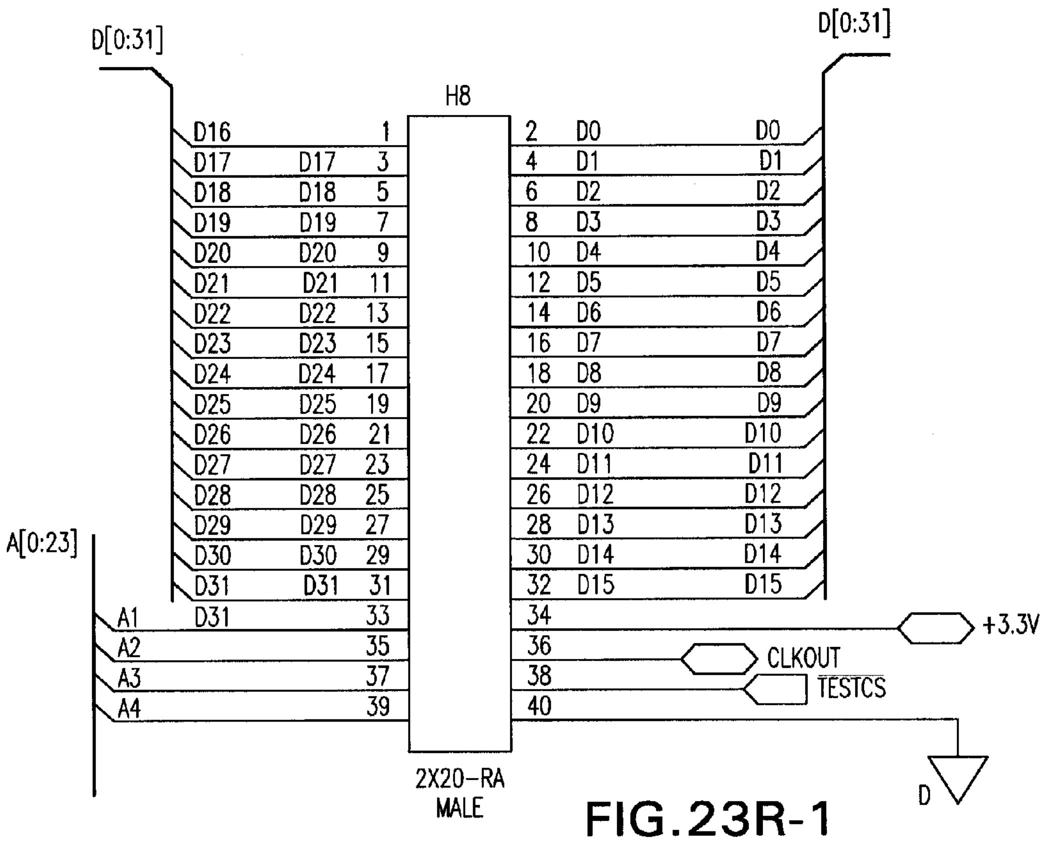
Figures 2, 23R:
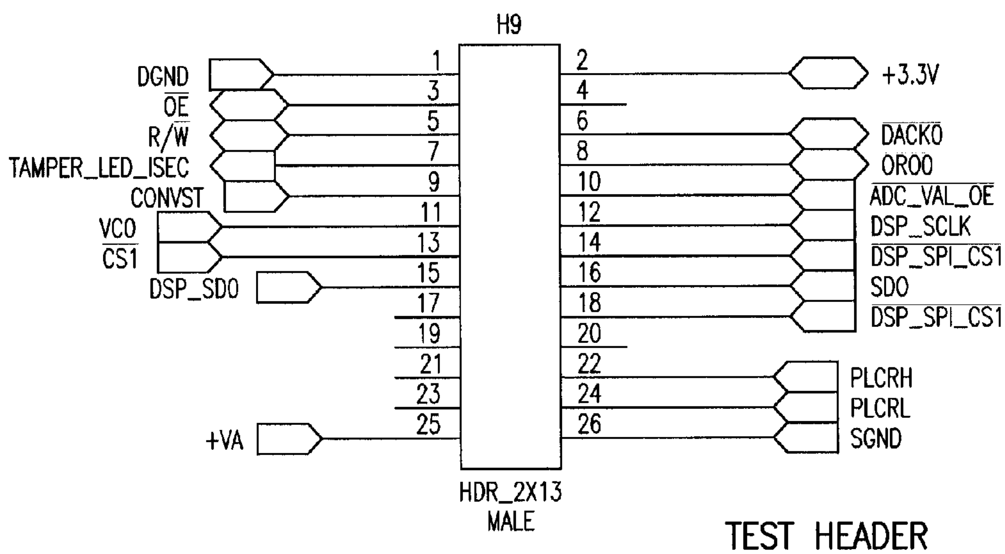
Figures 1, 24A:
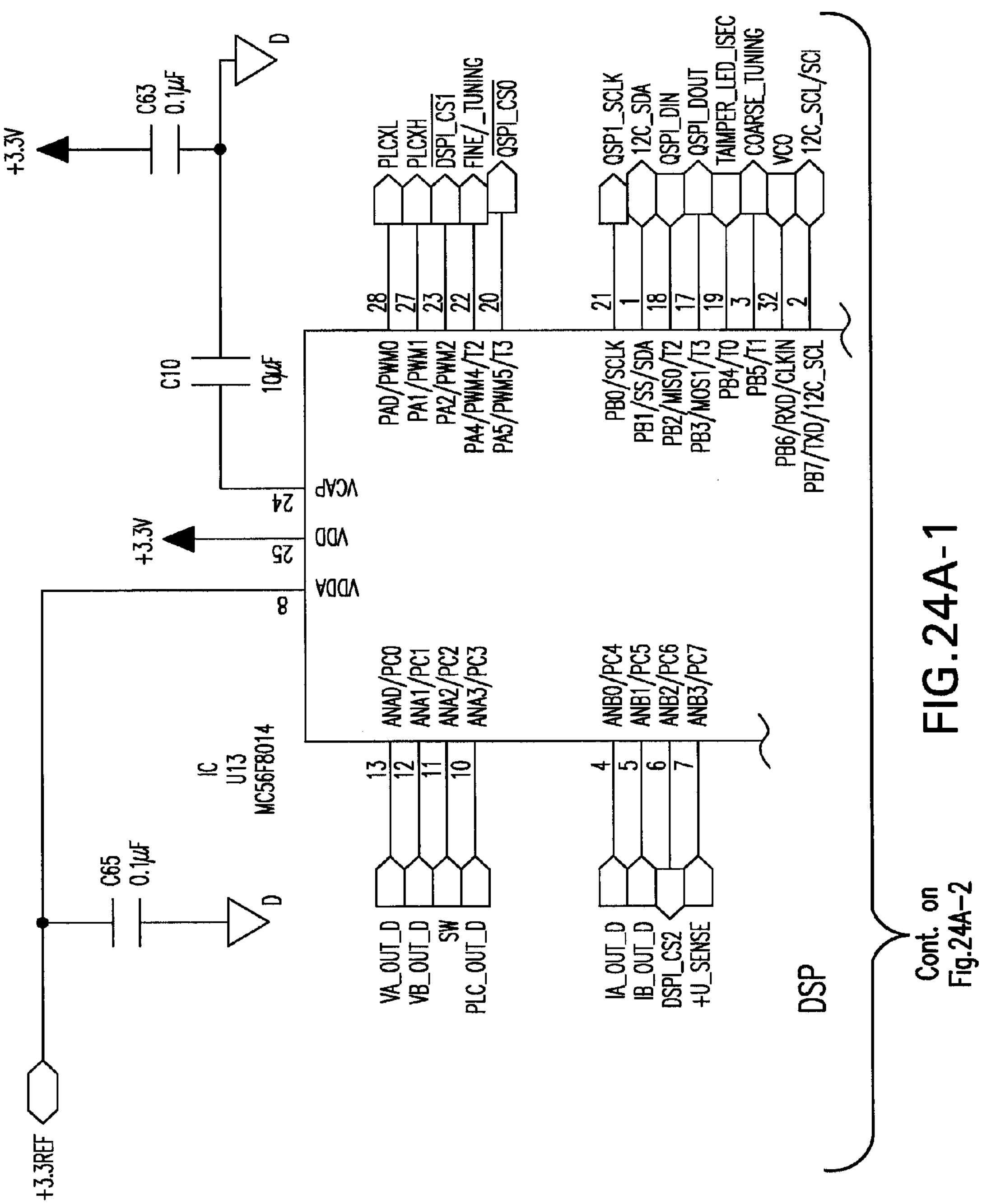
FIGS. 24A-N have preferred schematics for metering, power supply, and PLC transmit and receive circuitry for a residential meter (PCB 240).
Figures 2, 24A:
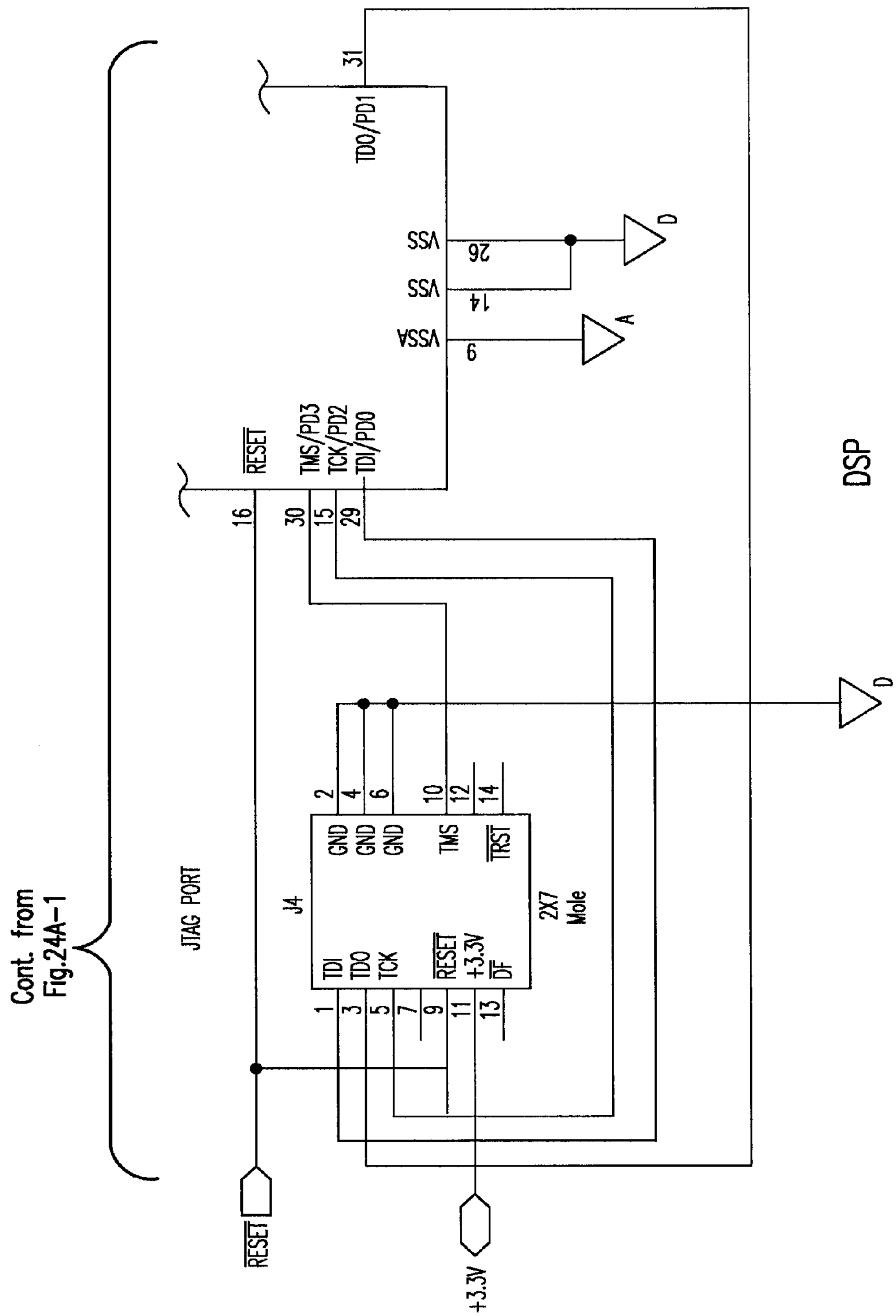
Figures 3, 24A:
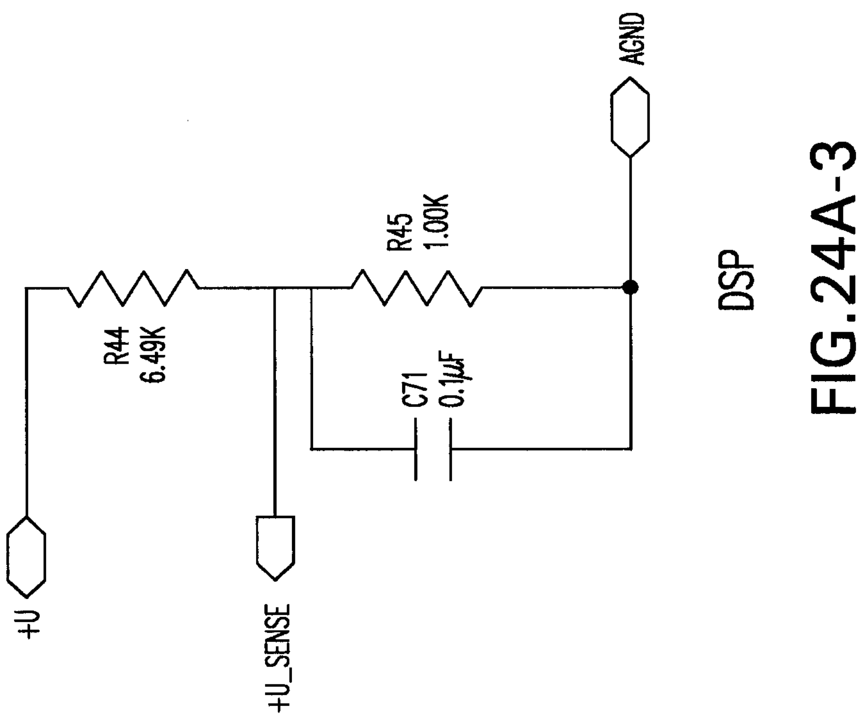
Figure 24B:
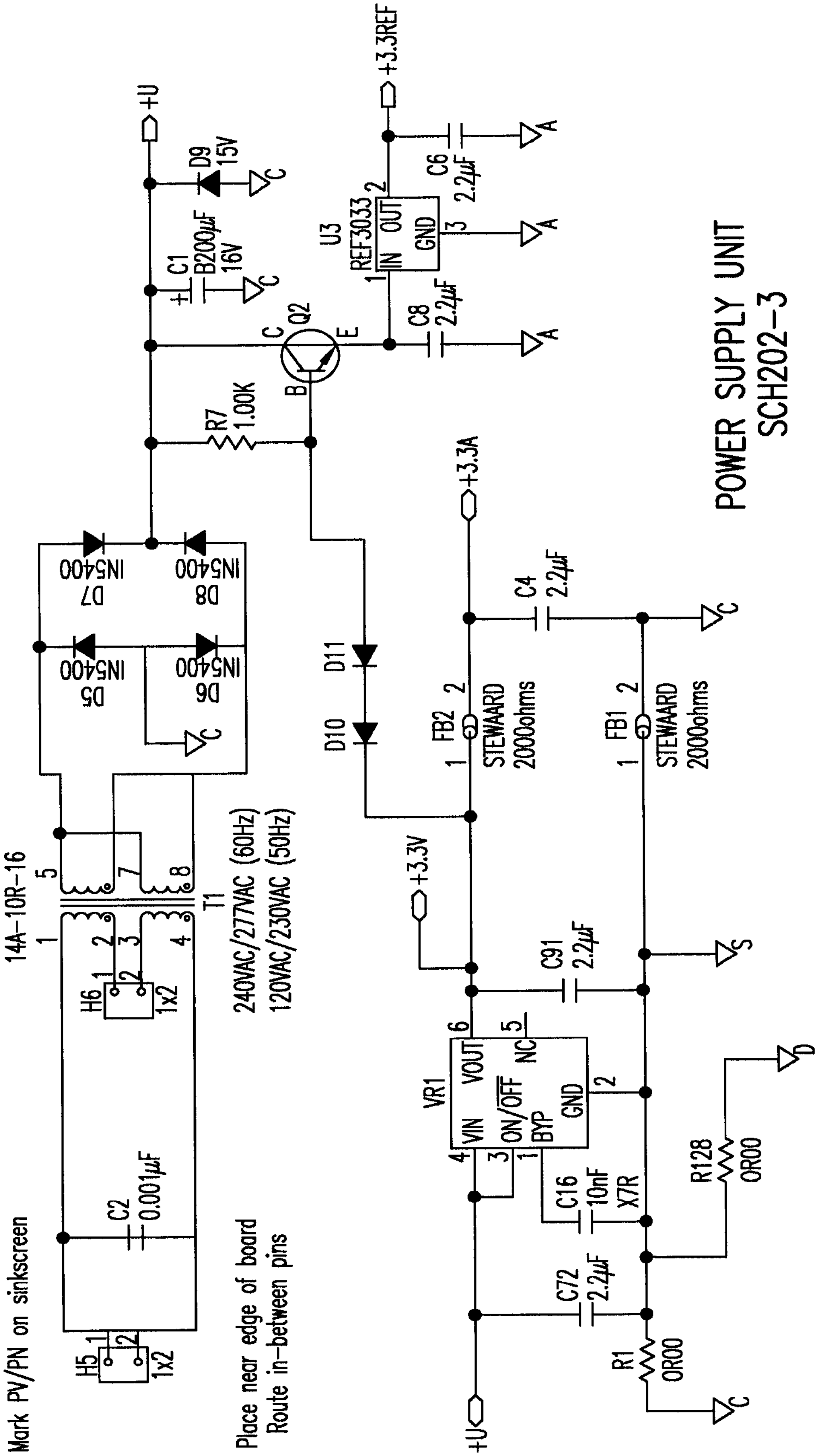
Figure 24C:
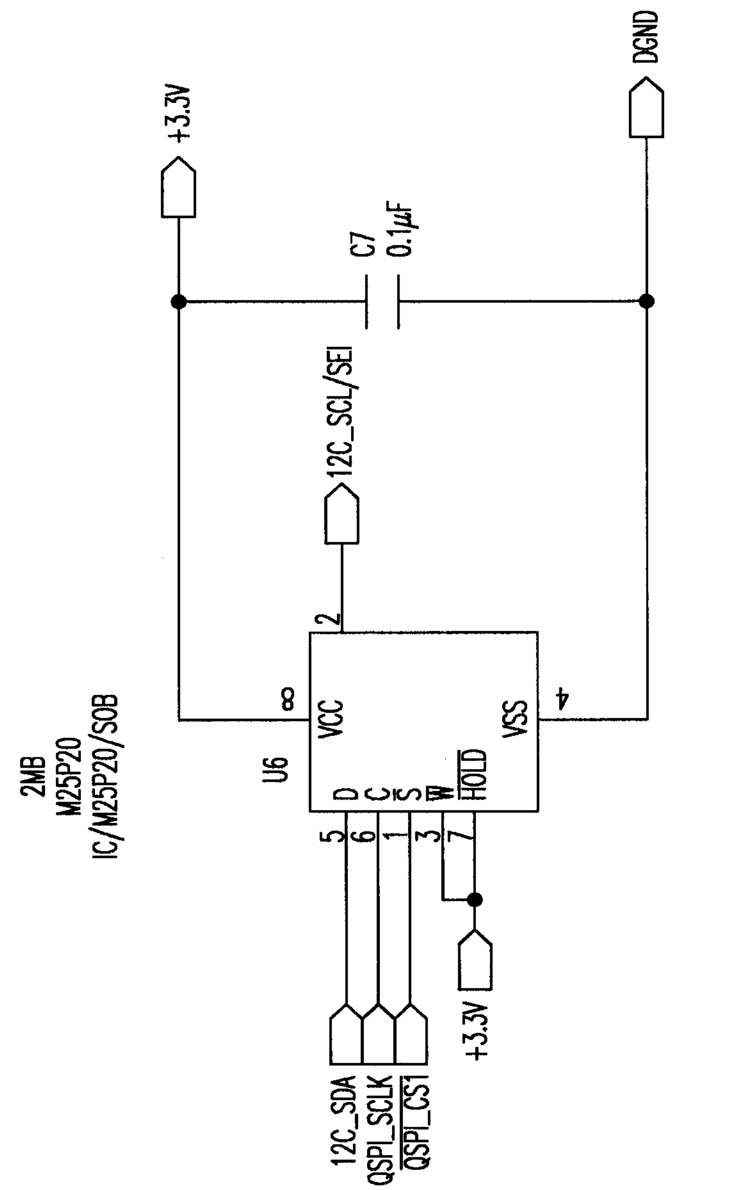
Figure 24D:
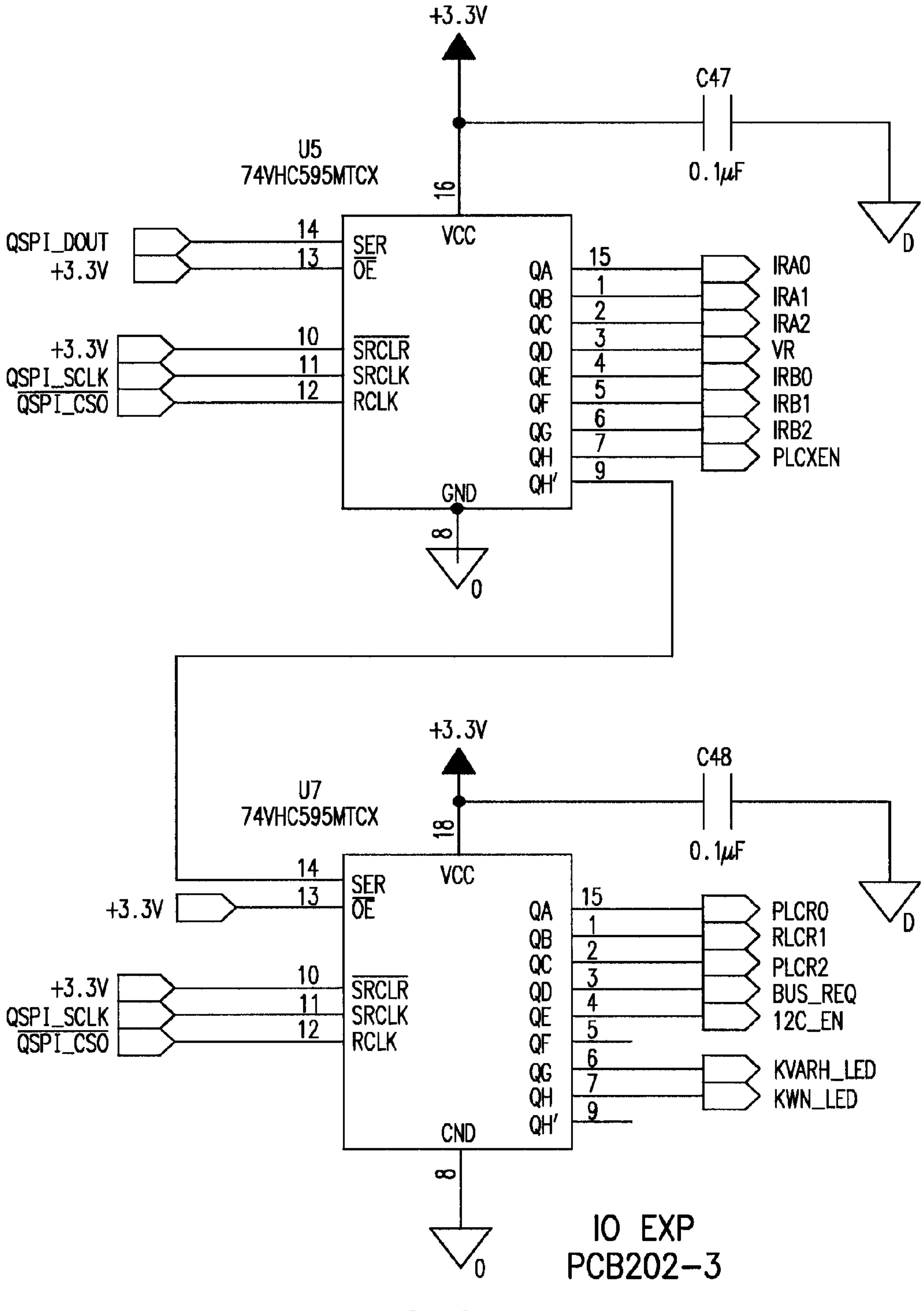
Figures 1, 24E:
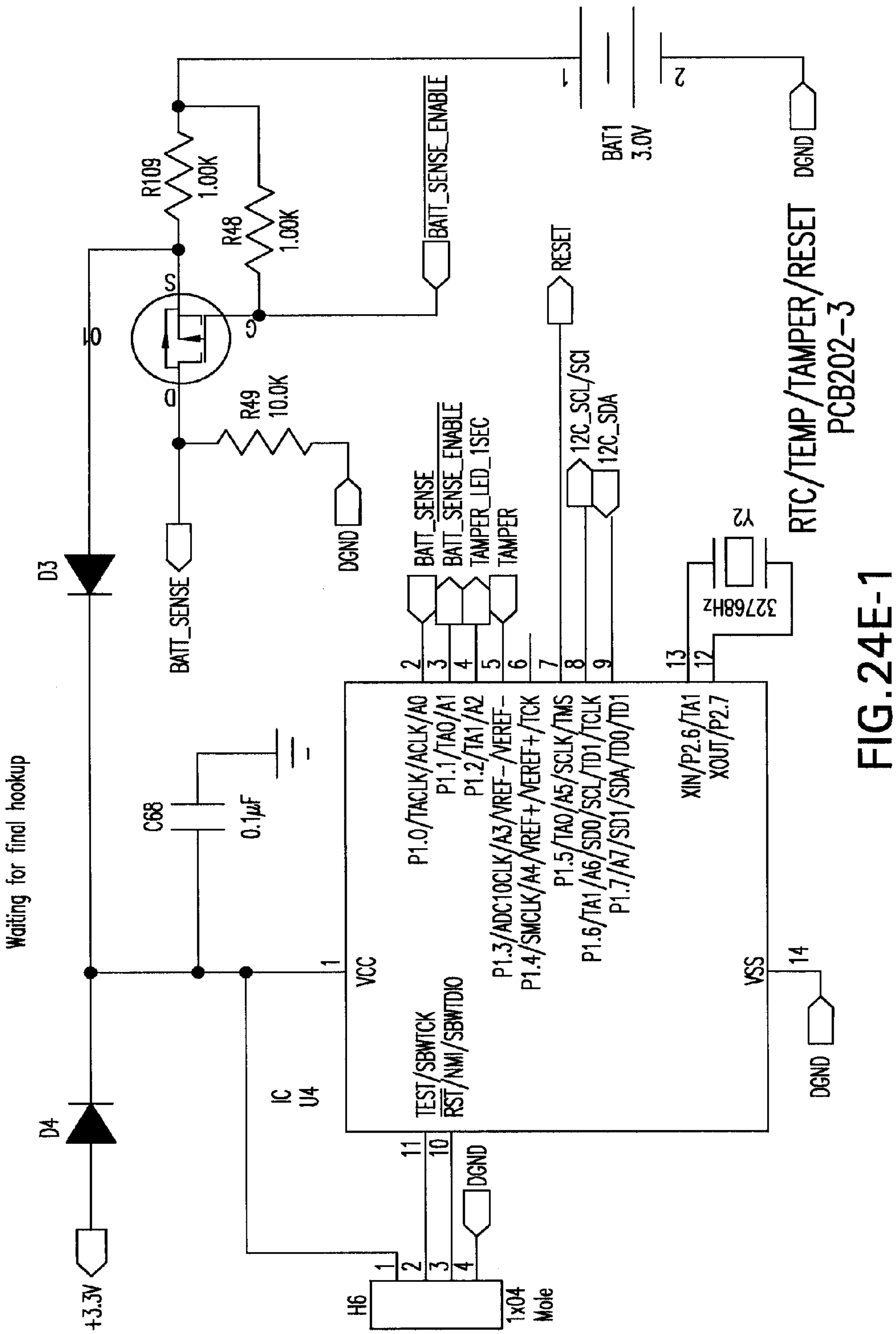
Figures 2, 24E:
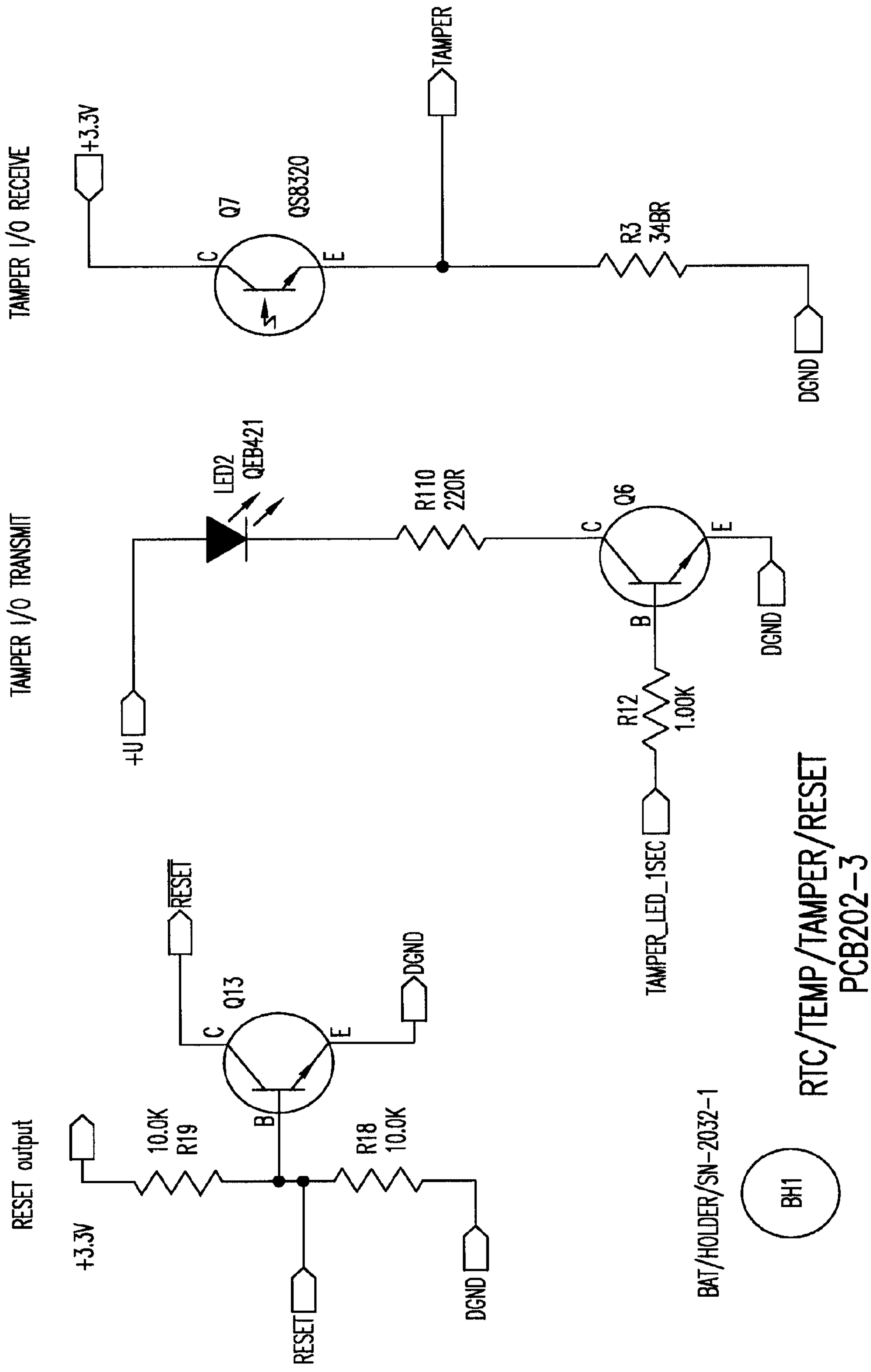
Figures 1, 24F:
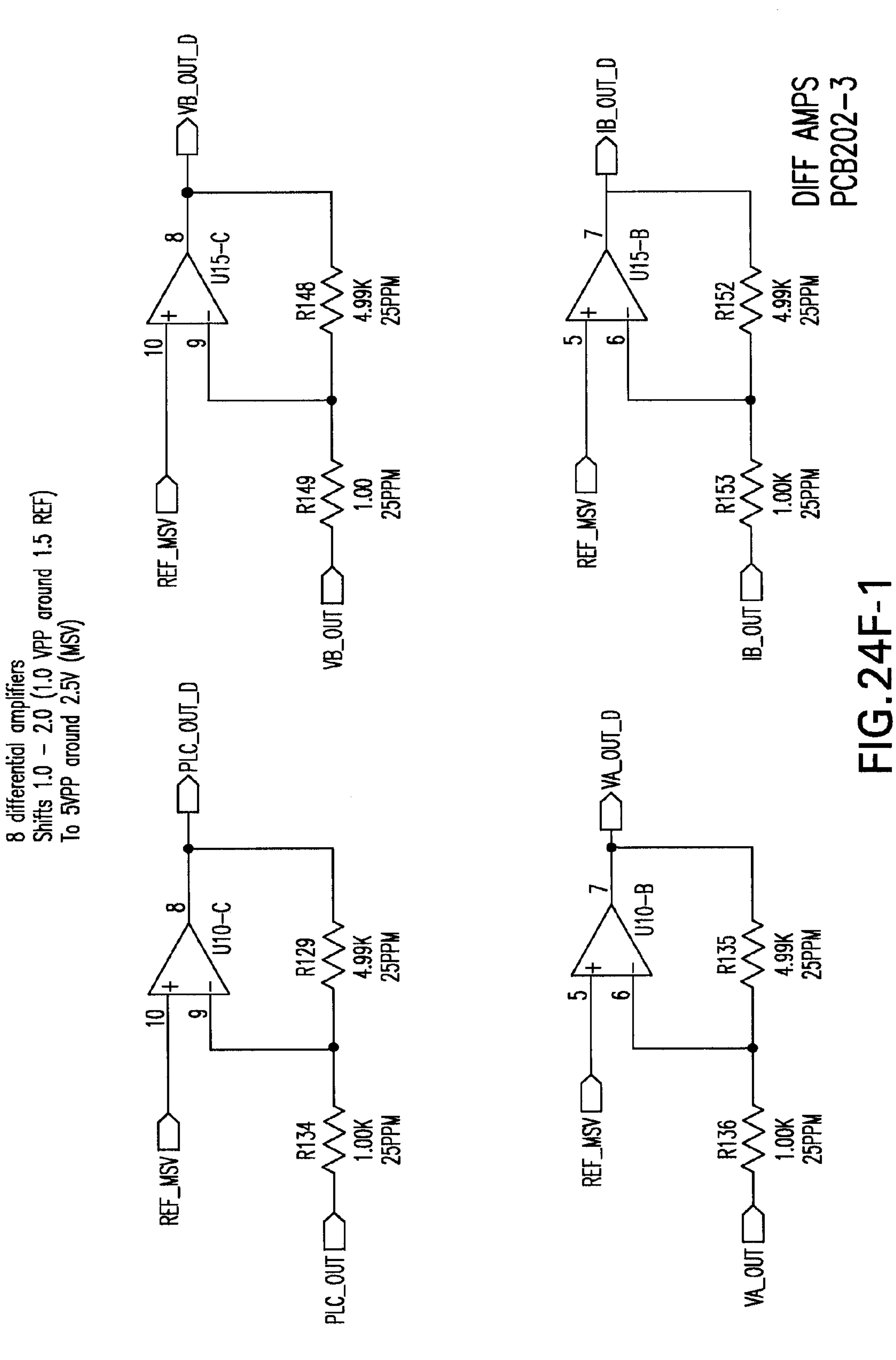
Figures 2, 24F:
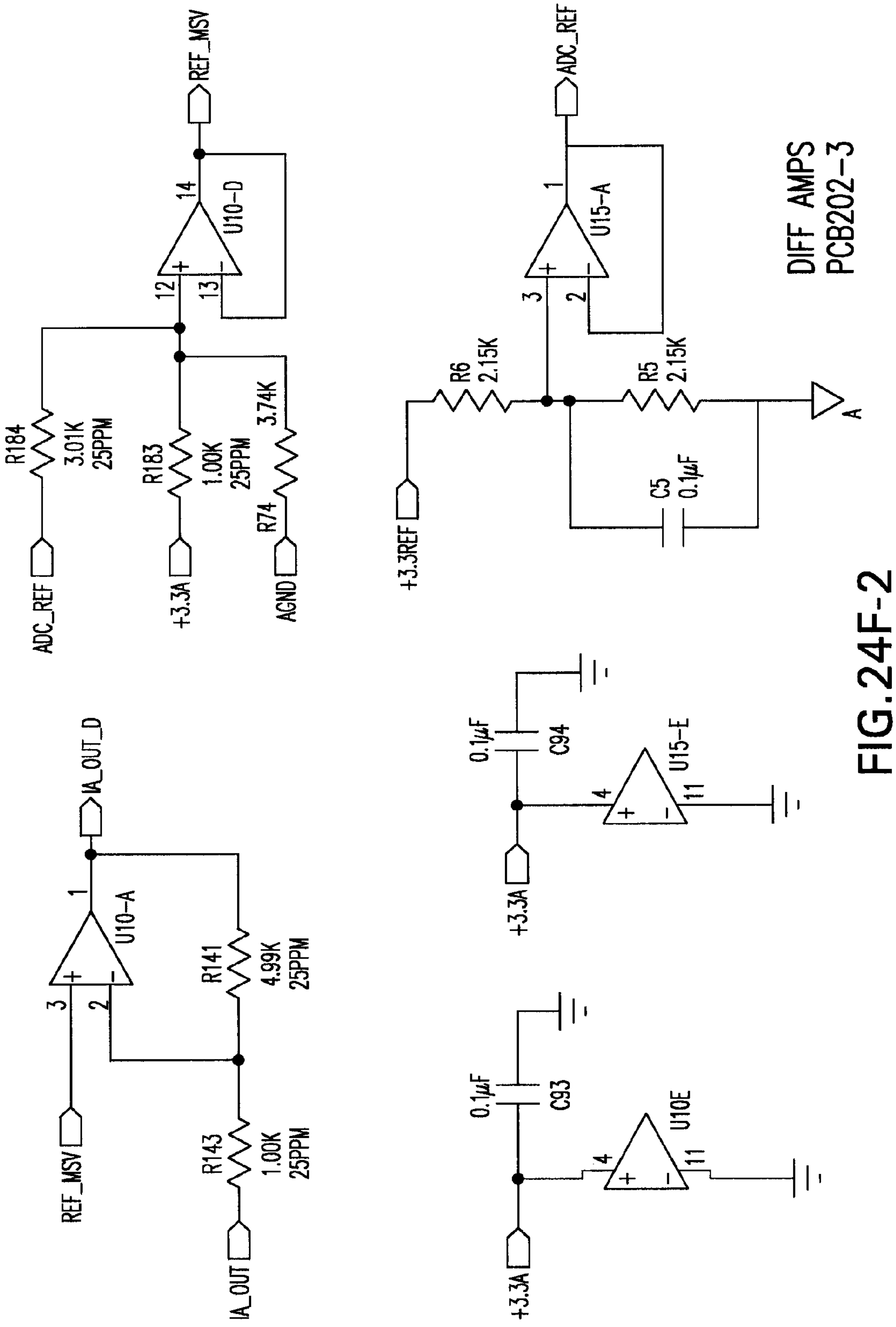
Figures 1, 24G:
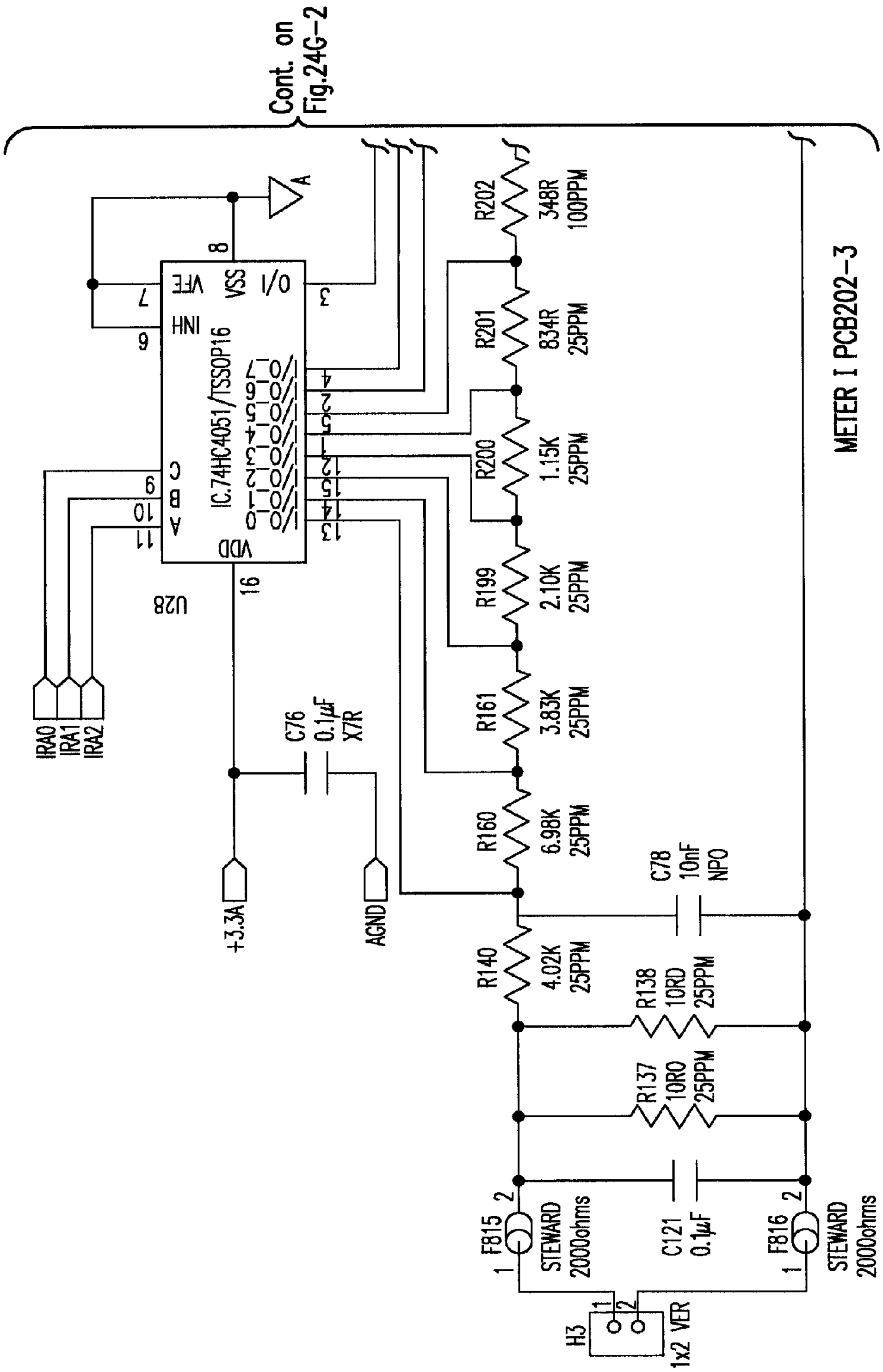
Figures 2, 24G:
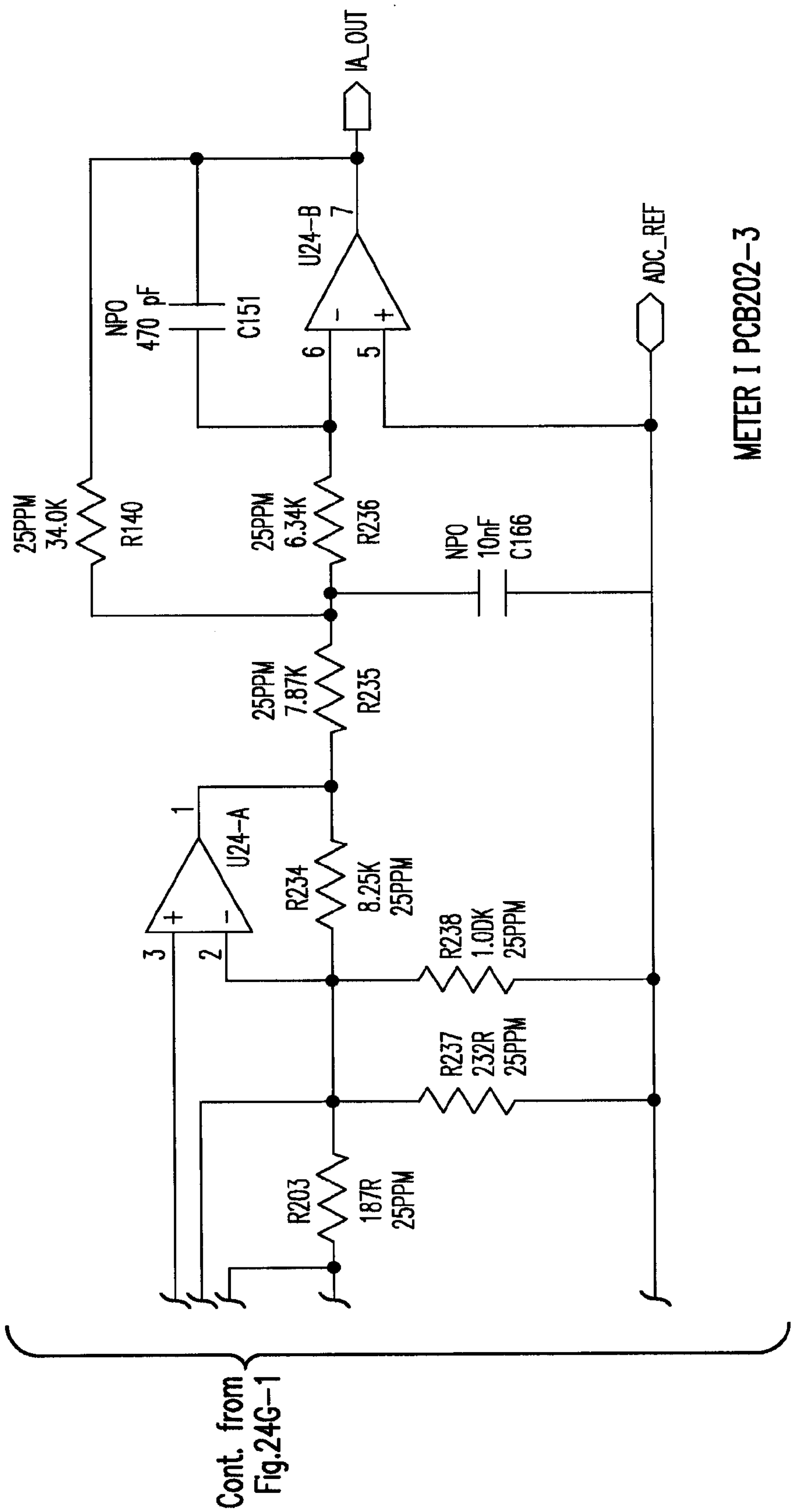
Figures 3, 24G:
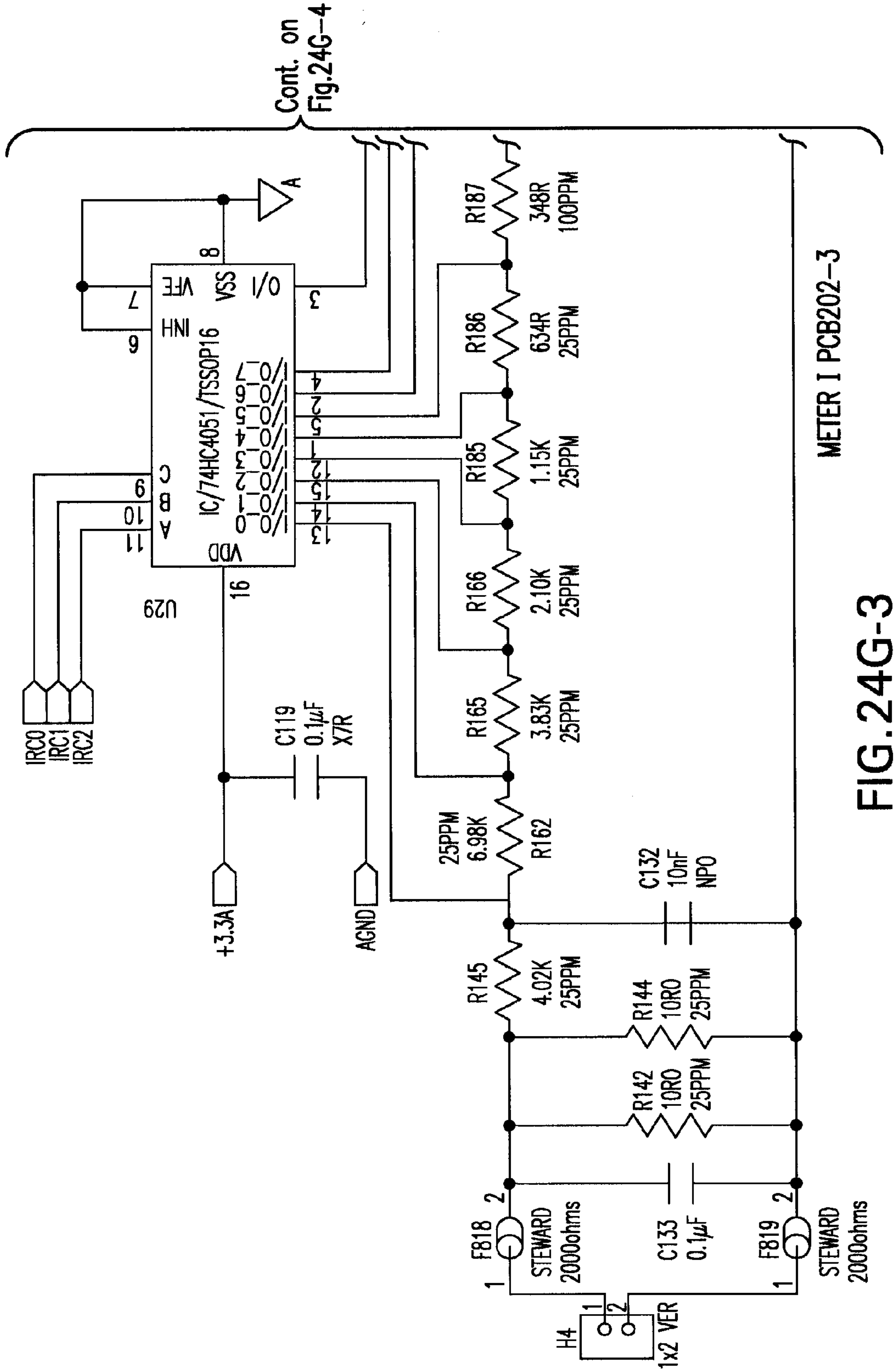
Figures 4, 24G:
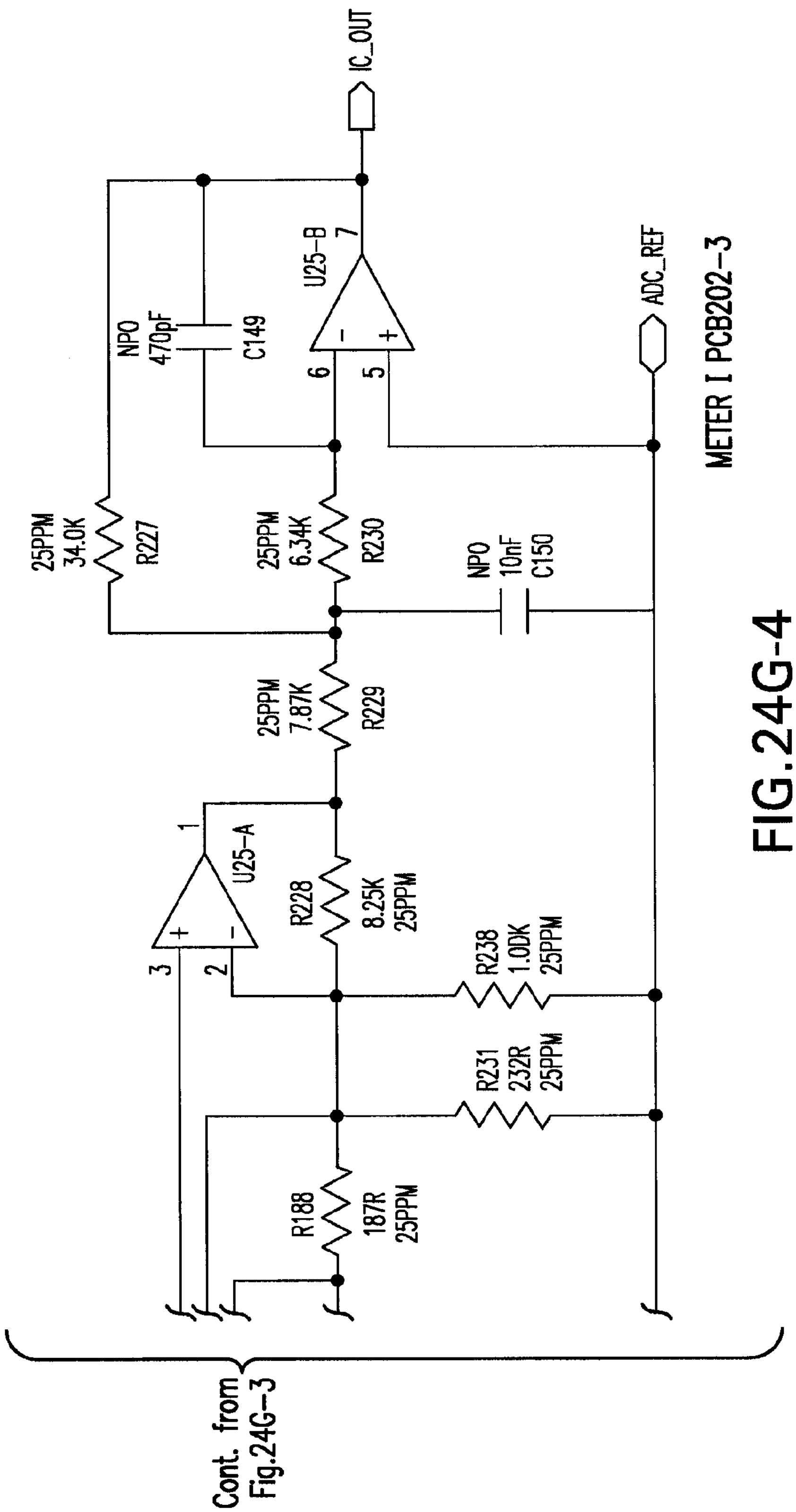
Figures 5, 24G:
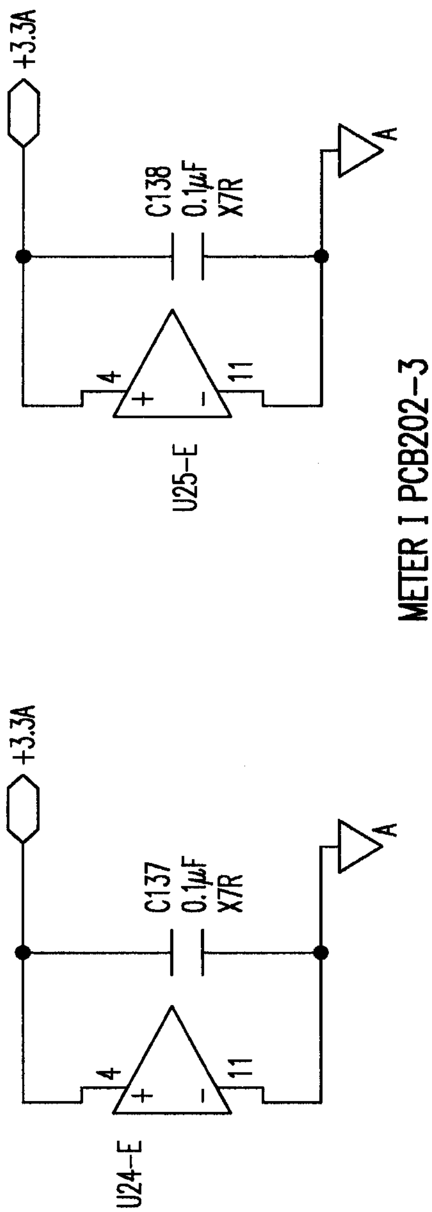
Figures 1, 24H:
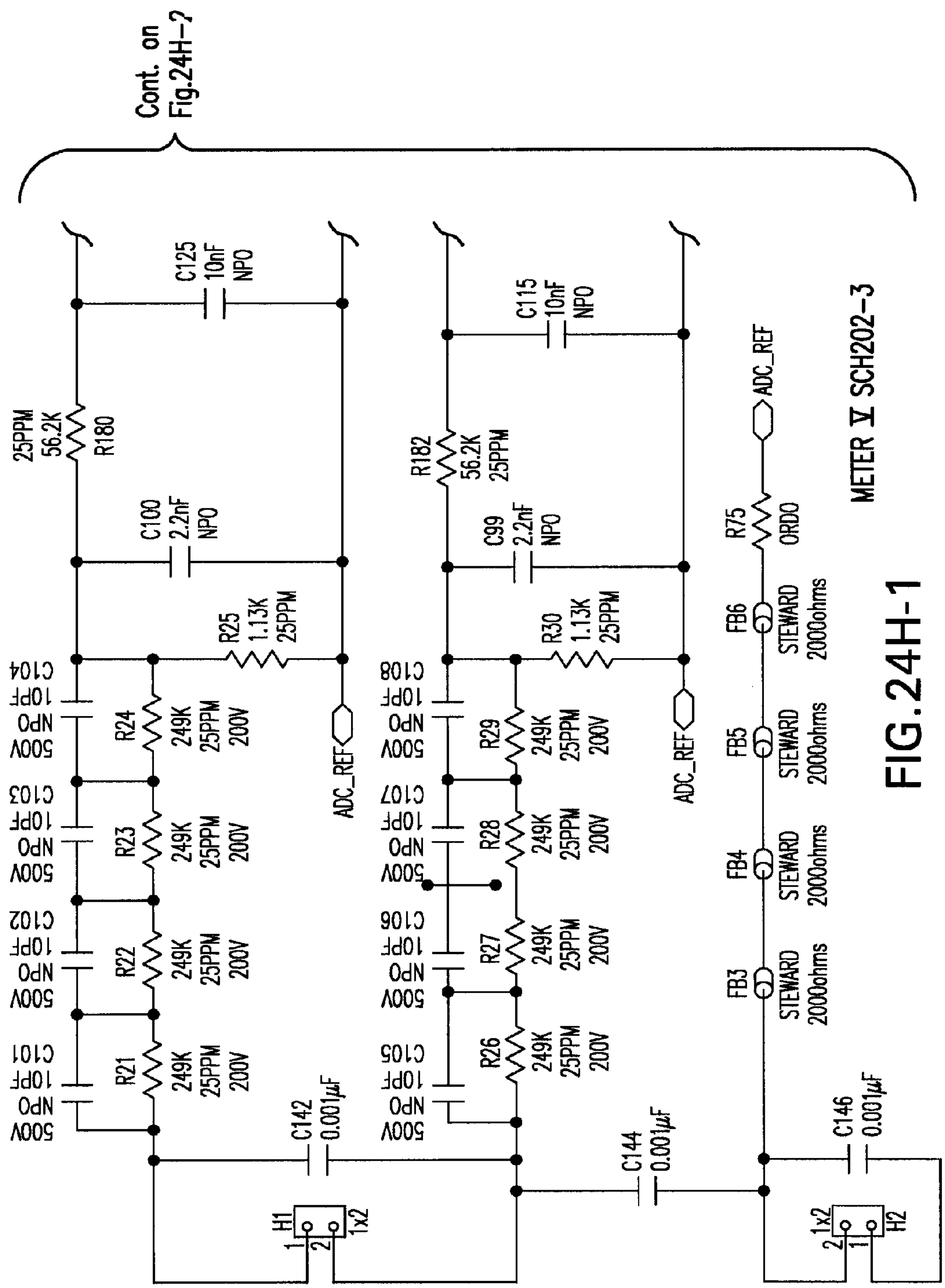
Figures 2, 24H:
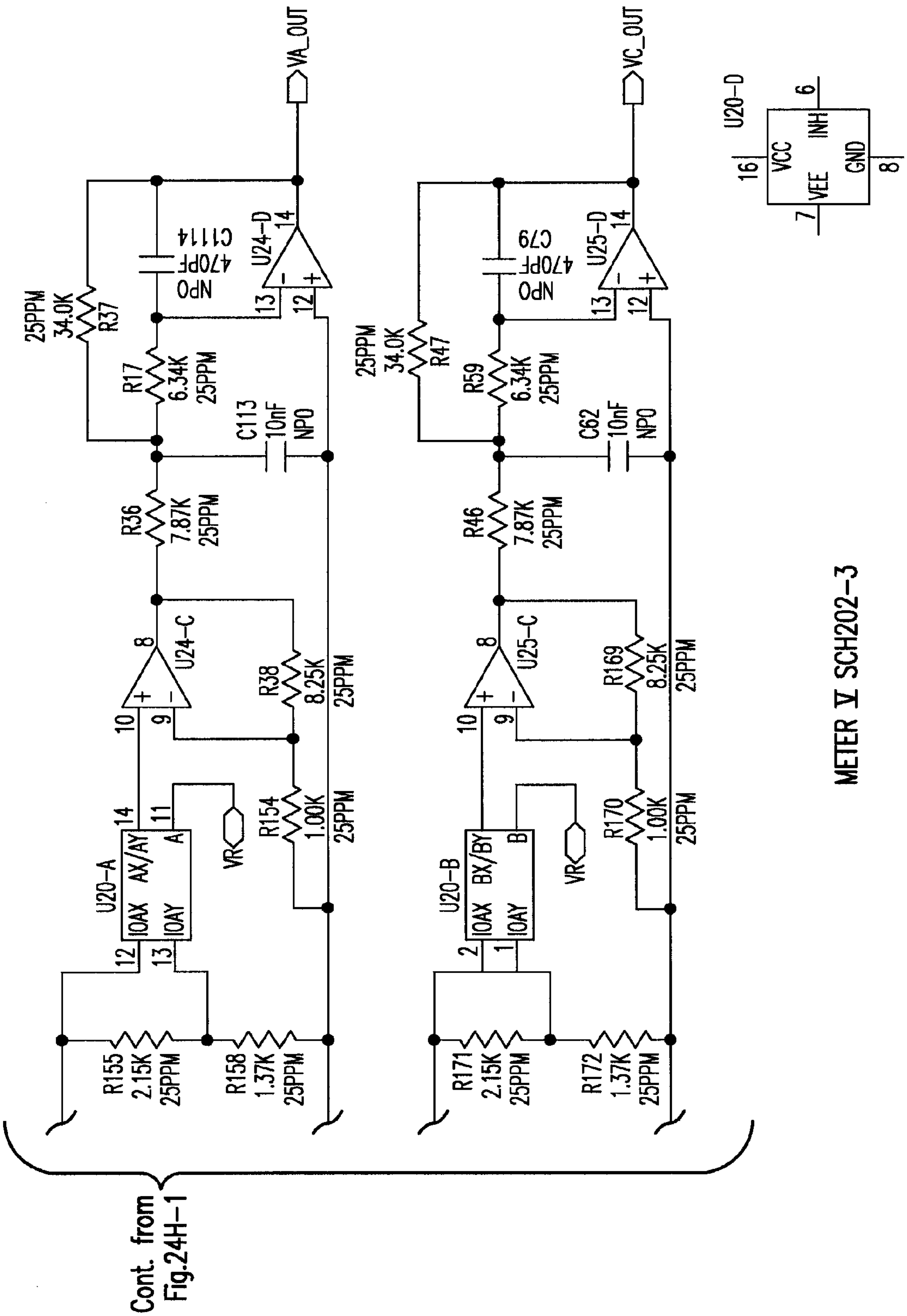
Figures 1, 24I:
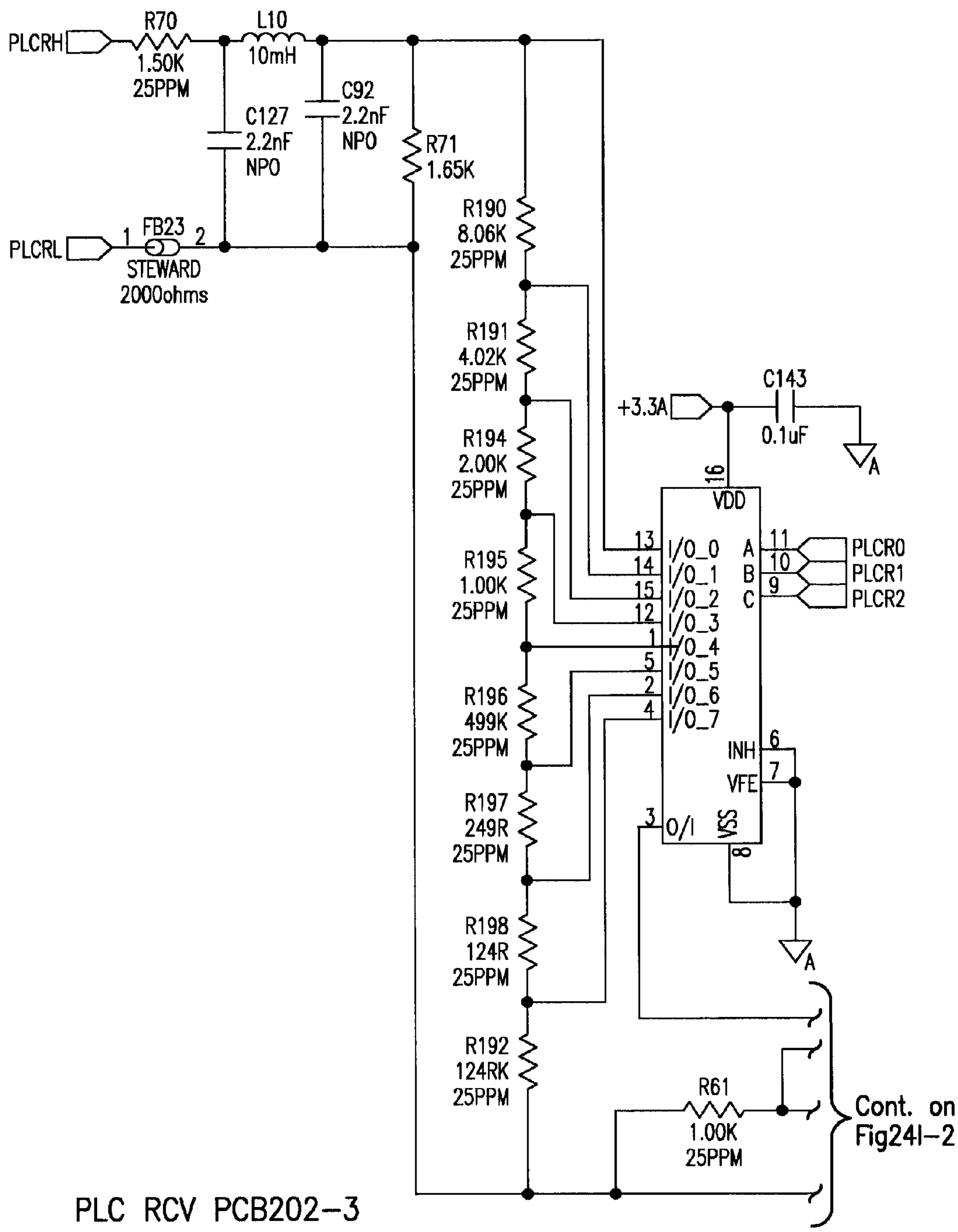
Figures 2, 24I:
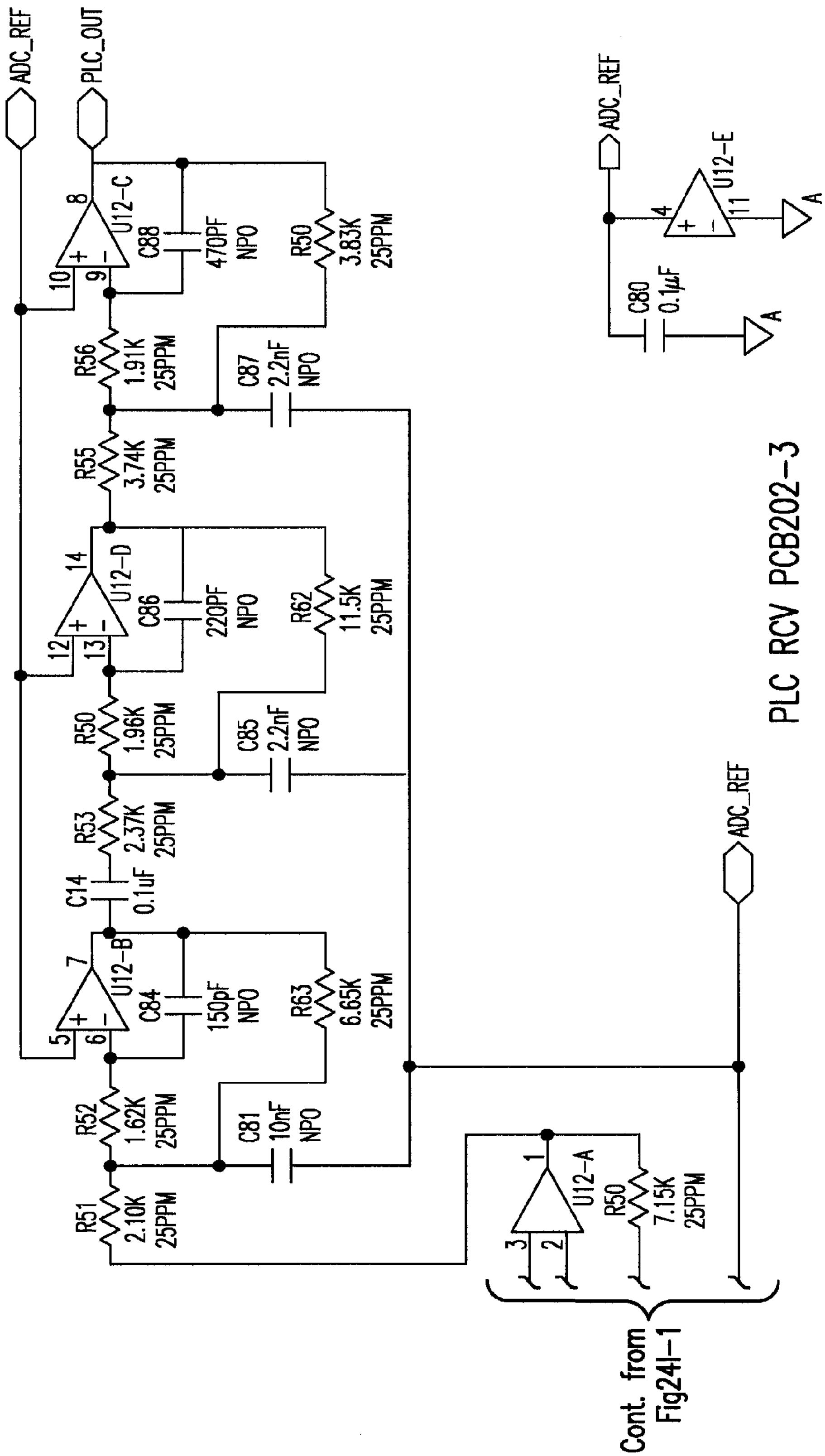
Figure 24J:
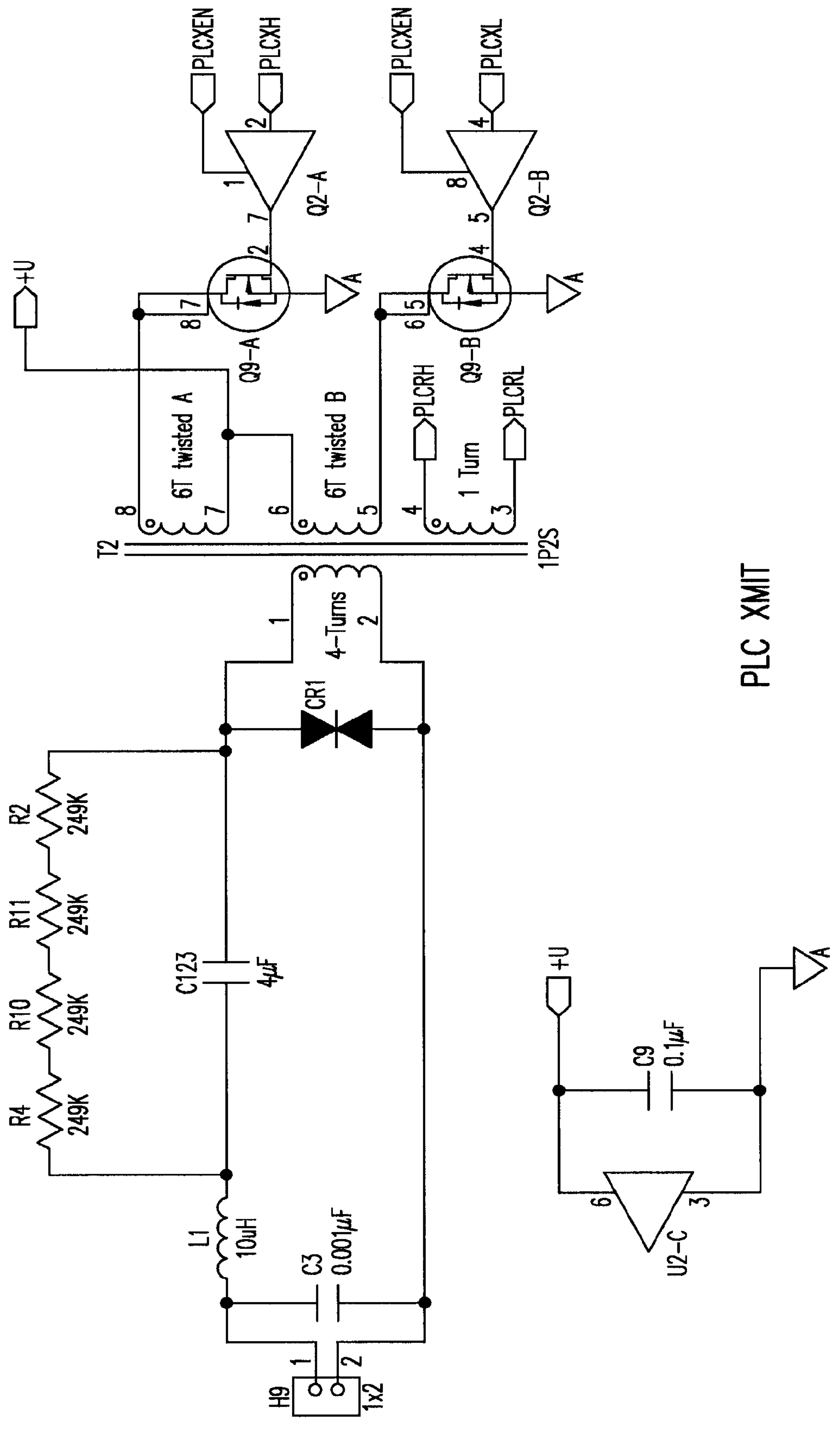
Figure 24K:
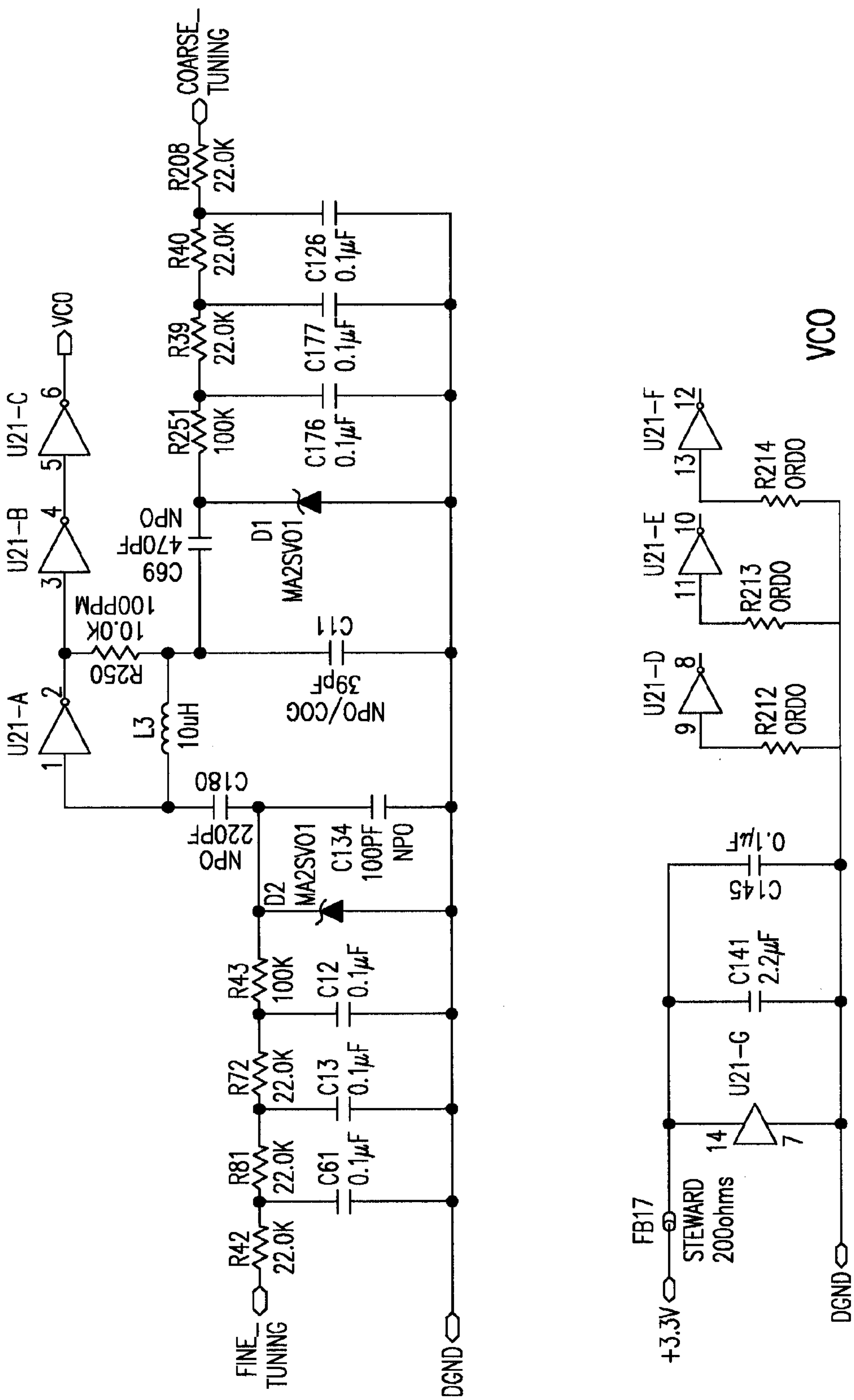
Figure 24L:
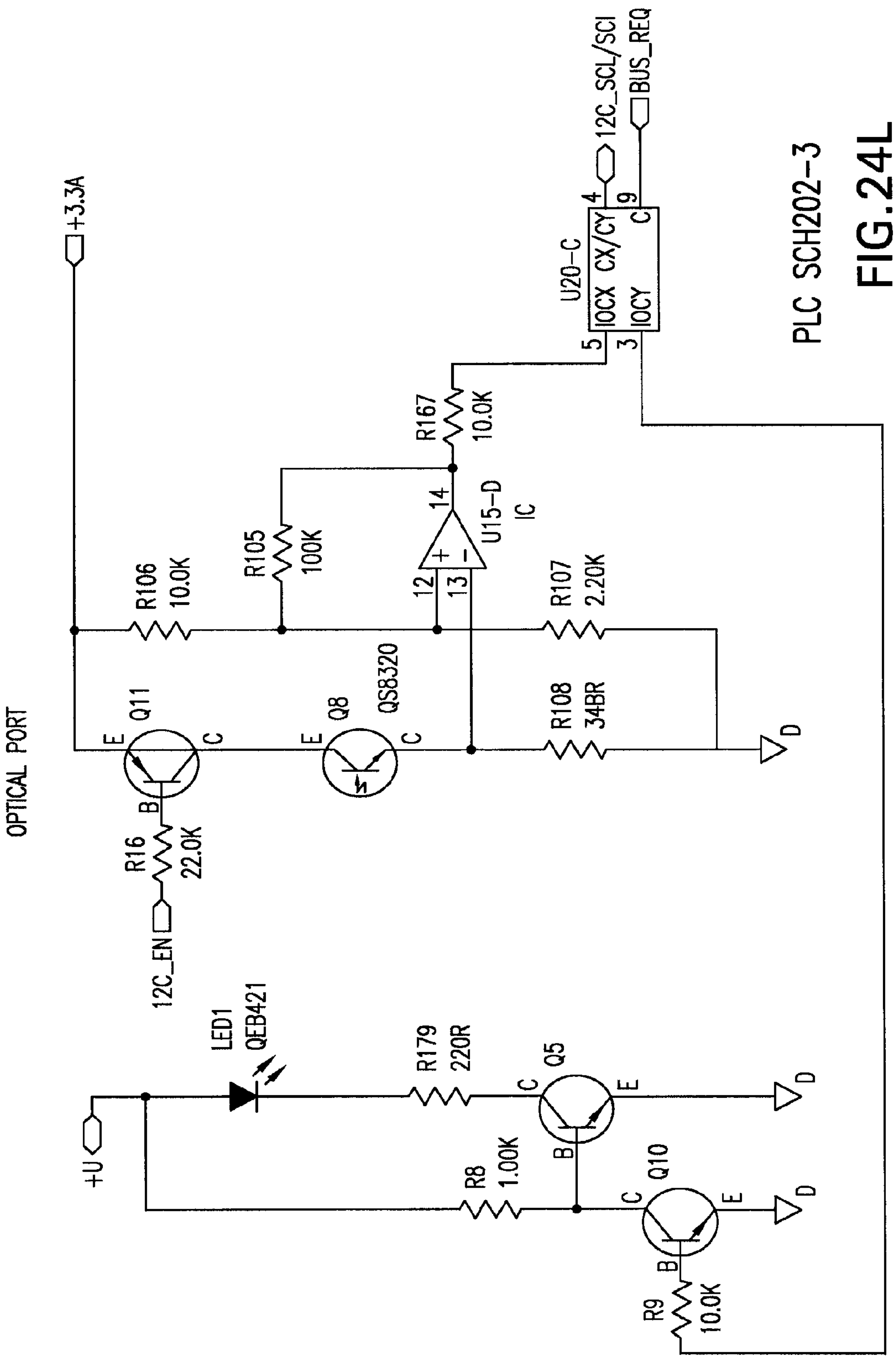
Figure 24M:
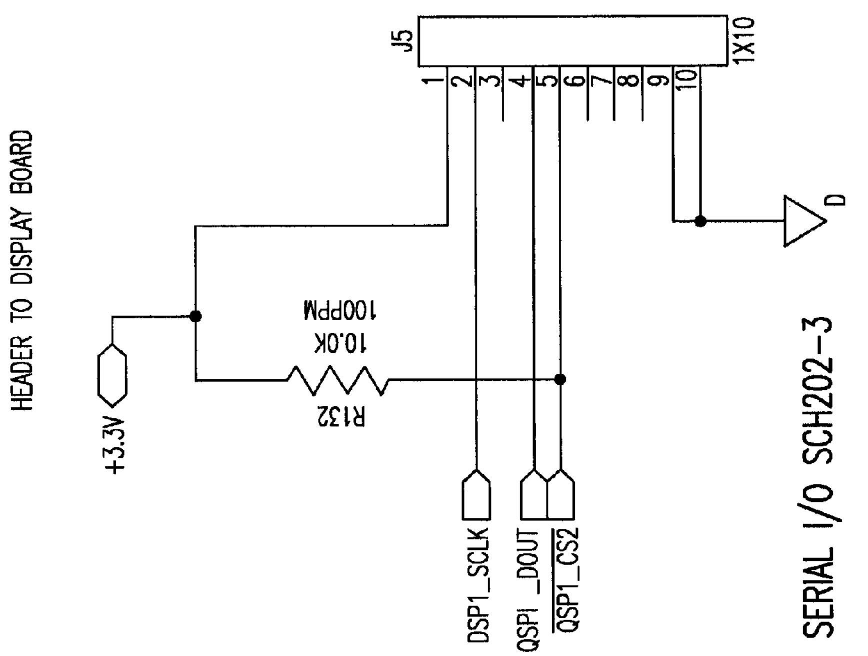
Figure 24N:
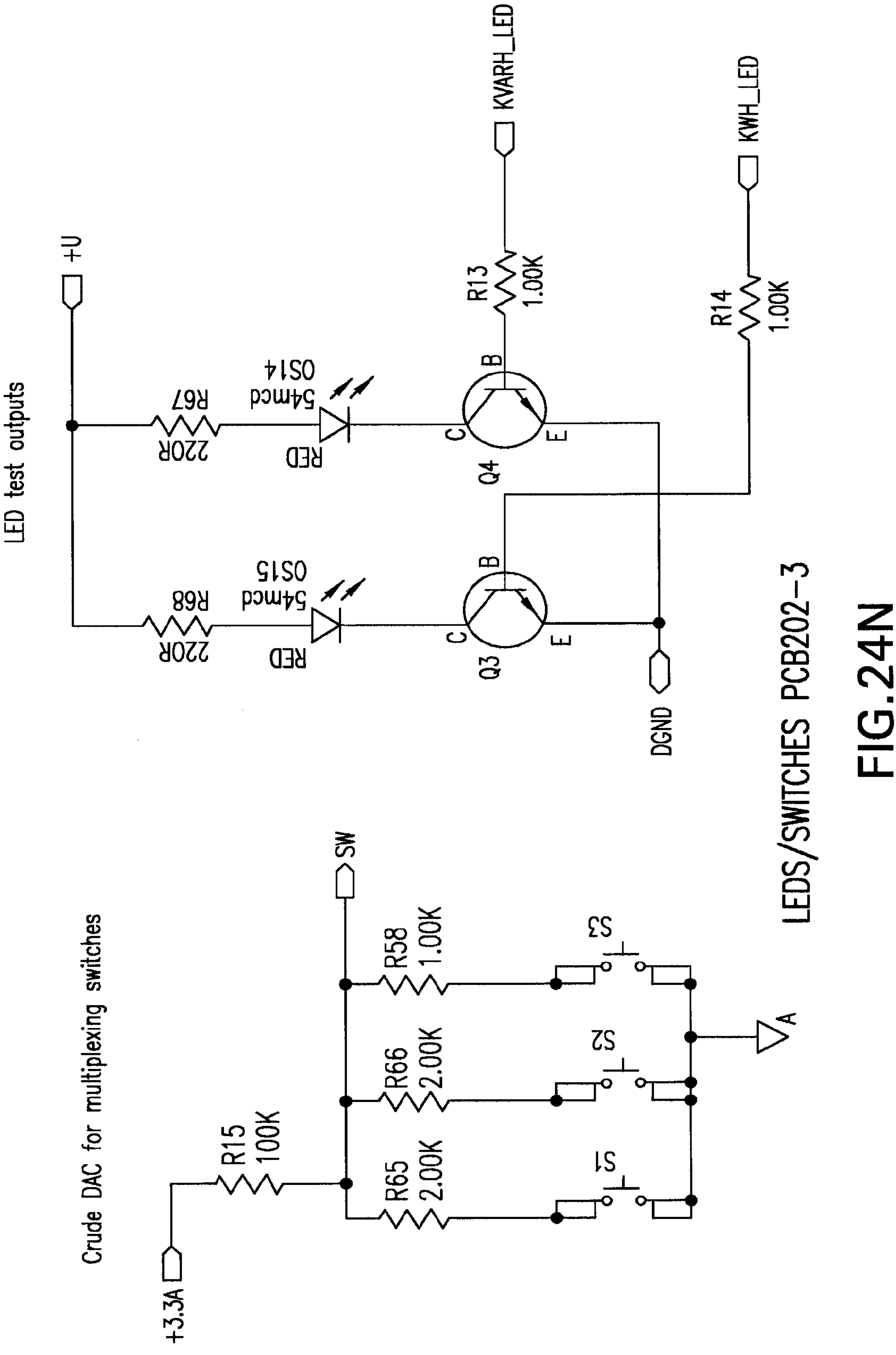

| Key to FIG. 20 | |
|---|---|
| FIG. 20A | Hierarchical interconnections |
| FIG. 20B | SDRAM memory |
| FIG. 20C | MCF5271 CPU |
| FIG. 20D | Debug |
| FIG. 20E | Ethernet interface |
| FIG. 20F | Maxim chip |
| FIG. 20G | Flash memory |
| FIG. 20H | Power supply unit |
| FIG. 20I | Reset configuration and clocking circuitry |
| FIG. 20J | Serial I/O interfaces |
| FIG. 20K | Meter-V |
| FIG. 20L | PLC |

Notes regarding FIG. 20: (1) all decoupling caps less than or equal to 0.1 μF are COG SMD unless otherwise stated; (2) all decoupling caps greater than 0.1 μF are X7R SMD 0805 unless otherwise stated; (3) all connectors are denoted Jx; (4) all jumpers are denoted JPx; (5) all switches are denoted SWx; and (6) all test points are denoted TPx.

It is more convenient to use a 24.576 MHz crystal for deriving the PLC frequencies. Specific to at least one embodiment are:

A Phase Locked Loop (PLL) to lock the sampling of the signal streams to a multiple of the incoming AC line (synchronous sampling to the power line frequency).

Figure 26:
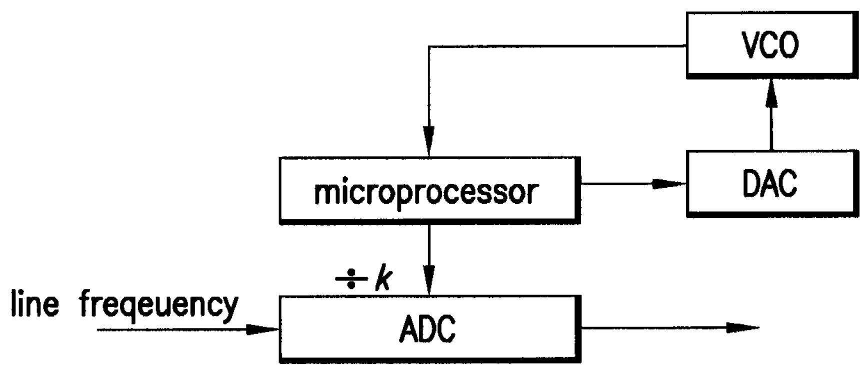
FIG. 26 illustrates a microprocessor being part of a phase locked loop.

A Voltage Controlled Oscillator (VCO) at 90-100 MHz controlled by digital signal processor (DSP) via two Pulse Width Modulators (PWMs) modules directly driving the system clock, hence making the DSP coherent with the PLL. See FIG. 26.

A synchronous phase detector that responds only to the fundamental of the incoming line frequency wave and not to its harmonics.

An option for performing Frequency Shift Keying (FSK) and Phase Shift Keying (PSK) modulation schemes

Fast Fourier Transform (FFT) Used in Certain Embodiments

In at least one aspect of the invention:

(1) The transponders use frequencies which are multiples of 60 Hz in the range of 15-35 kHz. For FSK, the Transponders preferably use two adjacent frequencies, for PSK, they preferably use just one frequency. The STs must have accurate system clocks from which they generate the carrier frequencies—especially in the case of PSK. By sharing one common clock with 1 ppm accuracy using a device such as the Maxim DS4000 TCXO, these conditions are easily met.

(2) A bank of transponders derives a data clock by synchronizing to a particular phase (e.g., the "A" phase of a trunk line with phases A, B, and C). All STs (even the ones in different banks) can utilize the same data clock to separate the bits of the FSK or PSK transmission.

(3) The Meters receive the data, pass it through an anti-aliasing filter and sample it:

(a) A MAX1308 ADC is controlled by an MCF5271 microprocessor to sample data at a rate of 60*2048 or 122880 Hz. (Other channels of the MAX1308 or MAX1320 are used for reading voltage and current for accumulating the metering data that will be transmitted to the Transponders. The metering data is sampled simultaneously with the powerline communications data).

(b) The MAX1308 uses two JK flip flops to control the DMA channel of the MCF5271 to put the sample data directly into the memory of the Coldfire.

(c) The Coldfire receives two frames of data (1/60 of a second, each containing 2048 points) and uses one frame for the real part of 2048 complex points and the second frame for the imaginary part of 2048 points. The data frames must be synchronized to the 60 Hz line as well.

Because many meters are not on the A phase of the 60 Hz line, they must hunt for the correct clock frequency. One exemplary method of hunting for valid preambles comprises dividing the 60 Hz line into 8 phases and trying each of the 8 phases until the correct phase is found. In one embodiment of the present invention, this method is only employed once by the meter until it determines the correct phase of the 60 Hz line, because once connected the meter will never change phase. The present invention, in at least one embodiment, divides the line frequency into more than 12 parts, to allow for a minimum of 30 degree resolution in the line frequency. This allows for the possible phase shifts that may occur in distribution transformers.

(d) The ColdFire then does a 2048 point complex FFT (which takes about 9.8 msec every 33 msec for about 30% of the CPU computing bandwidth). The complex 2048 fft is then decomposed into two real-2048 bit ffts by well known methods of adding and subtracting positive and negative mirror frequencies for the real and imaginary parts, respectively. Thus, every FFT yields two bits of data every 33 msec.

(e) The Coldfire then analyzes the data looking for valid preambles from as many Transponders as it can see. The preamble is a 32 bit number that is known and shared between the Transponders and the meters. It is a code that defines the beginning of the message. The FSK analysis preferably is performed by comparing the amplitudes of the adjacent bins.

(f) To use PSK requires another step. The preferred algorithm is to collect the complex phase information from the single bins into a buffer that is sufficiently large to hold an entire preamble (e.g., a 32 bit preamble). The crystal clock of the meter has an accuracy of 30 ppm. Therefore, over a 32 bit preamble the phase error is 180 degrees. This requires a first order linear correction factor. While scanning for 32 bit preambles, the algorithm checks for phase inversions in adjacent bits. But there is a phase rotation that must be corrected, and an unknown starting phase. The system preferably tries to find the rotation correction factor that is due to the error of its own crystal factor by trial and error, rescanning frames of 32 bits against 32 possible rotation correction factors that will get the correction factor to within 1 ppm, an acceptable error. Once the error is found, the drift is very slow and the meter can keep a record of the error of its own crystal relative to the known good frequency of the bank of transponders. To get the constant error, the PSK algorithm subtracts a constant phase from each point in the 32 bit preamble window. If no preambles are found in the 32 bit window, the algorithm waits for the next two bits from the FFT, eliminates the oldest two bits and brings in the newest two bits and repeats the scan to determine the phase and frequency error between the Transponder and the meter itself. After the successful determination of the error frequency, later scanning for frames needs to look only in a small window of rotation correction factors around the known error. This allows for continuous monitoring of the frequency error with less processing power. A similar technique of locking to the 60 Hz line using phase error information is disclosed in baudpll.c (included in the Appendix below).

Traversing Carrier Frequencies Through Distribution Transformers

As discussed, the prior art suffers from a disadvantage of not being able to pass high frequency signals (starting in the kHz range) through existing distribution transformers without using any additional equipment at the transformer. In other approaches, the transformer is bypassed using expensive additional equipment, thereby increasing overall system cost.

One embodiment comprises an arrangement for making the PLC signal go through the Distribution Transformers (DTs). It is well-established that the magnetic field in the DTs and noise on the line present far from ideal conditions for the PLC signal to propagate to the meters. Solving this problem preferably involves, in one embodiment, a two step process:

1. Signal Coupling: a strategically designed coupler couples the radio-frequency signal to either underground or overhead Medium Tension (MT) electrical distribution cables.
2. Coupler Tuning: the signal coupler is automatically tuned to the highest efficiency to maximize the Signal to Noise Ratio (SNR) as the current on the MT line varies.

Preferably, the coupler introduces a small inductance in the MT line, which then is tuned for a given carrier frequency by a bank of capacitors, thus providing a high SNR for communication. The signal tuning preferably utilizes a tank circuit that automatically maximizes the impedance match of PLC signals on the line by mounting a coupler at the point where the trunk begins. No additional installation is required near the transformer. This has the effect of maximizing the signal on the line as the low impedance of the trunk line provides a return path for the current. The coupler, which preferably comprises a ferrite core with calculated wire turns wound on it, provides a fixed inductance for the PLC signal. The capacitance for the tank circuit is provided by a Capacitor Relay bank (CRB). An Automatic Tuning Module (ATM) comprises circuitry to control the capacitors and relays in the CRB.

Figure 2:
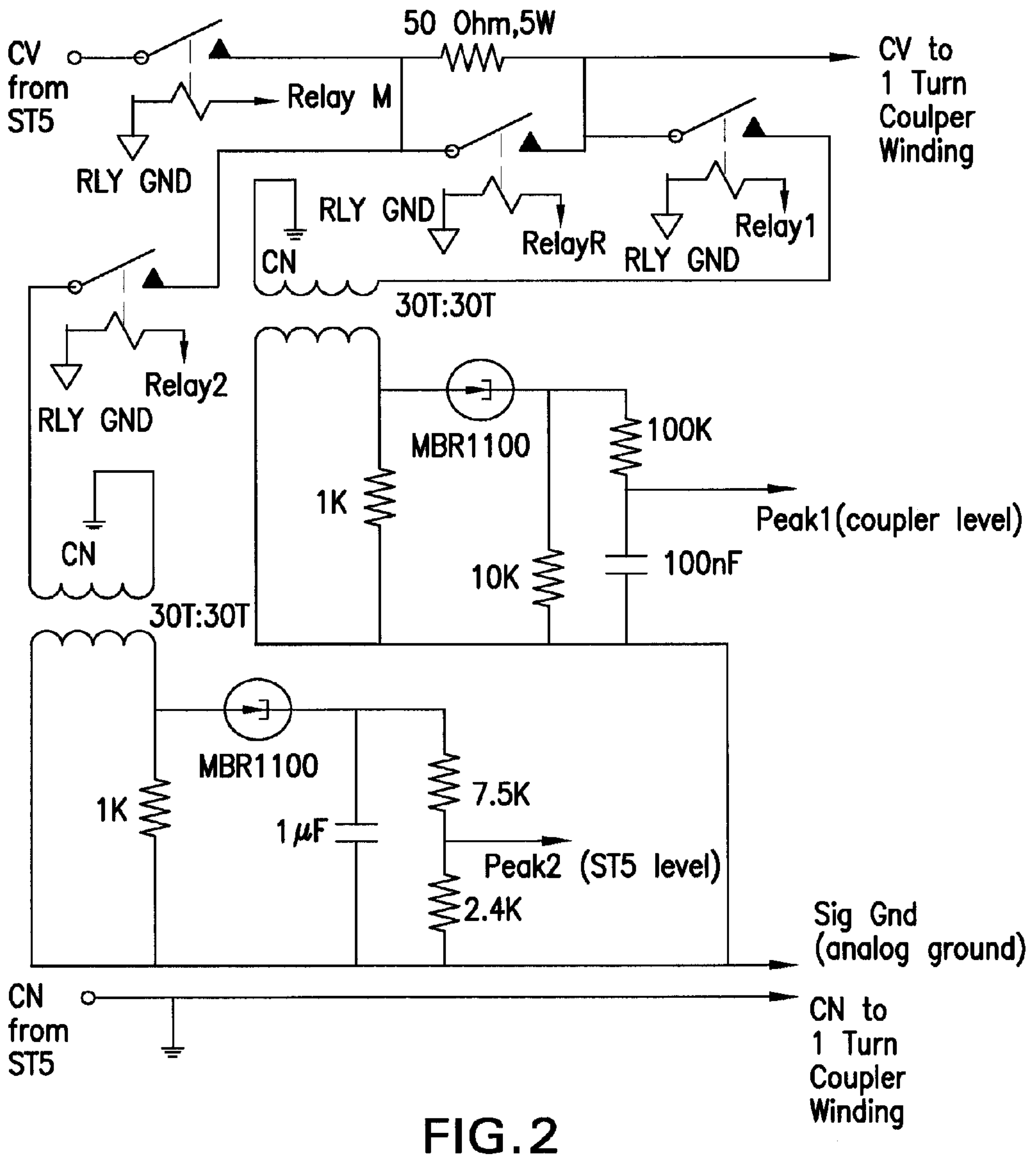
FIG. 2 is a block diagram of a preferred automatic tuning module.

A simplified diagram of the ATM is given in FIG. 2, where CV is Communication Voltage and CN is Communication Neutral.

To determine the data for tuning performance, the ATM calculates the ratio of PEAK1/PEAK2 for all possible values ($2^{10}$=1024 in this embodiment with CRB with 10 capacitors) of the capacitor combinations given a fixed inductance (taking into account inductance drifts due to temperature, etc.) and stores the variables or settings of the best ratio achieved. All further determinations are done relative to this ratio. A typical operation involves the following steps: choose capacitance value, send signal to relay, wait for relay operation, wait for relay settling, calculate the ratio, compare with other ratios and send signal to disconnect relay and wait for relay operation to settle, store the result in memory, and repeat the process with other capacitance values.

In an alternate embodiment, various improvements can be made to the above process. As an example, another embodiment combines ATM and CRB units into a single Automatic Tuning Unit (ATU). The improvements include, but are not limited to:

1. Finer tuning resolution by increased windings on the coupler up to 24 turns and increased capacitance choices up to 4096.
2. Replacing the continuous tone provided by the ST by an on-board signal generator.
3. Calculating PEAK1/PEAK2 ratio (P1/P2 Ratio) as a complex number, thereby detecting both amplitude and phase for the ratio. This improvement provides a better sense of the choice of inductance and capacitance for the resonant circuit, thereby reducing randomness in choosing capacitance values. By determining the phase in addition to the amplitude, lead/lag behavior and consequently an optimal choice of L and C is determined much faster. This in turn results in minimizing relay operation and increasing relay life.
4. Providing ATU Transmit power levels compatible with up to 20 W of PLC transmit power in a frequency band from 10-110 kHz.
5. Ability to tune the coupler to an impedance of at least 120 Ohms at resonance.

Tuning Operation

Referring to FIG. 2, during the tuning operation, Relays M, 1, and 2 are closed, whereas Relay R is open. As a result, the 50 Ohm resistor is selected in the series path of transponder and coupler. This is done to avoid damage to the ST transmitter so that if for some reason the impedance of the coupler is infinitely small, the signal still sees a load of at least 50 Ohm to perform the tuning. Relay M selects the coupler and the tuning process is initiated. Preferred steps comprise:

1. ST indicates to ATM/CRB that tuning can be initiated.
2. ATM/CRB initiates a request for ST to send out continuous tones of communication signal.
3. The ratio PEAK1/PEAK2 is calculated. This ratio corresponds to a DC voltage sensed by the ATM.
4. Responding to this voltage level, ATM calculates the optimum value of capacitance required for resonance and sends a signal to CRB.
5. The appropriate capacitance is selected in CRB, achieved by opening and closing of relays.
6. The ratio is calculated again with the new capacitance.
7. The process repeats for multiple values of capacitance, and when the ratio is as high as possible, the settings of capacitance and inductance are stored.
8. This information is conveyed to ST, and concludes the tuning process.

Normal Communication Operation

After tuning, the normal PLC communication operation proceeds: Relays M and R are closed, and Relays 1 and 2 are open.

All of the improvements mentioned above result in improved tuning efficiency and accuracy while maximizing system life by reducing unwanted relay operations.

Such a coupling set up is further discussed in connection with FIG. 2 and in U.S. patent application Ser. No. 11/198,795, mentioned above.

Figure 3:
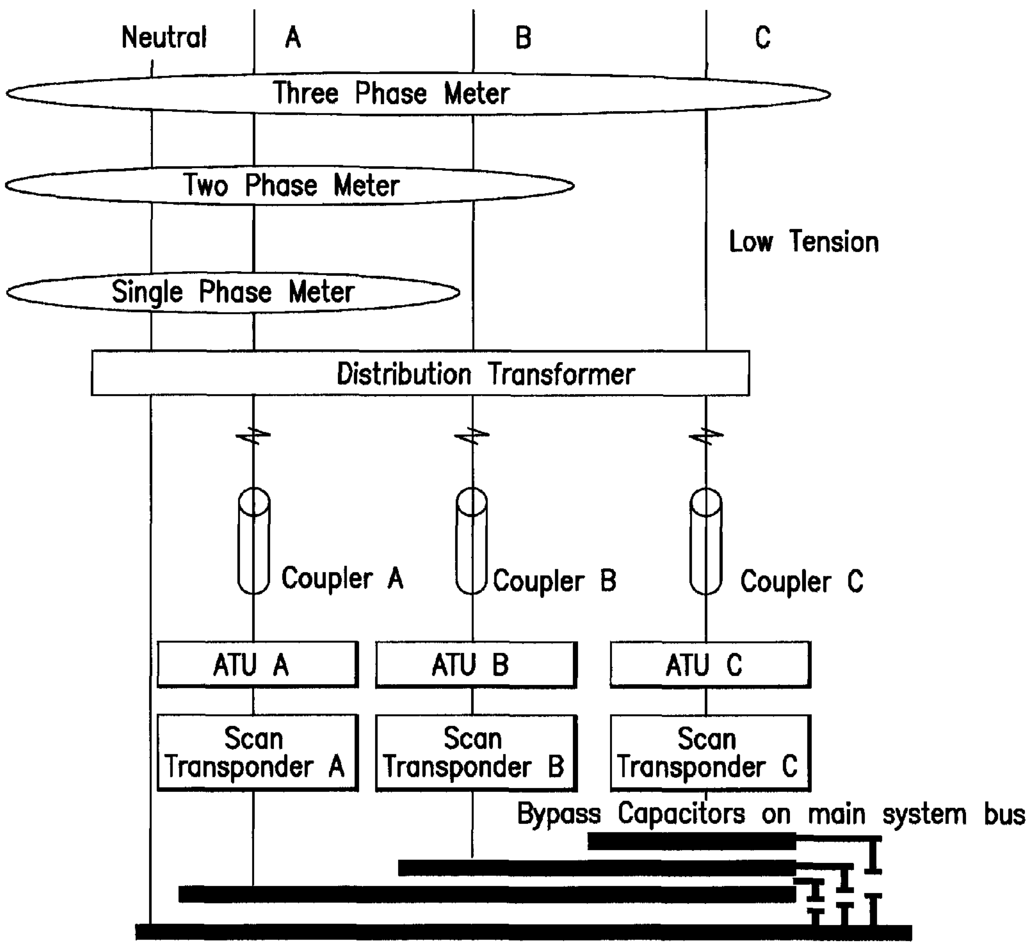
FIG. 3 depicts a preferred substation installation, indicating equipment on each phase of the feeder in a substation.

Owing to cross-links provided by polyphase devices, the PLC signal injected on a particular phase of a feeder in a substation can couple with other phases of either the same or different feeders of other substations. It becomes important to ensure the appropriate return PLC signal path. To this end, a Bypass Capacitor preferably is installed on each phase across the neutral on the main medium tension bus in the substation as shown in FIG. 3. This installation not only ensures that the return path of the PLC signal is the same feeder, but also that the majority of injected PLC signal flows towards the load.

Using FFT for Performing PLC Communication

There are three distinct bands that embodiments of the current invention may use for PLC communication: (1) 10-25 kHz for communication through distribution transformers; (2) 25-50 kHz for low voltage communication; and (3) 70 k-95 kHz for performing Medium Tension (MT) coupler-to-coupler communication in cases when a plurality of couplers are installed on the same medium tension power line.

Figure 4:
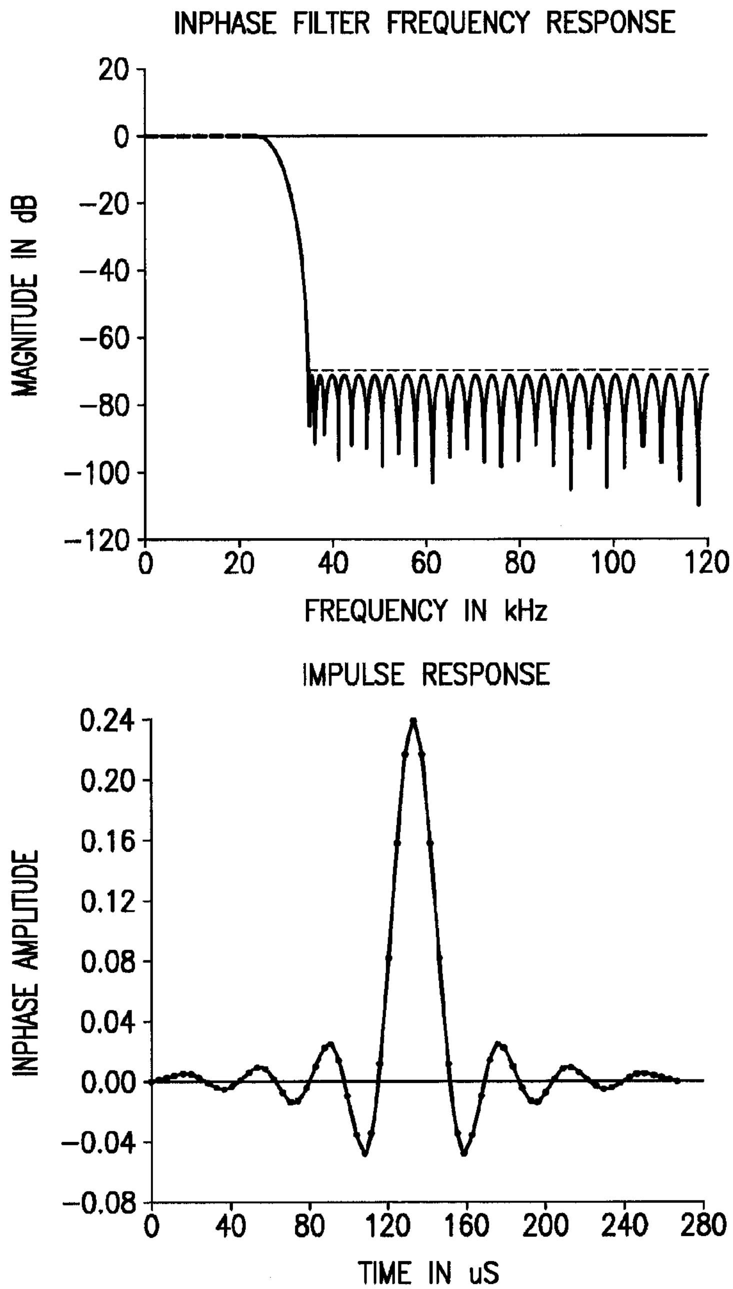
FIG. 4 depicts preferred FIR specifications for 10-25 kHz.

A unique feature of these embodiments is that the transponders use communication frequencies in the kHz range that are rational multiples of the line frequency (that is, of the form $(p/q)\times f_{time}$, where p and q are positive integers). The PLC signal is sampled at about 240 kHz ($2^{12}$*60). Depending upon the selection of one of the above frequency bands of operation, the appropriate Finite Impulse Response (FIR) filter is applied to decimate the data. The FIR specifications are given in FIGS. 4 and 5.

Figure 6:
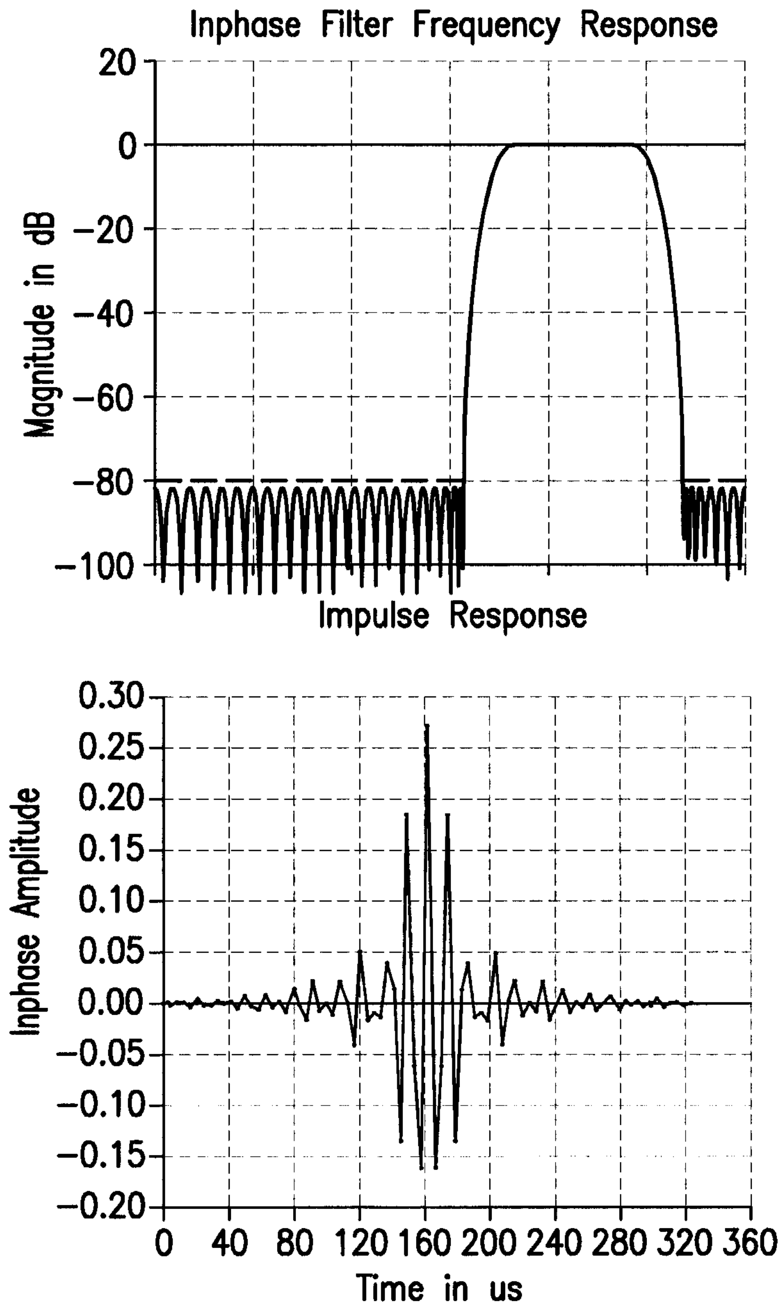
FIG. 6 depicts preferred FIR specifications for 70-90 kHz.

Those skilled in the art will recognize the need to make modifications to the current implementation discussed to incorporate the use of 70-90 kHz frequency band owing to the front-end anti-aliasing filter specifications in this embodiment. Embodiments of the current invention use this frequency range to enable communication between multiple scan transponders on medium tension lines for long distances. The FIR specifications are given in FIG. 6.

Depending upon the selection of the appropriate FIR filter, the decimation is done to either 120 kHz ($2^{11}$*60) or 60 kHz ($2^{11}$*30), in the case of communicating through transformers. A 2048 point FFT is then performed on the decimated data. The data rate is thus determined to be either 60 baud or 30 baud depending on the choice of FIR filters. Every FFT yields two bits approximately every 66 msec when traversing through distribution transformers.

This unique ability of both transponders and meters to perform FFT allows the meters to receive, demodulate, and interpret simultaneous communications from all of the transponders on all of the bands at once, eliminating the need for base and resting channels. Each meter can thus listen to all of the transponders and respond to the one that requests data from it. In addition, each meter can communicate information regarding the signal strength of each transponder that it can hear to the one to which it responds for data requests.

PLC Communication in Line Noise Environment

A distinction is made between PLC communication over medium tension (4-35 kV) and low voltage (LV) (<600V) lines as both power transmitting mediums present a different environment to PLC signals. Whereas medium tension presents its own challenges, it is a quieter environment for PLC communications than LV presenting well-characterized corona discharge noise. Embodiments of this invention overcome the historical challenge of performing PLC communication in a high line-noise environment.

Figure 7:
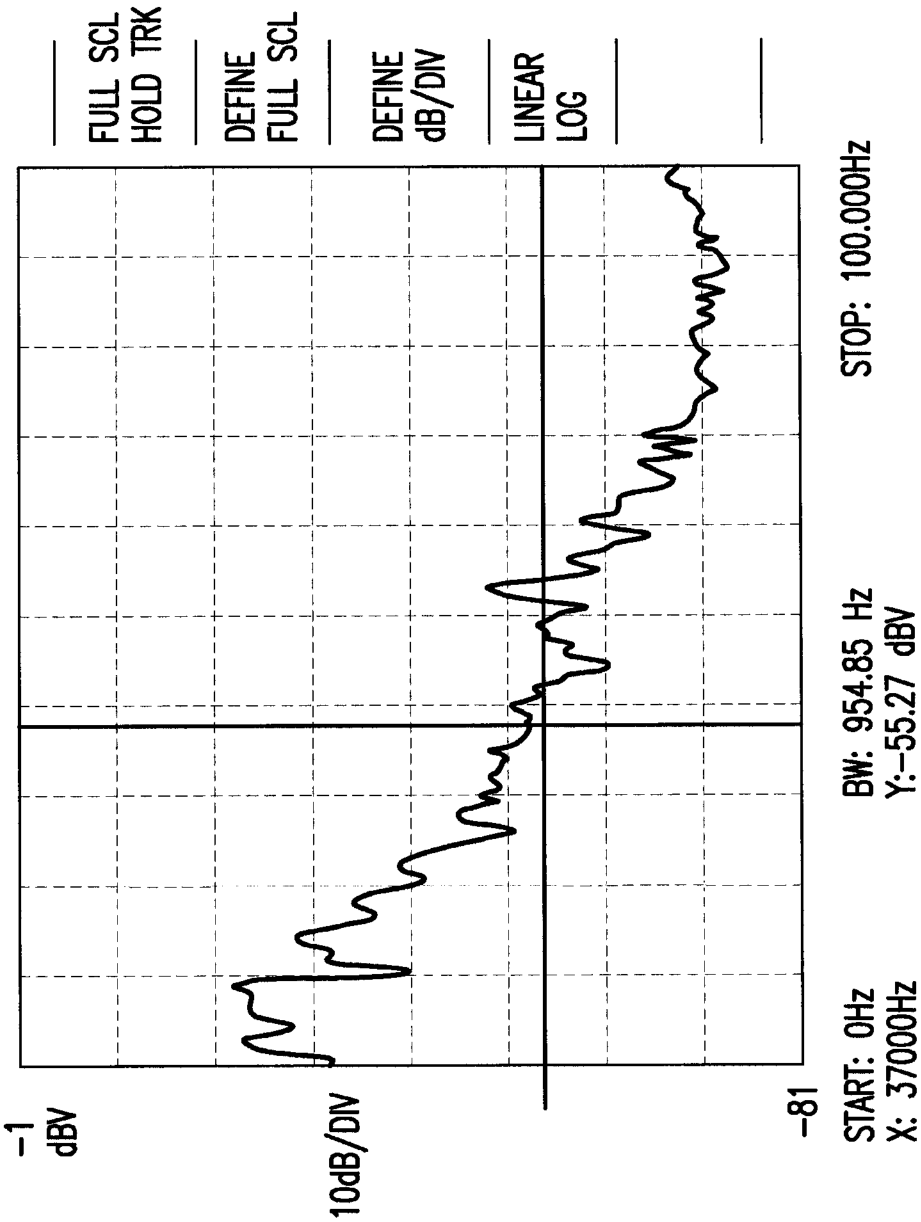
FIG. 7 illustrates line noise spectra for 10-100 kHz.

Shown in FIG. 7 is a snapshot of averaged low voltage noise spectrum in 60 Hz power lines from 0-100 kHz. Whereas the noise levels are sufficiently low at the higher end of the frequency range, at 10-25 kHz the noise rises faster than the signal. At least one embodiment of the invention comprises a method to solve this problem by injecting PLC signals at half odd harmonics of line frequency. This is shown in FIG. 8.

Figure 8:
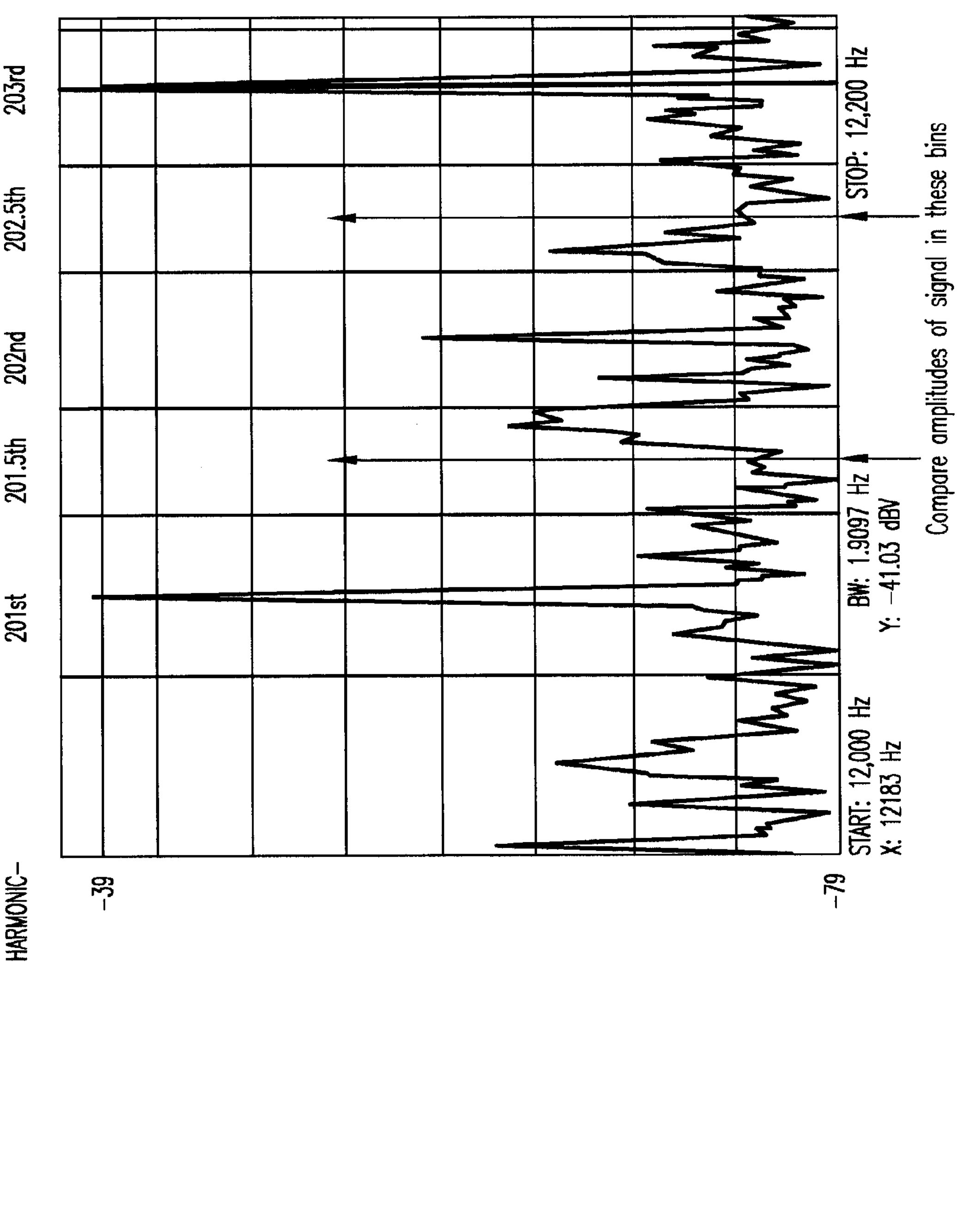
FIG. 8 illustrates injecting PLC signals at half-odd harmonics of 60 Hz.

When traversing through transformers, since FFT is done every 30 Hz and the harmonics are separated by 60 Hz, the data bits reside in the bin corresponding to the $201.5^{th}$ and $202.5^{th}$ harmonic of 60 Hz as shown in FIG. 8. When using an FSK scheme, the preferred algorithm considers these two bins of frequencies and compares the amplitude of the signal in the two to determine 1 or 0. This FSK scheme uses two frequencies and yields a data rate of 30 baud. It will be apparent to the skilled in the art that other schemes such as QFSK can be implemented to yield 60 baud.

The significant advantage of communicating at these frequencies is that it results in improvements in SNR of more than 40 dB. Similar results are obtained across other frequency ranges where the noise floor is ~80 dB below the harmonics.

Removing Phase Ambiguity in PLC Communication in a Polyphase Environment

Figure 10:
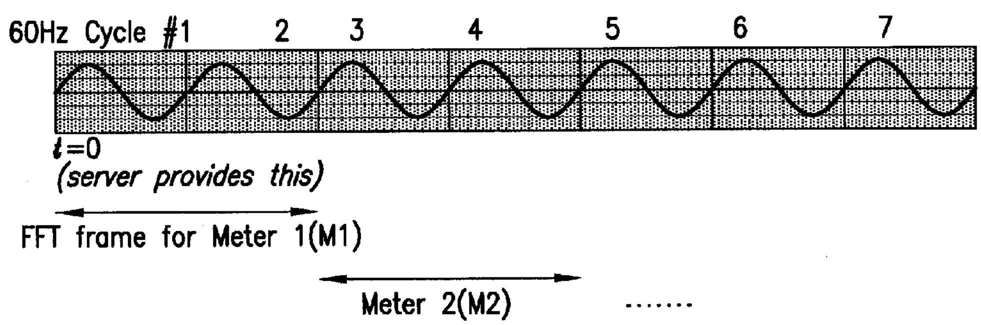
FIG. 10 depicts server determined time=0 reference and 30 Hz cycles of various meters.

The transponders communicate by allocating time windows for each meter. In most applications, the time window is one line-cycle wide. However, as mentioned, when communicating through distribution transformers, the time slot can be two line-cycles wide, as shown in FIG. 10. Given the ability of simultaneous communication of multiple meters and transponders, each meter performs a shift in its internal clock to align its data frames with the incoming data frames from the transponders. This preferably is achieved by:

1. Establishing a t=0 reference: In order to establish data-frame alignment between an ST and the meter, a zero time reference for communication is required. This is provided by the remote server that is itself locked to a particular phase (say, the A phase). This can be implemented by using Real Time Clock (RTC) circuits that use the 60 Hz line frequency as the time reference (such as Intersil CDP68HC68T1, a multifunctional CMOS real time clock). This time reference is communicated from the server to all the STs via a high speed network.
2. Aligning meter data frames with multiple transponders: When a meter is powered up, it listens to multiple STs in the territory. However, the meters are themselves on different phases, and each data frame received by the meter can undergo various phase variations due to the line topology. The probability of error increases as frames are more and more misaligned, reducing the overall SNR and the ability to differentiate between 1 and 0. As the meter tries to align its data frames with various STs that it can listen to, it shifts its data frames and calculates the SNR for every possible combination (24 for 30 Hz data frames, and 12 for 60 Hz data frames). Further, it locks to the ST which results in maximum SNR.

When traversing through transformers, both STs and meters perform FFT on the PLC and data signals every 30 Hz in the 10-25 kHz range. Because the PLLs implemented in both the ST and the meter are locked to the line, the data frames are synchronized to the 60 Hz line as well. However the data frames can shift in phase due to:

(a) Various transformer configurations that can exist in the path between the ST and the meter (delta-Wye, etc.).

(b) Shifts in phase due to the fact that STs are locked on a particular phase, whereas single and polyphase meters can be powered up by other phases.

Figure 9:
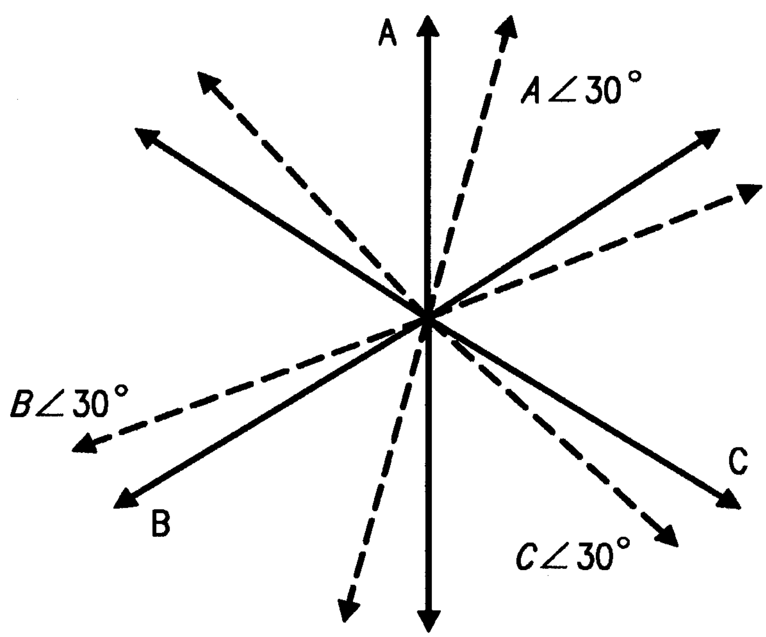
FIG. 9 depicts the 12 possibilities in which an FFT frame received by the meter can be out of phase with an ST FFT frame. Dotted lines correspond to a 30 degree rotation to account for a delta transformer in the signal path between the ST and the meter.

The SNR ratio is maximized when the meter data frame and ST data frames are most closely aligned. From a meter's standpoint, this requires receiving PLC signals from all possible STs that it can "hear," decoding the signal, checking the SNR ratio by aligning data frames and then responding to the ST yielding maximum SNR. FIG. 9 shows the 12 possible ways in which the data frames can be off in phase. In addition, because the data frames are available every 30 Hz on a 60 Hz line, there are two possibilities corresponding to the 2 possible phases obtained by dividing 60 Hz by 2. Hence there are 24 ways that meter data frames can be misaligned with ST data frames.

Figure 13A:
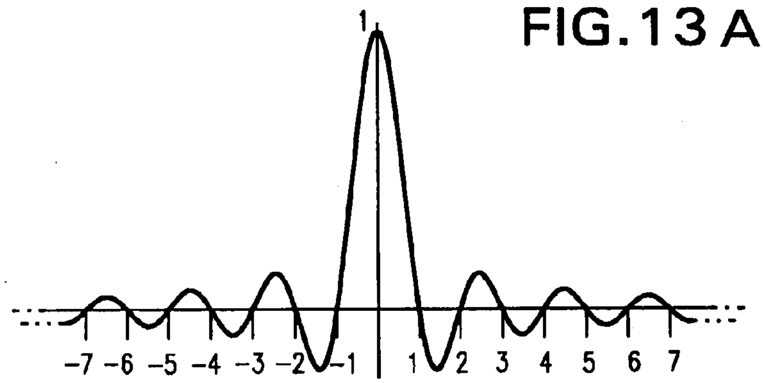
FIG. 13A depicts zeros of a Sinc function.
Figure 13B:
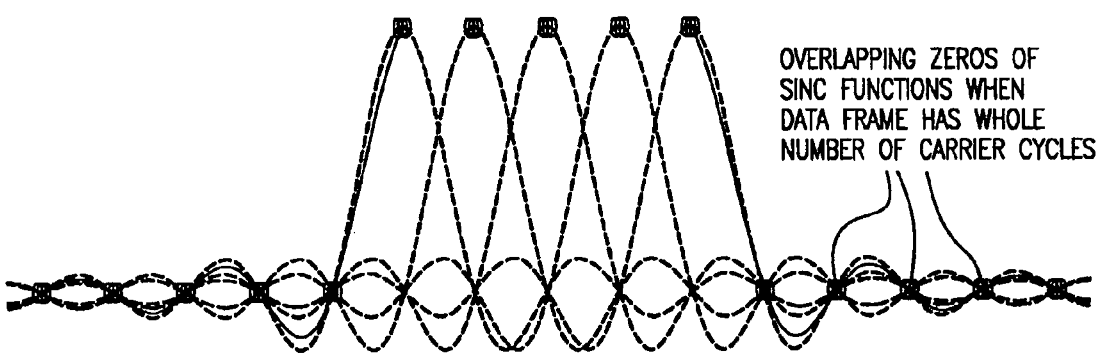
FIG. 13B depicts overlapping zeros of multiple Sinc functions when meter data frames are aligned with ST data frames.

The significant advantage offered by locking the data frames to the line frequency is explained thus: there are whole number of carrier cycles in each data frame. Keeping this in mind, and recalling that the Fourier transform of a rectangular function yields a Sinc function (see FIG. 13A, when several meters are communicating simultaneously, with each having shifted its internal data clock cycle to align with incoming data frames, the nulls of the Sinc function overlap and no smearing of data bits and no SNR degradation occurs (see FIG. 13B). This yields a very high SNR even when multiple meters communicate simultaneously. This is precisely the reason that the system goes through a communication alignment mode wherein: (1) in one embodiment, a remote server may assign the global clock (which maybe derived from the line frequency) to all STs; (2) meters receive data simultaneously from multiple STs; (3) meters determine the shift in their data clocks to align data frames with multiple STs; and (4) meters lock to the ST that results in highest SNR.

Figure 11:
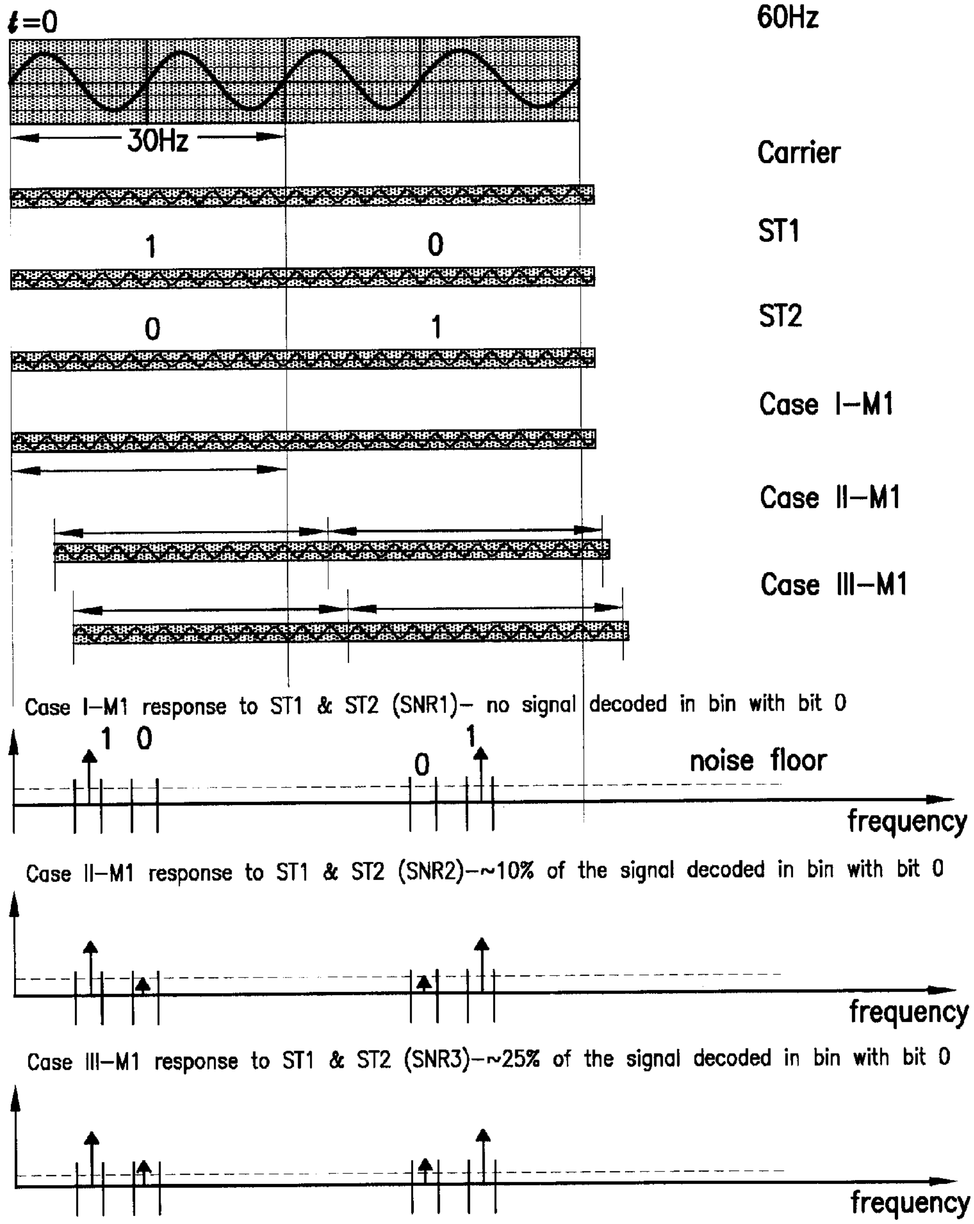
FIG. 11 illustrates SNR degradation effects of FSK decoding by meter when the data frames are aligned and not aligned.

FFT preferably is performed every 30 Hz or 2 cycles of line frequency of 60 Hz in the 10-25 kHz frequency band. In each frame of the ST, there are an odd integral number of cycles of the carrier frequency. The preferred modulation scheme being Frequency Shift Keying (FSK), if there are n cycles for transmitting bit 1, bit 0 is transmitted using n+2 cycles of the carrier frequency. It becomes important for the meter to recognize its own 2 cycles of 60 Hz in order to be able to decode its data bits which are available every 1/30$^{th}$ of a second (FIG. 10). In FIG. 11, two STs (ST1 and ST2) that transmit bits are intercepted by a meter (M1) for the case when data frames are aligned (Case I) and when they are misaligned by different degrees (Cases II and III). Both STs use different frequencies to communicate. FSK is used to decode the signal for bits.

In cases II and III, M1 decodes signals with misaligned data frames; hence, there is energy that spills over in the adjacent (half-odd separated) frequencies. If the signal level that falls in the "adjacent" frequency bin is less than the noise floor, the signal can be decoded correctly. However, if the spill-over is more than the noise floor (as with Case III), the ability to distinguish between 1 and 0 decreases, and hence the overall SNR drops, resulting in an error in decoding. Thus, a. If the frames are misaligned, smearing of data bits occurs and the SNR degrades.

b. In the event that the frequency changes and there are misaligned data frames, there is a substantial amount of energy that spills over in the adjacent FFT bins, interfering with the other STs in the system that communicate using frequencies in those specific bins.

Figure 12:
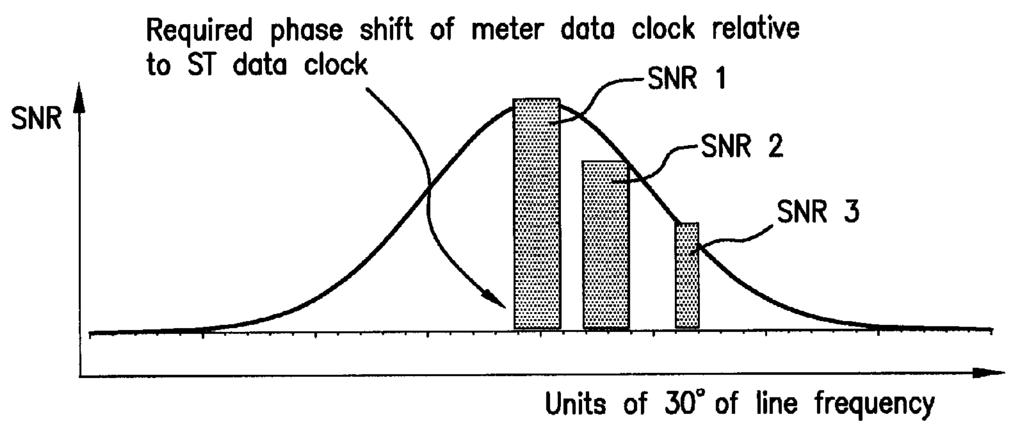
FIG. 12 depicts distribution of SNR as meter M1 tries to align its data frames to incoming ST's data frames.

In FIG. 11, SNR1>SNR2>SNR3. The SNR distribution is expected to look like a modified normal distribution, with one of the STs with which the meter data frames are aligned resulting in the max SNR. The meter then locks to this ST for further communication (FIG. 12). The meter locks until a significant change in SNR ratio is encountered by the meter, in which case the process repeats.

The above technique provides a substantial improvement over the existing art of performing PLC through distribution transformers without bypassing these transformers while maintaining robust and reliable communication resulting in high throughput.

Analog Signal Chain in Preferred Embodiment

Figure 14:
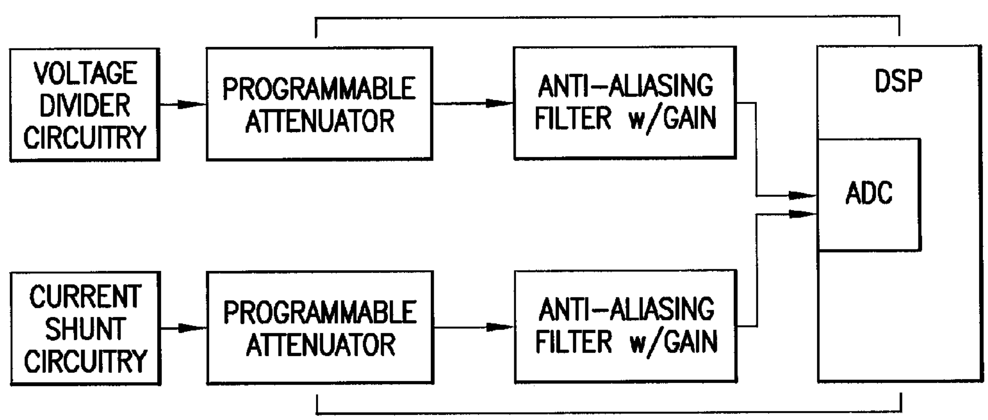
FIG. 14 is a block diagram of a preferred analog front-end for metering.

This section discusses the PCB 202 block diagram (see FIG. 14) and the blocks can be cross referenced with the schematic shown in FIG. 23. Each metering and communication channel preferably comprises front-end analog circuitry followed by the signal processing.

The current embodiment uses an anti-aliasing filter with fixed gain which provides first-order temperature tracking, hence eliminating the need to recalibrate meters when temperature drifts are encountered. The analog front-end for voltage (current) channels preferably comprises voltage (current) sensing elements and a programmable attenuator followed by an anti-aliasing filter. The attenuator reduces the incoming signal level so that no clipping occurs after the anti-aliasing filter. The constant gain anti-aliasing filter restores the signal to full value at the input of the ADC. For metering, the anti-aliasing filter cuts off frequencies above 5 kHz. The inputs are then fed into the ADC, which is part of the DSP.

Whereas it is a common practice in current art to include a Programmable Gain Amplifier (PGA) followed by a low gain anti-aliasing filter, the advantage offered by the use in the described embodiment of a programmable attenuator followed by a large fixed-gain filter i will be apparent to those skilled in the art. In addition, the implementation of both the anti-aliasing filters on a single chip is exactly identical using the same Quad Op Amps along with 25 ppm resistors and NPO/COG capacitors. This provides a means for both V and I channels to track temperature drifts up to first order without recalibrating the meter.

In contrast, using a PGA along with a low gain filter will not permit tracking of the phase shift in the V and I signals introduced due to temperature. This is due to the fact that the phase shift introduced by PGA is a function of the gain.

This unique implementation that includes pairing the anti-aliasing filters ensures that the phase drifts encountered in both voltage and current channels are exactly identical and hence accuracy of the power calculation (given by the product of V and I) is not compromised.

Digital Signal Chain in Preferred Embodiments

Figure 19A:
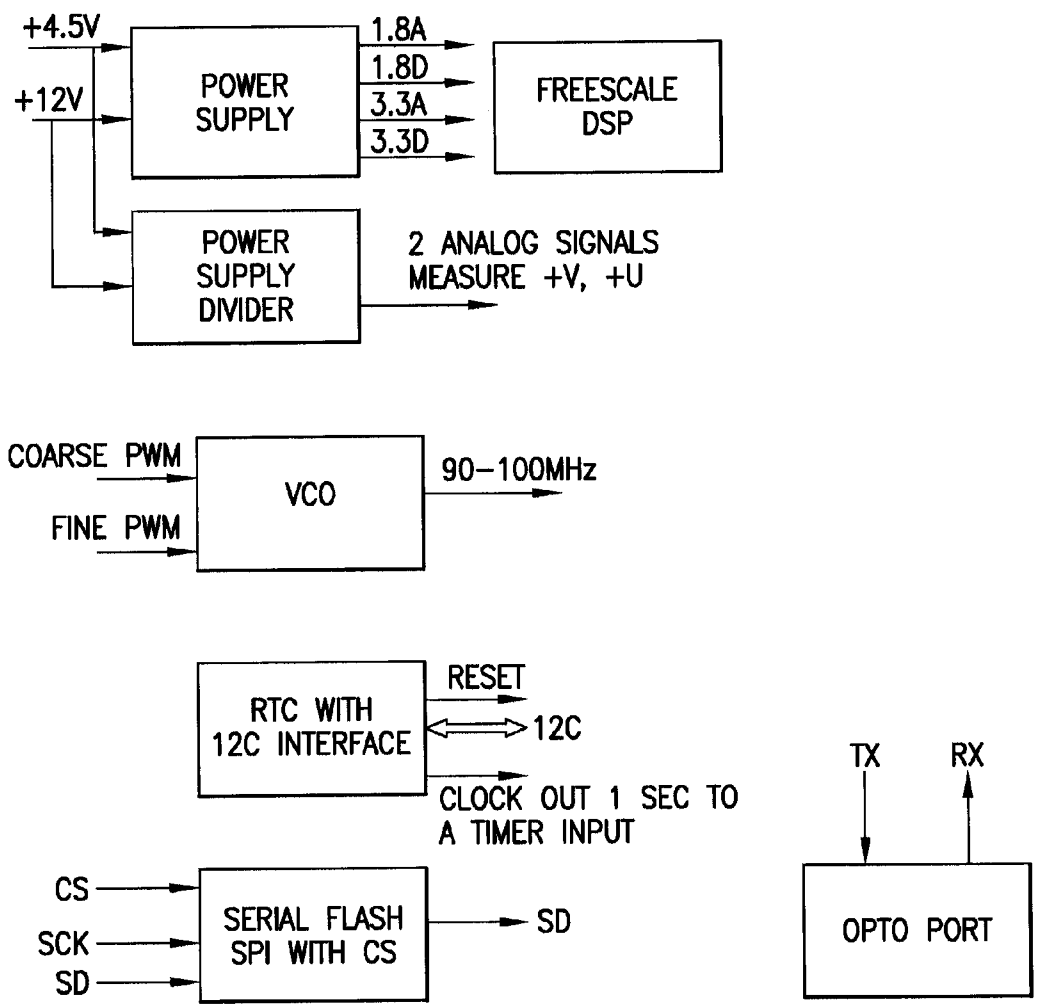
FIG. 19 is a block diagram of a preferred D meter (this is one of at least two versions of a D meter).
Figure 19B:
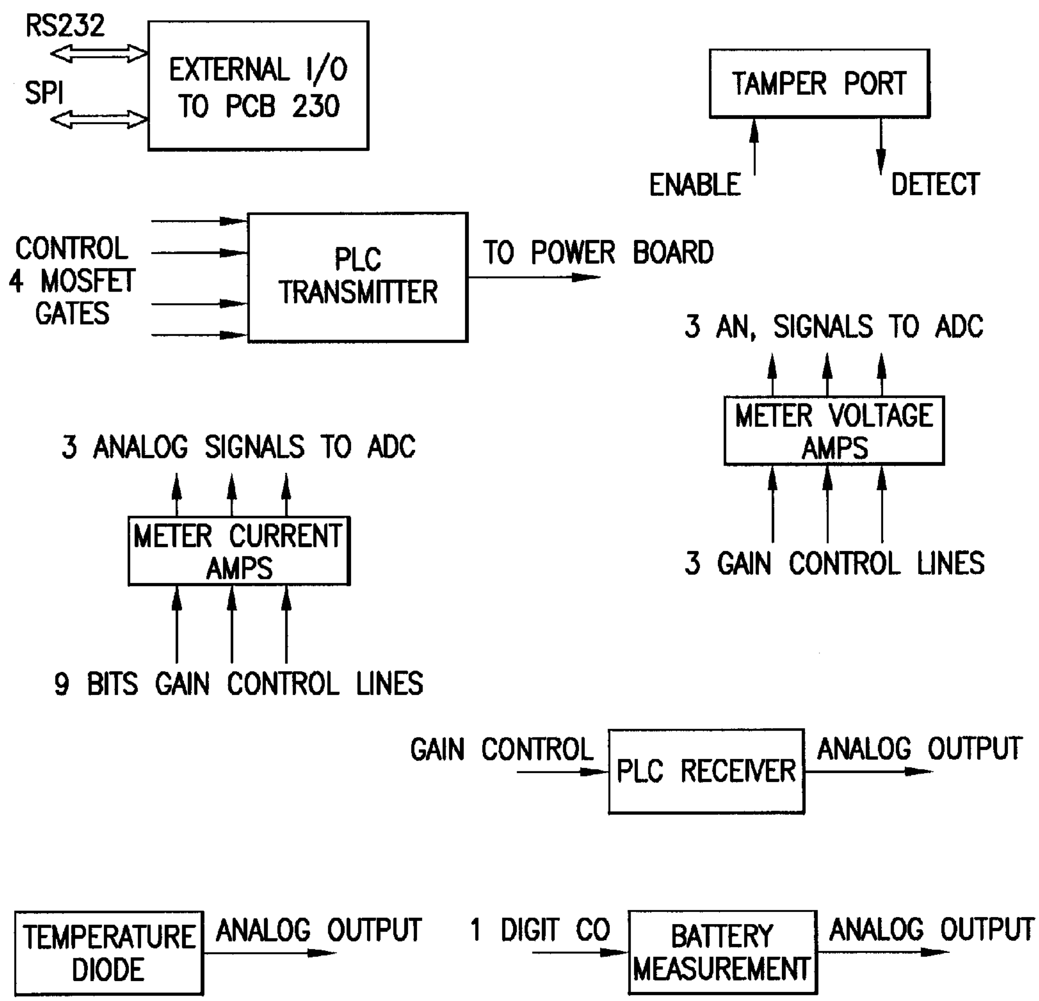

At least one embodiment preferably uses a Phase Lock Loop (PLL) to lock the sampling of the signal streams to a multiple of the incoming AC line frequency. In an embodiment discussed above, the sampling is at a rate asynchronous to the power line. In the meter circuit represented by FIG. 23 (also referred to herein as the "D meter") there is a Voltage Controlled Oscillator (VCO) at 90-100 MHz which is controlled by the Digital Signal Processing (DSP) engine via two Pulse Width Modulators (PWMs). The VCO directly drives the system clock of the DSP chip (disabling the internal PLL), so the DSP becomes an integral part of the PLL. Locking the system clock of the DSP to the power line facilitates the alignment of the sampling to the waveform of the power line. The phase detector should function so as to respond only to the fundamental of the incoming 60 Hz wave and not to its harmonics. FIG. 19 is a block diagram of this preferred DSP implementation.

A DSP BIOS or voluntary context switching code provides three stacks, each for background, PLC communications and serial communications. The small micro communicates with the DSP using an $I^2C$ driver. The MSP430F2002 integrated circuit measures the power supplies, tamper port, temperature and battery voltage. The tasks of the MSP430F2002 include:

i. maintain an RTC;

ii. measure the battery voltage;

iii. measure the temperature;

iv. measure the +U power supply;

v. reset the DSP on brown out;

vi. provide an additional watchdog circuit; and vii. provide a 1-second reference to go into the DSP for a time reference to measure against the system clock from the VCO.

Implementation of Metering in Preferred Embodiment

Each data stream has an associated circuit to effect analog amplification and anti-aliasing.

Figure 15:
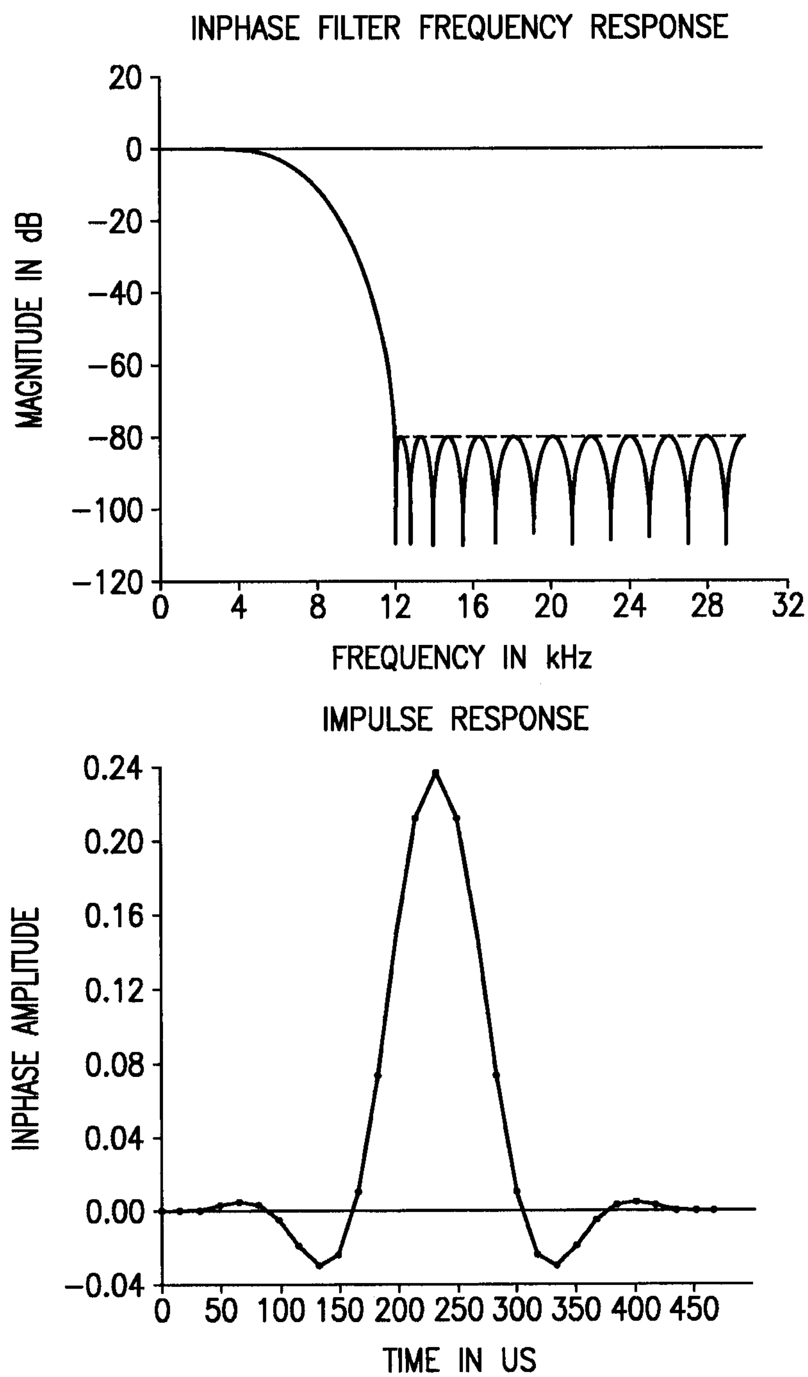
FIG. 15 depicts preferred FIR specs for decimating metering data.

Each of the analog front end sections has a programmable attenuator that is controlled by the higher level code. The data stream is sampled at 60 kHz ($2^{10}$*60) and then a FIR filter is applied to decimate the data stream to ~15 kHz ($2^8$*60). The filter specifications are shown in FIG. 15.

Since only the data up to 3 kHz is of interest, a 3-12 kHz rolloff on the decimating FIR is used with ~15 kHz sample rate. The frequencies from 0-3 or 12-15 kHz are mapped into 0-3 kHz. A real FFT is performed to yield 2 streams of data which can be further decomposed into 4 streams of data: Real and Imaginary Voltage and Real and Imaginary Current. This is achieved by adding and subtracting positive and negative mirror frequencies for the real and imaginary parts, respectively. Since the aliased signal in the 12-15 kHz range falls below 80 dB, the accuracy is achieved using the above discussed FIR filter. Alternatively, a 256-point complex FFT can be performed on every phase of the decimated data stream. This yields 2 pairs of data streams—a real part, which is the voltage, and an imaginary part, which is the current. This approach requires a 256 complex FFT every 16.667 milliseconds.

Figure 16:
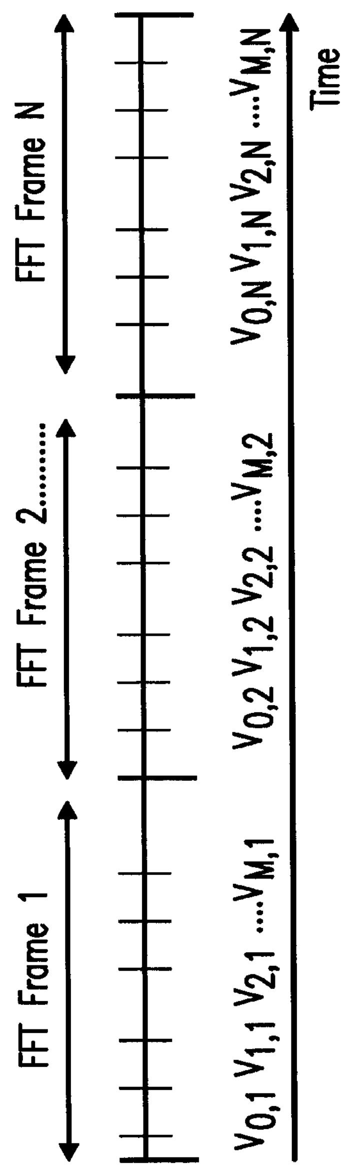
FIG. 16 depicts FFT frames for voltage indicating the harmonics

Performing either FFT results in the following voltage and current, where the notation $V_{m,n}$ denotes the m$^{th}$ harmonic of the n$^{th}$ cycle number. For example, $V_{11}$ and $I_{11}$ correspond to the fundamental of the first cycle and $V_{21}$ and $I_{21}$ to the first harmonic of the first cycle, etc., as shown in FIG. 16.

The real and imaginary parts of the harmonic content of any $k^{th}$ cycle are given by:

$$V_{mk}=Re(V_{mk})+iIm(V_{mk});\ m=1\ldots M$$

$$I_{mk}=Re(I_{mk})+iIm(I_{mk});\ k=1\ldots n$$

The imaginary part of voltage is the measure of lack of synchronization between the PLL and the line frequency. In order to calculate metering quantities, the calculations are done in the time-domain. In the time-domain, the FFT capability offers the flexibility to calculate metering quantities using only the fundamental or including the harmonics. Using the complex form of voltage and current obtained from FFT, the metering quantities are calculated as:

$$P=V_{mk}*I_{mk}^{*}$$

$$W=Re(P)=Re(V_{mk})*Re(I_{mk})+Im(I_{mk})*Im(V_{mk}).$$

$$\text{Var}=Im(P)=Re(I_{mk})*IM(V_{mk})-Re(V_{mk})*Im(I_{mk})$$

$$\text{PowerFactor}=W/P$$

In the above formulas, when the harmonics are included ($V_{mk}$ & $I_{mk}$; m=1 . . . M,k=1 . . . n), all metering quantities include the effects of harmonics. On the other hand, when only the fundamental is used ($V_{1k}$ & $I_{1k}$), all calculated quantities represent only the 60 Hz contribution. As an example, we show the calculations when only the fundamental is used to perform calculations. Only $V_1$ and $I_1$ are used from all FFT data frames. The following quantities are calculated for a given set of N frames and a line frequency of $f_{line}$:

$$kWh=\sum_{i=1}^{N}[\text{Re}(V_{1i})*\text{Re}(I_{1i})+\text{Im}(V_{1i})*\text{Im}(I_{1i})]*\Delta t_i*10^{-3}$$

$$kVAr=\sum_{i=1}^{N}[\text{Re}(I_{1i})*\text{Im}(V_{1i})-\text{Re}(V_{1k})*\text{Im}(I_{1k})]*\Delta t_i*10^{-3}$$

$$kVAh=\sum_{i=1}^{N}|V_{1i}|*|I_{1i}|*\Delta t_i*10^{-3}$$

$$V^2h=\sum_{i=1}^{N}|V_{1i}|^2*\Delta t_i$$

$$I^2h=\sum_{i=1}^{N}|I_{1i}|^2*\Delta t_i;$$

$$\Delta t=1/f_{line}$$

The displacement power factor is given by:

$$\text{Cos}(\theta)=\left|\frac{W}{VA}\right|;$$

where W and VA only includes the fundamentals and $$VA_1=V_1RMS*I_1RMS;\ \text{where}$$

$$V_1RMS=\sqrt{\sum_{n=1}^{N}|V_{1,n}|^2}\quad \&\ I_1RMS=\sqrt{\sum_{n=1}^{N}|I_{1,n}|^2}\ ;$$

for N cycles

The THD is the measurement of the harmonic distortion present and is defined as the ratio of the sum of the powers of all harmonic components to the power of the fundamental. For the $n^{th}$ cycle, this is evaluated as:

$$VTHD_n=\frac{\sqrt{\sum_{m=2}^{M}V_{mn}^2}}{V_{1n}}\quad \&\ ITHD_n=\frac{\sqrt{\sum_{m=2}^{M}I_{mn}^2}}{I_{1n}};$$

$V_{m,n}$ ($I_{mm}$) is the $m^{th}$ harmonic from the $n^{th}$ cycle obtained from the FFT, where $$V_{m,n}^{\ 2}=Re(V_{m,n})^2+Im(V_{m,n})^2\ \&\ I_{m,n}^{\ 2}=Re(I_{m,n})^2+Im(I_{m,n})^2.$$

This provides the flexibility to either include or exclude the harmonics when calculating metering quantities.

Logical Deductions from Data Received from PLC Communication

Figure 1:
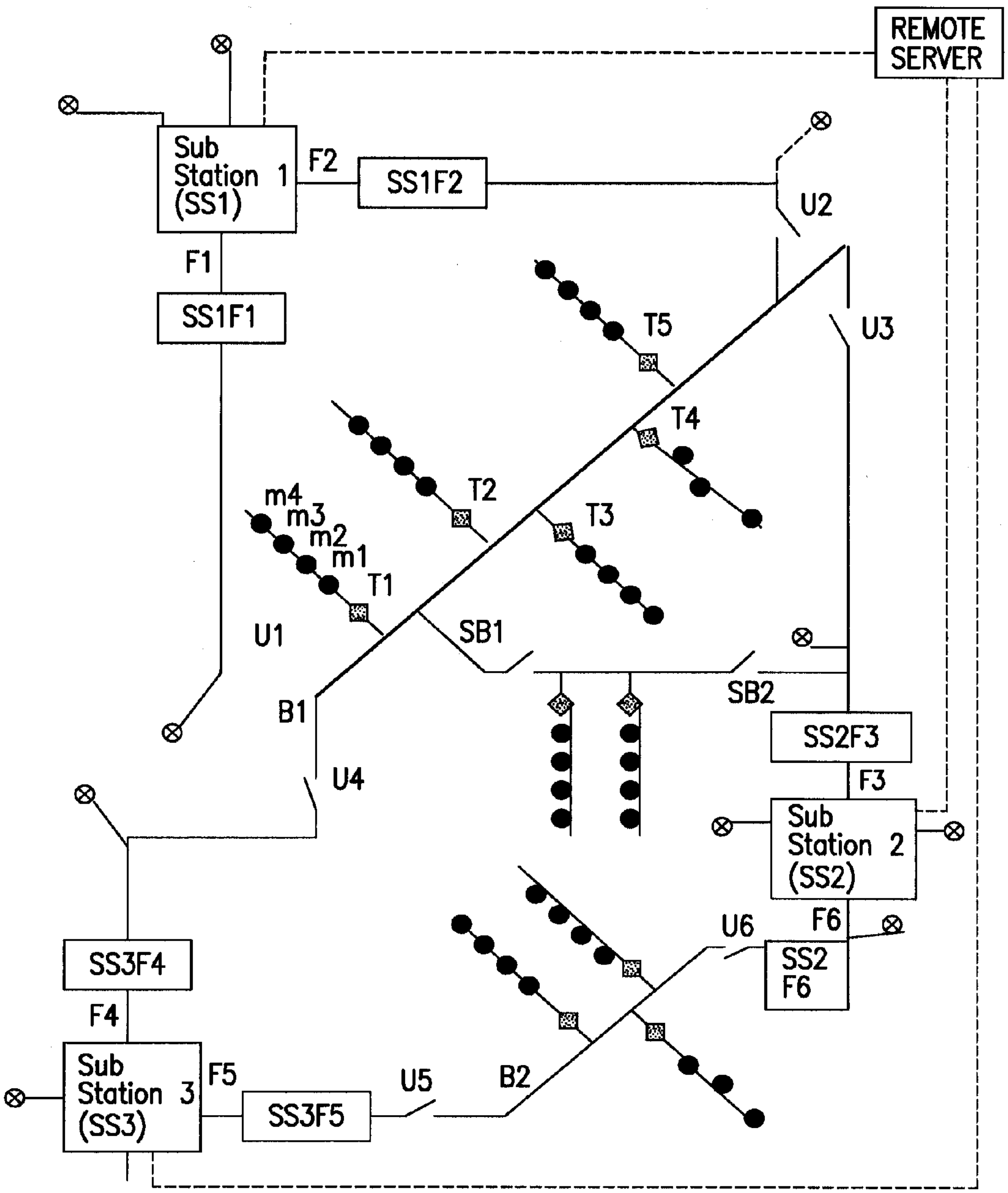
FIG. 1 is a diagram of an exemplary installation of a preferred system; substations are indicated as SSp; distribution transformers as Tp; switches as Up; feeders as Fq; and meters as mp. Transponders are indicated as $STpFq_i$, where p and q are integers and i=1, 2, or 3 for a 3-phase feeder line.

Embodiments of the current invention permit demodulation of messages from multiple scan transponders and meters simultaneously, thus providing a significant improvement in communications. Once a network of STs is established along with preferred meters in the service territory and the appropriate tuning and coupling installations are made, the system preferably operates in three distinct modes:

1. Communication Alignment Mode—Prior to collecting data from the meters, the STs sends out a periodic burst of signal stream of alternating 1 and 0 bits for ~5 minutes. All the meters in the service territory are programmed to receive this burst mode. The meters align their data clocks and choose the best ST with which to communicate for other modes of system operation.
2. Data Collection Mode—Once the data clocks are aligned with incoming FFT frames, each of the STs in the network communicates with the meters in its latest Cross Reference list and collects data stored in the memory of the meters using PLC, either on a demand or a scheduled basis.
3. Dynamic Mapping Mode—The entire ST network preferably cooperates to detect changes in the service territory. These may include, but are not limited to:
   a. Isolated hardware failure
      i. Meter hardware failure
      ii. Transformer Fuse failure
   b. Power failure
      i. Distribution transformer failure
      ii. Feeder Failure
   c. Switching of Feeders
      i. Feeder Faults
      ii. System wide load balancing
   d. Addition and updating of meters It is a common utility practice to switch feeder trunks (for example, to take a feeder out of service for maintenance, to switch feeders due to feeder faults, or to balance loads in the system). Under any one of these events, the scan transponder loses communication with the meters since they no longer can be contacted by the ST. The manual update of a cross-reference type of list, as performed by certain prior art, presents a significant concern with respect to scalability of the system. The current invention, in at least aspect, addresses this issue as follows:

Consider a typical utility setup as shown in FIG. 1: B1 and B2 are two feeder branches connected to 9 distribution transformers (Ti; i=1 to 9). These transformers feed a heterogeneous (single-phase and poly-phase) population of meters connected on the secondary low voltage side. Branch B1 can be fed from feeders emanating from any one of the three substations by the use of switches U1, U2, U3, and U4. Similarly, meters connected to B2 can be fed either from substation 2 or substation 3 by using switches U5 and U6. In addition, there is a Sub-branch that can be fed from any of the substations by using Sub Branch switches SB1 and SB2.

Remote Server Directory

The remote server to which the system of STs is connected maintains a directory (for example, Lightweight Directory Access Protocol or LDAP) which is essentially a hierarchical framework of objects with each object representing a shared entity. Once the system configuration is fed into the directory, the algorithm constantly updates this map as changes are made in the territory. This involves communicating with the meters and automatically mapping the system configuration by including information on primary and alternate paths to every meter. See FIG. 17.

The directory thus contains information regarding various abstraction levels in the network- feeder level, phase level, distribution transformer level, and meter level. The server runs a program that monitors the communication performance of the various STs deriving their master clocks from it. Every transformer is assigned a primary meter (typically the first-connected meter, $m_i$) with which the STs constantly communicate in order to detect outage and other changes in the service territory.

For example, SS1 feeds B1 by switch U1. In this case, the directory comprises the following information for meter $m_1$ connected to T1 in a look-up table:

TABLE 2

| m1 Path | Substation | Feeder | Switch | Transformer | Scan Transponder |
|---|---|---|---|---|---|
| Primary | 1 | F1 | U1 | T1 | $ST1F1_1$ |
| Alternate 1 | 1 | F2 | U2 | T1 | $ST1F2_1$ |
| Alternate 2 | 2 | F1 | U3 | T1 | $ST2F1_1$ |
| Alternate 3 | 3 | F2 | U4 | T1 | $ST3F2_1$ |

Figure 17:
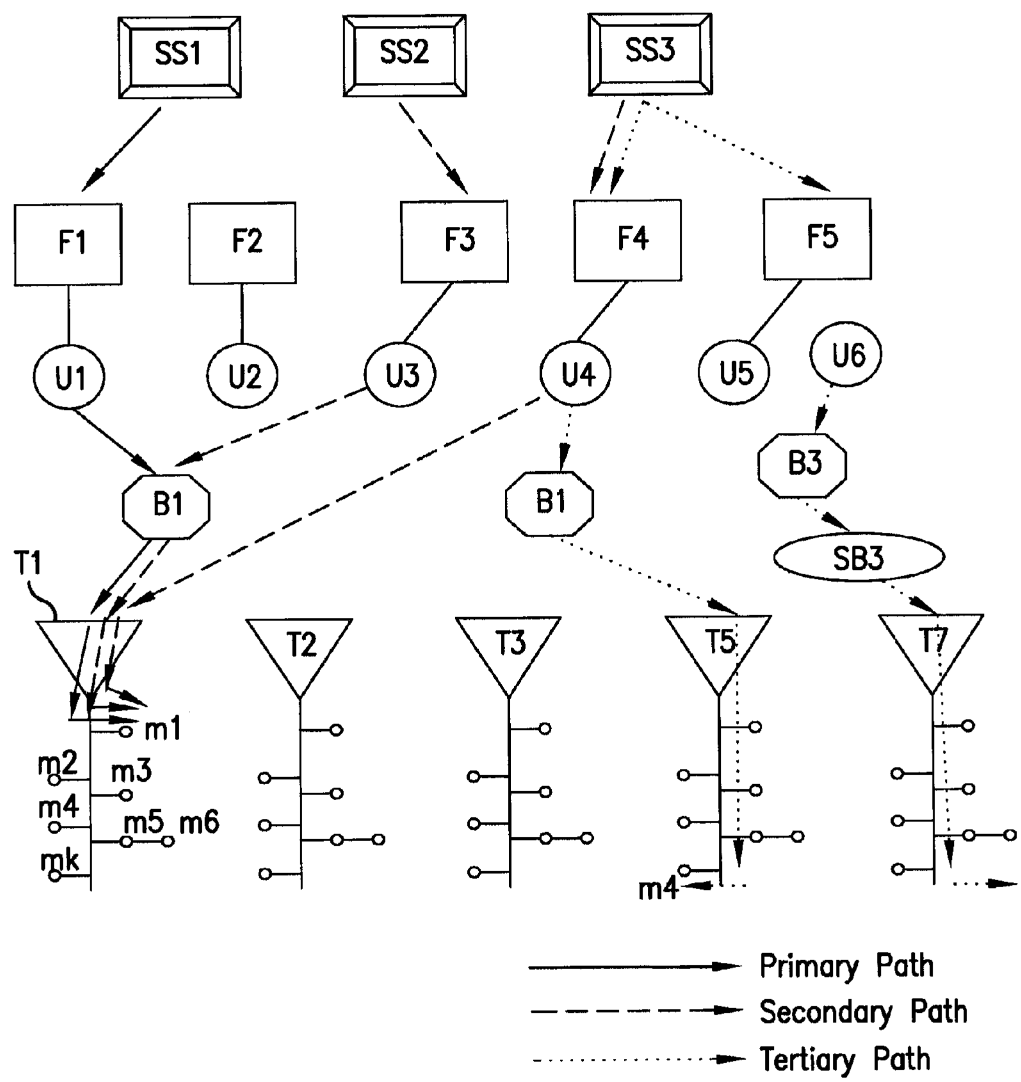
FIG. 17 depicts an exemplary directory structure of a system map.

The scan transponders preferably are named such that the first number is indicative of the corresponding substation and the number following F is indicative of the feeder number emanating from that substation, and the subscript indicates the phase on which it is installed. FIG. 17 depicts an exemplary directory structure implemented in the server, which can be configured for various event information. These events may include: (1) basic consumption data; (2) outage data; (3) power quality information; (4) status verification flags of several parts of a network; (5) load profile information for certain meters; (6) preventive maintenance flags for part of network infrastructure; and (7) status change flags of network elements such as switches, feeder changers, and reclosers. A preferred algorithm to raise status change flags of several network elements and for localizing outages is discussed below.

To explain the algorithm, we assume a population of m transformers and n meters per transformer. Running index i goes from 1 to m, and index k goes from 1 to n.

Figure 18:
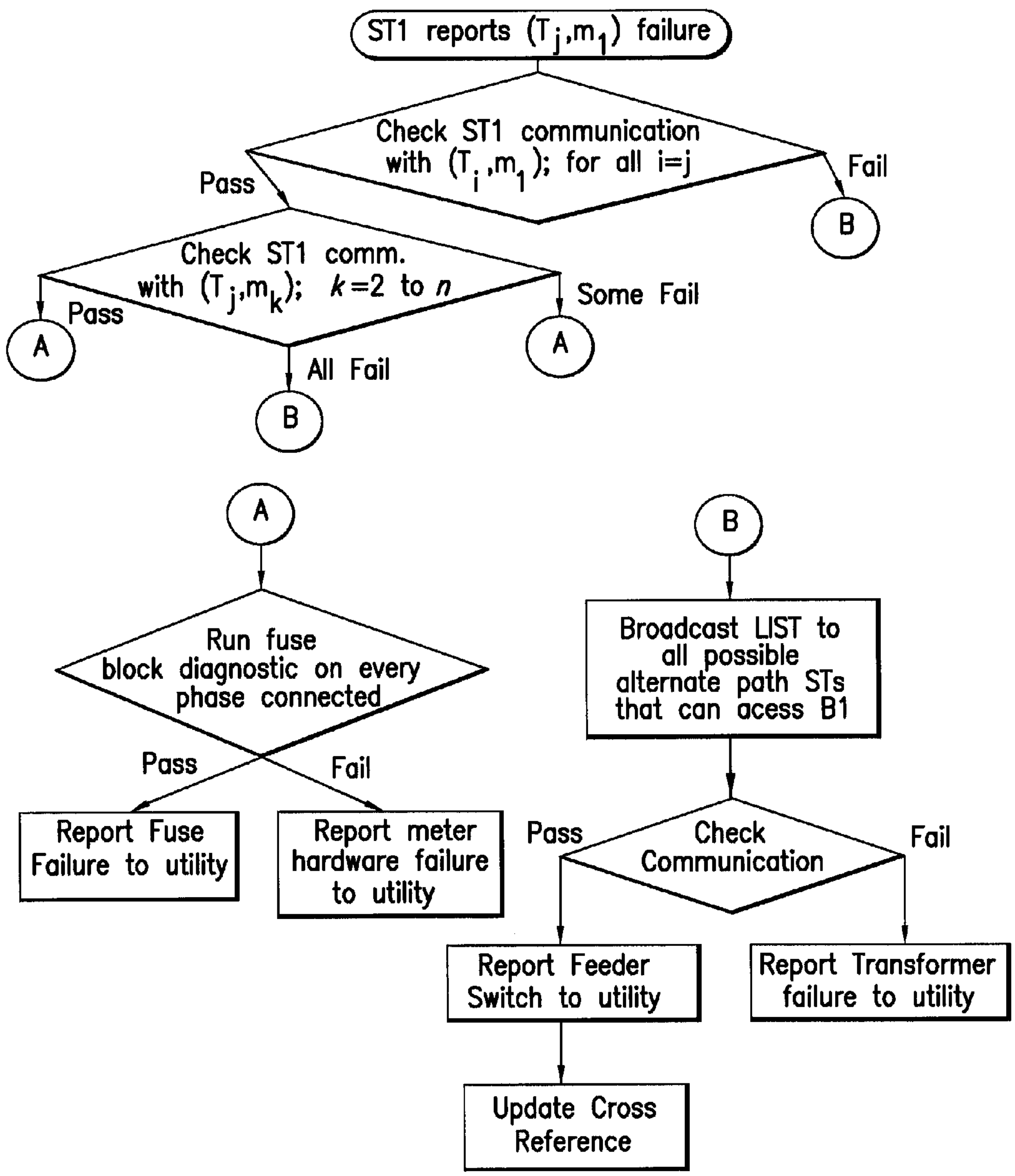
FIG. 18 is a flowchart of an example of logical analysis on received PLC data.

After a typical data collection operation period, the server preferably creates a list of meters that failed communication with their respective STs and hence failed to report consumption data. LIST is a preferred data structure listing meters that failed communication. Referring to FIG. 18, preferably, 1. During the data collection mode, the STs communicate with the meters in their cross reference list and collect energy consumption interval data.
2. All the meters that fail to communicate with the STs are grouped into a data structure called LIST. This data structure is stored in the server.
3. The server determines the alternate paths by which the meters can by accessed by using the look-up table (Table 2) in its memory.
4. The alternate paths for all the meters are traced.
5. Logical conclusions are made, outage is localized, flags are set and reporting is provided to the utility by sending a command to the utility control center.
6. The service map in LDAP and the cross reference list of STs are updated to access meters.
7. The above steps continue to take place after every data collection period is completed.

By implementing the above process steps, not only is the system map dynamically updated, the utility also gets immediate notifications of changes made in a service territory (outages, feeder switching, etc.). In addition, if the utility decides to discontinue power to some customers (typically due to sustained failure of payment), the corresponding meters fail to communicate. This change, once noticed by the EMS, can be verified with the utility by interfacing the remote server with a utility Customer Information System (CIS). This eliminates manual updating of the meter cross reference list for STs, thus making the system scalable for both utility and submetering installations.

As discussed, one unique feature of certain embodiments of this invention is the synchronization of all transponder data clocks to a global data clock, which may be derived from a remote server that may derive its own clock from one of the phases of the line frequency. Further, when the slave devices (typically meters) perform FFT on data frames, they preferably shift their own data clocks to align their FFT frames with the incoming data bits (see FIG. 9). Once this shifting is completed, each meter has knowledge of the absolute phase (absolute phase with 0 degrees referred to as "phase A," absolute phase with 120 degrees lead referred to as "Phase B," and absolute phase with 240 degree lead referred to as "phase C"). This unique capability enables determination by the remote server of absolute phase across the entire system territory.

Prior art systems do not allow for such a determination of absolute phase for a meter. The meters in some systems contain some information regarding phases, but only of relative phases, since the meter "sees" three phases 120 degrees apart. This lack of information regarding in phase continuity is also why it becomes difficult to exactly determine the absolute phase that feeds a wall socket, in a room with multiple sockets, on a given floor with multiple rooms, in a multi floor building being fed from three utility phases.

Embodiments of the current invention provide the continuity of phase information throughout the territory, from the remote server to transponders installed in substations down to meters installed in the low voltage territory. This capability enables identification of the absolute phase by which each single phase meter is powered up in the service territory.

Given the above capability, embodiments of the current invention enable reconstructing the load of a distribution transformer by phase, without actually installing a three phase meter at the transformer's secondary output. For a typical utility installation consisting of multiple transformers, this reduces system costs while providing value added service. By performing a vector sum of the currents on the three phases, the total load on the distribution transformer can be accurately determined at the substation.

Submetering involves the allocation of energy costs within a multi-tenant property according to the energy consumption by individual tenants. The meters measure electricity consumed by individual tenants and communicate the consumption data to a Scan Transponder, preferably installed at an entry point to the property, using the power lines in the property. This data then may be accessed from the transponder by a host of communication infrastructures (e.g., wireless, phone line, GPRS, etc.). In a preferred submetering installation, all the components for medium tension installation are eliminated, since both the STs and meters are installed on the low voltage line.

In a submetering environment with multiple electrical services feeding a large building, multiple STs are installed, one for each service. However, due to cross coupling of PLC signals (via the neutral which is common to all services or via phase to phase loads), the assignment of specific meters to each ST can be a tedious process. This invention allows the STs installed on different services to be connected to a remote server that can dynamically assign a meter cross reference list for every transponder as the communication environment changes.

A preferred submetering control module comprises a Power Board (see FIG. 21 for schematic) that also has the PLC transmit and receive circuitry on it. The Power Board provides power to the CPU board. The control module also comprises an I/O extension board (see FIG. 22 for schematic), which has several I/O extension options that enable communication from metering modules to the CPU board.

A preferred control module also comprises a CPU Board (see FIG. 23 for schematic), which has a Digital Signal Processing (DSP) processor.

For residential applications where limited data is expected (typically energy consumption only), another embodiment may include a low-cost meter with reduced resources compared to that presented in FIG. 23. This meter circuit is PCB 240, presented in FIG. 24.

Figure 25A:
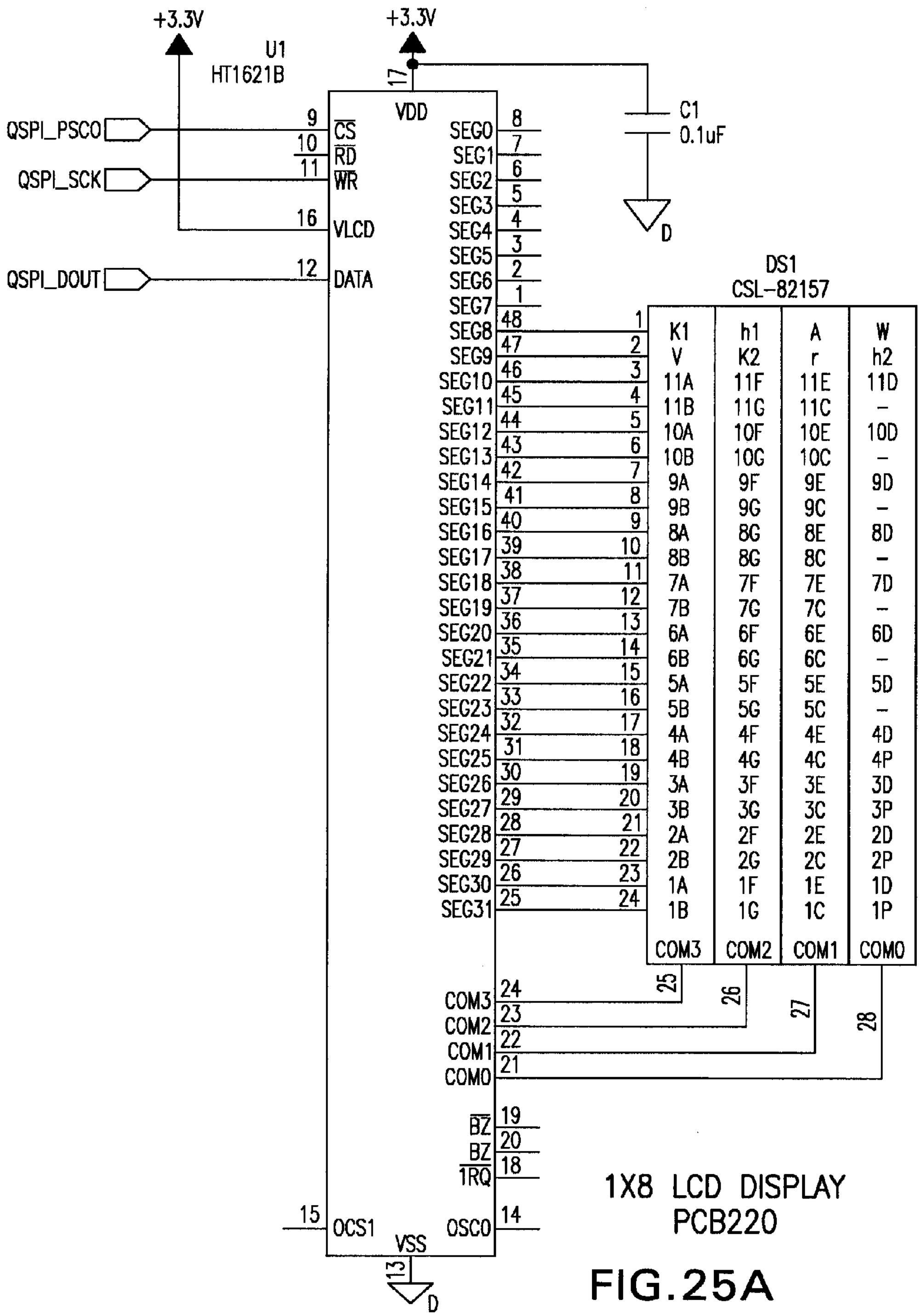
FIG. 25 has preferred schematics for a display board (PCB 220).
Figure 25B:
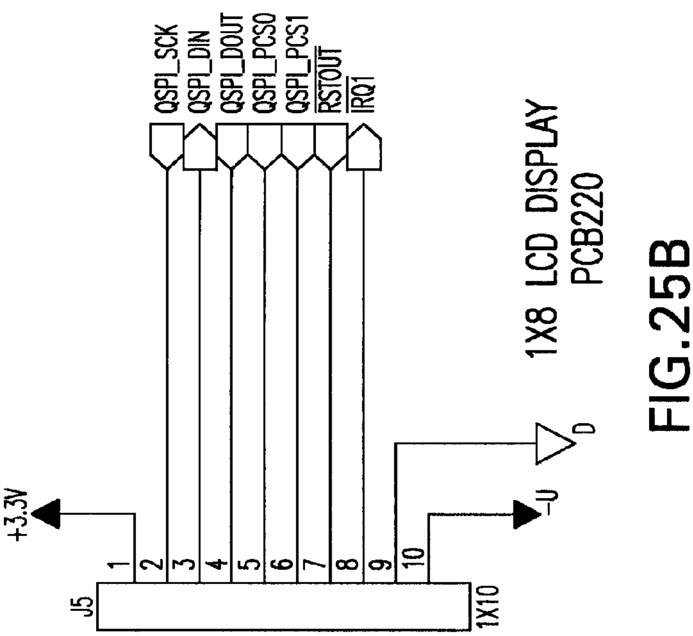

Each residential meter preferably also has a 9-digit display board (PCB 220; see FIG. 25 for schematic).

Although FFT has been described herein in various contexts, those skilled in the art will recognize that discrete Fourier transform (DFT) could also be used in each case.

The various embodiments described above are provided as an illustration only and do not limit the invention. The skilled in the art will recognize the various modifications that can be made to the embodiments discussed, without departing from the scope of the invention, which is set in the claims below.

We claim:

1. An apparatus to implement a Phased Locked Loop (PLL) comprising:

a Voltage Controlled Oscillator (VCO);

a microprocessor;

a digital-to-analog converter (DAC); and an analog-to-digital converter (ADC):

wherein said VCO drives a clock of said microprocessor;

wherein said microprocessor controls sampling time of said ADC at times determined by said clock of said microprocessor;

wherein said ADC monitors an input analog signal source and converts said signal to digital format;

wherein said microprocessor is in communication with said ADC and receives and filters said output digital signal from said ADC;

wherein said microprocessor controls output of said DAC based upon said filtered output digital signal from said ADC; and wherein said DAC controls input of said VCO to close said PLL.

2. The apparatus of claim 1, wherein an input analog signal is a conditioned copy of a waveform of a power line.

3. The apparatus of claim 1,wherein said DAC comprises a pulse width modulator followed by a low pass filter.

* * * * *